US012668677B2

(12) United States Patent
DeBruin et al.

(10) Patent No.: US 12,668,677 B2
(45) Date of Patent: Jun. 30, 2026

(54) LIQUEFYING AND DEHALOGENATING WASTE PLASTICS

(71) Applicant: ExxonMobil Product Solutions Company, Spring, TX (US)

(72) Inventors: Bruce Roger DeBruin, Gray, TN (US); Daryl Bitting, Longview, TX (US); David Eugene Slivensky, Tatum, TX (US); Xianchun Wu, Longview, TX (US); Michael Paul Ekart, Kingsport, TN (US); David Milton Lange, Blountville, TN (US); Aaron Nathaniel Edens, Weber City, VA (US)

(73) Assignee: ExxonMobil Product Solutions Company, Spring, TX (US)

( * ) Notice: Subject to any disclaimer, the term of this patent is extended or adjusted under 35 U.S.C. 154(b) by 675 days.

(21) Appl. No.: 17/996,656

(22) PCT Filed: Apr. 13, 2021

(86) PCT No.: PCT/US2021/026987
§ 371 (c)(1),
(2) Date: Oct. 20, 2022

(87) PCT Pub. No.: WO2021/211517
PCT Pub. Date: Oct. 21, 2021

(65) Prior Publication Data

US 2023/0212367 A1 Jul. 6, 2023

Related U.S. Application Data

(60) Provisional application No. 63/008,910, filed on Apr. 13, 2020.

(51) Int. Cl.
*B01D 19/00* (2006.01)
*C08J 11/06* (2006.01)

(52) U.S. Cl.
CPC ........... *C08J 11/06* (2013.01); *B01D 19/0005* (2013.01); *C08J 2323/06* (2013.01)

(58) Field of Classification Search
CPC ........ C08J 2300/30; C08J 11/06; C08J 11/12; Y02W 30/62; C10G 2300/4081
See application file for complete search history.

(56) References Cited

U.S. PATENT DOCUMENTS

| | | | |
|---|---|---|---|
| 1,048,530 | A | 12/1912 | Harlow |
| 1,219,162 | A | 3/1917 | Runge |

(Continued)

FOREIGN PATENT DOCUMENTS

| | | | |
|---|---|---|---|
| CN | 101948386 | A | 1/2011 |
| CN | 102249909 | A | 11/2011 |

(Continued)

OTHER PUBLICATIONS

Machine translation into English of JP-H0762353-A (Year: 1995).*

(Continued)

*Primary Examiner* — Karuna P Reddy
(74) *Attorney, Agent, or Firm* — C. Tumey Law Group PLLC

(57) ABSTRACT

A process and system for liquefying and dehalogenating a waste plastic are provided. Generally, the process comprises: (a) liquefying solid waste plastic to produce a liquefied waste plastic; (b) heating at least a portion of the molten waste plastic in a heat exchanger to thereby provide a heated liquefied waste plastic; (c) sparging a stripping gas into the heated liquefied waste plastic to produce a multi-phase mixture; and (d) disengaging a gaseous phase from a liquid phase of the multi-phase mixture to thereby provide a halogen-enriched gaseous material and a halogen-depleted liquefied waste plastic.

12 Claims, 25 Drawing Sheets

(56) References Cited

U.S. PATENT DOCUMENTS

| | | | |
|---|---|---|---|
| 1,683,347 | A | 9/1928 | Gray et al. |
| 1,698,049 | A | 1/1929 | Clarke et al. |
| 1,880,560 | A | 10/1932 | Webber et al. |
| 1,880,808 | A | 10/1932 | Clarke et al. |
| 1,984,147 | A | 12/1934 | Malm |
| 2,026,985 | A | 1/1936 | Malm et al. |
| 2,129,052 | A | 9/1938 | Fordyce |
| 2,163,013 | A | 6/1939 | Schulz |
| 2,294,984 | A | 9/1942 | Hasche |
| 2,337,004 | A | 12/1943 | Schwoegler |
| 2,464,916 | A | 3/1949 | Adams et al. |
| 2,880,241 | A | 3/1959 | Hughes |
| 2,892,858 | A | 6/1959 | Ziegler |
| 3,091,632 | A | 5/1963 | Hagemeyer et al. |
| 3,175,968 | A | 3/1965 | Berger |
| 3,239,566 | A | 3/1966 | Slaugh et al. |
| 3,291,821 | A | 12/1966 | Perry et al. |
| 3,340,312 | A | 9/1967 | Duke, Jr. et al. |
| 3,351,657 | A | 11/1967 | Duncanson et al. |
| 3,448,157 | A | 6/1969 | Slaugh et al. |
| 3,448,173 | A | 6/1969 | Francis et al. |
| 3,527,809 | A | 9/1970 | Pruett et al. |
| 3,617,201 | A | 11/1971 | Berni et al. |
| 3,655,825 | A | 4/1972 | Souder et al. |
| 3,660,447 | A | 5/1972 | Cragg et al. |
| 3,676,523 | A | 7/1972 | Mason |
| 3,686,334 | A | 8/1972 | Britton |
| 3,718,689 | A | 2/1973 | McCain et al. |
| 3,772,405 | A | 11/1973 | Hamb |
| 3,853,968 | A | 12/1974 | Bortnick et al. |
| 3,857,895 | A | 12/1974 | Booth |
| 3,920,760 | A | 11/1975 | Heinz |
| 3,935,279 | A | 1/1976 | Cocuzza et al. |
| 4,021,496 | A | 5/1977 | Wright |
| 4,147,603 | A | 4/1979 | Pacifici et al. |
| 4,148,830 | A | 4/1979 | Pruett et al. |
| 4,169,861 | A | 10/1979 | Hughes |
| 4,216,337 | A | 8/1980 | Baba et al. |
| 4,225,726 | A | 9/1980 | Morris et al. |
| 4,248,802 | A | 2/1981 | Kuntz |
| 4,287,369 | A | 9/1981 | Harris et al. |
| 4,287,370 | A | 9/1981 | Harris et al. |
| 4,314,090 | A | 2/1982 | Shewbart et al. |
| 4,316,990 | A | 2/1982 | Morris |
| 4,332,564 | A | 6/1982 | Lord |
| 4,364,905 | A | 12/1982 | Fahrig et al. |
| 4,446,585 | A | 5/1984 | Harding et al. |
| 4,479,012 | A | 10/1984 | Fischer et al. |
| 4,482,640 | A | 11/1984 | Knudsen et al. |
| 4,536,597 | A | 8/1985 | Pesa et al. |
| 4,593,127 | A | 6/1986 | Bunning et al. |
| 4,625,068 | A | 11/1986 | Young |
| 4,742,178 | A | 5/1988 | Nelson et al. |
| 4,755,624 | A | 7/1988 | Phillips et al. |
| 4,758,645 | A | 7/1988 | Miyazono et al. |
| 4,774,362 | A | 9/1988 | Devon et al. |
| 4,808,756 | A | 2/1989 | Tokitoh et al. |
| 4,839,230 | A | 6/1989 | Cook |
| 4,861,629 | A | 8/1989 | Nahm |
| 4,871,878 | A | 10/1989 | Puckette et al. |
| 4,873,213 | A | 10/1989 | Puckette et al. |
| 4,912,155 | A | 3/1990 | Burton |
| 4,960,949 | A | 10/1990 | Devon et al. |
| 4,993,473 | A | 2/1991 | Newcomb |
| 5,004,845 | A | 4/1991 | Bradley et al. |
| 5,082,914 | A | 1/1992 | Cook et al. |
| 5,087,763 | A | 2/1992 | Sorensen |
| 5,114,089 | A | 5/1992 | Posso |
| 5,137,954 | A | 8/1992 | DasGupta et al. |
| 5,180,847 | A | 1/1993 | Thurman et al. |
| 5,182,379 | A | 1/1993 | Cook et al. |
| 5,264,600 | A | 11/1993 | Lappe et al. |
| 5,292,877 | A | 3/1994 | Edgar et al. |
| 5,292,979 | A | 3/1994 | Chauvin et al. |
| 5,312,951 | A | 5/1994 | Herrmann et al. |
| 5,347,045 | A | 9/1994 | Herrmann et al. |
| 5,384,163 | A | 1/1995 | Budde et al. |
| 5,534,594 | A | 7/1996 | Troy et al. |
| 5,557,014 | A | 9/1996 | Grate et al. |
| 5,663,444 | A | 9/1997 | Melder et al. |
| 5,723,151 | A | 3/1998 | Cook et al. |
| 5,741,901 | A | 4/1998 | Cook et al. |
| 5,750,677 | A | 5/1998 | Edgar et al. |
| 5,866,725 | A | 2/1999 | Unruh et al. |
| 5,871,573 | A | 2/1999 | Cook et al. |
| 5,945,568 | A | 8/1999 | Nagata et al. |
| 5,977,407 | A | 11/1999 | Zoeller |
| 5,981,738 | A | 11/1999 | Cook et al. |
| 6,075,168 | A | 6/2000 | DiGuilio et al. |
| 6,184,428 | B1 | 2/2001 | Zahoor et al. |
| 6,278,030 | B1 | 8/2001 | Vargas et al. |
| 6,331,580 | B1 | 12/2001 | Molnar |
| 6,362,367 | B2 | 3/2002 | Braithwaite et al. |
| 6,369,214 | B1 | 4/2002 | Tye et al. |
| 6,458,992 | B1 | 10/2002 | Lederer et al. |
| 6,492,564 | B1 | 12/2002 | Wiese et al. |
| 6,693,213 | B1 | 2/2004 | Kolena et al. |
| 6,693,219 | B2 | 2/2004 | Puckette et al. |
| 6,825,255 | B2 | 11/2004 | Yuan et al. |
| 7,049,473 | B2 | 5/2006 | Mackewitz et al. |
| 7,261,807 | B2 | 8/2007 | Henry et al. |
| 7,329,774 | B2 | 2/2008 | Zuber et al. |
| 7,420,092 | B2 | 9/2008 | Fujita et al. |
| 7,629,491 | B2 | 12/2009 | Zoeller et al. |
| 7,652,175 | B2 | 1/2010 | Hassan et al. |
| 7,935,850 | B2 | 5/2011 | Caers et al. |
| 8,183,422 | B2 | 5/2012 | Alegria et al. |
| 8,344,195 | B2 | 1/2013 | Srinakruang |
| 8,354,563 | B2 | 1/2013 | Kharas |
| 8,404,911 | B2 | 3/2013 | Srinakruang |
| 8,426,652 | B2 | 4/2013 | Jevtic et al. |
| 8,658,019 | B2 | 2/2014 | Bridges et al. |
| 9,096,801 | B2 | 8/2015 | Baker |
| 9,309,183 | B2 | 4/2016 | Storzum et al. |
| 9,809,529 | B2 | 11/2017 | Frycek et al. |
| 10,344,226 | B2 | 7/2019 | Schmidt et al. |
| 2006/0287484 | A1 | 12/2006 | Crawford et al. |
| 2007/0179326 | A1 | 8/2007 | Baker |
| 2007/0299280 | A1 | 12/2007 | Zoeller et al. |
| 2009/0005605 | A1 | 1/2009 | Hassan et al. |
| 2011/0046365 | A1 | 2/2011 | Mikkonen et al. |
| 2011/0308142 | A1 | 12/2011 | Abhari et al. |
| 2012/0035404 | A1 | 2/2012 | Alegria et al. |
| 2012/0125813 | A1 | 5/2012 | Bridges et al. |
| 2012/0238742 | A1 | 9/2012 | Buchanan et al. |
| 2012/0258249 | A1 | 10/2012 | Adamson et al. |
| 2013/0296619 | A1 | 11/2013 | Iaccino et al. |
| 2015/0284645 | A1 | 10/2015 | Schmidt et al. |
| 2016/0264874 | A1 | 9/2016 | Narayanaswamy et al. |
| 2016/0264883 | A1 | 9/2016 | Narayanaswamy et al. |
| 2016/0264885 | A1 | 9/2016 | Narayanaswamy et al. |
| 2018/0163018 | A1 | 6/2018 | Kim et al. |
| 2019/0055483 | A1 | 2/2019 | Bafna et al. |
| 2020/0362248 | A1 | 11/2020 | Cartolano et al. |
| 2020/0369965 | A1 | 11/2020 | Bitting et al. |
| 2020/0369966 | A1 | 11/2020 | Bitting et al. |
| 2021/0009907 | A1 | 1/2021 | Frecon et al. |

FOREIGN PATENT DOCUMENTS

| | | | | |
|---|---|---|---|---|
| CN | 103664444 | A | 3/2014 | |
| CN | 106008218 | A | 10/2016 | |
| CN | 109575978 | A | 4/2019 | |
| DE | 1014089 | B | 8/1957 | |
| EP | 52419 | A1 | 5/1982 | |
| EP | 103810 | A2 | 3/1984 | |
| EP | 114611 | A2 | 8/1984 | |
| EP | 144745 | A1 | 6/1985 | |
| EP | 225143 | A2 | 6/1987 | |
| EP | 250168 | A1 | 12/1987 | |
| EP | 763412 | A1 * | 3/1997 | ......... B29B 17/0026 |
| EP | 0804398 | A1 | 11/1997 | |
| EP | 711747 | B1 | 7/1998 | |
| EP | 3063122 | A1 | 9/2016 | |

(56) References Cited

FOREIGN PATENT DOCUMENTS

| | | | | |
|---|---|---|---|---|
| EP | 3725403 | A1 | | 4/2019 |
| JP | 06-210263 | A | | 8/1994 |
| JP | H07-062353 | A | | 3/1995 |
| JP | H0762353 | A | * | 3/1995 |
| JP | H07-233374 | A | | 9/1995 |
| JP | 09-157659 | A | | 6/1997 |
| JP | 2005-120205 | A | | 5/2005 |
| JP | 2007-099827 | A | | 4/2007 |
| KR | 10-2004-0062793 | A | | 7/2004 |
| RU | 2162461 | C1 | | 1/2001 |
| WO | WO 96/22265 | A1 | | 7/1996 |
| WO | WO 97/41088 | A1 | | 11/1997 |
| WO | WO 2009/087080 | A2 | | 7/2009 |
| WO | WO 2014/034015 | A1 | | 3/2014 |
| WO | WO 2015/024103 | A1 | | 2/2015 |
| WO | WO 2017-146876 | A1 | | 8/2017 |
| WO | WO 2018-005074 | A1 | | 1/2018 |
| WO | WO 2018/011642 | A1 | | 1/2018 |
| WO | WO 2018/025103 | A1 | | 2/2018 |
| WO | WO 2018-069794 | A1 | | 4/2018 |
| WO | WO 2018-104443 | A1 | | 6/2018 |
| WO | WO 2018/160588 | A1 | | 9/2018 |
| WO | WO 2020/234679 | A1 | | 11/2020 |
| WO | WO 2020/239729 | A1 | | 12/2020 |
| WO | WO 2020/249853 | A1 | | 12/2020 |

OTHER PUBLICATIONS

ASTM D2887 "Standard Test Method for Boiling Range Distribution of Petroleum Fractions by Gas Chromatography" Published Jan. 2020.

ASTM D5399 "Standard Test Method for Boiling Point Distribution of Hydrocarbon Solvents by Gas Chromatography" Published Dec. 2017.

ASTM D6474 "Standard Test Method for Determining Molecular Weight Distribution and Molecular Weight Averages of Polyolefins by High Temperature Gel Permeation Chromatography" Published Apr. 2020.

ASTM D5296 "Standard Test Method for Molecular Weight Averages and Molecular Weight Distribution of Polystyrene by High Performance Size-Exclusion Chromatography" Published Dec. 2019.

ASTM E308 "Standard Practice for Computing the Colors of Objects by Using the CIE System" Published Sep. 2018.

ASTM D6290 "Standard Test Method for Color Determination of Plastic Pellets" Published Jun. 2019.

ASTM D790 "Standard Test Methods for Flexural Properties of Unreinforced and Reinforced Plastics and Electrical Insulating Materials" Published Jul. 2017.

ASTM D256 "Standard Test Methods for Determining the Izod Pendulum Impact Resistance of Plastics" Published Nov. 2018.

ASTMD3418 "Standard Test Method for Transition Temperatures and Enthalpies of Fusion and Crystallization of Polymers by Differential Scanning Calorimetry" Published Jun. 2015.

ASTM D1003 "Standard Test Method for Haze and Luminous Transmittance of Transparent Plastics" Published Nov. 2013.

ASTM D4440 "Standard Test Method for Plastics: Dynamic Mechanical Properties Melt Rheology" Published Feb. 2015.

European Search Report for Application No. 21789424.5 dated May 29, 2024.

Notification of Transmittal of the International Search Report and the Written Opinion of the International Searching Authority with Date of Mailing Sep. 4, 2020 for International Application No. PCT/US2020/034170.

Notification of Transmittal of the International Search Report and the Written Opinion of the International Searching Authority with Date of Mailing Sep. 4, 2020 for International Application No. PCT/US2020/034167.

Notification of Transmittal of the International Search Report and the Written Opinion of the International Searching Authority with Date of Mailing Sep. 4, 2020 for International Application No. PCT/US2020/034166.

Notification of Transmittal of the International Search Report and the Written Opinion of the International Searching Authority with Date of Mailing Aug. 27, 2020 for International Application No. PCT/US2020/034147.

Notification of Transmittal of the International Search Report and the Written Opinion of the International Searching Authority with Date of Mailing Sep. 9, 2020 for International Application No. PCT/US2020/034139.

Notification of Transmittal of the International Search Report and the Written Opinion of the International Searching Authority with Date of Mailing Sep. 4, 2020 for International Application No. PCT/US2020/034172.

Notification of Transmittal of the International Search Report and the Written Opinion of the International Searching Authority with Date of Mailing Sep. 9, 2020 for International Application No. PCT/US2020/034151.

Li, Fuwei, et al., "Production of Light Olefins from Catalytic Cracking Bio-oil Model Compounds over La203-Modified ZSM-5 zeolite", Energy & Fuels, 2018, 32, pp. 5910-5922.

Shelton, Michael C.; "Cellulose Esters, Inorganic Esters", Kirk-Othmer, Encyclopedia of Chemical Technology, 5th edition, vol. 5, Wiley Interscience, New York (2004), pp. 394-412.

Gedon, Steven, et al.; "Cellulose Esters, Organic Esters", Kirk-Othmer, Encyclopedia of Chemical Technology, 5th edition, vol. 5, Wiley Interscience, New York (2004), pp. 412-444.

Wade, Bruce; "Vinyl Acetal Polymers"; Encyclopdia of Polymer Science & Technology, 3rd edition, vol. 8, pp. 381-399 (2003).

Riesel, L., et al.; "A Simple Synthesis of Fluoro(organyl)phosphnes", Z. Anorg. Allg. Chem., 603, (1991), pp. 145-150.

Tullock, C.W., et al.; "Synthesis of Fluorides by Metathesis with Sodium Fluoride"; Journal of Organic Chemistry, vol. 25 (1960), pp. 2016-2019.

White, D.W., et al.; "Structural Implications of Nuclear Magentic Resonance Studies n 1-R-1-Phospha-2,6-dioxacyclohexanes"; Journal of the American Chemical Society, 92:24, Dec. 2, 1970, pp. 7125-7135.

Meyer, Thomas G., et al.; "Preparations and Single Crystal X-ray Diffraction Study of Some Fluorophosphites and Phosphite Esters"; Z Naturforsch, 48b, pp. 659-671 (1993).

Shoji, Atsushi, et al.; "Thermal weight analysis of the jet floor gasification process of wasteTen"; Journal of Chemical Engineering, 2000 pp. 27-34.

Zhiyuan, Button, et al.; "The release law of benzene, radon and fife in the process of pyrococosatic and plastic pyrolytic process"; Environmental Chemistry, vol. 1. 27, No. 6, Nov. 2008, pp. 766-769.

* cited by examiner

Feed

Light

Medium

Heavy

A

B

C

Per Unit Time

Per Unit Time

Product Efficiency$_A$ = Product weight of A/feed rate of A

Contamination Efficiency$_B$ = Product weight of B/feed rate of B

Contamination Efficiency$_C$ = Product weight of C/feed rate of C

Product Purity$_A$ = Product weight of A/(product rate of A+B+C)

Contamination Efficiency$_A$ = weight of A/feed rate of A

Product Efficiency$_B$ = Product weight of B/feed rate of B

Product Efficiency$_C$ = Product weight of C/feed rate of C

Product Purity = (Product weight of B+C)/(product rate of A+B+C)

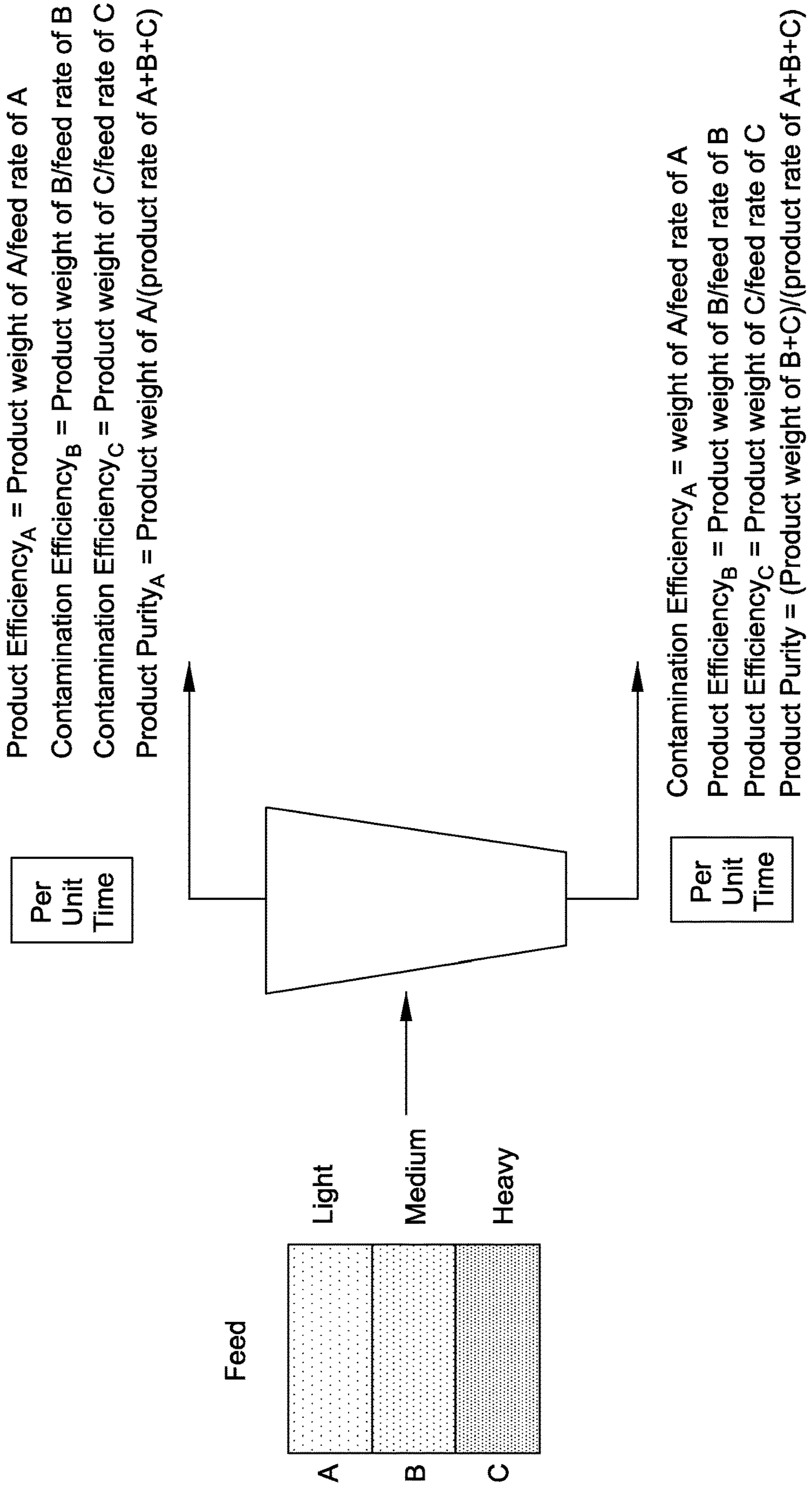

*Fig. 26.*

LIQUEFYING AND DEHALOGENATING WASTE PLASTICS

CROSS-REFERENCE TO RELATED APPLICATION(S)

This application is a national stage filing under 35 USC § 371 of International Application Number PCT/US2021/026987, filed on, Apr. 13, 2021 which claims the benefit of the filing date to U.S. Provisional Application No. 63/008,910, filed on Apr. 13, 2020, the entire disclosures of which are incorporated by reference herein.

BACKGROUND

Waste materials, especially non-biodegradable waste materials, can negatively impact the environment when disposed of in landfills after a single use. Thus, from an environmental standpoint, it is desirable to recycle as much waste materials as possible. However, there still exists streams of low value waste that are not possible or economically unfeasible to recycle with conventional recycling technologies. In addition, some conventional recycling processes produce waste streams that are themselves not economically feasible to recover or recycle, resulting in additional waste streams that must be disposed of or otherwise handled.

More particularly, most conventional chemical recycling processes, such as pyrolysis, combustion, cracking, and gasification, used for breaking down waste plastics into simpler products suffer many operational inefficiencies that do not allow for the efficient recycling of various waste plastics. For example, these conventional recycling processes can require high operation costs, specifically in terms of energy consumption, that may offset any financial benefit of utilizing waste plastics as a feedstock. Thus, there exists a need for an efficient and economical chemical recycling method for breaking down waste plastics.

Waste plastics often contain halogens (e.g., chlorine in polyvinylchloride), which can be problematic in facilities used to pyrolyze, gasify, crack, and/or combust waste plastics. Halogens are known to cause corrosion of equipment and conduits used to process halogen-containing streams. Although certain metallurgies are resistant to corrosion from halogens, implementation of such metallurgies can be cost prohibitive, both for newly constructed facilities and/or for retrofitting of existing facilities.

Additionally, although various methods are known for removing halogens from streams in conventional chemical processing plants, such halogen removal methods are ineffective and/or cost prohibitive when applied to facilities for pyrolyzing, gasifying, cracking, and/or combusting waste plastics.

SUMMARY

In one aspect, the present technology concerns a waste plastic dehalogenation process. Generally, the process comprises: (a) liquefying solid waste plastic to produce a liquefied waste plastic; (b) sparging a stripping gas into the liquefied waste plastic to produce a multi-phase mixture; and (c) disengaging a gaseous phase from a liquid phase of the multi-phase mixture to thereby provide a halogen-enriched gaseous material and a halogen-depleted liquefied waste plastic.

In one aspect, the present technology concerns a waste plastic dehalogenation process. Generally, the process comprises: (a) introducing solid waste plastic into a melt tank; (b) removing molten waste plastic from the melt tank to thereby provide a removed molten waste plastic; (c) heating at least a portion of the removed molten waste plastic in a heat exchanger to thereby provide a heated molten waste plastic; and (d) disengaging a halogen-enriched gaseous material from the heated molten waste plastic to thereby provide a heated halogen-depleted molten waste plastic.

In one aspect, the present technology concerns a waste plastic dehalogenation process. Generally, the process comprises: (a) liquefying solid waste plastic in a melt tank in the presence of at least one dissolution solvent to produce a liquefied waste plastic, wherein the dissolution solvent comprises a pyrolysis oil; and (b) separating the liquefied waste plastic into a halogen-enriched gaseous material and a halogen-depleted liquefied waste plastic.

In one aspect, the present technology concerns a waste plastic dehalogenation system. Generally, the system comprises: (a) a liquification system for at least partially liquifying a solid waste plastic into a liquified waste plastic; (b) a halogen stripper configured to receive at least a portion of the liquified waste plastic and sparge a stripping gas into the liquified waste plastic to thereby form a multi-phase mixture; and (c) a disengagement vessel configured to receive the multi-phase mixture and disengage a gaseous phase from a liquid phase of the multi-phase mixture to thereby provide a halogen-enriched gaseous material and a halogen-depleted molten waste plastic.

In one aspect, the present technology concerns a waste plastic dehalogenation system. Generally, the system comprises: (a) a melt tank for at least partially liquefying a solid waste plastic into a molten waste plastic; (b) a heat exchanger configured to receive at least a portion of the molten waste plastic and heat at least a portion of the molten waste plastic to thereby provide a heated molten waste plastic; and (c) a disengagement vessel configured to receive the heated molten waste plastic and disengage a gaseous phase from a liquid phase of the heated molten waste plastic to thereby provide a halogen-enriched gaseous material and a halogen-depleted molten waste plastic.

In one aspect, the present technology concerns a chemical recycling process. Generally, the process comprises: (a) subjecting a solid waste plastic to a viscosity reducing treatment to thereby provide a liquefied waste plastic having a viscosity of less than 800 poise at 350° C. and 10 radians/s; (b) introducing at least a portion of the liquefied waste plastic into a pyrolysis film reactor; and (c) converting at least a portion of the liquefied waste plastic in the pyrolysis film reactor into a pyrolysis effluent comprising a pyrolysis gas.

In one aspect, the present technology concerns a chemical recycling process. Generally, the process comprises: (a) separating a solid waste plastic feed into a polyolefin-enriched stream and a polyolefin-depleted stream; (b) liquefying the polyolefin-enriched stream to thereby provide a liquefied waste plastic; (c) introducing at least a portion of the liquefied waste plastic into a pyrolysis film reactor; and (d) converting at least a portion of the liquefied waste plastic in the pyrolysis film reactor into a pyrolysis effluent comprising a pyrolysis gas.

In one aspect, the present technology concerns a chemical recycling process. Generally, the process comprises: (a) liquefying at least one solid waste plastic to form a liquefied waste plastic; (b) removing one or more halogens from the liquefied waste plastic to thereby form a halogen-depleted liquefied waste plastic; (c) introducing at least a portion of the halogen-depleted liquefied waste plastic into a pyrolysis film reactor; and (d) converting at least a portion of the halogen-depleted liquefied waste plastic in the pyrolysis film reactor into a pyrolysis effluent comprising a pyrolysis gas.

In one aspect, the present technology concerns a chemical recycling process. Generally, the process comprises: (a) liquefying solid waste plastic in a melt tank to produce a molten waste plastic; (b) subjecting the molten waste plastic to at least one of the following steps—(i) sparging a stripping gas into the molten waste plastic to produce a multi-phase mixture and (ii) heating at least a portion of the molten waste plastic in a heat exchanger outside of the melt tank to thereby provide a heated molten waste plastic; (c) disengaging a gaseous phase from a liquid phase of the multi-phase mixture and/or the heated molten waste plastic to thereby provide a halogen-enriched gaseous material and a halogen-depleted molten waste plastic; (d) introducing the halogen-depleted molten waste plastic into a pyrolysis film reactor; and (e) converting at least a portion of the liquefied waste plastic in the pyrolysis film reactor into a pyrolysis effluent comprising a pyrolysis gas.

In one aspect, the present technology concerns a chemical recycling process. Generally, the process comprises: (a) providing a liquefied waste plastic; (b) introducing at least a portion of the liquefied waste plastic into a pyrolysis film reactor comprising a plurality of stationary film-generating structures and operating at a temperature of at least 525° C.; and (c) flowing at least a portion of the liquefied waste plastic downwardly along the stationary film-generating structures to thereby pyrolyze the liquefied waste plastic and form a pyrolysis effluent comprising a pyrolysis gas.

In one aspect, the present technology concerns a chemical recycling process. Generally, the process comprises: (a) providing a liquefied waste plastic; (b) introducing at least a portion of the liquefied waste plastic into an upflow pyrolysis film reactor comprising a plurality of stationary film-generating structures; and (c) flowing at least a portion of the liquefied waste plastic upwardly along the stationary film-generating structures to thereby pyrolyze the liquefied waste plastic and form a pyrolysis effluent comprising a pyrolysis gas.

In one aspect, the present technology concerns a chemical recycling facility. Generally, the facility comprises: (a) a waste plastic liquification system for liquefying at least one solid waste plastic, wherein the waste plastic melting system comprises a halogen removal system for removing one or more halogens from the molten waste plastic thereby providing a halogen-depleted molten waste plastic; and (b) a pyrolysis film reactor connected in fluid communication with the waste plastic melting system and configured to receive at least a portion of the halogen-depleted molten waste plastic and convert at least a portion of the halogen-depleted molten waste plastic to pyrolysis effluent comprising a pyrolysis gas.

In one aspect, the present technology concerns a chemical recycling process. Generally, the process comprises: (a) liquefying at least one solid waste plastic in the presence of a dissolution solvent to form a liquefied waste plastic, wherein the dissolution solvent comprises a pyrolysis oil; (b) introducing at least a portion of said liquefied waste plastic into a pyrolysis film reactor; and (c) converting at least a portion of said liquefied waste plastic in the pyrolysis film reactor into a pyrolysis effluent comprising a pyrolysis gas.

In one aspect, the present technology concerns a chemical recycling process. Generally, the chemical recycling process comprises: (a) liquefying at least one solid waste plastic to form a liquefied waste plastic; (b) introducing at least a portion of the liquefied waste plastic into a partial oxidation (POX) gasifier; and (c) converting at least a portion of the liquefied waste plastic in the POX gasifier into a syngas composition.

In one aspect, the present technology concerns a chemical recycling process. Generally, the chemical recycling process comprises: (a) liquefying at least one solid waste plastic in a melt tank to form a molten waste plastic; (b) removing one or more halogens from the molten waste plastic to form a halogen-depleted molten waste plastic; (c) introducing at least a portion of the halogen-depleted molten waste plastic into a partial oxidation (POX) gasifier; and (d) converting at least a portion of the halogen-depleted molten waste plastic in the POX gasifier into a syngas composition.

In one aspect, the present technology concerns a chemical recycling facility. Generally, the chemical recycling facility comprises: (a) a waste plastic liquification system for liquefying at least one solid waste plastic and forming a liquefied waste plastic; and (b) a partial oxidation (POX) gasifier connected in fluid communication with the plastic liquification system and configured to receive at least a portion of the liquefied waste plastic and convert at least a portion of the liquefied waste plastic to a syngas composition.

In one aspect, the present technology concerns a chemical recycling facility. Generally, the chemical recycling facility comprises: (a) a waste plastic melting system for liquefying at least one solid waste plastic and forming a molten waste plastic, wherein the waste plastic melting system comprises a dehalogenation system for removing one or more halogens from the molten waste plastic thereby providing a halogen-depleted molten waste plastic; and (b) a partial oxidation (POX) gasifier connected in fluid communication with the waste plastic melting system and configured to receive at least a portion of the halogen-depleted molten waste plastic and convert at least a portion of the halogen-depleted molten waste plastic to a syngas composition.

BRIEF DESCRIPTION OF THE FIGURES

Embodiments of the present invention are described herein with reference to the following drawing figures, wherein:

FIG. 26 provides a schematic demonstrating "separation efficiency."

DETAILED DESCRIPTION

We have discovered an effective and efficient halogen removal technique for use in chemical recycling facilities. More particularly, we have discovered a system that disengages gaseous halogens from liquified waste plastic, prior to introducing the liquified waste plastic into a reaction step (e.g., pyrolysis, gasification, cracking, or combusting) of a chemical recycling facility.

When a numerical sequence is indicated, it is to be understood that each number is modified the same as the first number or last number in the numerical sequence or in the sentence, e.g., each number is "at least," or "up to" or "not more than" as the case may be; and each number is in an "or" relationship. For example, "at least 10, 20, 30, 40, 50, 75 wt. % . . . " means the same as "at least 10 wt. %, or at least 20 wt. %, or at least 30 wt. %, or at least 40 wt. %, or at least 50 wt. %, or at least 75 wt. %," etc.; and "not more than 90 wt. %, 85, 70, 60 . . . " means the same as "not more than 90 wt. %, or not more than 85 wt. %, or not more than 70 wt. % . . . " etc.; and "at least 1%, 2%, 3%, 4%, 5%, 6%, 7%, 8%, 9% or 10% by weight . . . " means the same as "at least 1 wt. %, or at least 2 wt. %, or at least 3 wt. % . . . " etc.; and "at least 5, 10, 15, 20 and/or not more than 99, 95, 90 weight percent" means the same as "at least 5 wt. %, or at least 10 wt. %, or at least 15 wt. % or at least 20 wt. % and/or not more than 99 wt. %, or not more than 95 wt. %, or not more than 90 weight percent . . . " etc.

All concentrations or amounts are by weight unless otherwise stated.

Overall Chemical Recycling Facility

Figure 1:
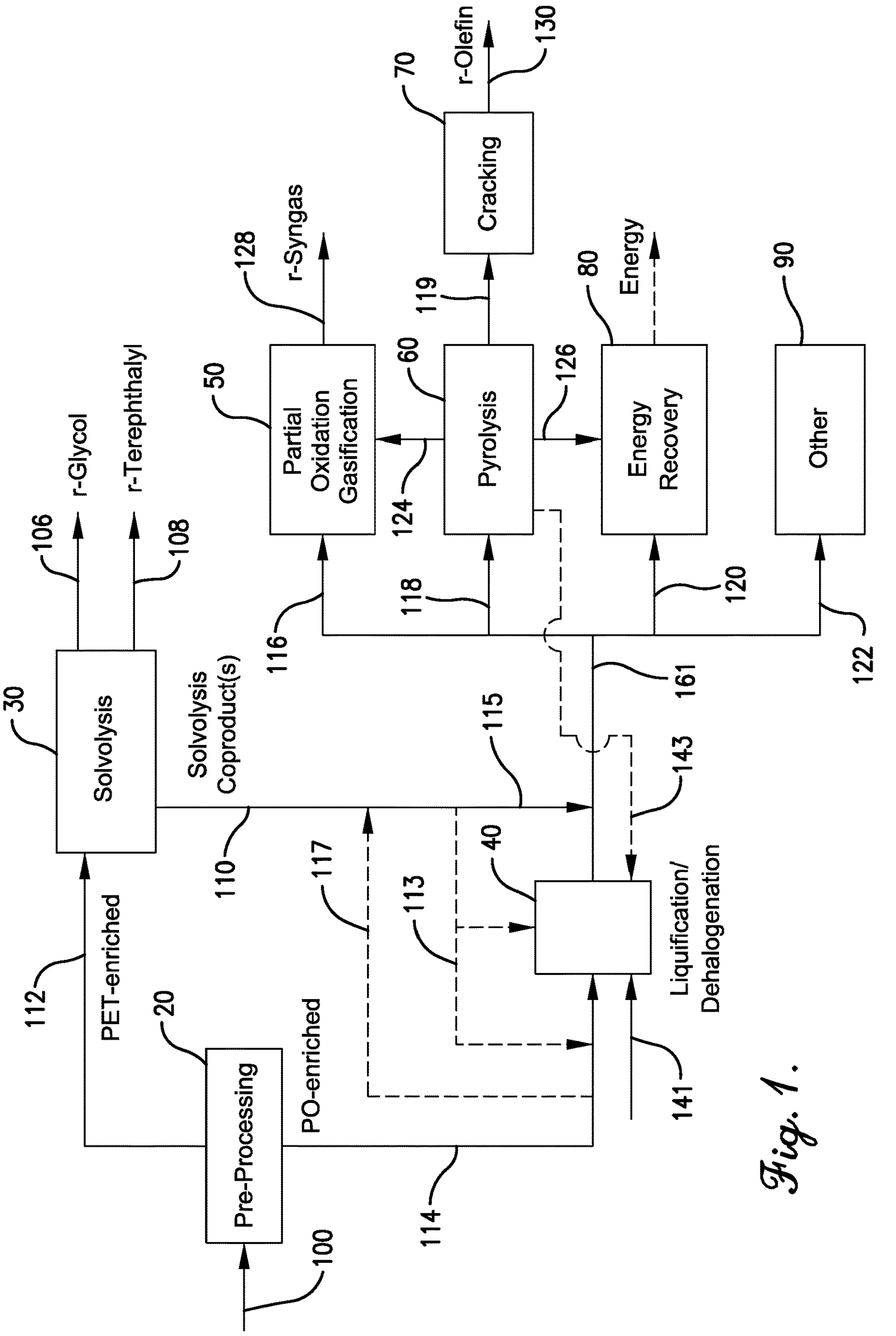
FIG. 1 depicts an exemplary chemical recycling facility.

Turning now to FIG. 1, the main steps of a process for chemically recycling waste plastic in a chemical recycling facility 10 are shown. It should be understood that FIG. 1 depicts one exemplary embodiment of the present technology. Certain features depicted in FIG. 1 may be omitted and/or additional features described elsewhere herein may be added to the system depicted in FIG. 1.

As shown in FIG. 1, these steps generally include a pre-processing step/facility 20, and at least one (or at least two or more) of a solvolysis step/facility 30, a partial oxidation (POX) gasification step/facility 50, a pyrolysis step/facility 60, a cracking step/facility 70, and an energy recovery step/facility 80. Optionally, in an embodiment or in combination with any embodiment mentioned herein, these steps may also include one or more other steps, such as, direct sale or use, landfilling, separation, and solidification, one or more of which is represented in FIG. 1 by block 90. Although shown as including all of these steps or facilities, it should be understood that a chemical recycling process and facility according to one or more embodiments of the present technology can include at least two, three, four, five, or all of these steps/facilities in various combinations for the chemical recycling of plastic waste and, in particular, mixed plastic waste. Chemical recycling processes and facilities as described herein may be used to convert waste plastic to recycle content products or chemical intermediates used to form a variety of end use materials. The waste plastic fed to the chemical recycling facility/process can be mixed plastic waste (MPW), pre-sorted waste plastic, and/or pre-processed waste plastic.

As used herein, the term "chemical recycling" refers to a waste plastic recycling process that includes a step of chemically converting waste plastic polymers into lower molecular weight polymers, oligomers, monomers, and/or non-polymeric molecules (e.g., hydrogen and carbon monoxide) that are useful by themselves and/or are useful as feedstocks to another chemical production process or processes. A "chemical recycling facility," is a facility for producing a recycle content product via chemical recycling of waste plastic. As used herein, the terms "recycle content" and "r-content" mean being or comprising a composition that is directly and/or indirectly derived from waste plastic.

As used herein, the term "directly derived" 'means having at least one physical component originating from waste plastic, while "indirectly derived" means having an assigned recycle content that i) is attributable to waste plastic, but ii) that is not based on having a physical component originating from waste plastic.

Chemical recycling facilities are not mechanical recycling facilities. As used herein, the terms "mechanical recycling" and "physical recycling" refer to a recycling process that includes a step of melting waste plastic and forming the molten plastic into a new intermediate product (e.g., pellets or sheets) and/or a new end product (e.g., bottles). Generally, mechanical recycling does not substantially change the chemical structure of the plastic being recycled. In one embodiment or in combination with any of the mentioned embodiments, the chemical recycling facilities described herein may be configured to receive and process waste streams from and/or that are not typically processable by a mechanical recycling facility.

Although described herein as being part of a single chemical recycling facility, it should be understood that one or more of the preprocessing facility 20, the solvolysis facility 30, the pyrolysis facility 60, the cracking facility 70, the partial oxidation (POX) gasification facility 50, and the energy recovery facility 80, or any of the other facility 90 such as solidification or separation, may be located in a different geographical location and/or be operated by a different commercial entity. Each of the preprocessing facility 20, the solvolysis facility 30, the pyrolysis facility 60, the cracking facility 70, the partial oxidation (POX) gasification facility 50, the energy recovery facility 80, or any other facility 90 may be operated by the same entity, while, in other cases, one or more of the preprocessing facility 20, the solvolysis facility 30, the pyrolysis facility 60, the cracking facility 70, the partial oxidation (POX) gasification facility 50, a solidification facility, the energy recovery facility 80, and one or more other facility 90 such as separation or solidification, may be operated by a different commercial entity.

In an embodiment or in combination with any embodiment mentioned herein, the chemical recycling facility 10 may be a commercial-scale facility capable of processing significant volumes of mixed plastic waste. As used herein, the term "commercial scale facility" refers to a facility having an average annual feed rate of at least 500 pounds per hour, averaged over one year. The average feed rate to the chemical recycling facility (or to any one of the preprocessing facility 20, the solvolysis facility 30, the pyrolysis facility 60, the cracking facility 70, the POX gasification facility 50, the energy recovery facility 80, and any other facility 90) can be at least 750, at least 1,000, at least 1,500, at least 2,000, at least 2,500, at least 3,000, at least 3,500, at least 4,000, at least 4,500, at least 5,000, at least 5,500, at least 6,000, at least 6,500, at least 7,500, at least 10,000, at least 12,500, at least 15,000, at least 17,500, at least 20,000, at least 22,500, at least 25,000, at least 27,500, at least 30,000 or at least 32,500 pounds per hour and/or not more than 1,000,000, not more than 750,000, not more than 500,000, not more than 450,000, not more than 400,000, not more than 350,000, not more than 300,000, not more than 250,000, not more than 200,000, not more than 150,000, not more than 100,000, not more than 75,000, not more than 50,000, or not more than 40,000 pounds per hour. When a facility includes two or more feed streams, the average annual feed rate is determined based on the combined weight of the feed streams.

Additionally, it should be understood that each of the preprocessing facility 20, the solvolysis facility 30, the pyrolysis facility 60, the cracking facility 70, the POX gasification facility 50, the energy recovery facility 80, and any other facility 90 may include multiple units operating in series or parallel. For example, the pyrolysis facility 60 may include multiple pyrolysis reactors/units operating in parallel and each receiving a feed comprising waste plastic. When a facility is made up of multiple individual units, the average annual feed rate to the facility is calculated as the sum of the average annual feed rates to all of the common types of units within that facility.

Additionally, in an embodiment or in combination with any embodiment mentioned herein, the chemical recycling facility 10 (or any one of the preprocessing facility 20, the solvolysis facility 30, the pyrolysis facility 60, the cracking facility 70, the POX gasification facility 50, the energy recovery facility 80, and any other facility 90) may be operated in a continuous manner. Additionally, or in the alternative, at least a portion of the chemical recycling facility 10 (or any of the preprocessing facility 20, the solvolysis facility 30, the pyrolysis facility 60, the cracking facility 70, the POX gasification facility 50, the energy recovery facility 80, and any other facility 90) may be operated in a batch or semi-batch manner. In some cases, the facility may include a plurality of tanks between portions of a single facility or between two or more different facilities to manage inventory and ensure consistent flow rates into each facility or portion thereof.

In addition, two or more of the facilities shown in FIG. 1 may also be co-located with one another. In an embodiment or in combination with any embodiment mentioned herein, at least two, at least three, at least four, at least five, at least six, or all of the facilities may be co-located. As used herein, the term "co-located" refers to facilities in which at least a portion of the process streams and/or supporting equipment or services are shared between the two facilities. When two or more of the facilities shown in FIG. 1 are co-located, the facilities may meet at least one of the following criteria (i) through (v): (i) the facilities share at least one non-residential utility service; (ii) the facilities share at least one service group; (iii) the facilities are owned and/or operated by parties that share at least one property boundary; (iv) the facilities are connected by at least one conduit configured to carry at least one process material (e.g., solid, liquid and/or gas fed to, used by, or generated in a facility) from one facility to another; and (v) the facilities are within 40, within 35, within 30, within 20, within 15, within 12, within 10, within 8, within 5, within 2, or within 1 mile of one another, measured from their geographical center. At least one, at least two, at least three, at least four, or all of the above statements (i) through (v) may be true.

Regarding (i), examples of suitable utility services include, but are not limited to, steam systems (co-generation and distribution systems), cooling water systems, heat transfer fluid systems, plant or instrument air systems, nitrogen systems, hydrogen systems, non-residential electrical generation and distribution, including distribution above 8000V, non-residential wastewater/sewer systems, storage facilities, transport lines, flare systems, and combinations thereof.

Regarding (i), examples of suitable utility services include, but are not limited to, steam systems (co-generation and distribution systems), cooling water systems, heat transfer fluid systems, plant or instrument air systems, nitrogen systems, hydrogen systems, non-residential electrical generation and distribution, including distribution above 8000V, non-residential wastewater/sewer systems, storage facilities, transport lines, flare systems, and combinations thereof.

Regarding (ii), examples of service groups and facilities include, but are not limited to, emergency services personnel (fire and/or medical), a third-party vendor, a state or local government oversight group, and combinations thereof. Government oversight groups can include, for example, regulatory or environmental agencies, as well as municipal and taxation agencies at the city, county, and state level.

Regarding (iii), the boundary may be, for example, a fence line, a property line, a gate, or common boundaries with at least one boundary of a third-party owned land or facility.

Regarding (iv), the conduit may be a fluid conduit that carries a gas, a liquid, a solid/liquid mixture (e.g., slurry), a solid/gas mixture (e.g., pneumatic conveyance), a solid/liquid/gas mixture, or a solid (e.g., belt conveyance). In some cases, two units may share one or more conduits selected from the above list. Fluid conduits may be used to transport process streams or utilities between the two units. For example, an outlet of one facility (e.g., the solvolysis facility 30) may be fluidly connected via a conduit with an inlet of another facility (e.g., the POX gasification facility 50). In some cases, an interim storage system for the materials being transported within the conduit between the outlet of one facility and the inlet of another facility may be provided. The interim storage system may comprise, for example, one or more tanks, vessels (open or closed), buildings, or containers that are configured to store the material carried by the conduit. In some cases, the interim storage between the outlet of one facility and the inlet of another can be not more than 90, not more than 75, not more than 60, not more than 40, not more than 30, not more than 25, not more than 20, not more than 15, not more than 10, not more than 5, not more than 2 days or not more than 1 day.

Turning again to FIG. 1, a stream 100 of waste plastic, which can be mixed plastic waste (MPW), may be introduced into the chemical recycling facility 10. As used herein, the terms "waste plastic" and "plastic waste" refer to used, scrap, and/or discarded plastic materials, such as plastic materials typically sent to a landfill. The waste plastic stream 100 fed to the chemical recycling facility 10 may include unprocessed or partially processed waste plastic. As used herein, the term "unprocessed waste plastic" means waste plastic that has not be subjected to any automated or mechanized sorting, washing, or comminuting. Examples of unprocessed waste plastic include waste plastic collected from household curbside plastic recycling bins or shared community plastic recycling containers. As used herein, the term "partially processed waste plastic" means waste plastic that has been subjected to at least one automated or mechanized sorting, washing, or comminuting step or process. Partially processed waste plastics may originate from, for example, municipal recycling facilities (MRFs) or reclaimers. When partially processed waste plastic is provided to the chemical recycling facility 10, one or more preprocessing steps may be skipped. Waste plastic may comprise at least one of post-industrial (or pre-consumer) plastic and/or post-consumer plastic.

As used herein, the terms "mixed plastic waste" and "MPW" refer to a mixture of at least two types of waste plastics including, but not limited to the following plastic types: polyethylene terephthalate (PET), one or more polyolefins (PO), and polyvinylchloride (PVC). In an embodiment or in combination with any embodiment mentioned herein, MPW includes at least two distinct types of plastic, with each type of plastic being present in an amount of at least 1, at least 2, at least 5, at least 10, at least 15, or at least 20 weight percent, based on the total weight of plastic in the MPW.

In an embodiment or in combination with any embodiment mentioned herein, MPW comprises at least 1, at least 2, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent PET and/or at least 1, at least 2, at least 5, at least 10, at least 15, or at least 20 weight percent PO, based on the total weight of plastic in the MPW. In one embodiment or more embodiments, MPW may also include minor amounts of one or more types of plastic components other than PET and PO (and optionally PVC) that total less than 50, less than 45, less than 40, less than 35, less than 30, less than 25, less than 20, less than 15, less than 10, less than 5, less than 2, or less than 1 weight percent, based on the total weight of plastic in the MPW.

In an embodiment or in combination with any embodiment mentioned herein, the MPW comprises at least 20, at least 25, at least 30, at least 35, at least 40, at least 45, at least 50, at least 55, at least 60, at least 65, at least 70, at least 75, at least 80, at least 85, at least 90, or at least 95 weight percent PET, based on the total weight of the stream. Alternatively, or in addition, the MPW comprises not more than 99.9, not more than 99, not more than 97, not more than 92, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, or not more than 5 weight percent PET, based on the total weight of the stream.

The MPW stream can include non-PET components in an amount of at least 0.1, at least 0.5, at least 1, at least 2, at least 5, at least 7, at least 10, at least 15, at least 20, at least 25, at least 30, or at least 35 and/or not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, or not more than 7 weight percent, based on the total weight of the stream. Non-PET components can be present in an amount between 0.1 and 50 weight percent, 1 and 20 weight percent, or 2 and 10 weight percent, based on the total weight of the stream. Examples of such non-PET components can include, but are not limited to, ferrous and non-ferrous metals, inerts (such as rocks, glass, sand, etc.), plastic inerts (such as titanium dioxide, silicon dioxide, etc.), olefins, adhesives, compatibilizers, biosludge, cellulosic materials (such as cardboard, paper, etc.), and combinations thereof.

In an embodiment or in combination with any embodiment mentioned herein, all or a portion of the MPW can originate from a municipal source or comprise municipal waste. The municipal waste portion of the MPW can include, for example, PET in an amount of from 45 to 95 weight percent, 50 to 90 weight percent, or 55 to 85 weight percent, based on the total weight of the municipal waste stream (or portion of the stream).

In an embodiment or in combination with any embodiment mentioned herein, all or a portion of the MPW can originate from a municipal recycling facility (MRF) and may include, for example, PET in an amount of from 65 to 99.9 weight percent, 70 to 99 weight percent, or 80 to 97 weight percent, based on the total weight of the stream. The non-PET components in such streams may include, for example, other plastics in an amount of at least 1, at least 2, at least 5, at least 7, or at least 10 weight percent and/or not more than 25, not more than 22, not more than 20, not more than 15, not more than 12, or not more than 10 weight percent, based on the total weight of the stream, or such may be present in an amount in the range of from 1 to 22 weight percent, 2 to 15 weight percent, or 5 to 12 weight percent, based on the total weight of the stream. In an embodiment or in combination with any embodiment mentioned herein, the non-PET components can include other plastics in an amount in the range of from 2 to 35 weight percent, 5 to 30 weight percent, or 10 to 25 weight percent, based on the total weight of the stream, particularly when, for example, the MPW includes colored sorted plastics.

In an embodiment or in combination with any embodiment mentioned herein, all or a portion of the MPW can originate from a reclaimer facility and may include, for example, PET in an amount of from 85 to 99.9 weight percent, 90 to 99.9 weight percent, or 95 to 99 weight percent, based on the total weight of the stream. The non-PET components in such streams may include, for example, other plastics in an amount of at least 1, at least 2, at least 5, at least 7, or at least 10 weight percent and/or not more than 25, not more than 22, not more than 20, not more than 15, not more than 12, or not more than 10 weight percent, based on the total weight of the stream, or such may be present in an amount in the range of from 1 to 22 weight percent, 2 to 15 weight percent, or 5 to 12 weight percent, based on the total weight of the stream.

As used herein, the term "plastic" may include any organic synthetic polymers that are solid at 25° C. and 1 atmosphere of pressure. In an embodiment or in combination with any embodiment mentioned herein, the polymers may have a number average molecular weight (Mn) of at least 75, or at least 100, or at least 125, or at least 150, or at least 300, or at least 500, or at least 1000, or at least 5,000, or at least 10,000, or at least 20,000, or at least 30,000, or at least 50,000 or at least 70,000 or at least 90,000 or at least 100,000 or at least 130,000 Daltons. The weight average molecular weight (Mw) of the polymers can be at least 300, or at least 500, or at least 1000, or at least 5,000, or at least 10,000, or at least 20,000, or at least 30,000 or at least 50,000, or at least 70,000, or at least 90,000, or at least 100,000, or at least 130,000, or at least 150,000, or at least 300,000 Daltons.

Examples of suitable plastics can include, but are not limited to, aromatic and aliphatic polyesters, polyolefins, polyvinyl chloride (PVC), polystyrene, polytetrafluoroethylene, acrylobutadienestyrene (ABS), cellulosics, epoxides, polyamides, phenolic resins, polyacetal, polycarbonates, polyphenylene-based alloys, poly(methyl methacrylate), styrene-containing polymers, polyurethane, vinyl-based polymers, styrene acrylonitrile, thermoplastic elastomers other than tires, and urea containing polymers and melamines.

Examples of polyesters can include those having repeating aromatic or cyclic units such as those containing a repeating terephthalate, isophthalate, or naphthalate units such as PET, modified PET, and PEN, or those containing repeating furanate repeating units. Polyethylene terephthalate (PET) is also an example of a suitable polyester. As used herein, "PET" or "polyethylene terephthalate" refers to a homopolymer of polyethylene terephthalate, or to a polyethylene terephthalate modified with one or more acid and/or glycol modifiers and/or containing residues or moieties of other than ethylene glycol and terephthalic acid, such as isophthalic acid, 1,4-cyclohexanedicarboxylic acid, diethylene glycol, 2,2,4,4-tetramethyl-1,3-cyclobutanediol (TMCD), cyclohexanedimethanol (CHDM), propylene glycol, isosorbide, 1,4-butanediol, 1,3-propane diol, and/or neopentyl glycol (NPG).

Also included within the definition of the terms "PET" and "polyethylene terephthalate" are polyesters having repeating terephthalate units (whether or not they contain repeating ethylene glycol-based units) and one or more residues or moieties of a glycol including, for example, TMCD, CHDM, propylene glycol, or NPG, isosorbide, 1,4-butanediol, 1,3-propane diol, and/or diethylene glycol, or combinations thereof. Examples of polymers with repeat terephthalate units can include, but are not limited to, polypropylene terephthalate, polybutylene terephthalate, and copolyesters thereof. Examples of aliphatic polyesters can include, but are not limited to, polylactic acid (PLA), polyglycolic acid, polycaprolactones, and polyethylene adipates. The polymer may comprise mixed aliphatic-aromatic copolyesters including, for example, mixed terephthalates/adipates.

In an embodiment or in combination with any embodiment mentioned herein, the waste plastic may comprise at least one type of plastic that has repeat terephthalate units with such a plastic being present in an amount of at least 1, at least 2, at least 5, at least 10, at least 15, at least 20, at least 25, or at least 30 and/or not more than 45, not more than 40, not more than 35, not more than 30, not more than 25, not more than 20, not more than 15, not more than 10, not more than 5, or not more than 2 weight percent, based on the total weight of the stream, or it can be present in the range of from 1 to 45 weight percent, 2 to 40 weight percent, or 5 to 40 weight percent, based on the total weight of the stream. Similar amounts of copolyesters having multiple cyclohexane dimethanol moieties, 2,2,4,4-tetramethyl-1,3-cyclobutanediol moieties, or combinations thereof may also be present.

In an embodiment or in combination with any embodiment mentioned herein, the waste plastic may comprise at least one type of plastic that has repeat terephthalate units with such a plastic being present in an amount of at least 30, at least 35, at least 40, at least 45, at least 50, at least 55, at least 60, at least 65, at least 70, at least 75, at least 80, at least 85, or at least 90 and/or not more than 99.9, not more than 99, not more than 97, not more than 95, not more than 90, or not more than 85 weigh percent, based on the total weight of the stream, or it can be present in the range of from 30 to 99.9 weight percent, 50 to 99.9 weight percent, or 75 to 99 weight percent, based on the total weight of the stream.

In an embodiment of in combination with any embodiment mentioned herein, the waste plastic may comprise terephthalate repeat units in an amount of at least 1, at least 5, at least 10, at least 15, at least 20, at least 25, at least 30, at least 35, at least 40, or at least 45 and/or not more than 75, not more than 72, not more than 70, not more than 60, or not more than 65 weight percent, based on the total weight of the plastic in the waste plastic stream, or it may include terephthalate repeat units in an amount in the range of from 1 to 75 weight percent, 5 to 70 weight percent, or 25 to 75 weight percent, based on the total weight of the stream.

Examples of specific polyolefins may include low density polyethylene (LDPE), high density polyethylene (HDPE), atactic polypropylene, isotactic polypropylene, syndiotactic polypropylene, crosslinked polyethylene, amorphous polyolefins, and the copolymers of any one of the aforementioned polyolefins. In an embodiment or in combination with any embodiment mentioned herein, the waste plastic may include polymers including linear low-density polyethylene (LLDPE), polymethylpentene, polybutene-1, and copolymers thereof. In an embodiment or in combination with any embodiment mentioned herein, the waste plastic may comprise flashspun high density polyethylene.

The waste plastic may include thermoplastic polymers, thermosetting polymers, or combinations thereof. In an embodiment or in combination with any embodiment mentioned herein, the waste plastic can include at least 0.1, at least 1, at least 2, at least 5, at least 10, at least 15, at least 20, at least 25, or at least 30 and/or not more than 45, not more than 40, not more than 35, not more than 30, not more than 25, not more than 20, not more than 15, not more than 10, not more than 5, or not more than 2 weight percent of one or more thermosetting polymers, based on the total weight of the stream, or it can be present in an amount of 0.1 to 45 weight percent, 1 to 40 weight percent, 2 to 35 weight percent, or 2 to 20 weight percent, based on the total weight of the stream.

Alternatively, or in addition, the waste plastic may include at least 0.1, at least 1, at least 2, at least 5, at least 10, at least 15, at least 20, at least 25, or at least 30 and/or not more than 45, not more than 40, not more than 35, not more than 30, not more than 25, not more than 20, not more than 15, not more than 10, not more than 5, or not more than 2 weight percent of cellulose materials, based on the total weight of the stream, or it can be present in an amount in the range of from 0.1 to 45 weight percent, 1 to 40 weight percent, or 2 to 15 weight percent, based on the total weight of the stream. Examples of cellulose materials may include cellulose acetate, cellulose diacetate, cellulose triacetate, cellulose acetate propionate, cellulose acetate butyrate, as well as regenerated cellulose such as viscose. Additionally, the cellulose materials can include cellulose derivatives having an acyl degree of substitution of less than 3, not more than 2.9, not more than 2.8, not more than 2.7, or not more than 2.6 and/or at least 1.7, at least 1.8, or at least 1.9, or from 1.8 to 2.8, or 1.7 to 2.9, or 1.9 to 2.9.

In an embodiment or in combination with any embodiment mentioned herein, the waste plastic may comprise STYROFOAM or expanded polystyrene.

The waste plastic may originate from one or more of several sources. In an embodiment or in combination with any embodiment mentioned herein, the waste plastic may originate from plastic bottles, diapers, eyeglass frames, films, packaging materials, carpet (residential, commercial, and/or automotive), textiles (clothing and other fabrics) and combinations thereof.

In an embodiment or in combination with any embodiment mentioned herein, the waste plastic (e.g., MPW) fed to the chemical recycling facility may include one or more plastics having or obtained from plastics having a resin ID code numbered 1-7 with the chasing arrow triangle established by the SPI. The waste plastic may include one or more plastics that are not generally mechanically recycled. Such plastics can include, but are not limited to, plastics with the resin ID code 3 (polyvinyl chloride), resin ID code 5 (polypropylene), resin ID code 6 (polystyrene), and/or resin ID code 7 (other). In an embodiment or in combination with any embodiment mentioned herein, plastics having at least 1, at least 2, at least 3, at least 4, or at least 5 of the resin ID codes 3-7 or 3, 5, 6, 7, or a combination thereof may be present in the waste plastic in an amount of at least 0.1, at least 0.5, at least 1, at least 2, at least 3, at least 5, at least 7, at least 10, at least 12, at least 15, at least 20, at least 25, at least 30, at least 35, or at least 40 and/or not more than 90, not more than 85, not more than 80, not more than 75, not more than 70, not more than 65, not more than 60, not more than 55, not more than 50, not more than 45, not more than 40, or not more than 35 weight percent, based on the total weight of all plastics, or it could be in an amount of 0.1 to 90 weight percent, 1 to 75 weight percent, or 2 to 50 weight percent, based on the total weight of plastics.

In an embodiment or in combination with any embodiment mentioned herein, at least 5, at least 10, at least 15, at least 20, at least 25, at least 30, or at least 35 and/or not more than 60, not more than 55, not more than 50, not more than 45, not more than 40, not more than 35, not more than 30, not more than 25, not more than 20, not more than 15, not more than 10, or not more than 5 weight percent of the total plastic components in the waste plastic fed to the chemical recycling facility may comprise plastics not having a resin ID code 3, 5, 6, and/or 7 (e.g., where a plastic is not classified). At least 0.1, at least 0.5, at least 1, at least 2, at least 3, at least 4, at least 5, at least 10, at least 15, at least 20, at least 25, at least 30, or at least 35 and/or not more than 60, not more than 55, not more than 50, not more than 45, not more than 40, not more than 35, not more than 30, not more than 25, not more than 20, not more than 15, not more than 10, or not more than 5 weight percent of the total plastic components in the waste plastic fed to the chemical recycling facility 10 may comprise plastics not having a resin ID code 4-7, or it can be in the range of 0.1 to 60 weight percent, 1 to 55 weight percent, or 2 to 45 weight percent, based on the total weight of plastic components.

In an embodiment or in combination with any embodiment mentioned herein, the waste plastic (e.g., MPW) fed to the chemical recycling facility may comprise plastic that is not classified as resin ID codes 3-7 or ID codes 3, 5, 6, or 7. The total amount of plastic not classified as resin ID code 3-7 or ID codes 3, 5, 6, or 7 plastics in the waste plastic can be at least 0.1, at least 0.5, at least 1, at least 2, at least 3, at least 4, at least 5, at least 10, at least 15, at least 20, at least 25, at least 30, at least 35, at least 40, at least 45, at least 50, at least 55, at least 60, at least 65, at least 70, or at least 75 and/or not more than 95, not more than 90, not more than 85, not more than 80, not more than 75, not more than 70, not more than 65, not more than 60, not more than 55, not more than 50, not more than 45, not more than 40, or not more than 35 weight percent, based on the total weight of plastic in the waste plastic stream, or it can be in the range of from 0.1 to 95 weight percent, 0.5 to 90 weight percent, or 1 to 80 weight percent, based on the total weight of plastic in the waste plastic stream.

In one embodiment or in combination with any of the mentioned embodiments, the MPW comprises plastics having or obtained from plastics having at least 30, at least 35, at least 40, at least 45, at least 50, at least 55, at least 60, at least 65, at least 70, at least 75, at least 80, at least 85, at least 90, at least 95, or at least 99 weight percent of at least one, at least two, at least three, or at least four different kinds of resin ID codes.

In one embodiment or in combination with any of the mentioned embodiments, the MPW comprises multi-component polymers. As used herein, the term "multi-component polymers" refers to articles and/or particulates comprising at least one synthetic or natural polymer combined with, attached to, or otherwise physically and/or chemically associated with at least one other polymer and/or non-polymer solid. The polymer can be a synthetic polymer or plastic, such as PET, olefins, and/or nylons. The non-polymer solid can be a metal, such as aluminum, or other non-plastic solids as described herein. The multi-component polymers can include metalized plastics.

In one embodiment or in combination with any of the mentioned embodiments, the MPW comprises multi-component plastics in the form of multi-layer polymers. As used herein, the term "multi-layer polymers" refers to multi-component polymers comprising PET and at least one other polymer and/or non-polymer solid physically and/or chemically associated together in two or more physically distinct layers. A polymer or plastic is considered a multi-layered polymer even though a transition zone may exist between two layers, such as may be present in adhesively adhered layers or co-extruded layers. An adhesive between two layers is not deemed to be a layer. The multi-layer polymers may comprise a layer comprising PET and a one or more additional layers at least one of which is a synthetic or natural polymer that is different from PET, or a polymer which has no ethylene terephthalate repeating units, or a polymer which has no alkylene terephthalate repeating units (a "non-PET polymer layer"), or other non-polymer solid.

Examples of non-PET polymer layers include nylons, polylactic acid, polyolefins, polycarbonates, ethylene vinyl alcohol, polyvinyl alcohol, and/or other plastics or plastic films associated with PET-containing articles and/or particulates, and natural polymers such as whey proteins. The multi-layer polymers may include metal layers, such as aluminum, provided that at least one additional polymer layer is present other than the PET layer. The layers may be adhered with adhesive bonding or other means, physically adjacent (i.e., articles pressed against the film), tackified (i.e., the plastics heated and stuck together), co-extruded plastic films, or otherwise attached to the PET-containing articles. The multi-layer polymers may comprise PET films associated with articles containing other plastics in the same or similar manner. The MPW may comprise multi-component polymers in the form of PET and at least one other plastic, such as polyolefins (e.g., polypropylene) and/or other synthetic or natural polymers, combined in a single physical phase. For example, the MPW comprises a heterogenous mixture comprising a compatibilizer, PET, and at least one other synthetic or natural polymer plastic (e.g., non-PET plastic) combined in a single physical phase. As used herein, the term "compatibilizer" refers to an agent capable of combining at least two otherwise immiscible polymers together in a physical mixture (i.e., blend).

In one embodiment or in combination with any of the mentioned embodiments, the MPW comprises not more than 20, not more than 10, not more than 5, not more than 2, not more than 1, or not more than 0.1 weight percent nylons, on a dry plastic basis. In one embodiment or in combination with any of the mentioned embodiments, the MPW comprises from 0.01 to 20, from 0.05 to 10, from 0.1 to 5, or from 1 to 2 weight percent nylons, on a dry plastic basis.

In one embodiment or in combination with any of the mentioned embodiments, the MPW comprises not more than 40, not more than 20, not more than 10, not more than 5, not more than 2, or not more than 1 weight percent multi-component plastics, on a dry plastic basis. In one embodiment or in combination with any of the mentioned embodiments, the MPW comprises from 0.1 to 40, from 1 to 20, or from 2 to 10 weight percent multi-component plastics, on a dry plastic basis. In one embodiment or in combination with any of the mentioned embodiments, the MPW comprises not more than 40, not more than 20, not more than 10, not more than 5, not more than 2, or not more than 1 weight percent multi-layer plastics, on a dry plastic basis. In one embodiment or in combination with any of the mentioned embodiments, the MPW comprises from 0.1 to 40, from 1 to 20, or from 2 to 10 weight percent multi-layer plastics, on a dry plastic basis.

In one embodiment or in combination with any of the mentioned embodiments, the MPW feedstock to the chemical recycling facility 10 in stream 100 comprises not more than 20, not more than 15, not more than 12, not more than 10, not more than 8, not more than 6, not more than 5, not more than 4, not more than 3, not more than 2, or not more than 1 weight percent of biowaste materials, with the total weight of the MPW feedstock taken as 100 weight percent on a dry basis. The MPW feedstock comprises from 0.01 to 20, from 0.1 to 10, from 0.2 to 5, or from 0.5 to 1 weight percent of biowaste materials, with the total weight of the MPW feedstock taken as 100 weight percent on a dry basis. As used herein, the term "biowaste" refers to material derived from living organisms or of organic origin. Exemplary biowaste materials include, but are not limited to, cotton, wood, saw dust, food scraps, animals and animal parts, plants and plant parts, and manure.

In one embodiment or in combination with any of the mentioned embodiments, the MPW feedstock comprises not more than 20, not more than 15, not more than 12, not more than 10, not more than 8, not more than 6, not more than 5, not more than 4, not more than 3, not more than 2, or not more than 1 weight percent of manufactured cellulose products, with the total weight of the MPW feedstock taken as 100 weight percent on a dry basis. The MPW feedstock comprises from 0.01 to 20, from 0.1 to 10, from 0.2 to 5, or from 0.5 to 1 weight percent of manufactured cellulose products, with the total weight of the MPW feedstock taken as 100 weight percent on a dry basis. As used herein, the term "manufactured cellulose products" refers to nonnatural (i.e., manmade or machine-made) articles, and scraps thereof, comprising cellulosic fibers. Exemplary manufactured cellulose products include, but are not limited to, paper and cardboard.

In an embodiment or in combination with any embodiment mentioned herein, the waste plastic (e.g., MPW) fed to the chemical recycling facility can include at least 0.001, at least 0.01, at least 0.05, at least 0.1, or at least 0.25 weight percent and/or not more than 10, not more than 5, not more than 4, not more than 3, not more than 2, not more than 1, not more than 0.75, or not more than 0.5 weight percent of polyvinyl chloride (PVC) based on the total weight of plastics in the waste plastic feed.

Additionally, or in the alternative, the waste plastic (e.g., MPW) fed to the chemical recycling facility can include at least 0.1, at least 1, at least 2, at least 4, or at least 6 weight percent and/or not more than 25, not more than 15, not more than 10, not more than 5, or not more than 2.5 weight percent of non-plastic solids. Non-plastic solids may include inert filler materials (e.g., calcium carbonate, hydrous aluminum silicate, alumina trihydrate, calcium sulfate), rocks, glass, and/or additives (e.g., thixotropes, pigments and colorants, fire retardants, suppressants, UV inhibitors & stabilizers, conductive metal or carbon, release agents such as zinc stearate, waxes, and silicones).

In one embodiment or in combination with any of the mentioned embodiments, the MPW may comprise at least 0.01, at least 0.1, at least 0.5, or at least 1 and/or not more than 25, not more than 20, not more than 25, not more than 10, not more than 5, or not more than 2.5 weight percent of liquids, based on the total weight of the MPW stream or composition. The amount of liquids in the MPW can be in the range of from 0.01 to 25 weight percent, from 0.5 to 10 weight percent, or 1 to 5 weight percent, based on the total weight of the MPW stream 100.

In one embodiment or in combination with any of the mentioned embodiments, the MPW may comprise at least 35, at least 40, at least 45, at least 50, or at least 55 and/or not more than 65, not more than 60, not more than 55, not more than 50, not more than 45, not more than 40, or not more than 35 weight percent of liquids, based on the total weight of the waste plastic. The liquids in the waste plastic can be in the range of from 35 to 65 weight percent, 40 to 60 weight percent, or 45 to 55 weight percent, based on the total weight of the waste plastic.

In one embodiment or in combination with any of the mentioned embodiments, the amount of textiles (including textile fibers) in the MPW stream in line 100 can be at least 0.1 weight percent, or at least 0.5 weight percent, or at least 1 weight percent, or at least 2 weight percent, or at least 5 weight percent, or at least 8 weight percent, or at least 10 weight percent, or at least 15 weight percent, or at least 20 weight percent material obtained from textiles or textile fibers, based on the weight of the MPW. The amount of textiles (including textile fibers) in the MPW in stream 100 is not more than 50, not more than 40, not more than 30, not more than 20, not more than 15, not more than 10, not more than 8, not more than 5, not more than 2, not more than 1, not more than 0.5, not more than 0.1, not more than 0.05, not more than 0.01, or not more than 0.001 weight percent, based on the weight of the MPW stream 100. The amount of textiles in the MPW stream 100 can be in the range of from 0.1 to 50 weight percent, 5 to 40 weight percent, or 10 to 30 weight percent, based on the total weight of the MPW stream 100.

The MPW introduced into the chemical recycling facility 10 may contain recycle textiles. Textiles may contain natural and/or synthetic fibers, rovings, yarns, nonwoven webs, cloth, fabrics and products made from or containing any of the aforementioned items. Textiles can be woven, knitted, knotted, stitched, tufted, may include pressed fibers such as in felting, embroidered, laced, crocheted, braided, or may include nonwoven webs and materials. Textiles can include fabrics, and fibers separated from a textile or other product containing fibers, scrap or off-spec fibers or yarns or fabrics, or any other source of loose fibers and yarns. A textile can also include staple fibers, continuous fibers, threads, tow bands, twisted and/or spun yarns, gray fabrics made from yarns, finished fabrics produced by wet processing gray fabrics, and garments made from the finished fabrics or any other fabrics. Textiles include apparels, interior furnishings, and industrial types of textiles. Textiles can include post-industrial textiles (pre-consumer) or post-consumer textiles or both.

In one embodiment or in combination with any of the mentioned embodiments, textiles can include apparel, which can generally be defined as things humans wear or made for the body. Such textiles can include sports coats, suits, trousers and casual or work pants, shirts, socks, sportswear, dresses, intimate apparel, outerwear such as rain jackets, cold temperature jackets and coats, sweaters, protective clothing, uniforms, and accessories such as scarves, hats, and gloves. Examples of textiles in the interior furnishing category include furniture upholstery and slipcovers, carpets and rugs, curtains, bedding such as sheets, pillow covers, duvets, comforters, mattress covers; linens, tablecloths, towels, washcloths, and blankets. Examples of industrial textiles include transportation (auto, airplane, train, bus) seats, floor mats, trunk liners, and headliners; outdoor furniture and cushions, tents, backpacks, luggage, ropes, conveyor belts, calendar roll felts, polishing cloths, rags, soil erosion fabrics and geotextiles, agricultural mats and screens, personal protective equipment, bullet proof vests, medical bandages, sutures, tapes, and the like.

The nonwoven webs that are classified as textiles do not include the category of wet laid nonwoven webs and articles made therefrom. While a variety of articles having the same function can be made from a dry or wet laid process, an article made from a dry laid nonwoven web is classified as a textile. Examples of suitable articles that may be formed from dry laid nonwoven webs as described herein can include those for personal, consumer, industrial, food service, medical, and other end uses. Specific examples can include, but are not limited to, baby wipes, flushable wipes, disposable diapers, training pants, feminine hygiene products such as sanitary napkins and tampons, adult incontinence pads, underwear, or briefs, and pet training pads. Other examples include a variety of different dry or wet wipes, including those for consumer (such as personal care or household) and industrial (such as food service, health care, or specialty) use. Nonwoven webs can also be used as padding for pillows, mattresses, and upholstery, and batting for quilts and comforters. In the medical and industrial fields, nonwoven webs of the present invention may be used for consumer, medical, and industrial face masks, protective clothing, caps, and shoe covers, disposable sheets, surgical gowns, drapes, bandages, and medical dressings.

Additionally, nonwoven webs as described herein may be used for environmental fabrics such as geotextiles and tarps, oil and chemical absorbent pads, as well as building materials such as acoustic or thermal insulation, tents, lumber and soil covers and sheeting. Nonwoven webs may also be used for other consumer end use applications, such as for, carpet backing, packaging for consumer, industrial, and agricultural goods, thermal or acoustic insulation, and in various types of apparel.

The dry laid nonwoven webs as described herein may also be used for a variety of filtration applications, including transportation (e.g., automotive or aeronautical), commercial, residential, industrial, or other specialty applications. Examples can include filter elements for consumer or industrial air or liquid filters (e.g., gasoline, oil, water), including nanofiber webs used for microfiltration, as well as end uses like tea bags, coffee filters, and dryer sheets. Further, nonwoven webs as described herein may be used to form a variety of components for use in automobiles, including, but not limited to, brake pads, trunk liners, carpet tufting, and under padding.

The textiles can include single type or multiple type of natural fibers and/or single type or multiple type of synthetic fibers. Examples of textile fiber combinations include all natural, all synthetic, two or more type of natural fibers, two or more types of synthetic fibers, one type of natural fiber and one type of synthetic fiber, one type of natural fibers and two or more types of synthetic fibers, two or more types of natural fibers and one type of synthetic fibers, and two or more types of natural fibers and two or more types of synthetic fibers.

Natural fibers include those that are plant derived or animal derived. Natural fibers can be cellulosics, hemicellulosics, and lignins. Examples of plant derived natural fibers include hardwood pulp, softwood pulp, and wood flour; and other plant fibers including those in wheat straw, rice straw, abaca, coir, cotton, flax, hemp, jute, bagasse, kapok, papyrus, ramie, rattan, vine, kenaf, abaca, henequen, sisal, soy, cereal straw, bamboo, reeds, esparto grass, bagasse, Sabai grass, milkweed floss fibers, pineapple leaf fibers, switch grass, lignin-containing plants, and the like. Examples of animal derived fibers include wool, silk, mohair, cashmere, goat hair, horsehair, avian fibers, camel hair, angora wool, and alpaca wool.

Synthetic fibers are those fibers that are, at least in part, synthesized or derivatized through chemical reactions, or regenerated, and include, but are not limited to, rayon, viscose, mercerized fibers or other types of regenerated cellulose (conversion of natural cellulose to a soluble cellulosic derivative and subsequent regeneration) such as lyocell (also known as TENCEL™), Cupro, Modal, acetates such as polyvinyl acetate, polyamides including nylon, polyesters such as PET, olefinic polymers such as polypropylene and polyethylene, polycarbonates, poly sulfates, poly sulfones, polyethers such as polyether-urea known as Spandex or elastane, polyacrylates, acrylonitrile copolymers, polyvinylchloride (PVC), polylactic acid, polyglycolic acid, sulfopolyester fibers, and combinations thereof.

Prior to entering the chemical recycling facility, the textiles can be size reduced via chopping, shredding, harrowing, confrication, pulverizing, or cutting to make size reduced textiles. The textiles can also be densified (e.g., pelletized) prior to entering the chemical recycling facility. Examples of processes that densify include extrusion (e.g., into pellets), molding (e.g., into briquettes), and agglomerating (e.g., through externally applied heat, heat generated by frictional forces, or by adding one or more adherents, which can be non-virgin polymers themselves). Alternatively, or in addition, the textiles can be in any of the forms mentioned herein and may be exposed to one or more of the previously mentioned steps in the pre-processing facility 20 prior to being processed in the remaining facilities of the chemical recycling facility 10 shown in FIG. 1.

In an embodiment or in combination with any embodiment mentioned herein, polyethylene terephthalate (PET) and one or more polyolefins (PO) in combination make up at least 50, at least 55, at least 60, at least 65, at least 70, at least 75, at least 80, at least 85, at least 90, at least 95, or at least 99 weight percent of the waste plastic (e.g., MPW) fed to the chemical recycling facility in stream 100 of FIG. 1. Polyvinylchloride (PVC) can make up at least 0.001, at least 0.01, at least 0.05, at least 0.1, at least 0.25, or at least 0.5 weight percent and/or not more than 10, not more than 5, not more than 4, not more than 3, not more than 2, not more than 1, not more than 0.75, or not more than 0.5 weight percent of the waste plastic, based on the total weight of the plastic in the waste plastic introduced into the chemical recycling facility 10.

In an embodiment or in combination with any embodiment mentioned herein, the waste plastic can comprise at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of PET, based on the total weight of the plastic in the waste plastic introduced into the chemical recycling facility 10.

In an embodiment or in combination with any embodiment mentioned herein, the waste plastic can comprise at least 5, at least 10, at least 15, at least 20, at least 25, at least 30, at least 35, at least 40 and/or not more than 95, not more than 90, not more than 85, not more than 80, not more than 75, not more than 70, not more than 65, not more than 60, not more than 55, not more than 50, not more than 45, not more than 40, or not more than 35 weight percent PO, based on the total weight of the plastic in the waste plastic, or PO can be present in an amount in the range of from 5 to 75 weight percent, 10 to 60 weight percent, or 20 to 35 weight percent, based on the total weight of plastic in the waste plastic introduced into the chemical recycling facility 10.

The waste plastic (e.g., MPW) introduced into the chemical recycling facility may be provided from a variety of sources, including, but not limited to, municipal recycling facilities (MRFs) or reclaimer facilities or other mechanical or chemical sorting or separation facilities, manufacturers or mills or commercial production facilities or retailers or dealers or wholesalers in possession of post-industrial and pre-consumer recyclables, directly from households/businesses (i.e., unprocessed recyclables), landfills, collection centers, convenience centers, or on docks or ships or warehouses thereon. In an embodiment or in combination with any embodiment mentioned herein, the source of waste plastic (e.g., MPW) does not include deposit state return facilities, whereby consumers can deposit specific recyclable articles (e.g., plastic containers, bottles, etc.) to receive a monetary refund from the state. In an embodiment or in combination with any embodiment mentioned herein, the source of waste plastic (e.g., MPW) does include deposit state return facilities, whereby consumers can deposit specific recyclable articles (e.g., plastic containers, bottles, etc.) to receive a monetary refund from the state. Such return facilities are commonly found, for example, in grocery stores.

In an embodiment or in combination with any embodiment mentioned herein, the waste plastic may be provided as a waste stream from another processing facility, for example a municipal recycling facility (MRF) or reclaimer facility, or as a plastic-containing mixture comprising waste plastic sorted by a consumer and left for collection at a curbside, or at a central convenience station. In one or more of such embodiments, the waste plastic comprises one or more MRF products or co-products, reclaimer co-products, sorted plastic-containing mixtures, and/or PET-containing waste plastic from a plastic article manufacturing facility comprising at least 10, at least 20, at least 30, at least 40, at least 50, at least 60, at least 70, at least 80, or at least 90 weight percent PET and/or not more than 99.9, not more than 99, not more than 98, not more than 97, not more than 96, or not more than 95 weight percent PET, on a dry plastics basis, or it can be in the range of from 10 to 99.9 weight percent, 20 to 99 weight percent, 30 to 95 weight percent, or 40 to 90 weight percent PET, on a dry plastics basis.

In one or more of such embodiments, the waste plastic comprises a quantity of a PET-containing reclaimer coproduct or plastic-containing mixture comprising at least 1, at least 10, at least 30, at least 50, at least 60, at least 70, at least 80, or at least 90 weight percent and/or not more than 99.9, not more than 99, or not more than 90 weight percent PET, on a dry plastic basis, or it can be in the range of from 1 to 99.9 weight percent, 1 to 99 weight percent, or 10 to 90 weight percent PET, on a dry plastic basis. Reclaimer facilities may also include processes that produce high purity PET (at least 99 or at least 99.9 weight percent) reclaimer co-products but in a form that is undesirable to mechanical recycling facilities. As used herein, the term "reclaimer co-product" refers to any material separated or recovered by the reclaimer facility that is not recovered as a clear rPET product, including colored rPET. The reclaimer co-products described above and below are generally considered to be waste products and may sent to landfills.

In one or more of such embodiments, the waste plastic comprises a quantity of reclaimer wet fines comprising at least 20, at least 40, at least 60, at least 80, at least 90, at least 95, or at least 99 weight percent and/or not more than 99.9 weight percent PET, on a dry plastic basis. In one or more of such embodiments, the waste plastic comprises a quantity of colored plastic-containing mixture comprising at least 1, at least 10, at least 20, at least 40, at least 60, at least 80, or at least 90 and/or not more than 99.9 or not more than 99 weight percent PET, on a dry plastic basis. In one or more of such embodiments, the waste plastic comprises a quantity of eddy current waste stream comprising metal and at least 0.1, at least 1, at least 10, at least 20, at least 40, at least 60, or at least 80 weight percent and/or not more than 99.9, not more than 99, or not more than 98 weight percent PET, on a dry plastic basis. In one or more of such embodiments, the waste plastic comprises a quantity of reclaimer flake reject comprising at least 0.1, at least 1, at least 10, at least 20, at least 40, at least 60, or at least 80 weight percent and/or not more than 99.9, not more than 99, or not more than 98 weight percent PET, on a dry plastic basis, or it could be in the range of from 0.1 to 99.9 weight percent, 1 to 99 weight percent, or 10 to 98 weight percent PET, on a dry plastic basis. In one or more of such embodiments, the waste plastic comprises a quantity of dry fines comprising at least 50, at least 60, at least 70, at least 80, at least 90, at least 95, at least 99, at least 99.9 weight percent PET, on a dry plastic basis.

The chemical recycling facility 10 may also include infrastructure for receiving waste plastic (e.g., MPW) as described herein to facilitate delivery of the waste plastic by any suitable type of vehicle including, for example, trains, trucks, and/or ships. Such infrastructure may include facilities to assist with offloading the waste plastic from the vehicle, as well as storage facilities and one or more conveyance systems for transporting the waste plastic from the offloading zone to the downstream processing zones. Such conveyance systems may include, for example, pneumatic conveyors, belt conveyors, bucket conveyors, vibrating conveyors, screw conveyors, cart-on-track conveyors, tow conveyors, trolley conveyors, front-end loaders, trucks, and chain conveyors.

The waste (e.g., MPW) introduced into the chemical recycling facility 10 may be in several forms including, but not limited to, whole articles, particulates (e.g., comminuted, pelletized, fiber plastic particulates), bound bales (e.g., whole articles compressed and strapped), unbound articles (i.e., not in bales or packaged), containers (e.g., box, sack, trailer, railroad car, loader bucket), piles (e.g., on a concrete slab in a building), solid/liquid slurries (e.g., pumped slurry of plastics in water), and/or loose materials conveyed physically (e.g., particulates on a conveyor belt) or pneumatically (e.g., particulates mixed with air and/or inert gas in a convey pipe).

As used herein, the term "waste plastic particulates" refers to waste plastic having a D90 of less than 1 inch. In an embodiment or in combination with any embodiment mentioned herein, the waste plastic particulates can be MPW particulates. A waste plastic or MPW particulate can include, for example, comminuted plastic particles that have been shredded or chopped, or plastic pellets. When whole or nearly whole articles are introduced into the chemical recycling facility 10 (or preprocessing facility 20), one or more comminuting or pelletizing steps may be used therein to form waste plastic particulates (e.g., MPW particulates). Alternatively, or in addition, at least a portion of the waste plastic introduced into the chemical recycling facility 10 (or preprocessing facility 20) may already be in the form of particulates.

The general configuration and operation of each of the facilities that may be present in the chemical recycling facility shown in FIG. 1 will now be described in further detail below, beginning with the preprocessing facility. Optionally, although not shown in FIG. 1, at least one of the streams from the chemical recycling facility may be sent to an industrial landfill or other similar type of processing or disposal facility.

Preprocessing

As shown in FIG. 1, the unprocessed and/or partially processed waste plastic, such as mixed plastic waste (MPW), may first be introduced into a preprocessing facility 20 via stream 100. In preprocessing facility 20 the stream may undergo one or more processing steps to prepare it for chemical recycling. As used herein, the term "preprocessing" refers to preparing waste plastic for chemical recycling using one or more of the following steps: (i) comminuting; (ii) particulating; (iii) washing; (iv) drying; and (v) separation. As used herein, the term "preprocessing facility" refers to a facility that includes all equipment, lines, and controls necessary to carry out the preprocessing of waste plastic. Preprocessing facilities as described herein may employ any suitable method for carrying out the preparation of waste plastic for chemical recycling using one or more of these steps, which are described in further detail below.

Comminuting & Particulating

In an embodiment or in combination with any embodiment mentioned herein, the waste plastic (e.g., MPW) may be provided in bales of unsorted or presorted plastic, or in other large, aggregated forms. The bales or aggregated plastics undergo an initial process in which they are broken apart. Plastic bales can be sent to a debaler machine that comprises, for example, one or more rotating shafts equipped with teeth or blades configured to break the bales apart, and in some instances shred, the plastics from which the bales are comprised. In one or more other embodiments, the bales or aggregated plastics can be sent to a guillotine machine where they are chopped into smaller sized pieces of plastic. The debaled and/or guillotined plastic solids can then be subjected to a sorting process in which various non-plastic, heavy materials, such as glass, metal, and rocks, are removed. This sorting process can be performed manually or by a machine. Sorting machines may rely upon optical sensors, magnets, eddy currents, pneumatic lifts or conveyors that separate based on drag coefficient, or sieves to identify and remove the heavy materials.

In an embodiment or in combination with any embodiment mentioned herein, the waste plastic feedstock comprises plastic solids having a D90 that is greater than one inch, greater than 0.75 inch, or greater than 0.5 inch, such as used containers. Alternatively, or in addition, the waste plastic feedstock may also comprise a plurality of plastic solids that, at one time, had at least one dimension of greater than one inch, but the solids may have been compacted, pressed, or otherwise aggregated into a larger unit, such as a bale. In such embodiments wherein at least a portion, or all, of the plastic solids have at least one dimension greater than one inch, greater than 0.75 inch, or 0.5 inch, the feedstock may be subjected to a mechanical size reduction operation, such as grinding/granulating, shredding, guillotining, chopping, or other comminuting process to provide MPW particles having a reduced size. Such mechanical size reduction operations can include a size reduction step other than crushing, compacting, or forming plastic into bales.

In one or more other embodiments, the waste plastic may already have undergone some initial separation and/or size-reduction process. In particular, the waste plastic may be in the form of particles or flakes and provided in some kind of container, such as a sack or box. Depending upon the composition of these plastic solids and what kind of preprocessing they may have been subjected to, the plastic feedstock may bypass the debaler, guillotine, and/or heavies removal station and proceed directly to the granulating equipment for further size reduction.

In an embodiment or in combination with any embodiment mentioned herein, the debaled or broken apart plastic solids may be sent to comminution or granulating equipment in which the plastic solids are ground, shredded, or otherwise reduced in size. The plastic materials can be made into particles having a D90 particle size of less than 1 inch, less than ¾ inch, or less than ½ inch. In one or more other embodiments, the D90 particle size of the plastic materials exiting the granulating equipment is from 1/16 inch to 1 inch, ⅛ inch to ¾ inch, ¼ inch to ⅝ inch, or ⅜ inch to ½ inch.

Washing & Drying

In an embodiment or in combination with any embodiment mentioned herein, the unprocessed or partially processed waste plastic provided to the chemical recycling facility may comprise various organic contaminants or residues that may be associated with the previous use of the waste plastic. For example, the waste plastic may comprise food or beverage soils, especially if the plastic material was used in food or beverage packaging. Accordingly, the waste plastic may also contain microorganism contaminants and/or compounds produced by the microorganisms. Exemplary microorganisms that may be present on the surfaces of the plastic solids making up the waste plastic include *E. coli, salmonella, C. dificile, S. aureus, L. monocytogenes, S. epidermidis, P. aeruginosa*, and *P. fluorescens*.

Various microorganisms can produce compounds that cause malodors. Exemplary odor-causing compounds include hydrogen sulfide, dimethyl sulfide, methanethiol, putrescine, cadaverine, trimethylamine, ammonia, acetaldehyde, acetic acid, propanoic acid, and/or butyric acid. Thus, it can be appreciated that the waste plastic could present odor nuisance concerns. Therefore, in one or more embodiments, the waste plastic may be stored within an enclosed space, such as a shipping container, enclosed railcar, or enclosed trailer until it can be processed further. In certain embodiments, the unprocessed or partially processed waste plastic, once it reaches the site where processing (e.g., comminuting, washing, and sorting) of the waste plastic is to occur, can be stored with the enclosed spaces for no more than one week, no more than 5 days, no more than 3 days, no more than 2 days, or no more than 1 day.

In an embodiment or in combination with any embodiment mentioned herein, the preprocessing facility 20 may also include equipment for or the step of treating the waste plastic with a chemical composition that possesses antimicrobial characteristics, thereby forming treated particulate plastic solids. In some embodiments, this may include treating the waste plastic with sodium hydroxide, high pH salt solutions (e.g., potassium carbonate), or other antimicrobial composition.

Additionally, in an embodiment or in combination with any embodiment mentioned herein, the waste plastic (e.g., MPW) may optionally be washed to remove inorganic, non-plastic solids such as dirt, glass, fillers and other non-plastic solid materials, and/or to remove biological components such as bacteria and/or food. The resulting washed waste plastic may also be dried to a moisture content of not more than 5, not more than 3, not more than 2, not more than 1, not more than 0.5, or not more than 0.25 weight percent water (or liquid), based on the total weight of the waste plastic. The drying can be done in any suitable manner, including by the addition of heat and/or air flow, mechanical drying (e.g., centrifugal), or by permitting evaporation of the liquid to occur over a specified time.

Separation

In an embodiment or in combination with any embodiment mentioned herein, the preprocessing facility 20 or step of the chemical recycling process or facility 10 may include at least one separation step or zone. The separation step or zone may be configured to separate the waste plastic stream into two or more streams enriched in certain types of plastics. Such separation is particularly advantageous when the waste plastic fed to the preprocessing facility 20 is MPW.

Figure 2:
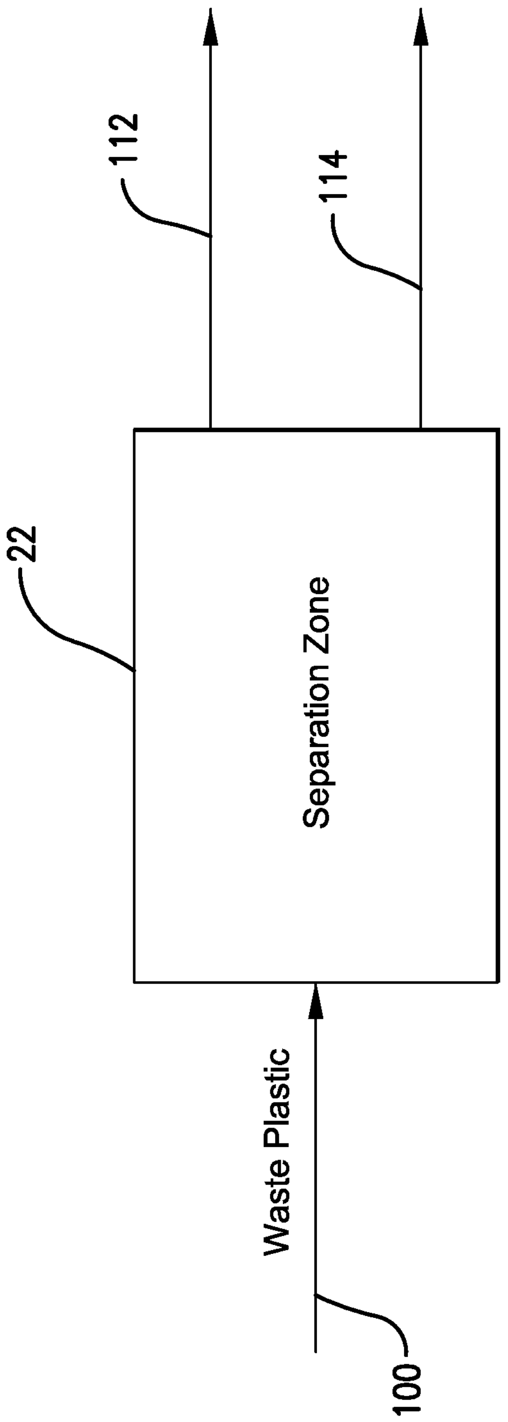
FIG. 2 depicts an exemplary separation zone of a preprocessing facility.

In an embodiment or in combination with any embodiment mentioned herein, the separation zone 22 (see FIG. 2) of the preprocessing facility 20 may separate the waste plastic (e.g., MPW) into a PET-enriched stream 112 and a PET-depleted stream 114 as shown in FIG. 2. As used herein, the term "enriched" means having a concentration (on an undiluted dry weight basis) of a specific component that is greater than the concentration of that component in a reference material or stream. As used herein, the term "depleted" means having a concentration (on an undiluted dry weight basis) of a specific component that is less than the concentration of that component in a reference material or stream. As used herein, all weight percentages are given on an undiluted dry weight basis, unless otherwise noted.

When the enriched or depleted component is a solid, concentrations are on an undiluted dry solids weight basis; when the enriched or depleted component is a liquid, concentrations are on an undiluted dry liquid weight basis; and when the enriched or depleted component is a gas, concentrations are on an undiluted dry gas weight basis. In addition, enriched and depleted can be expressed in mass balance terms, rather than as a concentration. As such, a stream enriched in a specific component can have a mass of the component that is greater than the mass of the component in a reference stream (e.g., feed stream or other product stream), while a stream depleted in a specific component can have a mass of the component that is less than the mass of the component in a reference stream (e.g., feed stream or other product stream).

Referring again to FIG. 2, the PET-enriched stream 112 of waste plastic withdrawn from the preprocessing facility 20 (or separation zone 22) may have a higher concentration or mass of PET than the concentration or mass of PET in the waste plastic feed stream 100 introduced into the preprocessing facility 20 (or separation zone 22). Similarly, the PET-depleted stream 114 withdrawn from the preprocessing facility 20 (or separation zone 22) may be PET-depleted and have a lower concentration or mass of PET than the concentration or mass of PET in the waste plastic introduced into the preprocessing facility 20 (or separation zone 22). The PET-depleted stream 114 may also be PO-enriched and have a higher concentration or mass of PO than the concentration or mass of PO in the waste plastic (e.g., MPW) stream introduced into the preprocessing facility 20 (or separation zone 22).

In an embodiment or in combination with any embodiment mentioned herein, when a MPW stream 100 is fed to the preprocessing facility 20 (or separation zone 22), the PET-enriched stream may be enriched in concentration or mass of PET relative to the concentration or mass of PET in the MPW stream, or the PET-depleted stream, or both, on an undiluted solids dry weight basis. For example, if the PET-enriched stream is diluted with liquid or other solids after separation, the enrichment would be on the basis of a concentration in the undiluted PET-enriched stream, and on a dry basis. In one embodiment or in combination with any of the mentioned embodiments, the PET-enriched stream 112 has a percent PET enrichment relative to the MPW feed stream (Feed-Based % PET Enrichment), the PET-depleted product stream 114 (Product-Based % PET Enrichment), or both that is at least 10, at least 20, at least 40, at least 50, at least 60, at least 80, at least 100, at least 125, at least 150, at least 175, at least 200, at least 225, at least 250, at least 300, at least 350, at least 400, at least 500, at least 600, at least 700, at least 800, at least 900, or at least 1000% as determined by the formula:

$$\text{Feed-Based } \% PETEnrichment = \frac{PETe - PETm}{PETm} \times 100$$

and $$\text{Product-Based } \% PETEnrichment = \frac{PETe - PETd}{PETd} \times 100$$

where PETe is the concentration of PET in the PET-enriched product stream 112 on an undiluted dry weight basis;

PETm is the concentration of PET in the MPW feed stream 100 on a dry weight basis; and PETd is the concentration of PET in the PET-depleted product stream 114 on a dry weight basis.

In an embodiment or in combination with any embodiment mentioned herein, when a stream comprising MPW 100 is fed to the preprocessing facility 20 (or separation zone 22), the PET-enriched stream is also enriched in halogens, such as fluorine (F), chlorine (Cl), bromine (Br), iodine (I), and astatine (At), and/or halogen-containing compounds, such as PVC, relative to the concentration or mass of halogens in the MPW feed stream 100, or the PET-depleted product stream 114, or both. In one embodiment or in combination with any of the mentioned embodiments, the PET-enriched stream 112 has a percent PVC enrichment relative to the MPW feed stream 100 (Feed-Based % PVC Enrichment), the PET-depleted product stream (Product-Based % PVC Enrichment), or both that is at least 1, at least 3, at least 5, at least 7, at least 10, at least 15, at least 20, at least 40, at least 50, at least 60, at least 80, at least 100, at least 125, at least 150, at least 175, at least 200, at least 225, at least 250, at least 300, at least 350, at least 400, or at least 500% as determined by the formula:

$$\text{Feed-Based }\%PVCEnrichment = \frac{PVCe - PVCm}{PVCm} \times 100$$

and $$\text{Product-Based }\%PVCEnrichment = \frac{PVCe - PVCd}{PVCd} \times 100$$

where PVCe is the concentration of PVC in the PET-enriched product stream 112 on an undiluted dry weight basis;

PVCm is the concentration of PVC in the MPW feed stream 100 on an undiluted dry weight basis; and where PVCd is the concentration of PVC in the PET-depleted product stream 114 on an undiluted dry weight basis.

In one embodiment or in combination with any of the mentioned embodiments, when a MPW stream 100 is fed to the preprocessing facility 20 (or separation zone 22), the PET-depleted stream 114 is enriched in polyolefins relative to the concentration or mass of polyolefins in the MPW feed stream 100, the PET-enriched product stream 112, or both, on an undiluted solids dry basis. In one embodiment or in combination with any of the mentioned embodiments, the PET-depleted stream 114 has a percent polyolefin enrichment relative to the MPW feed stream 100 (Feed-Based % PO Enrichment), or relative to the PET-enriched product stream 112 (Product-Based % PO Enrichment), or both that is at least 10, at least 20, at least 40, at least 50, at least 60, at least 80, at least 100, at least 125, at least 150, at least 175, at least 200, at least 225, at least 250, at least 300, at least 350, at least 400, at least 500, at least 600, at least 700, at least 800, at least 900, or at least 1000% as determined by the formula:

$$\text{Feed-Based }\%POEnrichment = \frac{POd - POm}{POm} \times 100$$

and $$\text{Product-Based }\%POEnrichment = \frac{POd - POe}{POe} \times 100$$

where POd is the concentration of polyolefins in the PET-depleted product stream 114 on an undiluted dry weight basis;

POm is the concentration of PO in the MPW feed stream 100 on a dry weight basis; and POe is the concentration of PO in the PET-enriched product stream 112 on a dry weight basis.

In one embodiment or in combination with any other embodiments, when a MPW stream 100 is fed to the preprocessing facility 20 (or separation zone 22), the PET-depleted stream 114 is also depleted in halogens, such as fluorine (F), chlorine (Cl), bromine (Br), iodine (I), and astatine (At), and/or halogen-containing compounds, such as PVC, relative to the concentration or mass of halogens in the MPW stream 100, the PET-enriched stream 112, or both. In one embodiment or in combination with any of the mentioned embodiments, the PET-depleted stream 114 has a percent PVC depletion, relative to the MPW feed stream 100 (Feed-Based % PVC Depletion) or the PET-enriched product stream 112 (Product-Based % PVC Depletion) that is at least 1, at least 3, at least 5, at least 7, at least 10, at least 15, at least 20, at least 25, at least 30, at least 35, at least 40, at least 50, at least 60, at least 65, at least 70, at least 75, at least 80, at least 85, or at least 90% as determined by the formula:

$$\text{Feed-Based }\%PVCDepletion = \frac{PVCm - PVCd}{PVCm} \times 100$$

and $$\text{Product-Based }\%PVCDepletion = \frac{PVCe - PVCd}{PVCe} \times 100$$

where PVCm is the concentration of PVC in the MPW feed stream 100 on an undiluted dry weight basis;

PVCd is the concentration of PVC in the PET-depleted product stream 114 on an undiluted dry weight basis; and PVCe is the concentration of PVC in the PET-enriched product stream 112 on an undiluted dry weight basis.

The PET-depleted stream 114 is depleted in PET relative to the concentration or mass of PET in the MPW stream 100, the PET-enriched stream 112, or both. In one embodiment or in combination with any of the mentioned embodiments, the PET-depleted stream 114 has a percent PET depletion, relative to the MPW feed stream 100 (Feed-Base % PET Depletion) or the PET-enriched product stream 112 (Product-Based % PET Depletion) that is at least 1, at least 3, at least 5, at least 7, at least 10, at least 15, at least 20, at least 25, at least 30, at least 35, at least 40, at least 50, at least 60, at least 65, at least 70, at least 75, at least 80, at least 85, or at least 90% as determined by the formula:

$$\text{Feed-Based }\%PETDepletion = \frac{PETm - PETd}{PETm} \times 100$$

and $$\text{Product-Based }\%PETDepletion = \frac{PETe - PETd}{PETe} \times 100$$

where PETm is the concentration of PET in the MPW feed stream 100 on an undiluted dry weight basis;

PETd is the concentration of PET in the PET-depleted product stream 114 on an undiluted dry weight basis; and PETe is the concentration of PET in the PET-enriched product stream 112 on an undiluted dry weight basis.

The percentage enrichment or depletion in any of the above embodiments can be an average over 1 week, or over 3 days, or over 1 day, and the measurements can be conducted to reasonably correlate the samples taken at the exits of the process to MPW bulk from which the sample of MPW is taking into account the residence time of the MPW to flow from entry to exit. For example, if the average residence time of the MPW is 2 minutes, then the outlet sample would be taken two minutes after the input sample, so that the samples correlate to one another.

In an embodiment or in combination with any embodiment mentioned herein, the PET-enriched stream exiting the separation zone 22 or the preprocessing facility 20 may include at least 50, at least 55, at least 60, at least 65, at least 70, at least 75, at least 80, at least 85, at least 90, at least 95, at least 97, at least 99, at least 99.5, or at least 99.9 weight percent PET, based on the total weight of plastic in the PET-enriched stream 112. The PET-enriched stream 112 may also be enriched in PVC and can include, for example, at least 0.1, at least 0.5, at least 1, at least 2, at least 3, at least 5 and/or not more than 10, not more than 8, not more than 6, not more than 5, not more than 3 weight percent of halogens, including PVC, based on the total weight of plastic in the PET-enriched stream, or it can be in the range of 0.1 to 10 weight percent, 0.5 to 8 weight percent, or 1 to 5 weight percent, based on the total weight of plastic in the PET-enriched stream. The PET-enriched stream may include at least 50, at least 55, at least 60, at least 65, at least 70, at least 75, at least 80, at least 85, at least 90, at least 95, at least 99, or at least 99.5 weight percent of the total amount of PET introduced into the preprocessing facility 20 (or separation zone 22).

The PET-enriched stream 112 may also be depleted in PO and/or heavier plastics such as polytetrafluoroethylene (PTFE), polyamide (PA 12, PA 46, PA 66), polyacrylamide (PARA), polyhydroxybutyrate (PHB), polycarbonate polybutylene terephthalate blends (PC/PBT), polyvinyl chloride (PVC), polyimide (PI), polycarbonate (PC), polyethersulfone (PESU), polyether ether ketone (PEEK), polyamide imide (PAI), polyethylenimine (PEI), polysulfone (PSU), polyoxymethylene (POM), polyglycolides (poly(glycolic acid), PGA), polyphenylene sulfide (PPS), thermoplastic styrenic elastomers (TPS), amorphous thermoplastic polyimide (TPI), liquid crystal polymer (LCP), glass fiber-reinforced PET, chlorinated polyvinyl chloride (CPVC), polybutylene terephthalate (PBT), polyphthalamide (PPA), polyvinylidene chloride (PVDC), ethylene tetrafluoroethylene (ETFE), polyvinylidene fluoride (PVDF), fluorinated ethylene propylene (FEP), polymonochlorotrifluoroethylene (PCTFE), and perfluoroalkoxy (PFA), any of which may include carbon, glass, and/or mineral fillers, and which have a density higher than PET and PVC.

In an embodiment or in combination with any embodiment mentioned herein, the PET-enriched stream 112 may comprise not more than 45, not more than 40, not more than 35, not more than 30, not more than 25, not more than 20, not more than 15, not more than 10, not more than 5, not more than 2, not more than 1, not more than 0.5 weight percent PO, based on the total weight of plastic in the PET-enriched stream 112. The PET-enriched stream 112 may comprise not more than 10, not more than 8, not more than 5, not more than 3, not more than 2, or not more than 1 weight percent of the total amount of PO introduced into the preprocessing facility 20 (or separation zone 22). The PET-enriched stream 112 may comprise not more than 45, not more than 40, not more than 35, not more than 30, not more than 25, not more than 20, not more than 15, not more than 10, not more than 5, not more than 2, not more than 1 weight percent of components other than PET, based on the total weight of the PET-enriched stream 112.

Additionally, or in the alternative, the PET-enriched stream 112 can include not more than 2, not more than 1, not more than 0.5, or not more than 0.1 weight percent of adhesives on a dry basis. Typical adhesives include carpet glue, latex, styrene butadiene rubber, and the like. Additionally, the PET-enriched stream 112 can include not more than 4, not more than 3, not more than 2, not more than 1, not more than 0.5, or not more than 0.1 weight percent plastic fillers and solid additives on a dry basis. Exemplary fillers and additives include silicon dioxide, calcium carbonate, talc, silica, glass, glass beads, alumina, and other solid inerts, which do not chemically react with the plastics or other components in the processes described herein.

In an embodiment or in combination with any embodiment mentioned herein, the PET-depleted (or PO-enriched) stream 114 exiting the separation zone 22 or the preprocessing facility 20 may include at least 50, at least 55, at least 60, at least 65, at least 70, at least 75, at least 80, at least 85, at least 90, at least 95, at least 97, at least 99, or at least 99.5 weight percent PO, based on the total weight of plastic in the PET-depleted (or PO-enriched) stream 114. The PET-depleted (or PO-enriched stream) may be depleted in PVC and can include, for example, not more than 5, not more than 2, not more than 1, not more than 0.5, not more than 0.1, not more than 0.05, or not more than 0.01 weight percent of halogens, including chorine in PVC, based on the total weight of plastic in the PET-depleted (or PO-enriched) stream. The PET-depleted or PO-enriched stream may include at least 50, at least 55, at least 60, at least 65, at least 70, at least 75, at least 80, at least 85, at least 90, at least 95, at least 99, or at least 99.9 weight percent of the total amount of PO introduced into the preprocessing facility 20 or separation facility 22.

The PO-enriched stream 114 may also be depleted in PET and/or other plastics, including PVC. In an embodiment or in combination with any embodiment mentioned herein, the PET-depleted (or PO-enriched stream) may comprise not more than 45, not more than 40, not more than 35, not more than 30, not more than 25, not more than 20, not more than 15, not more than 10, not more than 5, not more than 2, not more than 1, not more than 0.5 weight percent PET, based on the total weight of plastic in the PET-depleted or PO-enriched stream. The PO-enriched (or PET-depleted) stream 114 may comprise not more than 10, not more than 8, not more than 5, not more than 3, not more than 2, or not more than 1 weight percent of the total amount of PET introduced into the preprocessing facility.

In an embodiment or in combination with any embodiment mentioned herein, the PET-depleted or PO-enriched stream 114 may also comprise not more than 45, not more than 40, not more than 35, not more than 30, not more than 25, not more than 20, not more than 15, not more than 10, not more than 5, not more than 2, not more than 1 weight percent of components other than PO, based on the total weight of PET-depleted or PO-enriched stream 114. The PET-depleted or PO-enriched stream 114 comprises not more than 4, not more than 2, not more than 1, not more than 0.5, or not more than 0.1 weight percent of adhesives, based on the total weight of the stream.

In an embodiment or in combination with any embodiment mentioned herein, the PET-depleted or PO-enriched stream 114 may have a melt viscosity of at least 1, at least 5, at least 50, at least 100, at least 200, at least 300, at least 400, at least 500, at least 600, at least 700, at least 800, at least 900, at least 1000, at least 1500, at least 2000, at least 2500, at least 3000, at least 3500, at least 4000, at least 4500, at least 5000, at least 5500, at least 6000, at least 6500, at least 7000, at least 7500, at least 8000, at least 8500, at least 9000, at least 9500, or at least 10,000 poise, measured using a Brookfield R/S rheometer with V80-40 vane spindle operating at a shear rate of 10 rad/s and a temperature of 350° C.

Alternatively, or in addition, the PET-depleted or PO-enriched stream may have a melt viscosity of not more than 25,000, not more than 24,000, not more than 23,000, not more than 22,000, not more than 21,000, not more than 20,000, not more than 19,000, not more than 18,000, or not more than 17,000 poise, (measured at 10 rad/s and 350° C.). Or the stream may have a melt viscosity in the range of from 1 to 25,000 poise, 500 to 22,000 poise, or 1000 to 17,000 poise (measured at 10 rad/s and 350° C.).

Any suitable type of separation device, system, or facility may be employed to separate the waste plastic into two or more streams enriched in certain types of plastics such as, for example, the PET-enriched stream 112 and the PO-enriched stream 114. Examples of suitable types of separation include mechanical separation and density separation, which may include sink-float separation and/or centrifugal density separation. As used herein, the term "sink-float separation" refers to a density separation process where the separation of materials is primarily caused by floating or sinking in a selected liquid medium, while the term "centrifugal density separation" refers to a density separation process where the separation of materials is primarily caused by centrifugal forces. In general, the term "density separation process" refers to a process for separating materials based, at least in part, upon the respective densities of the materials into at least a higher-density output and a lower-density output and includes both sink-float separation and centrifugal density separation.

When sink-float separation is used, the liquid medium can comprise water. Salts, saccharides, and/or other additives can be added to the liquid medium, for example to increase the density of the liquid medium and adjust the target separation density of the sink-float separation stage. The liquid medium can comprise a concentrated salt solution. In one or more such embodiments, the salt is sodium chloride. In one or more other embodiments, however, the salt is a non-halogenated salt, such as acetates, carbonates, citrates, nitrates, nitrites, phosphates, and/or sulfates. The liquid medium can comprise a concentrated salt solution comprising sodium bromide, sodium dihydrogen phosphate, sodium hydroxide, sodium iodide, sodium nitrate, sodium thiosulfate, potassium acetate, potassium bromide, potassium carbonate, potassium hydroxide, potassium iodide, calcium chloride, cesium chloride, iron chloride, strontium chloride, zinc chloride, manganese sulfate, magnesium sulfate, zinc sulfate, and/or silver nitrate. In an embodiment or in combination with any embodiment mentioned herein, the salt is a caustic component. The salt may comprise sodium hydroxide, potassium hydroxide, and/or potassium carbonate. The concentrated salt solution may have a pH of greater than 7, greater than 8, greater than 9, or greater than 10.

In an embodiment or in combination with any embodiment mentioned herein, the liquid medium can comprise a saccharide, such as sucrose. The liquid medium can comprise carbon tetrachloride, chloroform, dichlorobenzene, dimethyl sulfate, and/or trichloro ethylene. The particular components and concentrations of the liquid medium may be selected depending on the desired target separation density of the separation stage. The centrifugal density separation process may also utilize a liquid medium as described above to improve separation efficiency at the target separation density.

In an embodiment or in combination with any embodiment mentioned herein, the waste plastic separation methods comprise at least two density separation stages. In certain such embodiments, the methods generally comprise introducing waste plastic particulates into the first density separation stage and feeding an output from the first density separation stage into the second density separation stage. The density separation stages can be any system or unit operation that performs a density separation process, as defined herein. At least one of the density separation stages comprises a centrifugal force separation stage or a sink-float separation stage. Each of the first and second density separation stages comprises a centrifugal force separation stage and/or a sink-float separation stage.

To produce a PET-enriched material stream, one of the density separation stages may comprise a low-density separation stage and the other generally comprises a high-density separation stage. As defined herein, the low-density separation stage has a target separation density less than the target separation density of the high-density separation stage. The low-density separation stage has a target separation density less than the density of PET, and the high-density separation stage has a target separation density greater than the density of PET.

As used herein, the term "target separation density" refers to a density above which materials subjected to a density separation process are preferentially separated into the higher-density output and below which materials are separated in the lower-density output. The target separation density specifies a density value, wherein it is intended that all plastics and other solid materials having a density higher than the value are separated into the higher-density output and all plastics and other solid materials having a density lower than the value are separated into the lower-density output. However, the actual separation efficiency of the materials in a density separation process may depend on various factors, including residence time and relative closeness of the density of a particular material to the target density separation value, as well as factors related to the form of the particulate such as, for example, area-to-mass ratio, degree of sphericity, and porosity.

In an embodiment or in combination with any embodiment mentioned herein, the low-density separation stage has a target separation density that is less than 1.35, less than 1.34, less than 1.33, less than 1.32, less than 1.31, or less than 1.30 g/cc and/or at least 1.25, at least 1.26, at least 1.27, at least 1.28, or at least 1.29 g/cc. The high-density separation stage has a target separation density that is at least 0.01, at least 0.025, at least 0.05, at least 0.075, at least 0.1, at least 0.15, or at least 0.2 g/cc greater than the target separation density of the low-density separation stage. The target separation density of the high-density separation stage is at least 1.31, at least 1.32, at least 1.33, at least 1.34, at least 1.35, at least 1.36, at least 1.37, at least 1.38, at least 1.39, or at least 1.40 g/cc and/or not more than 1.45, not more than 1.44, not more than 1.43, not more than 1.42, or not more than 1.41 g/cc. The target separation density of the low-density separation stage is in the range of 1.25 to 1.35 g/cc and the target separation density of said high-density separation stage is in the range of 1.35 to 1.45 g/cc.

Referring again to FIG. 1, both the PET-enriched stream 112 and the PO-enriched stream 114 may be introduced into one or more downstream processing facilities (or undergo one or more downstream processing steps) within the chemical recycling facility 10. In an embodiment or in combination with any embodiment mentioned herein, at least a portion of the PET-enriched stream 112 may be introduced into a solvolysis facility 30, while at least a portion of the PO-enriched stream 114 may be directly or indirectly introduced into one or more of a pyrolysis facility 60, a cracking facility 70, a partial oxidation (POX) gasification facility 50, an energy recovery facility 80, or other facility 90, such as a solidification or separation facility. Additional details of each step and type of facility, as well as the general integration of each of these steps or facilities with one or more of the others according to one or more embodiments of the present technology are discussed in further detail below.

Solvolysis

In an embodiment or in combination with any embodiment mentioned herein, at least a portion of a PET-enriched stream 112 from the preprocessing facility 20 may be introduced into a solvolysis facility 30. As used herein, the term "solvolysis" or "ester solvolysis" refers to a reaction by which an ester-containing feed is chemically decomposed in the presence of a solvent to form a principal carboxyl product and a principal glycol product. A "solvolysis facility" is a facility that includes all equipment, lines, and controls necessary to carry out solvolysis of waste plastic and feedstocks derived therefrom.

When the ester being subjected to solvolysis comprises PET, the solvolysis performed in the solvolysis facility may be PET solvolysis. As used herein, the term "PET solvolysis" refers to a reaction by which a polyester terephthalate-containing feed is chemically decomposed in the presence of a solvent to form a principal terephthalyl product and a principal glycol product. As used herein, the term "principal terephthalyl" refers to the main or key terephthalyl product being recovered from the solvolysis facility. As used herein, the term "principal glycol" refers to the main glycol product being recovered from the solvolysis facility. As used herein, the term "glycol" refers to a component comprising two or more —OH functional groups per molecule. As used herein, the term "terephthalyl" refers to a molecule including the following group:

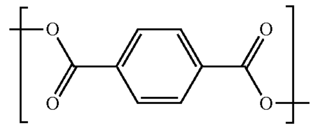

Figure 3:
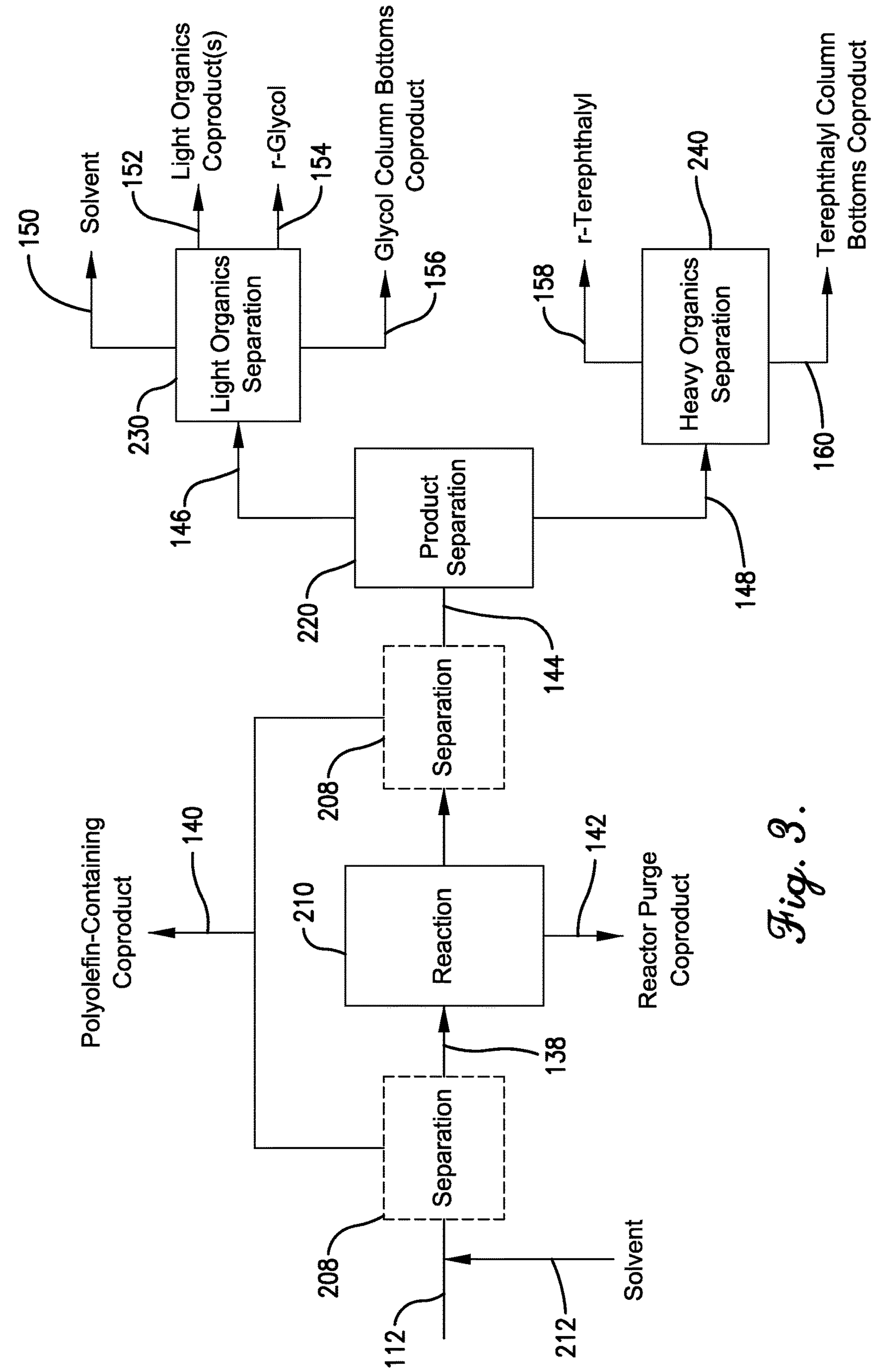
FIG. 3 depicts an exemplary solvolysis facility.

In an embodiment or in combination with any embodiment mentioned herein, the principal terephthalyl product comprises a terephthalyl, such as terephthalic acid or dimethyl terephthalate (or oligomers thereof), while the principal glycol comprises a glycol, such as ethylene glycol and/or diethylene glycol. The main steps of a PET solvolysis facility 30 according to one or more embodiments of the present technology are generally shown in FIG. 3.

In an embodiment or in combination with any embodiment mentioned herein, the principal solvent used in solvolysis comprises a chemical compound having at least one —OH group. Examples of suitable solvents can include, but are not limited to, (i) water (in which case the solvolysis may be referred to as "hydrolysis"), (ii) alcohols (in which case the solvolysis may be referred to as "alcoholysis"), such as methanol (in which case the solvolysis may be referred to as "methanolysis") or ethanol (in which case the solvolysis may be referred to as "ethanolysis"), (iii) glycols such as ethylene glycol or diethylene glycol (in which case the solvolysis may be referred to as "glycolysis"), or (iv) ammonia (in which case the solvolysis may be referred to as "ammonolysis").

In an embodiment or in combination with any embodiment mentioned herein, the solvolysis solvent can include at least 50, at least 55, at least 60, at least 65, at least 70, at least 75, at least 80, at least 85, at least 90, at least 95, at least or at least 99 weight percent of the principal solvent, based on the total weight of the solvent stream. In an embodiment or in combination with any embodiment mentioned herein, the solvent may comprise not more than 45, not more than 40, not more than 35, not more than 30, not more than 25, not more than 20, not more than 15, not more than 10, not more than 5, not more than 2, or not more than 1 weight percent of other solvents or components, based on the total weight of the solvent stream.

When the solvolysis facility 30 utilizes a glycol, such as ethylene glycol, as the principal solvent, the facility may be referred to as a glycolysis facility. In an embodiment or in combination with any embodiment mentioned herein, the chemical recycling facility of FIG. 1 may comprise a glycolysis facility. In a glycolysis facility, PET can be chemically decomposed to form ethylene glycol (EG) as the principal glycol and dimethyl terephthalate (DMT) as the principal terephthalyl. When the PET comprises waste plastic, both the EG and DMT formed in the solvolysis facility may comprise recycle content ethylene glycol (r-EG) and recycle content dimethyl terephthalate (r-DMT). When formed by glycolysis, the EG and DMT can be present in a single product stream.

When a solvolysis facility utilizes methanol as the principal solvent, the facility may be referred to as a methanolysis facility. The chemical recycling facility of FIG. 1 may include a methanolysis facility. In a methanolysis facility, an example of which is schematically depicted in FIG. 3, PET can be chemically decomposed to form ethylene glycol (EG) as the principal glycol and dimethyl terephthalate (DMT) as the principal terephthalyl. When the PET comprises waste plastic, both the EG and DMT formed in the solvolysis facility may comprise recycle content ethylene glycol (r-EG) and recycle content dimethyl terephthalate (r-DMT).

In an embodiment or in combination with any embodiment mentioned herein, the stream of recycle content glycol 154 (r-glycol) withdrawn from the solvolysis facility 30 may comprise at least 45, at least 50, at least 55, at least 60, at least 65, at least 70, at least 75, at least 80, at least 85, at least 90, or at least 95 weight percent of the principal glycol formed in the solvolysis facility. It may also include not more than 99.9, not more than 99, not more than 95, not more than 90, not more than 85, not more than 80, or not more than 75 weight percent of the principal glycol (such as EG), and/or may include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, or not more than 15 weight percent of components other than the principal glycol, based on the total weight of the stream, or these may be present in amounts in the range of from 0.5 to 45 weight percent, 1 to 40 weight percent, or 2 to 15 weight percent, based on the total weight of the stream. The r-glycol may be present in the stream 154 in an amount in the range of from 45 to 99.9 weight percent, 55 to 99.9 weight percent, or 80 to 99.9 weight percent, based on the total weight of the stream 154.

In an embodiment or in combination with any embodiment mentioned herein, the stream of recycle content principal terephthalyl (r-terephthalyl) 158 withdrawn from the solvolysis facility may comprise at least 45, at least 50, at least 55, at least 60, at least 65, at least 70, at least 75, at least 80, at least 85, at least 90, or at least 95 weight percent of the principal terephthalyl (such as DMT) formed in the solvolysis facility 30. It may also include not more than 99, not more than 95, not more than 90, not more than 85, not more than 80, or not more than 75 weight percent of the principal terephthalyl, or the principal terephthalyl may be present in an amount of 45 to 99 weight percent, 50 to 90 weight percent, or 55 to 90 weight percent, based on the total weight of the stream. Additionally, or in the alternative, the stream can include at least 0.5, at least 1, at least 2, at least 5, at least 7, at least 10, at least 12, at least 15, at least 20, or at least 25 weight percent and/or not more than 45, not more than 40, not more than 35, not more than 30, not more than 25, not more than 20, or not more than 15 weight percent of components other than the principal terephthalyl, based on the total weight of the stream. The r-terephthalyl (or terephthalyl) may be present in the stream 154 in an amount in the range of from 45 to 99.9 weight percent, 55 to 99.9 weight percent, or 80 to 99.9 weight percent, based on the total weight of the stream 154.

In addition to providing a recycle content principal glycol stream, a recycle content principal terephthalyl stream, the solvolysis facility may also provide one or more solvolysis coproduct streams, shown as stream 110 in FIG. 1, which may also be withdrawn from one or more locations within the solvolysis facility. As used herein, the term "coproduct" or "solvolysis coproduct" refers to any compound from a solvolysis facility that is not the principal carboxyl (terephthalyl) product of the solvolysis facility, the principal glycol product of the solvolysis facility, or the principal solvent fed to the solvolysis facility. Solvolysis coproduct streams can comprise at least 40, at least 45, at least 50, at least 55, at least 60, at least 65, at least 70, at least 75, at least 80, at least 85, at least 90, at least 95, or at least 99 weight percent of one or more solvolysis coproducts, based on the total weight of the stream.

Solvolysis coproducts can comprise a heavy organic solvolysis coproduct stream or a light organic solvolysis coproduct stream. As used herein, the term "heavy organic solvolysis coproduct" refers to a solvolysis coproduct with a boiling point higher than the boiling point of the principal terephthalyl product of the solvolysis facility, while the term "light organics solvolysis coproduct" refers to a solvolysis coproduct with a boiling point lower than the boiling point of the principal terephthalyl product of the solvolysis facility.

When the solvolysis facility is a methanolysis facility, one or more methanolysis coproducts may be withdrawn from the facility. As used herein, the term "methanolysis coproduct" refers to any compound from a methanolysis facility that is not DMT, EG, or methanol. Methanolysis coproduct streams can comprise at least 40, at least 45, at least 50, at least 55, at least 60, at least 65, at least 70, at least 75, at least 80, at least 85, at least 90, at least 95, or at least 99 weight percent of one or more solvolysis coproducts, based on the total weight of the stream. In an embodiment or in combination with any embodiment mentioned herein, methanolysis coproduct streams can comprise a heavy organic methanolysis coproduct or light organic methanolysis coproduct. As used herein, the term "heavy organic methanolysis coproduct" refers to a methanolysis coproduct with a boiling point greater than DMT, while the term "light methanolysis coproduct" refers to a methanolysis coproduct with a boiling point less than DMT.

In an embodiment or in combination with any embodiment mentioned herein, the solvolysis facility may produce at least one heavy organic solvolysis coproduct stream. The heavy organic solvolysis coproduct stream may include at least 40, at least 45, at least 50, at least 55, at least 60, at least 65, at least 70, at least 75, at least 80, at least 85, at least 90, or at least 95 weight percent of organic compounds having a boiling point higher than the boiling point of the principal terephthalyl (such as DMT) produced from the solvolysis facility 30, based on the total weight of organics in the stream.

Additionally, or in the alternative, the solvolysis facility may produce at least one light organics solvolysis coproduct stream. The light organics solvolysis coproduct stream may include at least 40, at least 45, at least 50, at least 55, at least 60, at least 65, at least 70, at least 75, at least 80, at least 85, at least 90, or at least 95 weight percent of organic compounds having a boiling point lower than the boiling point of the principal terephthalyl (such as DMT) produced from the solvolysis facility 30, based on the total weight of organics in the stream.

Turning again to FIG. 3, in operation, streams of mixed plastic waste and solvent introduced (separately or together) into the solvolysis facility may first be passed through an optional non-PET separation zone 208, wherein at least 50, at least 55, at least 60, at least 65, at least 70, at least 75, at least 80, at least 85, at least 90, or at least 95 weight percent of the total weight of components other than PET are separated out. The non-PET components may have a boiling point lower than PET and may be removed from the zone 208 as a vapor. Alternatively, or in addition, at least a portion of the non-PET components may have a slightly higher or lower density than PET and may be separated out by forming a two-phase liquid stream, then removing one or both non-PET phases. Finally, in some embodiments, the non-PET components may be separated out as solids from a PET-containing liquid phase.

In an embodiment or in combination with any embodiment mentioned herein, at least 50, at least 55, at least 60, at least 65, at least 70, at least 75, at least 80, at least 85, at least 90, or at least 95 percent of the non-PET components separated from the PET-containing stream comprise polyolefins such as polyethylene and/or polypropylene. As indicated generally by the dashed lines in FIG. 3, all or a part of the non-PET separation zone 208 may be upstream of the reaction zone 210, while all or a part of the non-PET separation zone 208 may be downstream of the reaction zone 210. Separation techniques such as extraction, solid/liquid separation, decanting, cyclone or centrifugal separation, manual removal, magnetic removal, eddy current removal, chemical degradation, vaporization and degassing, distillation, and combinations thereof may be used to separate the non-PET components from the PET-containing stream in the non-PET separation zone 208.

As shown in FIG. 3, the PET-containing stream 138 exiting the non-PET separation zone 208 may comprise not more than 25, not more than 20, not more than 15, not more than 10, not more than 5, not more than 2, not more than 1, or not more than 0.5 weight percent of components other than the PET (or its oligomeric and monomeric degradation products) and solvent, based on the total weight of the PET-containing stream. The PET-containing stream 138 exiting the non-PET separation zone 208 may comprise not more than 25, not more than 20, not more than 15, not more than 10, not more than 5, not more than 2, or not more than 1 weight percent of other types of plastics (such as polyolefins). The PET-containing stream 138 exiting the non-PET separation zone 208 may include not more than 45, not more than 40, not more than 35, not more than 30, not more than 25, not more than 20, not more than 10, not more than 5, or not more than 2 weight percent of the total amount of non-PET components introduced into the non-PET separation zone 208.

The non-PET components may be removed from the solvolysis (or methanolysis) facility 30 as generally shown in FIG. 3 as a polyolefin-containing coproduct stream 140. The polyolefin-containing coproduct stream (or decanter olefin coproduct stream) 140 may comprise at least 35, at least 40, at least 45, at least 50, at least 55, at least 60, at least 65, at least 70, at least 75, at least 80, at least 85, at least 90, at least 92, at least 95, at least 97, at least 99, or at least 99.5 weight percent of polyolefin, based on the total weight of the coproduct stream 140.

The polyolefin present in the polyolefin-containing coproduct stream may comprise predominantly polyethylene, predominantly polypropylene, or a combination of polyethylene and polypropylene. The polyolefin in the polyolefin-containing coproduct stream comprises at least 70, at least 75, at least 80, at least 85, at least 90, at least 92, at least 94, at least 95, at least 97, at least 98, or at least 99 weight percent of polyethylene, based on the total weight of the polyolefin in the polyolefin-containing coproduct stream 140. Alternatively, the polyolefin in the polyolefin-containing coproduct stream comprises at least 70, at least 75, at least 80, at least 85, at least 90, at least 92, at least 94, at least 95, at least 97, at least 98, or at least 99 weight percent of polypropylene, based on the total weight of the polyolefin in the polyolefin-containing coproduct stream 140.

The polyolefin-containing coproduct stream comprises not more than 10, not more than 5, not more than 2, not more than 1, not more than 0.75, not more than 0.50, not more than 0.25, not more than 0.10, or not more than 0.05 weight percent of PET, based on the total weight of the polyolefin-containing coproduct stream 140. Additionally, the polyolefin-containing coproduct stream comprises at least 0.01, at least 0.05, at least 0.10, at least 0.50, at least 1, or at least 1.5 and/or not more than 40, not more than 35, not more than 30, not more than 25, not more than 20, not more than 15, not more than 10, not more than 5, or not more than 2 weight percent of components other than polyolefin, based on the total weight of the polyolefin-containing coproduct stream 140.

Overall, the polyolefin-containing coproduct stream 140 comprises at least 40, at least 45, at least 50, at least 55, at least 60, at least 65, at least 70, at least 75, at least 80, at least 85, at least 90, at least 95, or at least 99 weight percent of organic compounds, based on the total weight of the polyolefin-containing coproduct stream 140. The polyolefin-containing coproduct stream 140 can include at least 0.5, at least 1, at least 2, at least 3, at least 5, at least 10, or at least 15 and/or not more than 40, not more than 35, not more than 30, not more than 25, not more than 20, not more than 15, not more than 10, not more than 5, not more than 2, or not more than 1 weight percent of inorganic components, based on the total weight of the polyolefin-containing coproduct stream 140.

The polyolefin-containing coproduct stream can comprise at least 0.1, at least 0.5, at least 1, at least 1.5, at least 2, at least 2.5, at least 3, at least 3.5, at least 4, at least 4.5, at least 5, at least 8, at least 10, at least 12, at least 15, at least 18, at least 20, at least 22, or at least 25 weight percent and/or not more than 50, not more than 45, not more than 40, not more than 35, not more than 30, not more than 25, not more than 20, not more than 15, not more than 10, not more than 5, or not more than 2 weight percent of one or more non-reactive solids, based on the total weight of the polyolefin-containing coproduct stream 140. Non-reactive solids refer to solid components that do not chemically react with PET. Examples of non-reactive solids include, but are not limited to, sand, dirt, glass, plastic fillers, and combinations thereof.

The polyolefin-containing coproduct stream 140 comprises at least 100, at least 250, at least 500, at least 750, at least 1000, at least 1500, at least 2000, at least 2500, at least 5000, at least 7500 ppm by weight or at least 1, at least 1.5, at least 2, at least 5, at least 10, at least 15, at least 20, or at least 25 weight percent) and/or not more than 50, not more than 45, not more than 40, not more than 35, not more than 30, not more than 25, not more than 20, not more than 15, not more than 10, not more than 5, not more than 2, or not more than 1 weight percent of one or more fillers, based on the total weight of the polyolefin-coproduct stream 140. The polyolefin-containing coproduct stream 140 can include fillers in an amount of 100 ppm to 50 weight percent, 500 ppm to 10 weight percent, or 1000 ppm to 5 weight percent.

Examples of fillers can include, but are not limited to, thixotropic agents such as fumes silica and clay (kaolin), pigments, colorants, fire retardants such as alumina trihydrate, bromine, chlorine, borate, and phosphorous, suppressants such as wax based materials, UV inhibitors or stabilizers, conductive additives such as metal particles, carbon particles, or conductive fibers, release agents such as zinc stearate, waxes, and silicones, calcium carbonate, and calcium sulfate.

In an embodiment or in combination with any embodiment mentioned herein, the polyolefin-containing coproduct stream 140 can have a density of at least 0.75, at least 0.80, at least 0.85, at least 0.90, at least 0.95, at least 0.99 and/or not more than 1.5, not more than 1.4, not more than 1.3, not more than 1.2, not more than 1.1, not more than 1.05, or not more than 1.01 g/cm$^3$, measured at a temperature of 25° C. The density can be from 0.80 to 1.4, from 0.90 to 1.2, or 0.95 to 1.1 g/cm$^3$. When removed from the non-PET separation zone 208, the polyolefin-containing coproduct stream 140 may have a temperature of at least 200, at least 205, at least 210, at least 215, at least 220, at least 225, at least 230, or at least 235° C. and/or not more than 350, not more than 340, not more than 335, not more than 330, not more than 325, not more than 320, not more than 315, not more than 310, not more than 305, or not more than 300° C. The polyolefin-containing coproduct stream 140 can comprise at least 50, at least 55, at least 60, at least 65, at least 70, at least 75, at least 80, at least 85, at least 90, or at least 95 weight percent of components boiling higher than the principal terephthalyl or DMT, based on the total weight of the stream.

As discussed in further detail herein, all or a portion of the polyolefin-containing coproduct stream may be introduced into one or more downstream chemical recycling facilities alone or in combination with one or more other coproduct streams, streams resulting from one or more of the other downstream chemical recycling facilities, and/or streams of waste plastic, including mixed plastic waste that is unprocessed, partially processed, and/or processed.

Turning again to FIG. 3, the PET-containing stream 138 (which comprises dissolved PET as well as its degradation products) exiting the non-PET separation zone 208 (upstream of the reaction zone 210) may then be transferred to a reaction zone 210, wherein at least 50, at least 55, at least 60, at least 65, at least 70, at least 75, at least 80, at least 85, at least 90, or at least 95 percent of the decomposition of the PET introduced into the reaction zone occurs. In some embodiments, the reaction medium within reaction zone 210 may be agitated or stirred and one or more temperature control devices (such as heat exchangers) may be employed to maintain a target reaction temperature. In an embodiment or in combination with any embodiment mentioned herein, the target reaction temperature in the reaction zone 210 can be at least 50, at least 55, at least 60, at least 65, at least 70, at least 75, at least 80, or at least 85° C. and/or not more than 350, not more than 345, not more than 340, not more than 335, not more than 330, not more than 325, not more than 320, not more than 315, not more than 310, not more than 300, or not more than 295° C.

In an embodiment or in combination with any embodiment mentioned herein, the solvolysis process can be a low-pressure solvolysis process and the pressure in the solvolysis reactor (or reaction zone) 210 can be within 5, within 10, within 15, within 20, within 25, within 30, within 35, within 40, within 45, or within 50 psi of atmospheric, or it may be within 55, within 75, within 90, within 100, within 125, within 150, within 200, or within 250 psi of atmospheric. The pressure in the solvolysis reactor (or reaction zone) 210 can be within 0.35, within 0.70, within 1, within 1.4, within 1.75, within 2, within 2.5, within 2.75, within 3, within 3.5, within 3.75, within 5, or within 6.25 bar gauge (bar) and/or not more than 6.9, not more than 8.6, or not more than 10.35 bar of atmospheric. The pressure in the solvolysis reactor (or reaction zone) 210 can be at least 100 psig (6.7 barg), at least 150 psig (10.3 barg), at least 200 psig (13.8 barg), at least 250 psig (17.2 barg), at least 300 psig (20.7 barg), at least 350 psig (24.1 barg), at least 400 psig (27.5 barg) and/or not more than 725 psig (50 barg), not more than 650 psig (44.7 barg), not more than 600 psig (41.3 barg), not more than 550 psig (37.8 barg), not more than 500 psig (34.5 barg), not more than 450 psig (31 barg), not more than 400 psig (27.6 barg), or not more than 350 psig (24.1 barg).

In an embodiment or in combination with any embodiment mentioned herein, the solvolysis process carried out in reaction zone 210 or facility 30 can be a high-pressure solvolysis process and the pressure in the solvolysis reactor can be at least 50 barg (725 psig), at least 70 barg (1015 psig), at least 75 barg (1088 psig), at least 80 barg (1161 psig), at least 85 barg (1233 psig), at least 90 barg (1307 psig), at least 95 barg (1378 psig), at least 100 barg (1451 psig), at least 110 barg (1596 psig), at least 120 barg (1741 psig), or at least 125 barg (1814 psig) and/or not more than 150 barg (2177 barg), not more than 145 barg (2104 psig), not more than 140 barg (2032 psig), not more than 135 barg (1959 psig), not more than 130 barg (1886 psig), or not more than 125 barg (1814 psig).

In an embodiment or in combination with any embodiment mentioned herein, the average residence time of the reaction medium in the reaction zone 210 can be at least 1, at least 2, at least 5, at least 10, or at least 15 minutes and/or not more than 12, not more than 11, not more than 10, not more than 9, not more than 8, not more than 7, not more than 6, not more than 5, or not more than 4 hours. At least 50, at least 55, at least 60, at least 65, at least 70, at least 75, at least 80, at least 85, at least 90, at least 95, or at least 99 percent of the total weight of PET introduced into the solvolysis or methanolysis facility 30 can be decomposed upon leaving the reaction zone 210 in the reactor effluent stream 144.

In an embodiment or in combination with any embodiment mentioned herein, a reactor purge stream 142 may be removed from the reaction zone 210 and at least a portion may be passed to one or more downstream facilities within the chemical recycling facility 10 as a reactor purge coproduct stream 142. The reactor purge coproduct stream 142 may have a boiling point higher than the boiling point of the principal terephthalyl (or DMT in the case or methanolysis) produced from the solvolysis facility 30.

In an embodiment or in combination with any embodiment mentioned herein, the reactor purge coproduct stream 142 comprises at least 25, at least 30, at least 35, at least 40, at least 45, at least 50, at least 55, at least 60, at least 65, at least 70, at least 75, at least 80, at least 85, at least 90, at least 95, or at least 99 weight percent of the principal terephthalyl, based on the total weight of the stream 142. When the solvolysis facility is a methanolysis facility, the reactor purge coproduct stream 142 may comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of DMT, based on the total weight of the stream 142.

In addition, the reactor purge coproduct stream 142 may include at least 100 ppm and not more than 25 weight percent of one or more non-terephthalyl solids, based on the total weight of the stream 142. In an embodiment or in combination with any embodiment mentioned herein, the total amount of non-terephthalyl solids in the reactor purge coproduct stream 142 can be at least 150, at least 200, at least 250, at least 300, at least 350, at least 400, at least 500, at least 600, at least 700, at least 800, at least 900, at least 1000, at least 1500, at least 2000, at least 2500, at least 3000, at least 3500, at least 4000, at least 4500, at least 5000, at least 5500, at least 6000, at least 7000, at least 8000, at least 9000, at least 10,000, or at least 12,500 ppm and/or not more than 25, not more than 22, not more than 20, not more than 18, not more than 15, not more than 12, not more than 10, not more than 8, not more than 5, not more than 3, not more than 2, or not more than 1 weight percent, based on the total weight of the stream.

In an embodiment or in combination with any embodiment mentioned herein, the reactor purge coproduct stream 142 has a total solids content of at least 100, at least 250, at least 500, at least 750, at least 1000, at least 1500, at least 2000, at least 2500, at least 3000, at least 3500, at least 4000, at least 4500, at least 5000, at least 5500, at least 6000, at least 6500, at least 7000, at least 7500, at least 8000, at least 8500, at least 9000, at least 9500 ppm by weight or at least 1, at least 2, at least 5, at least 8, at least 10, or at least 12 weight percent and/or not more than 25, not more than 22, not more than 20, not more than 17, not more than 15, not more than 12, not more than 10, not more than 8, not more than 6, not more than 5, not more than 3, not more than 2, or not more than 1 weight percent or not more than 7500, not more than 5000, or not more than 2500 ppm by weight, based on the total weight of the stream.

Examples of solids can include, but are not limited to, non-volatile catalyst compounds. In an embodiment or in combination with any embodiment mentioned herein, the reactor purge coproduct stream can include at least 100, at least 250, at least 500, at least 750, at least 1000, at least 1500, at least 2000, at least 2500, at least 3000, at least 3500, at least 4000, at least 4500, at least 5000, at least 7500, at least 10,000, or at least 12,500 ppm and/or not more than 60,000, not more than 50,000, not more than 40,000, not more than 35,000, not more than 30,000, not more than 25,000, not more than 20,000, not more than 15,000, or not more than 10,000 ppm of non-volatile catalyst metals.

Examples of suitable non-volatile catalyst metals can include, but are not limited to, titanium, zinc, manganese, lithium, magnesium, sodium, methoxide, alkali metals, alkaline earth metals, tin, residual esterification or ester exchange catalysts, residual polycondensation catalysts, aluminum, depolymerization catalysts, and combinations thereof. As discussed in further detail herein, all or a portion of the reactor purge coproduct stream 142 may be introduced into one or more downstream chemical recycling facilities alone or in combination with one or more other coproduct streams, streams resulting from one or more of the other downstream chemical recycling facilities, and/or streams of waste plastic, including mixed plastic waste that is unprocessed, partially processed, and/or processed.

In an embodiment or in combination with any embodiment mentioned herein, as generally shown in FIG. 3, the effluent stream 144 from the reaction zone 210 in a solvolysis facility 30 may optionally be sent through a non-PET separation zone 208 located downstream of the reactor, as discussed previously. The resulting effluent stream 144 from the reactor or, when present, the non-PET separation zone 208, may be passed through a product separation zone 220, wherein at least 50, at least 55, at least 60, at least 65, at least 70, at least 75, at least 80, at least 85, at least 90, at least 95, or at least 99 weight percent of the heavy organic materials are separated from the feed stream 144 to form streams of predominantly light organic materials 146 and heavy organic materials 148. Any suitable method of separating such streams can be used and may include, for example, distillation, extraction, decanting, crystallization, membrane separation, solid/liquid separation such as, for example, filtration (e.g., a belt filter), and combinations thereof.

As shown in FIG. 3, the heavy organic stream 148 withdrawn from the product separation zone 220, which may include for example at least 55, at least 60, at least 65, at least 70, at least 75, at least 80, at least 85, at least 90, at least 95, or at least 99 weight percent of heavy organic components, based on the total weight of the stream, may be introduced into a heavy organics separation zone 240. In the heavy organics separation zone 240, a primary terephthalyl product stream 158 may be separated from a terephthalyl bottoms or "sludge" coproduct stream 160. Such separation may be accomplished by, for example, distillation, extraction, decantation, membrane separation, melt crystallization, zone refining, and combinations thereof. The result is a stream 158 comprising at least 50, at least 55, at least 60, at least 65, at least 70, at least 75, at least 80, at least 85, at least 90, at least 95, or at least 99 weight percent of the principal terephthalyl (or DMT), based on the total weight of the stream. In an embodiment or in combination with any embodiment mentioned herein, at least a portion or all of the primary terephthalyl can comprise recycle content terephthalyl (r-terephthalyl), such as recycle content DMT (r-DMT).

Also withdrawn from the heavy organics separation zone 240 is a terephthalyl bottoms coproduct stream (also called "terephthalyl column bottoms coproduct stream" or "terephthalyl sludge coproduct stream" or "terephthalyl dregs coproduct stream") coproduct stream 160 may also be removed from the heavy organics separation zone 240. When the solvolysis facility is a methanolysis facility, the stream can be referred to as a DMT bottoms coproduct stream, a DMT column bottoms coproduct stream, a DMT sludge coproduct stream, or a DMT dregs stream.

In an embodiment or in combination with any embodiment mentioned herein, this coproduct stream can include, for example, at least 60, at least 65, at least 70, at least 75, at least 80, at least 85, at least 90, at least 92, at least 95, at least 97, at least 98, at least 99, or at least 99.5 weight percent of oligomers comprising moieties of the polyester undergoing solvolysis, based on the total weight of the composition such as, for example, PET oligomers. As used herein, the terms "polyester moieties" or "moieties of polyester," refer to portions or residues of a polyester, or reaction products of the polyester portions or residues. These oligomers can have a number average chain length of at least 2, at least 3, at least 4, at least 5, at least 6, at least 7, or at least 8 monomer units (acid+glycol) and/or not more than 30, not more than 27, not more than 25, not more than 22, not more than 20, not more than 17, not more than 15, not more than 12, or not more than 10 monomer units (acid+glycol) and may include moieties of the polyester being processed (e.g., PET).

In an embodiment or in combination with any embodiment mentioned herein, the terephthalyl column bottoms (or the DMT column bottoms) coproduct stream 160 may comprise oligomers and at least one substituted terephthalyl component. As used herein, the term "substituted terephthalyl" refers to a terephthalyl component having at least one substituted atom or group. The terephthalyl column bottoms coproduct stream 160 can include at least 1, at least 100, at least 500 parts per billion by weight, or at least 1, at least 50, at least 1000, at least 2500, at least 5000, at least 7500, or at least 10,000 parts per million by weight, or at least 1, at least 2, or at least 5 weight percent and/or not more than 25, not more than 20, not more than 15, not more than 10, not more than 5, not more than 2, not more than 1, not more than 0.5, not more than 0.1, not more than 0.05, or not more than 0.01 weight percent of substituted terephthalyl components, based on the total weight of the terephthalyl column bottoms coproduct stream 160.

As discussed in further detail herein, all or a portion of the terephthalyl column bottoms coproduct stream 160 may be introduced into one or more downstream chemical recycling facilities alone or in combination with one or more other coproduct streams, streams resulting from one or more of the other downstream chemical recycling facilities, and/or streams of waste plastic, including mixed plastic waste that is unprocessed, partially processed, and/or processed.

Referring again to FIG. 3, the predominantly light organics stream 146 from the product separation zone 220 may be introduced into a light organics separation zone 230. In the light organics separation zone 230, the stream 146 may be separated to remove the principal solvent (e.g., methanol in methanolysis) and to separate out the principal glycol (e.g., ethylene glycol in methanolysis) from an organic coproduct (or coproducts) lighter than and heavier than the principal glycol.

In an embodiment or in combination with any embodiment mentioned herein, a solvent stream 150 withdrawn from the light organics separation zone 230 can include at least 50, at least 55, at least 60, at least 65, at least 70, at least 75, at least 80, at least 85, at least 90, at least 95, or at least 99 weight percent of the principal solvent, based on the total weight of the stream 150. When the solvolysis facility 30 is a methanolysis facility, this stream 150 may comprise at least 50, at least 55, at least 60, at least 65, at least 70, at least 75, at least 80, at least 85, at least 90, at least 95, or at least 99 weight percent of methanol, based on the total weight of the stream. All or a portion of the stream may be recycled back to one or more locations within the solvolysis facility for further use.

In an embodiment or in combination with any embodiment mentioned herein, at least one light organics solvolysis coproduct stream 152 (also referred to as a "light organics" stream) can also be withdrawn from the light organics separation zone 230 and may include at least 40, at least 45, at least 50, at least 55, at least 60, at least 65, at least 70, at least 75, at least 80, at least 85, at least 90, or at least 95 weight percent of components with a boiling point lower than the boiling point of the principal terephthalyl (or DMT) that are not the principal glycol (or ethylene glycol) or the principal solvent (or methanol). Additionally, or in the alternative, the coproduct stream can comprise not more than 60, not more than 55, not more than 50, not more than 45, not more than 40, not more than 35, not more than 30, not more than 25, not more than 20, not more than 15, not more than 10, not more than 5, not more than 3, not more than 2, not more than 1 weight percent of components with a boiling point higher than the boiling point of DMT and the stream 152 itself can have a boiling point lower than the boiling point of the principal terephthalyl (or DMT).

In an embodiment or in combination with any embodiment mentioned herein, a light organics solvolysis coproduct stream 152 may be produced in the solvolysis facility that comprises the principal solvent (e.g., methanol). For example, the light organics coproduct stream 152 can include at least 2, at least 5, at least 10, at least 15, at least 20, at least 25, at least 30, at least 35, at least 40, at least 45, at least 50, or at least 55 weight percent and/or not more than 90, not more than 85, not more than 80, not more than 75, not more than 70, not more than 65, not more than 60, not more than 55, not more than 50, not more than 45, not more than 40, not more than 35, or not more than 30 weight percent of the principal solvent.

In addition, this coproduct stream 152 may also include acetaldehyde in an amount of at least 1, at least 5, at least 10, at least 50, at least 100, at least 250, at least 500, at least 750, or at least 1000 ppm and/or not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 3, not more than 2, not more than 1, not more than 0.5, not more than 0.1, or not more than 0.05 weight percent, based on the total weight of the coproduct stream, or the acetaldehyde can be present in an amount of 1 ppm to 50 weight percent, 50 ppm to 0.5 weight percent, or 100 ppm to 0.05 weight percent, based on the total weight of the coproduct stream.

Further, the light organics coproduct stream 152 may also include para-dioxane (or p-dioxane) in amount of at least 1, at least 5, at least 10, at least 50, at least 100, at least 250, at least 500, at least 750, or at least 1000 ppm and/or not more than 60, not more than 55, not more than 50, not more than 45, not more than 40, not more than 35, not more than 30, not more than 25, not more than 20, not more than 15, not more than 10, not more than 5, not more than 3, not more than 2, not more than 1, not more than 0.5, not more than 0.1, or not more than 0.05 weight percent, based on the total weight of the coproduct stream, or the p-dioxane can be present in an amount of 1 ppm to 50 weight percent, 50 ppm to 0.5 weight percent, or 100 ppm to 0.05 weight percent, based on the total weight of the coproduct stream.

This light organics coproduct stream 152 may further include at least one additional component selected from the group consisting of tetrahydrofuran (THF), methyl acetate, silicates, 2,5-methyl dioxolane, 1,4-cyclohexanedimethanol, 2-ethyl-1-hexanol, 2,2,4,4,-tetramethyl-1,3-cyclobutanediol, 2,2,4-trimethyl-3-pentenal, 2,2,4-trimethyl-3-pentenol, 2,2,4-trimethylpentane, 2,4-dimethyl-3-pentanone (DIPK), isobutyl isobutyrate, methyl formate, n-butanol, acetic acid, dibutyl ether, heptane, dibutyl terephthalate, dimethyl phthalate, dimethyl 1,4-cyclohexanedicarboxylate, 2-methoxyethanol, 2-methyl-1,3-dioxolane, 1,1-dimethoxy-2-butene, 1,1-dimethoxyethane, 1,3-propanediol, 2,5-dimethyl-1,3,5-hexadiene, 2,5-dimethyl-2,4-hexadiene, alpha-methyl styrene, diethylene glycol methyl ether, diethylene glycol formal, dimethoxydimethyl silane, dimethyl ether, diisopropyl ketone, EG benzoate, hexamethylcyclotrisiloxane, hexamethyldisiloxane, methoxytrimethylsilane, methyl 4-ethylbenzoate, methyl caprylate, methyl glycolate, methyl lactate, methyl laurate, methyl methoxyethyl terephthalic acid, methyl nonanoate, methyl oleate, methyl palmitate, methyl stearate, methyl-4-acetyl benzoate, octamethylcyclotetrasiloxane, styrene, trimethylsilanol, 1,1-dimethyoxy-2-butene, 4-methyl morpholine, 1,3,3-trimethoxypropane, methyl myristate, dimethyl adipate, n-methyl-caprolactam, dimethyl azelate, neopentyl glycol, and combinations thereof.

As discussed in further detail herein, all or a portion of the light organics coproduct stream or streams may be introduced into one or more downstream chemical recycling facilities alone or in combination with one or more other coproduct streams, streams resulting from one or more of the other downstream chemical recycling facilities, and/or streams of waste plastic, including mixed plastic waste (unprocessed, partially processed, or processed).

Additionally, a stream predominantly comprising the principal glycol 154 may also be withdrawn from the light organics separation zone 230. In an embodiment or in combination with any embodiment mentioned herein, the stream of principal glycol 154 (such as ethylene glycol) can include at least 55, at least 60, at least 65, at least 70, at least 75, at least 80, at least 85, at least 90, at least 95, or at least 99 weight percent of the principal glycol, based on the total weight of the stream 154. The principal glycol stream 154 may also include recycle content, such that the principal glycol product stream 154 has a recycle content of at least 50, at least 55, at least 60, at least 65, at least 70, at least 75, at least 80, at least 85, at least 90, or at least 95 weight percent, based on the total weight of the stream. The principal glycol (or ethylene glycol) can comprise r-glycol (or r-ethylene glycol).

As shown in FIG. 3, a glycol-containing column bottoms coproduct stream 156 may also be withdrawn from the light organics separation zone 230. The terms "glycol column bottoms" or "glycol column sludge" (or, more particularly, EG column bottoms or EG column sludge in methanolysis) refers to components that have a boiling point (or azeotrope) higher than the boiling point of the principal glycol but lower than the principal terephthalyl.

In an embodiment or in combination with any embodiment mentioned herein, the glycol column bottoms coproduct stream 156 can comprise at least 50, at least 55, at least 60, at least 65, at least 70, at least 75, at least 80, at least 85, at least 90, or at least 95 weight percent of components with a boiling point higher than the boiling point of the principal glycol (e.g., ethylene glycol) and lower than the boiling point of the principal terephthalyl. The glycol column bottoms coproduct stream 156 can comprise not more than 60, not more than 55, not more than 50, not more than 45, not more than 40, not more than 35, not more than 30, not more than 25, not more than 20, not more than 15, not more than 10, not more than 5, not more than 2, not more than 1 weight percent of components with a boiling point lower than the boiling point of the principal glycol (e.g., ethylene glycol). The glycol column bottoms coproduct stream 156 can have a boiling point higher than the boiling point of the principal glycol (e.g., EG) and lower than the boiling point of the principal terephthalyl (e.g., DMT).

In an embodiment or in combination with any embodiment mentioned herein, the glycol bottoms coproduct stream 156 can comprise the principal glycol and at least one other glycol. For example, the glycol column bottoms coproduct stream 156 can comprise at least 0.5, at least 1, at least 2, at least 3, at least 5, or at least 8 and/or not more than 30, not more than 25, not more than 20, not more than 15, not more than 12, or not more than 10 weight percent of the primary glycol (or ethylene glycol), based on the total weight of the coproduct stream 156. The principal glycol (or ethylene glycol) may be present as itself (in a free state) or as a moiety in another compound.

Examples of other possible principal glycols (depending on the PET or other polymer being processed) may include, but are not limited to, diethylene glycol, triethylene glycol, 1,4-cyclohexane-dimethanol, propane-1,3-diol, butane-1,4-diol, pentane-1,5-diol, hexane-1,6-diol, neopentyl glycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, BDS-(2,2-(sulfonylbis)4,1-phenyleneoxy))bis(ethanol), and combinations thereof. The other glycol may not be or comprise ethylene glycol. Moieties of these glycols may also be present in any oligomers of polyester in this or other coproduct streams. Additionally, other non-terephthalyl and/or non-glycol components may also be present in these streams. Examples of such components include, isophthalates and other acid residues that boil higher than the principal terephthalyl.

In an embodiment or in combination with any embodiment mentioned herein, the glycol other than the principal glycol (or ethylene glycol in the case of methanolysis) can be present in the glycol column bottoms coproduct stream 156 in an amount of at least 15, at least 20, at least 25, at least 30, at least 35, at least 40, at least 45, at least 50, at least 55, at least 60, at least 65, at least 70, or at least 75 and/or not more than 99, not more than 95, not more than 90, not more than 85, not more than 80, not more than 75, not more than 70, not more than 65, not more than 60, not more than 55, not more than 50, not more than 45, not more than 40, or not more than 35 weight percent, based on the total weight of glycols in the glycol column bottoms coproduct stream 156.

In an embodiment or in combination with any embodiment mentioned herein, the weight ratio of the at least one glycol other than the principal glycol to the principal glycol in the glycol column bottoms coproduct stream 156 is at least 0.5:1, at least 0.55:1, at least 0.65:1, at least 0.70:1, at least 0.75:1, at least 0.80:1, at least 0.85:1, at least 0.90:1, at least 0.95:1, at least 0.97:1, at least 0.99:1, at least 1:1, at least 1.05:1, at least 1.1:1, at least 1.15:1, at least 1.2:1, at least or at least 1.25:1. Additionally, or in the alternative, the weight ratio of the at least one glycol other than the principal glycol to the principal glycol in the glycol column bottoms coproduct stream 156 is not more than 5:1, not more than 4.5:1, not more than 4:1, not more than 3.5:1, not more than 3:1, not more than 2.5:1, not more than 2:1, not more than 1.5:1, not more than 1.25:1, or not more than 1:1, or in the range of from 0.5:1 to 5:1, from 0.70:1 to 3:1, or 0.80:1 to 2.5:1.

In an embodiment or in combination with any embodiment mentioned herein, the solvolysis facility 30 may produce two or more coproduct streams, which can include two or more heavy organic coproduct streams, two or more light organic coproduct streams, or combinations of light and heavy organic coproduct streams. All or a portion of one or more of the solvolysis coproduct stream or streams (shown as stream 110 in FIG. 1) may be introduced into at least one of the downstream processing facilities including, for example, the pyrolysis facility 60, the cracking facility 70, the POX gasification facility 50, the energy recovery facility 80, and any of the other optional facilities mentioned previously.

In an embodiment or in combination with any embodiment mentioned herein, two or more (or portions of two or more) solvolysis coproduct streams may be introduced into the same downstream processing facility, while, in other cases, two or more (or portions of two or more) solvolysis coproduct streams may be introduced into different downstream processing facilities. In some embodiments, at least 90, at least 95, at least 97, at least 99 weight percent, or all, of a single coproduct stream may be introduced into one downstream facility, while, in other embodiments, the stream may be divided amongst two or more downstream facilities, such that not more than 60, not more than 55, not more than 50, not more than 45, not more than 40, not more than 35, or not more than 30 weight percent of a single coproduct stream may be introduced into one of the downstream processing facilities.

Referring again to FIG. 1, in an embodiment or in combination with any embodiment mentioned herein, at least a portion of at least one solvolysis coproduct stream 110 may be combined with at least a portion of the PO-enriched plastic stream 114 withdrawn from the pre-processing facility 20 as shown in FIG. 1. The amount of a single coproduct stream 110 (or all coproduct streams when two or more are combined) in the combined stream with the PO-enriched plastic may vary and can be, for example, at least 1, at least 5, at least 10, at least 15, at least 20, at least 25, at least 30, at least 35, at least 40, at least 45, or at least 50 and/or not more than 90, not more than 85, not more than 80, not more than 75, not more than 70, not more than 65, not more than 60, not more than 55, not more than 50, or not more than 40 weight percent, based on the total weight of the combined stream. As shown in FIG. 1, the combined stream may then be introduced into one or more locations of the chemical recycling facility, including, for example into a POX gasification facility 50, a pyrolysis facility 60, a cracker facility 70, and/or an energy generation facility 80.

Liquification/Dehalogenation

As shown in FIG. 1, the PO-enriched waste plastic stream 114 (with or without being combined with a solvolysis coproduct stream 110) may optionally be introduced into a liquification zone or step prior to being introduced into one or more of the downstream processing facilities. As used herein, the term "liquification" zone or step refers to a chemical processing zone or step in which at least a portion of the incoming plastic is liquefied. The step of liquefying plastic can include chemical liquification, physical liquification, or combinations thereof. Exemplary methods of liquefying the polymer introduced into the liquification zone can include (i) heating/melting; (ii) dissolving in a solvent; (iii) depolymerizing; (iv) plasticizing, and combinations thereof. Additionally, one or more of options (i) through (iv) may also be accompanied by the addition of a blending or liquification agent to help facilitate the liquification (reduction of viscosity) of the polymer material. As such, a variety of rheology modification agents (e.g., solvents, depolymerization agents, plasticizers, and blending agents) can be used the enhance the flow and/or dispersibility of the liquified waste plastic.

Referring again to FIG. 1, the PO-enriched waste plastic stream and/or the solvolysis coproducts from the solvolysis system may be introduced into a liquification system or step prior to being introduced into one or more of the downstream processing facilities. Additionally, or in the alternative, an unsorted waste plastic (such as unprocessed waste plastic and/or partially processed waste plastic) and/or any sorted waste plastic from the preprocessing facility or other sources may be introduced into the liquification system or step prior to being introduced into one or more of the downstream processing facilities. In an embodiment or in combination with any embodiment mentioned herein, the waste plastic fed into the liquification system or step may be provided as a waste stream from another processing facility, for example a municipal recycling facility (MRF) or reclaimer facility, or as a plastic-containing mixture comprising waste plastic sorted by a consumer and left for collection at a curbside.

In an embodiment or in combination with any embodiment mentioned herein, the plastic stream fed into the liquification system 40 can comprise a sorted waste plastic stream that is enriched in PO and contains low amounts of PET and PVC, such as the PO-enriched waste plastic stream. For example, the plastic stream fed into the liquification system 40 can comprise at least 10, at least 15, at least 25, at least 50, at least 75, or at least 90 and/or not more than 99, not more than 98, not more than 95, not more than 90, not more than 85, not more than 80, not more than 75, not more than 70, not more than 65, not more than 60, not more than 55, not more than 50, not more than 45, not more than 40, not more than 35, or not more than 30 weight percent of one or more polyolefins, based on the total weight of the stream. Additionally, or in the alternative, the plastic stream fed into the liquification system 40 can comprise not more than 25, not more than 10, not more than 5, not more than 2, not more than 1, or not more than 0.5 weight percent of PET and/or PVC, based on the total weight of the stream.

In an embodiment or in combination with any embodiment mentioned herein, the plastic stream fed into the liquification system 40 can comprise an unsorted waste plastic stream that comprises a notable amount of PET. For example, in one or more embodiments, the plastic stream fed into the liquification system 40 can comprise at least 0.5, at least 1, at least 2, at least 3, at least 4, at least 5, at least 10, at least 15, at least 20, at least 25, or at least 30 and/or not more than 95, not more than 90, not more than 80, or not more than 70 weight percent of PET, based on the total weight of the stream. Additionally, or in the alternative, the plastic stream fed into the liquification system 40 can comprise at least 5, at least 10, at least 15, at least 20, at least 25, or at least 30 and/or not more than 95, not more than 90, not more than 80, or not more than 70 weight percent of one or more polyolefins, based on the total weight of the stream.

In an embodiment or in combination with any embodiment mentioned herein, the plastic stream fed into the liquification system 40 can comprise of at least 50, at least 75, at least 80, at least 85, at least 90, at least 95, or at least 99 weight percent of one or more solid waste plastics, based on the total weight of the feed stream being introduced into the liquification system 40. Thus, in one or more embodiments, the plastic stream being fed into the liquification system comprises a very high solids content.

Additionally, or in the alternative, the plastic stream fed into the liquification system 40 can be in the form of a slurry and comprise one or more slurry-forming liquids, such as water. In such embodiments, the plastic stream fed into the liquification system 40 can comprise at least 1, at least 2, at least 3, at least 4, at least 5, at least 10, at least 15, at least 20, or at least 25 and/or not more than 90, not more than 80, not more than 70, not more than 60, not more than 50, not more than 40, not more than 30, not more than 20, not more than 10, or not more than 5 weight percent of one or more slurry-forming liquids, based on the total weight of the feed stream being introduced into the liquification system 40.

When added to the liquification system 40, at least 50, at least 55, at least 60, at least 65, at least 70, at least 75, at least 80, at least 85, at least 90, at least 95, or at least 99 weight percent of the plastic (usually waste plastic) undergoes a reduction in viscosity. In some cases, the reduction in viscosity can be facilitated by heating (e.g., addition of steam directly or indirectly contacting the plastic), while, in other cases, it can be facilitated by combining the plastic with a solvent capable of dissolving it.

In an embodiment or in combination with any embodiment mentioned herein, the waste plastic added to the liquification system may be at least partially dissolved by contacting the plastic with at least one solvent. Generally, the dissolving step may be carried at a pressure and temperature sufficient to at least partially dissolve the solid waste plastic. Examples of suitable solvents can include, but are not limited to, alcohols such as methanol or ethanol, glycols such as ethylene glycol, diethylene glycol, triethylene glycol, neopentyl glycol, cyclohexanedimethanol, glycerin, pyrolysis oil, motor oil, and water. As shown in FIG. 1, the solvent stream 141 can be added directly to the liquification system 40, or it can be combined with one or more streams fed to the liquification system 40 (not shown in FIG. 1). In the event that a pyrolysis oil is used as the solvent in the solvent stream 141, such pyrolysis oil may be derived from the pyrolysis facility 60 or be a pyrolysis oil purchased from an external source.

When used, the solvent may be present in an amount of at least 1, at least 2, at least 5, at least 10, at least 15, or at least 20 weight percent, based on the total weight of the feed stream introduced into the liquification system 40. Additionally, or in the alternative, the solvent may be present in an amount of not more than 60, not more than 50, not more than 40, not more than 30, not more than 20, or not more than 15 weight percent, based on the total weight of the feed stream introduced into the liquification system 40. For example, the overall feed stream introduced into the liquification system 40 may comprise 1 to 50, 2 to 40, or 5 to 30 weight percent of one or more solvents.

In an embodiment or in combination with any embodiment mentioned herein, the solvent can comprise a stream withdrawn from one or more other facilities within the chemical recycling facility. For example, the solvent can comprise a stream withdrawn from at least one of the solvolysis facility 30, the pyrolysis facility 60, and the cracking facility 70. The solvent can be or comprise at least one of the solvolysis coproducts described herein or can be or comprise pyrolysis oil. As shown in FIG. 1, the solvent can be derived from a pyrolysis oil via line 143 from the pyrolysis facility 60.

When combined with the PO-enriched plastic stream 114 as generally shown in FIG. 1, the solvolysis coproduct stream (which can include one or more solvolysis coproducts described herein) may be added before introduction of the PO-enriched waste plastic stream 114 into the liquification system 40 (as shown by line 113) and/or after removal of the liquified plastic stream from the liquification system 40 (as shown by line 115). In an embodiment or in combination with any embodiment mentioned herein, at least a portion or all of one or more coproduct streams may also be introduced directly into the liquification zone, as shown in FIG. 1. In an embodiment or in combination with any embodiment mentioned herein, at least a portion of the PO-enriched waste plastic stream 114 can bypass the liquification system 40 altogether in line 117 and may optionally combined with at least one solvolysis coproduct stream 110 as also shown in FIG. 1.

Additionally, as shown in FIG. 1, at least a portion of the pyrolysis oil stream 143 withdrawn from the pyrolysis facility 60 can be combined with the PO-enriched plastic stream 114 to form a liquified plastic. Although shown as being introduced directly into the liquification system 40, all or a portion of the pyrolysis oil stream 143 may be combined with the PO-enriched plastic stream 114 prior to introduction into the liquification system 40, or after the PO-enriched plastic stream 114 exits the liquification system 40. When used, the pyrolysis oil can be added at one or more locations described herein, alone or in combination with one or more other solvent streams.

In an embodiment or in combination with any embodiment mentioned herein, the waste plastic added to the liquification system 40 may be depolymerized such that, for example, the number average chain length of the plastic is reduced by contact with a depolymerization agent. Generally, the depolymerizing step may be carried at a pressure and temperature sufficient to at least partially liquefy the solid waste plastic. In an embodiment or in combination with any embodiment mentioned herein, at least one of the previously-listed solvents used for dissolving may also be used as a depolymerization agent, while, in one or more other embodiments, the depolymerization agent can include an organic acid (e.g., acetic acid, citric acid, butyric acid, formic acid, lactic acid, oleic acid, oxalic, stearic acid, tartaric acid, and/or uric acid) or inorganic acid such as sulfuric acid and/or nitric acid (for polyolefin). The depolymerization agent may reduce the melting point and/or viscosity of the polymer by reducing its number average chain length.

When used, the depolymerization agent may be present in an amount of at least 1, at least 2, at least 5, at least 10, at least 15, or at least 20 weight percent, based on the total weight of the feed stream introduced into the liquification system 40. Additionally, or in the alternative, the depolymerization agent may be present in an amount of not more than 60, not more than 50, not more than 40, not more than 30, not more than 20, or not more than 15 weight percent, based on the total weight of the feed stream introduced into the liquification system 40. For example, the overall feed stream introduced into the liquification system 40 may comprise 1 to 50, 2 to 40, or 5 to 30 weight percent of one or more depolymerization agents.

In an embodiment or in combination with any embodiment mentioned herein, the waste plastic added to the liquification system may be contacted with a plasticizer in the liquification system to reduce the viscosity of the plastic. In such embodiments, the plasticizing step may be carried out in a heated vessel, such as the melt tank described below, and/or in a mixer under agitation, such as a calendaring mixer and/or an extruder. During the plasticizing step, the plasticizers may be incorporated into the plastic while it is being liquefied in the liquification vessel. Plasticizers for polyethylene include, for example, dioctyl phthalate, dioctyl terephthalate, glyceryl tribenzoate, polyethylene glycol having molecular weight of up to 8,000 Daltons, sunflower oil, paraffin wax having molecular weight from 400 to 1,000 Daltons, paraffinic oil, mineral oil, glycerin, EPDM, and EVA. Plasticizers for polypropylene include, for example, dioctyl sebacate, paraffinic oil, isooctyl tallate, plasticizing oil (Drakeol 34), naphthenic and aromatic processing oils, and glycerin. Plasticizers for polyesters include, for example, polyalkylene ethers (e.g., polyethylene glycol, polytetramethylene glycol, polypropylene glycol or their mixtures) having molecular weight in the range from 400 to 1500 Daltons, glyceryl monostearate, octyl epoxy soyate, epoxidized soybean oil, epoxy tallate, epoxidized linseed oil, polyhydroxyalkanoate, glycols (e.g., ethylene glycol, pentamethylene glycol, hexamethylene glycol, etc.), phthalates, terephthalates, trimellitate, and polyethylene glycol di-(2-ethylhexoate). When used, the plasticizer may be present in an amount of at least 0.1, at least 0.5, at least 1, at least 2, or at least 5 weight percent and/or not more than 10, not more than 8, not more than 5, not more than 3, not more than 2, or not more than 1 weight percent, based on the total weight of the stream, or it can be in a range of from 0.1 to 10 weight percent, 0.5 to 8 weight percent, or 1 to 5 weight percent, based on the total weight of the feed stream introduced into the liquification system 40.

Further, one or more of the methods of liquefying the waste plastic stream can also include adding at least one liquification agent to the plastic before, during, or after the liquification process. Such liquification agents may include for example, emulsifiers and/or surfactants, and may serve to more fully blend the liquified plastic into a single phase, particularly when differences in densities between the plastic components of a mixed plastic stream result in multiple liquid or semi-liquid phases. When used, the liquification agent may be present in an amount of at least 0.1, at least 0.5, at least 1, at least 2, or at least 5 weight percent and/or not more than 10, not more than 8, not more than 5, not more than 3, not more than 2, or not more than 1 weight percent, based on the total weight of the feed stream introduced into the liquification system 40, or it can be in a range of from 0.1 to 10 weight percent, 0.5 to 8 weight percent, or 1 to 5 weight percent, based on the total weight of the feed stream introduced into the liquification system 40.

As discussed above, one or more of the methods of liquefying the waste plastic stream in the liquification system 40 can involve a heating/melting step, which may be carried out in a melt tank system to thereby form a molten feed, such as a molten waste plastic. During this step, at least a portion of the plastic may be heated above its melt temperature and/or glass transition temperature to thereby form a molten waste plastic. As used herein, a "molten feed" refers to a substantially liquid feed that contains at least one component that is in substantially liquid form and has been heated above its melt temperature and/or glass transition temperature. Similarly, as used herein, a "molten waste plastic" refers to a waste plastic in substantially liquid form that has been heated above its melt temperature and/or glass transition temperature.

In an embodiment or in combination with any embodiment mentioned herein, the liquified plastic stream exiting the liquification system 40 can have a viscosity of less than 3,000, less than 2,500, less than 2,000, less than 1,500, less than 1,000, less than 800, less than 750, less than 700, less than 650, less than 600, less than 550, less than 500, less than 450, less than 400, less than 350, less than 300, less than 250, less than 150, less than 100, less than 75, less than 50, less than 25, less than 10, less than 5, or less than 1 poise as measured using a Brookfield R/S rheometer with V80-40 vane spindle operating at a shear rate of 10 rad/s and a temperature of 350° C. Additionally, or in the alternative, the viscosity (measured at 350° C. and 10 rad/s and expressed in poise) of the liquified plastic stream exiting the liquification zone is not more than 95, not more than 90, not more than 75, not more than 50, not more than 25, not more than 10, not more than 5, or not more than 1 percent of the viscosity of the PO-enriched stream introduced into the liquification zone.

Figure 4:
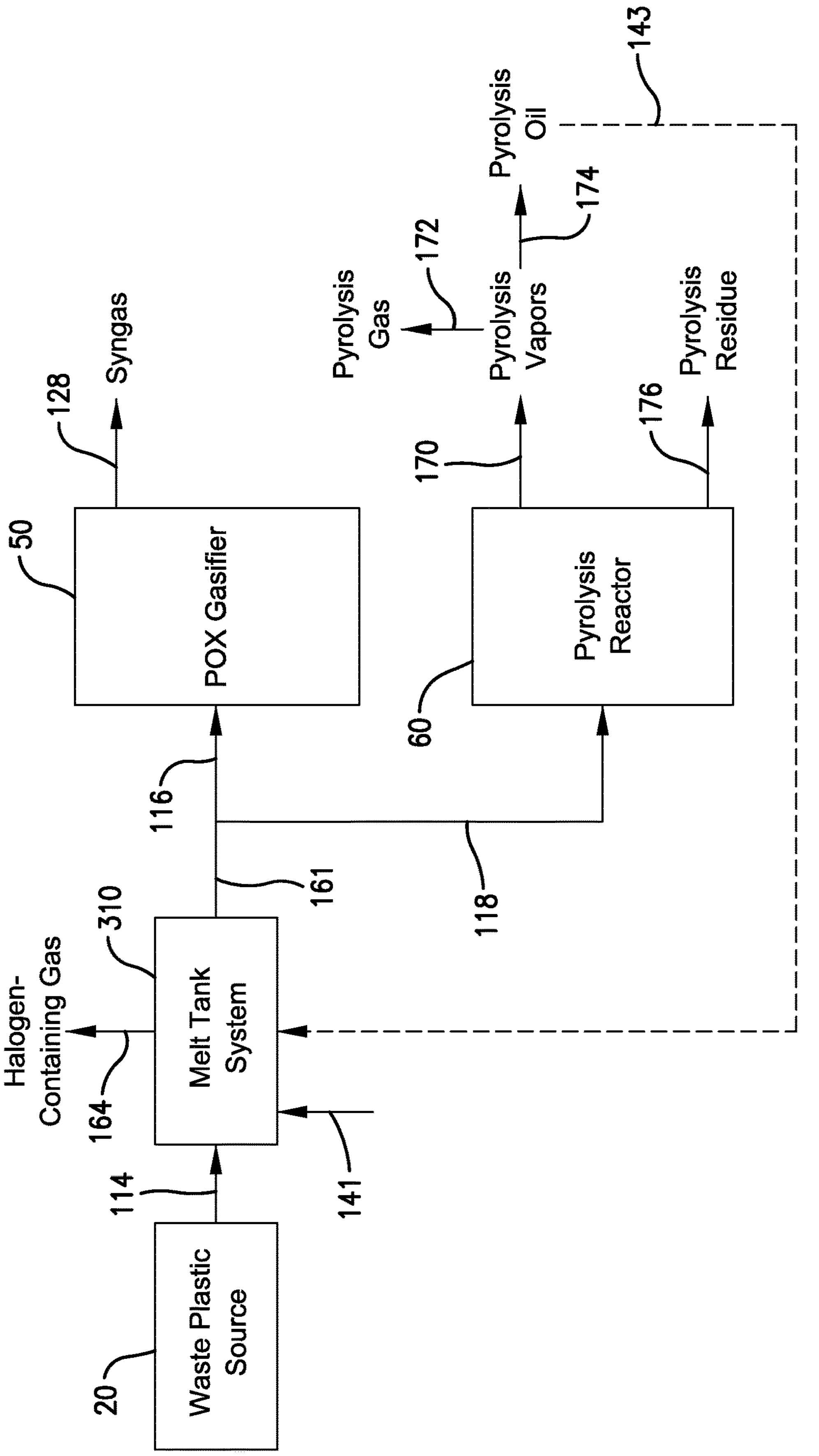
FIG. 4 depicts an exemplary recycling facility with a liquification melt tank system.

FIG. 4 shows the basic components in a liquification system that may be used as the liquification system 40 in the chemical recycling facility illustrated in FIG. 1. It should be understood that FIG. 4 depicts one exemplary embodiment of a liquification system 40. Certain features depicted in FIG. 4 may be omitted and/or additional features described elsewhere herein may be added to the system depicted in FIG. 4.

As shown in FIG. 4, a solid waste plastic feed, such as the PO-enriched waste plastic stream, may be derived from a Waste Plastic Source 20, such as the Preprocessing Facility discussed herein. The waste plastic feed 114 may then be introduced into the liquification system, which FIG. 4 depicts as a melt tank system 310 containing at least one melt tank. While in the melt tank system 310, at least a portion of the plastic feed 114 may be heated above its melting temperature and/or glass transition temperature to thereby form a liquefied (i.e., molten) waste plastic.

Furthermore, while in the melt tank system 310, at least a portion of the halogens present in the plastic feed stream 114 can be removed from the plastic feed stream. More particularly, in one or more embodiments, the liquification system can also contain equipment for removing halogens from the waste plastic feed stream. For example, when the waste plastic is heated in the melt tank system 310, halogen enriched gases can evolve. The evolved halogen-enriched gases 164 may be disengaged from the resulting liquified plastic material, which results in a liquefied (i.e., molten) plastic stream 161 with a reduced halogen content. As shown in FIG. 4, the resulting dehalogenated liquefied waste plastic 161 may then be introduced into downstream processing facilities, such as a pyrolysis reactor in a pyrolysis facility 60 via line 118 and/or a POX gasifier at a POX facility 50 via line 118, while the halogen-enriched gas 164 may be removed from the system.

As also shown in FIG. 4, the resulting pyrolysis vapors 170 may be separated (as discussed below) into a pyrolysis gas stream 172 and a pyrolysis oil stream 174. The resulting pyrolysis heavy residue 176 may be removed from the pyrolysis system 50 for other downstream uses. Furthermore, an embodiment or in combination with any embodiment mentioned herein, at least a portion of the pyrolysis oil stream 174 may be recycled back to the melt tank system 310 via line 143 in order to provide pyrolysis oil to the melt tank system 310, where the pyrolysis oil may function as a dissolution solvent, as discussed above. Additionally, or alternatively, another dissolution solvent may be added to the melt tank system via line 141, as discussed above.

In an embodiment or in combination with any embodiment mentioned herein, at least 1, at least 5, at least 10, at least 15, at least 20, at least 25, at least 50, at least 75, at least 90, or at least 99 percent of the pyrolysis oil stream 174 may be recycled back to the liquification system 40, such as the melt tank system 310, via line 143 for use as a dissolution solvent. In certain embodiments, all of the pyrolysis oil stream 174 may be recycled back to the liquification system 40 via line 143.

FIG. 4 also shows that the dehalogenated liquefied waste plastic 161 may be introduced into a POX gasifier at a POX facility 50 via line 118 to produce a syngas 128. The syngas 128 may be subjected to additional processing as discussed below.

In an embodiment or in combination with any embodiment mentioned herein, the liquefied waste plastic stream

161 from the liquification system 40, such as the melt tank system 310 in FIG. 4, may be selectively routed and proportioned to the POX facility 50 and pyrolysis facility 60. For example, at least 10, at least 20, at least 30, at least 40, at least 50, at least 60, at least 70, at least 80, or at least 90 percent and/or not more than 99, not more than 95, or not more than 92 percent of the liquefied waste plastic stream 161 can be directed and sent to the POX facility 50 via line 116. In certain embodiments, 10 to 99, 20 to 99, 40 to 95, or 70 to 95 percent of the liquefied waste plastic stream 161 can be directed and sent to the POX facility 50 via line 116.

Additionally, or in the alternative, in an embodiment or in combination with any embodiment mentioned herein, at least 1, at least 2, at least 3, at least 4, at least 5, at least 10, or at least 15 percent and/or not more than 90, not more than 50, not more than 30, or not more than 20 percent of the liquefied waste plastic stream 161 can be directed and sent to the pyrolysis facility 60 via line 118. In certain embodiments, 1 to 90, 1 to 50, 1 to 30, or 1 to 20 percent of the liquefied waste plastic stream 161 can be directed and sent to the pyrolysis facility 60 via line 118. In such embodiments, the proportioned liquefied waste plastic stream 161 can be converted into pyrolysis oil in the pyrolysis facility 60, which may then be recycled back to the liquification system 40, as discussed above.

Figure 5:
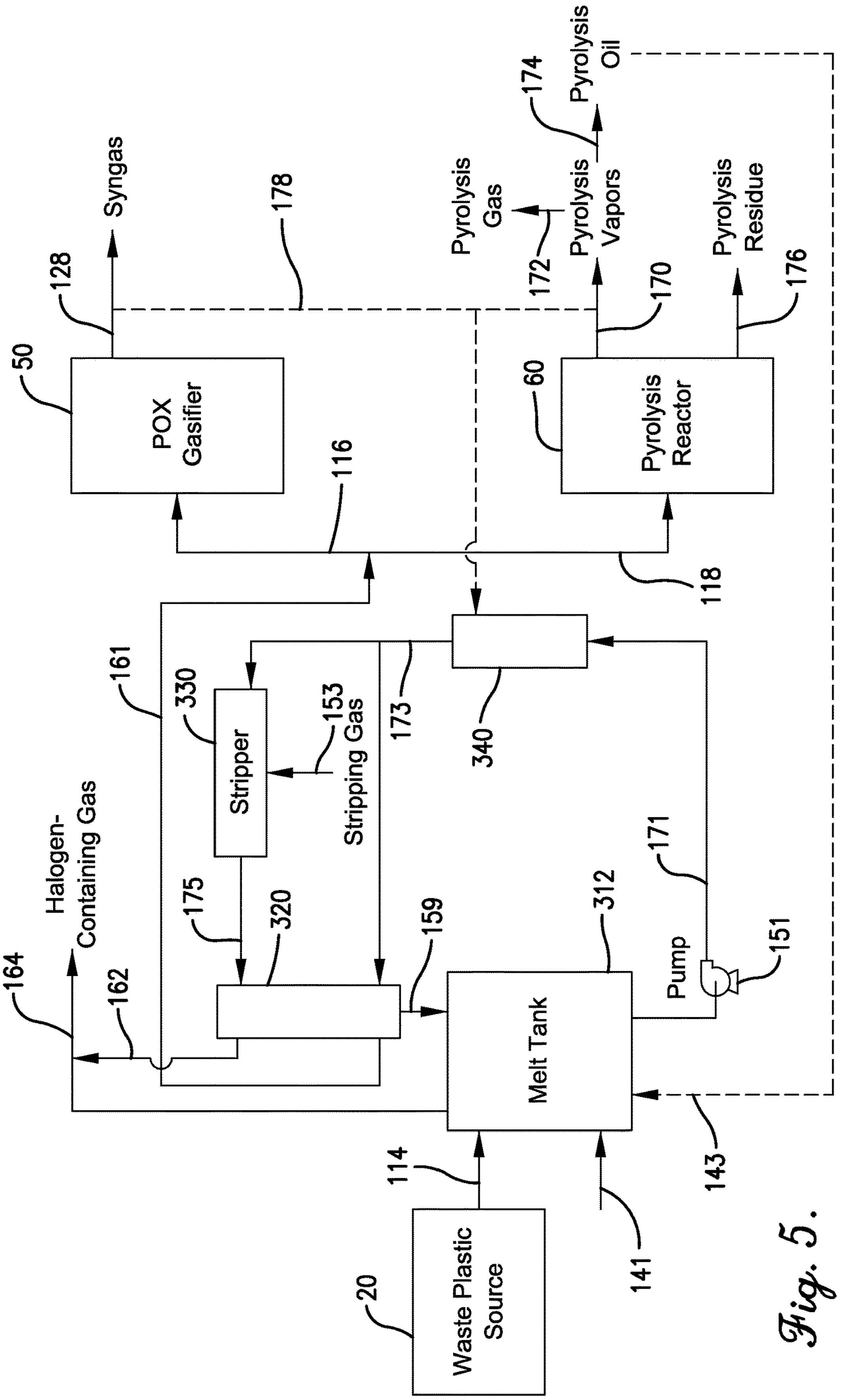
FIG. 5 depicts an exemplary melt tank liquification system according to one embodiment.

FIG. 5 shows an exemplary melt tank system that may be used as the liquification system 40 in FIG. 1. It should be understood that FIG. 5 depicts one exemplary embodiment of a liquification system. Certain features depicted in FIG. 5 may be omitted and/or additional features described elsewhere herein may be added to the system depicted in FIG. 5. It should be noted that all of the components depicted in FIG. 5 may operate in the same manner as the identical components described above in regard to FIGS. 1 and 4, unless otherwise noted.

As shown in FIG. 5, a waste plastic feed, such as the PO-enriched waste plastic stream 114, may be derived from a waste plastic source 20, such as the preprocessing facility 20 discussed herein. The waste plastic feed, such as the PO-enriched waste plastic stream 114, may be introduced into the liquification system 40, which FIG. 5 depicts as containing at least one melt tank 312, at least one external heat exchanger 340, at least one stripping column 330, and at least one disengagement vessel 320. These various exemplary components and their functionality in the liquification system 40 are discussed in greater detail below.

In an embodiment or in combination with any embodiment mentioned herein, and as shown in FIG. 5, the liquification system 40 includes a melt tank 312 and a heater. The melt tank 312 receives the waste plastic feed, such as PO-enriched waste plastic stream 114, and the heater heats the waste plastic.

In an embodiment or in combination with any embodiment mentioned herein, the melt tank 312 can include one or more continuously stirred tanks. When one or more rheology modification agents (e.g., solvents, depolymerization agents, plasticizers, and blending agents) are used in the liquification system 40, such rheology modification agents can be added to and/or mixed with the PO-enriched plastic in or prior to the melt tank 312 via line 141 and/or line 143.

In an embodiment or in combination with any embodiment mentioned herein, the heater (not shown in FIG. 5) of the liquification system 40 can take the form of internal heat exchange coils located in the melt tank 312, a jacketing on the outside of the melt tank 312, a heat tracing on the outside of the melt tank 312, and/or electrical heating elements on the outside of the melt tank 312. Additionally, or alternatively, as shown in FIG. 5, the heater of the liquification system 40 can include an external heat exchanger 340 that receives a stream of liquified plastic 171 from the melt tank 312, heats it, and returns at least a portion of the heated liquified plastic stream 173 to the melt tank 312.

The external heat exchanger 340 can comprise any conventional heat exchanger known and used in the art. In an embodiment or in combination with any embodiment mentioned herein, the external heat exchanger 340 can comprise a single pass or multiple pass vertical heat exchanger. As shown in FIG. 5, the external heat exchanger 340 receives liquified plastic via line 171 from the melt tank 312 and heats it up for further processing.

As shown in FIG. 5, when an external heat exchanger 340 is used to provide heat for the liquification system 40, a circulation loop can be employed to continuously add heat to the PO-enriched material. In an embodiment or in combination with any embodiment mentioned herein, the circulation loop includes the melt tank 312, the external heat exchanger 340, conduits (shown as lines 159, 171, 173, and 175) connecting the melt tank 312 and the external heat exchanger 340, and a pump 151 for circulating liquified waste plastic in the circulation loop. When a circulation loop is employed, the liquified PO-enriched material produced can be continuously withdrawn from the liquification system 40 as a fraction of the circulating PO-enriched stream via conduit 161 shown in FIG. 5.

Although FIG. 5 depicts the liquification system comprising only a single melt tank 312, a single heat exchanger 340, a single stripper 330, and a single disengagement vessel 320, it is within the scope of the present application that the liquification system 40 may comprise a plurality of melt tanks 312, a plurality of external heat exchangers 340, a plurality of strippers 330, and/or a plurality of disengagement vessels 320.

In an embodiment or in combination with any embodiment mentioned herein, and as depicted in FIG. 5, dehalogenation of the liquefied plastic stream can be promoted by sparging a stripping gas (e.g., steam) via conduit 153 into the liquified plastic material when the liquefied plastic is introduced and present in the stripper 330. The stripping gas can comprise, for example, nitrogen, steam, methane, carbon monoxide, and/or hydrogen. In particular embodiments, the stripping gas can comprise steam.

In an embodiment or in combination with any embodiment mentioned herein, and as shown in FIG. 5, a stripper 330 and a disengagement vessel 320 are provided in the circulation loop downstream of the external heat exchanger 340 and upstream of the melt tank 312. As shown in FIG. 5, the stripper 330 can receive the heated liquified plastic from the external heat exchanger 340 and provide for the sparging of a stripping gas stream 153 into the liquified plastic. In certain embodiments, sparging of a stripping gas into the liquified plastic can create a two-phase medium in the stripper 330.

The two-phase medium formed in the stripper 330 can then be flowed (e.g., by gravity) through the disengagement vessel 320, where a halogen-enriched gaseous phase 162 is disengaged from a halogen-depleted liquid phase. Alternatively, as shown in FIG. 5, a portion of the heated liquefied plastic from the external heat exchanger 340 may bypass the stripper 330 and be introduced directly into the disengagement vessel 320.

In an embodiment or in combination with any embodiment mentioned herein, a first portion of the halogen-depleted liquid phase discharged from an outlet of the disengagement vessel can be returned to the melt tank 312 via line 159, while a second portion of the halogen-depleted liquid phase can be discharged from the liquification system as the dehalogenated, liquified plastic stream 161. The disengaged halogen-enriched gaseous stream 162 can be removed from the liquification system 40 for further processing and/or disposal.

In an embodiment or in combination with any embodiment mentioned herein, the interior space of the melt tank 312, where the plastic is heated, is maintained at a temperature of at least 200, at least 210, at least 220, at least 230, at least 240, at least 250, at least 260, at least 270, at least 280, at least 290, at least 300, at least 310, at least 320, at least 330, at least 340, at least 350, at least 360, at least 370, at least 380, at least 390, or at least 400° C. Additionally, or in the alternative, the interior space of the melt tank 312 may be maintained at a temperature of not more than 500, not more than 475, not more than 450, not more than 425, not more than 400, not more than 390, not more than 380, not more than 370, not more than 365, not more than 360, not more than 355, not more than 350, or not more than 345° C. Generally, in one or more embodiments, the interior space of the melt tank 312 may be maintained at a temperature ranging from 200 to 500° C., 240 to 425° C., 280 to 380° C., or 320 to 350° C.

In an embodiment or in combination with any embodiment mentioned herein, the plastic fed into the melt tank 312 may have a residence time in the melt tank 312 of at least 1, at least 5, at least 10, at least 20, at least 30, at least 40, at least 50, or at least 60 minutes and/or not more than 10, not more than 9, not more than 8, not more than 7, not more than 6, not more than 5, not more than 4, or not more than 3 hours. Generally, in one or more embodiments, the plastic fed into the melt tank 312 may have a residence time in the melt tank 312 in the range of 1 minute to 10 hours, 30 minutes to 6 hours, or 60 minutes to 4 hours.

In an embodiment or in combination with any embodiment mentioned herein, the pressure within the melt tank 312 may be maintained at a range from an absolute vacuum to 100 torr.

As noted above, the external heat exchanger 340 may provide additional heating and may further heat the liquefied plastic from the melt tank 312. In an embodiment or in combination with any embodiment mentioned herein, the liquefied plastic fed into the external heat exchanger 340 may have a residence time in the heat exchanger 340 of at least 1, at least 2, at least 3, at least 4, or at least 5 minutes and/or not more than 30, not more than 25, not more than 20, not more than 15, or not more than 10 minutes. Generally, in one or more embodiments, at least 50, at least 75, at least 90, at least 95, or at least 99 percent, or substantially all of the heat used to form the molten waste plastic in the melt tank 312 is provided by the external heat exchanger 340.

Turning back to FIG. 5, at least a portion of the molten plastic from the external heat exchanger 340 may be introduced into a stripper 330 configured to sparge a stripping gas stream 153 into the liquified waste plastic to thereby form a multi-phase mixture, which may comprise a gaseous phase and a liquid phase (e.g., a two-phase mixture). Generally, in one or more embodiments, the stripper 330 comprises one or more sparger tubes comprising a plurality of apertures that are configured to distribute the stripping gas into the molten waste plastic.

In an embodiment or in combination with any embodiment mentioned herein, the liquefied plastic may have a residence time in the stripper 330 of at least 10 seconds, at least 30 seconds, at least 1 minute, at least 5 minutes, at least 10 minutes, at least 15 minutes, or at least 30 minutes and/or not more than 60 minutes, not more than 30 minutes, not more than 10 minutes, not more than 5 minutes, or not more than 1 minute. The residence time in the stripper 330 is largely affected by the position and size of the stripper 330. Generally, while in the stripper 330, the stripping gas may be introduced into the molten waste plastic at a stripping gas to molten waste plastic ratio of at least 0.01:1, at least 0.05:1, or at least 0.1:1 and/or not more than 3:1, not more than 2:1, not more than 1:1, or not more than 0.9:1, on a weight basis.

Furthermore, in one or more embodiments, the disengagement vessel 320 can be configured to receive the multi-phase mixture from the stripper 330 and disengage the gaseous phase from the liquid phase of the multi-phase mixture to thereby provide a halogen-enriched gaseous material and a halogen-depleted molten waste plastic. In an embodiment or in combination with any embodiment mentioned herein, the disengagement vessel 320 may comprise a gravity-flow, multi-level, tray-containing vessel. Generally, in one or more embodiments, the multi-phase mixture may have a residence time in the disengagement vessel 320 of at least 10 seconds, at least 30 seconds, at least 1 minute, at least 5 minutes, at least 10 minutes, at least 15 minutes, or at least 30 minutes and/or not more than 2 hours, not more than 60 minutes, not more than 30 minutes, or not more than 10 minutes.

As shown in FIG. 5, at least a portion of the halogen-depleted molten waste plastic from the disengagement vessel 320 may be reintroduced via line 159 to the melt tank 312 for further liquefying and/or at least a portion of the halogen-depleted molten waste plastic may be removed from the liquification system 40 via line 161 at or near an outlet of the disengagement vessel 320 for further processing in a downstream facility, such as in a pyrolysis reactor at a pyrolysis facility 60 and/or a POX gasifier at a POX facility 50.

In an embodiment or in combination with any embodiment mentioned herein, the recirculated and heated molten plastic from the disengagement vessel 320 (and the circulation loop) may be used to provide heat in the melt tank 312 and, therefore, may assist in the heating and melting of the solid waste plastic introduced in the melt tank 312. Generally, in one or more embodiments, the ratio of the halogen-depleted molten waste plastic returned to the melt tank 312 via line 159 to the halogen-depleted molten waste plastic removed from the liquification system is at least 0.1:1, at least 0.2:1, at least 0.5:1, or at least 0.8:1 and/or not more than 50:1, not more than 40:1, not more than 30:1, not more than 20:1, not more than 10:1, not more than 5:1, or not more than 1:1. Generally, in one or more embodiments, the ratio of the halogen-depleted molten waste plastic returned to the melt tank 312 via line 159 to the halogen-depleted molten waste plastic removed from the liquification system is in the range of 0.1:1 to 40:1, 0.2:1 to 20:1, or 0.8:1 to 10:1.

In an embodiment or in combination with any embodiment mentioned herein, at least 50, at least 75, at least 90, at least 95, or at least 99 percent, or substantially all of the heat used to form the molten waste plastic in the melt tank 312 is provided by the heated waste plastic returned to the melt tank 312 from the disengagement vessel 320.

As shown in FIG. 5, in an embodiment or in combination with any embodiment mentioned herein, at least a portion of the syngas stream 128 from the POX facility 50 and/or at least a portion of the pyrolysis vapors from the pyrolysis facility 60 may be routed via line 178 to the external heat exchanger 340 so as to recycle the heat from these streams back into the circulation loop of the liquification system 40.

In an embodiment or in combination with any embodiment mentioned herein, not more than 50, not more than 25, not more than 10, not more than 5 percent, or substantially none of the heat used to form the molten waste plastic in the melt tank 312 is provided via indirect heat transfer through surfaces of or within the melt tank 312. Generally, in certain embodiments, the melt tank 312 may comprise no internal heating elements or external heat jacketing. Thus, in such embodiments, the heat necessary to form the molten waste plastic may be derived solely from the external heat exchanger 340 and/or the heated molten waste plastic returned to the melt tank 312 from the circulation loop.

Furthermore, in one or more embodiments, the halogen-enriched gaseous material stream 162 may be removed from an outlet of the disengagement vessel 320, generally positioned near or at the top of the disengagement vessel 320, and/or from an outlet near or at the top of the melt tank 312.

In an embodiment or in combination with any embodiment mentioned herein, the halogen-depleted molten waste plastic is produced by the liquification system 40 at a rate of at least 2,000, at least 10,000, at least 25,000, at least 50,000, or at least 100,000 pounds per hour.

Figure 6:
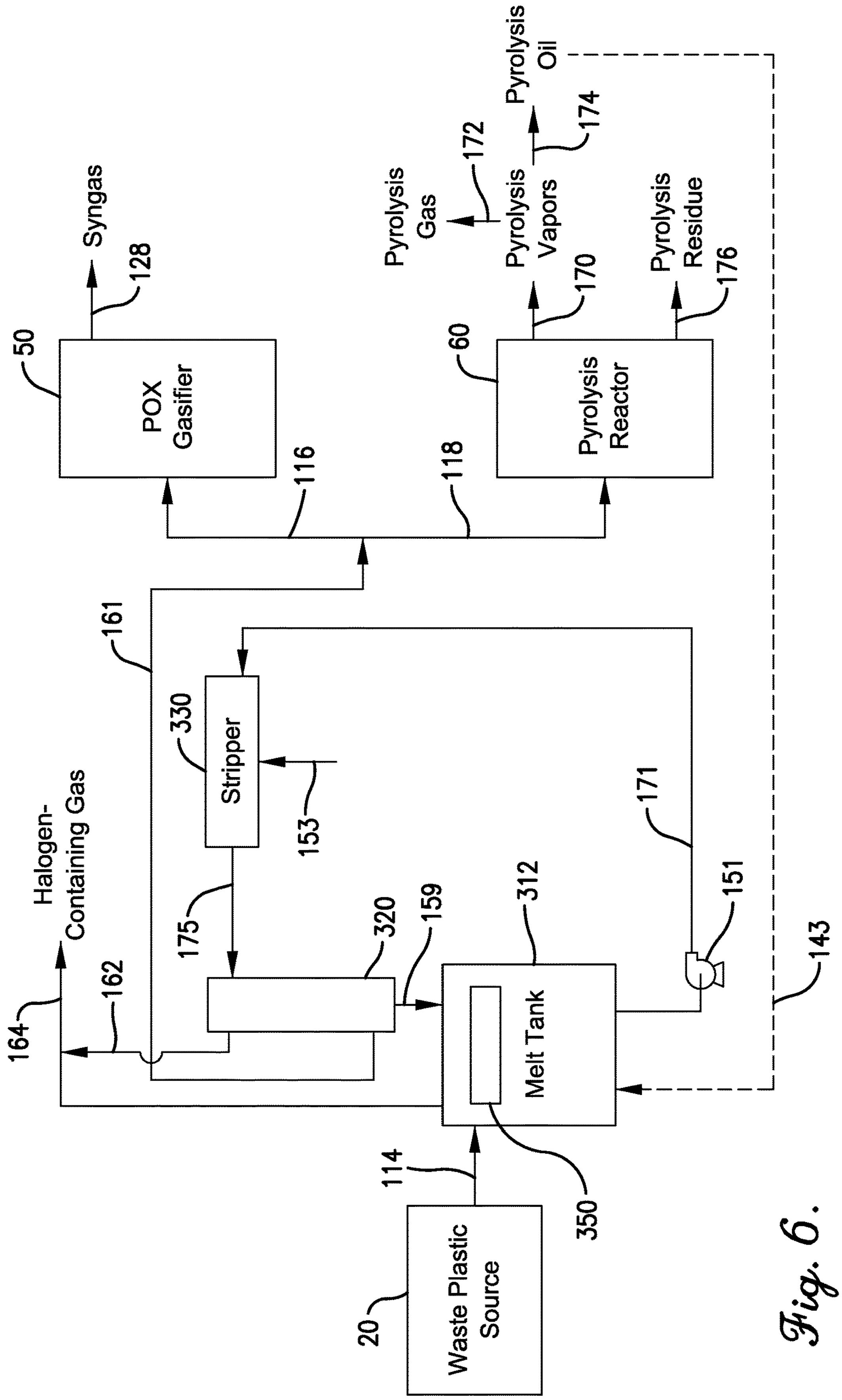
FIG. 6 depicts an exemplary melt tank liquification system according to one embodiment.

FIG. 6 depicts an alternative embodiment of the melt tank system 310 and circulation loop. It should be understood that FIG. 6 depicts one exemplary embodiment of a liquification system 40 in the form of a melt tank system 310. Certain features depicted in FIG. 6 may be omitted and/or additional features described elsewhere herein may be added to the system depicted in FIG. 6. It should be noted that all of the components depicted in FIG. 6 may operate in the same manner as the identical components described above in regard to FIGS. 1, 4, and 5, unless otherwise noted.

FIG. 6 depicts an alternative melt tank configuration that does not contain an external heat exchanger. Rather, in the configuration of FIG. 6, an internal heating system 350 is provided in the melt tank 312 to provide the heat necessary to form the molten waste plastic. In an embodiment or in combination with any embodiment mentioned herein, this internal heating system can take the form of one or more internal heat exchange coils located in the melt tank 312. As shown in FIG. 6, the molten plastic from the melt tank 312 may be transferred via the circulation loop to the stripper 330 to form a two-phase mixture, which may then be separated in the disengagement vessel 320. The resulting halogen-depleted molten plastic may be either reintroduced into the melt tank via line 159 (for additional treatment and/or to provide supplemental heating) and/or sent downstream via line 161 for further processing in the pyrolysis reactor 60 and/or POX gasifier 50.

Figure 7:
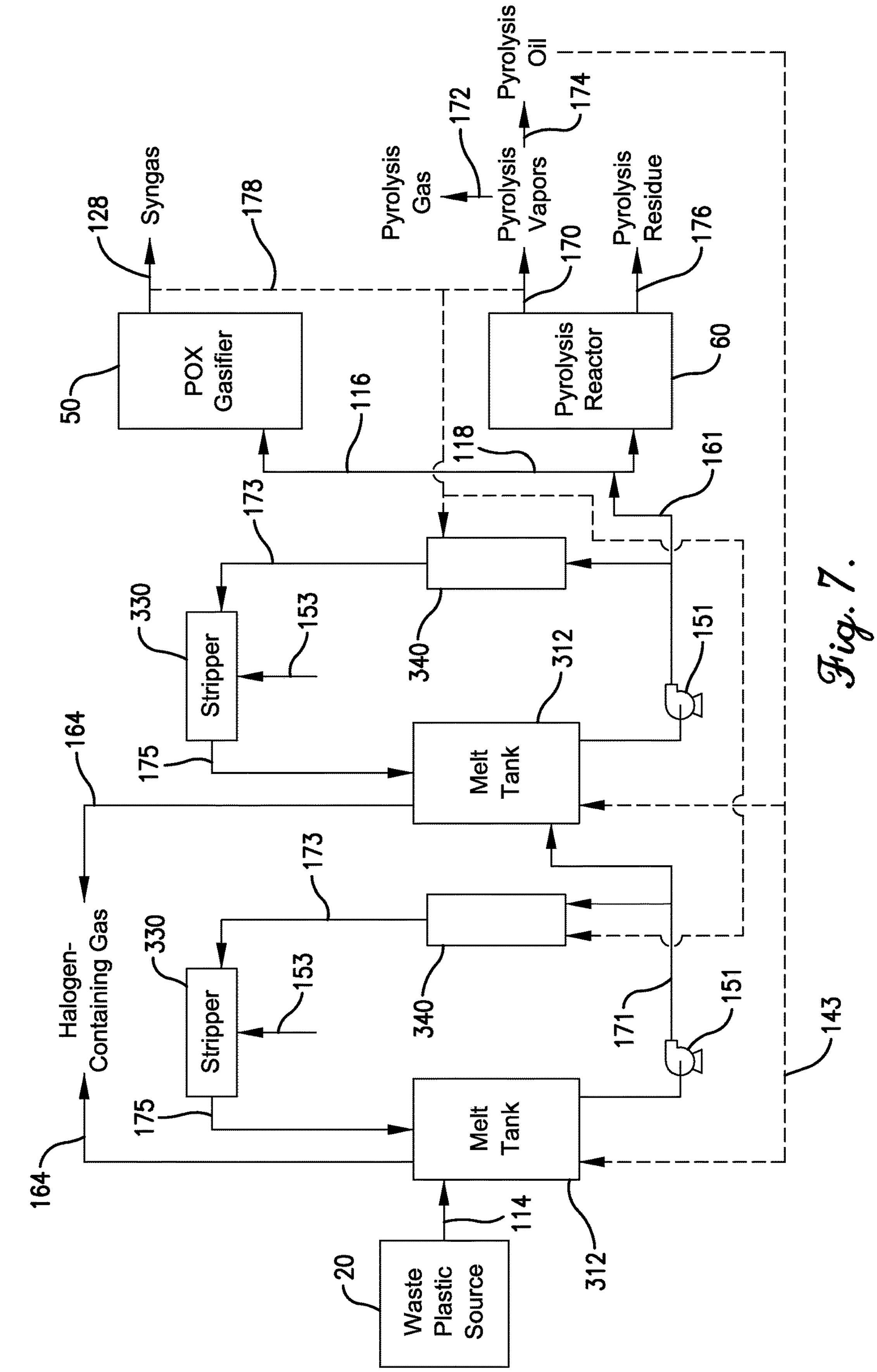
FIG. 7 depicts an exemplary melt tank liquification system according to one embodiment.

FIG. 7 depicts an alternative embodiment of the melt tank system 310 and circulation loop. It should be understood that FIG. 7 depicts one exemplary embodiment of a liquification system 40 in the form of a melt tank system 310. Certain features depicted in FIG. 7 may be omitted and/or additional features described elsewhere herein may be added to the system depicted in FIG. 7. It should be noted that all of the components depicted in FIG. 7 may operate in the same manner as the identical components described above in regard to FIGS. 1 and 4-6, unless otherwise noted.

FIG. 7 depicts an alternative melt tank configuration that does not utilize a disengagement vessel. Rather, in the configuration of FIG. 7, the melt tank system 310 comprises two melt tank circulation loops (lines 171, 173, and 175) placed in series, wherein each melt tank circulation loop comprises a melt tank 312, an external heat exchanger 340, and a stripper 330. The halogen-depleted molten plastic may be formed by sequential treatment in each of these melt tank circulation loops. As shown in FIG. 7, the molten plastic from the melt tank 312 may be transferred via the circulation loop to the heat exchanger 340 to form a heated molten plastic. Afterwards, the heated molten plastic may be sent to the stripper 330 to form a two-phase mixture. Subsequently, this two-phase mixture may then be reintroduced into the melt tank 312, where it may be separated into a halogen-enriched gaseous byproduct stream 164 (and removed from the system) and a halogen-depleted molten liquid stream 171. The resulting halogen-depleted molten plastic may be either recirculated in the first circulation loop and/or sent for additional processing in the second melt tank circulation loop via conduit 161. After sufficient treatment in the second melt tank circulation loop, the resulting halogen-depleted molten waste plastic may be sent downstream for further processing in the pyrolysis reactor 60 and/or POX gasifier 50.

Although FIG. 7 depicts the liquification system as only comprising two melt tank circulation loops, it is feasible for the system to contain more melt tank circulation loops. For example, the liquification system may comprise at least 3, at least 4, at least 5, at least 6, at least 7, or at least 8 melt tank circulation loops either in parallel and/or series.

Figure 8:
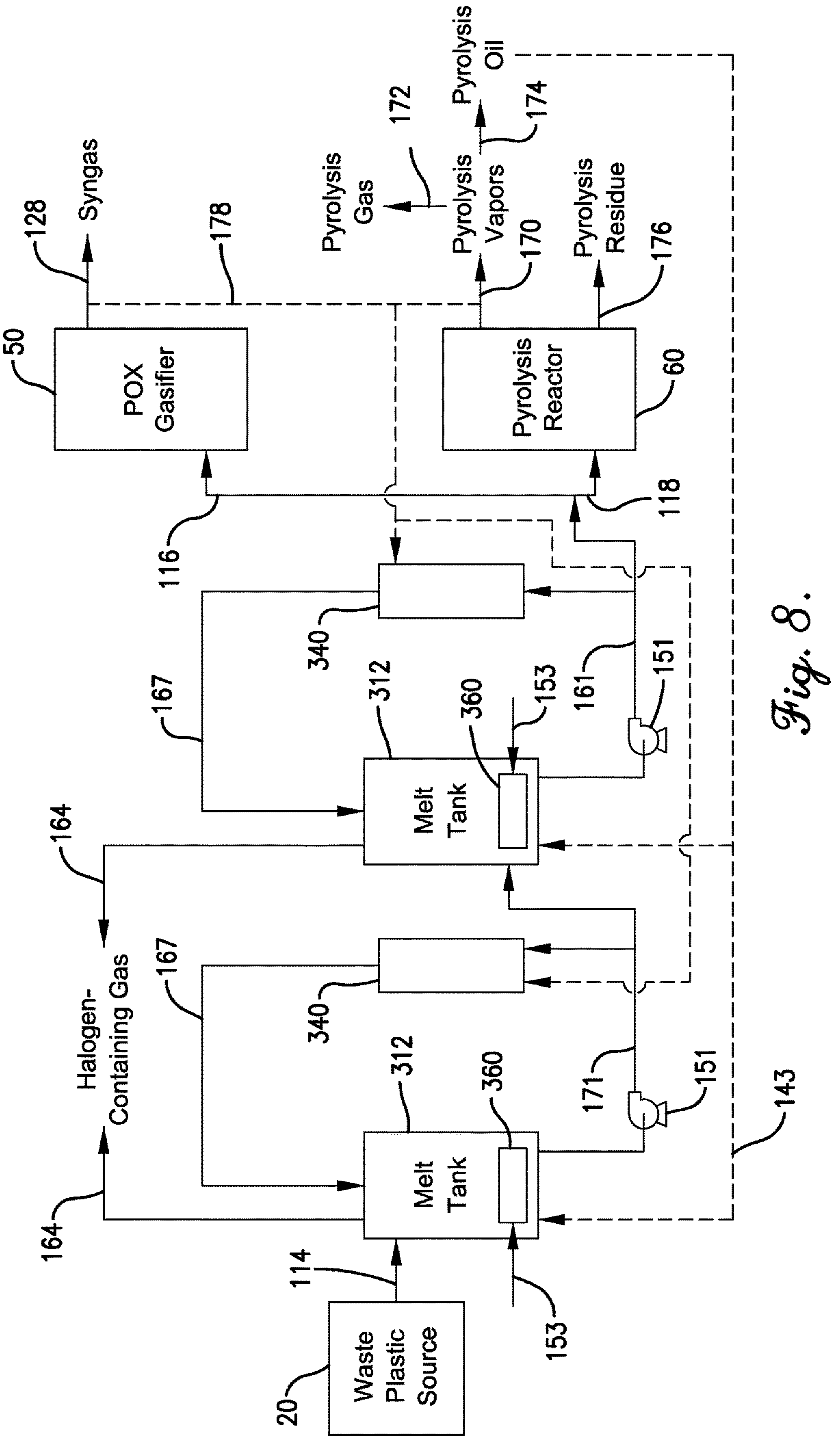
FIG. 8 depicts an exemplary melt tank liquification system according to one embodiment.

FIG. 8 depicts an alternative embodiment of the melt tank system and circulation loop. It should be understood that FIG. 8 depicts one exemplary embodiment of a liquification system 40 in the form of a melt tank system 310. Certain features depicted in FIG. 8 may be omitted and/or additional features described elsewhere herein may be added to the system depicted in FIG. 8. It should be noted that all of the components depicted in FIG. 8 may operate in the same manner as the identical components described above in regard to FIGS. 1 and 4-7, unless otherwise noted.

FIG. 8 depicts an alternative melt tank configuration that does not utilize a disengagement vessel and an external stripper. Rather, in the configuration of FIG. 8, the melt tank configuration comprises two melt tank circulation loops placed in series, wherein each melt tank circulation loop comprises a melt tank 312 and an external heat exchanger 340. Furthermore, each of the melt tanks 312 comprise an internal sparger 360 for introducing a stripping gas stream 153 into the molten waste plastic within the melt tank 312. The halogen-depleted molten plastic may be formed by sequential treatment in each of these melt tank circulation loops.

As shown in FIG. 8, the molten plastic from the melt tank 312 may be transferred via the circulation loop to the heat exchanger 340 to form a heated molten plastic, which may then be returned to the melt tank 312. While in the melt tank 312, the molten waste plastic may be sparged with a stripping gas stream 153 from the internal sparger 360 located in the melt tank 312 in order to form a two-phase mixture. Subsequently, this two-phase mixture may be separated into a halogen-enriched gaseous byproduct stream 164 (and removed from the system) and a halogen-depleted molten liquid. The resulting halogen-depleted molten plastic may be either recirculated in the first circulation loop and/or sent for additional processing in the second melt tank circulation loop. After sufficient treatment in the second melt tank circulation loop, the resulting halogen-depleted molten waste plastic may be sent downstream via conduit 161 for further processing in the pyrolysis reactor 60 and/or POX gasifier 50.

Although FIG. 8 depicts the liquification system as only comprising two melt tank circulation loops, it is feasible for the system to contain more melt tank circulation loops. For example, the liquification system may comprise at least 3, at least 4, at least 5, at least 6, at least 7, or at least 8 melt tank circulation loops either in parallel and/or series.

Figure 9:
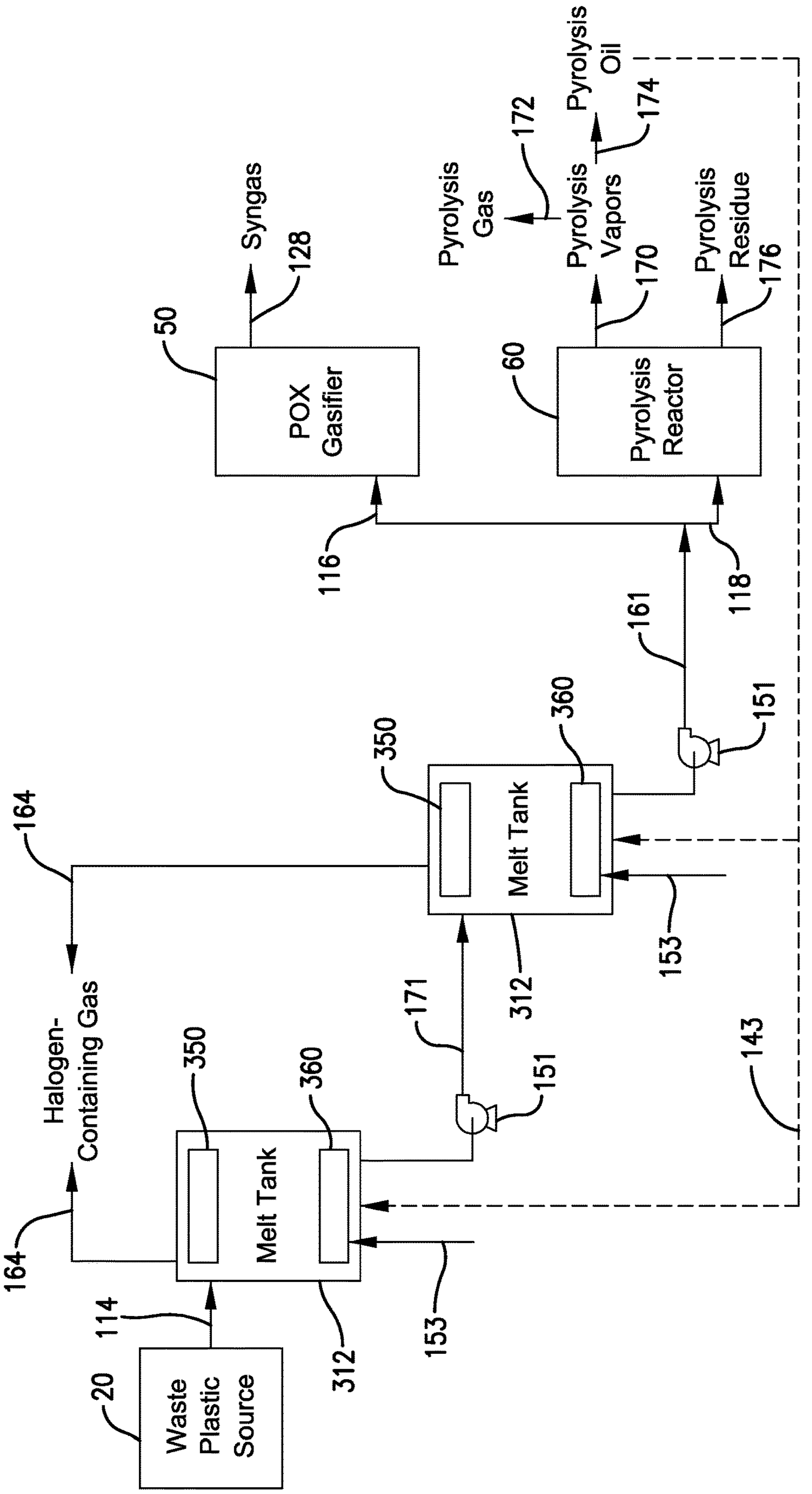
FIG. 9 depicts an exemplary melt tank liquification system according to one embodiment.

FIG. 9 depicts an alternative embodiment of the melt tank system and circulation loop. It should be understood that FIG. 9 depicts one exemplary embodiment of a liquification system 40 in the form of a melt tank system 310. Certain features depicted in FIG. 9 may be omitted and/or additional features described elsewhere herein may be added to the system depicted in FIG. 9. It should be noted that all of the components depicted in FIG. 9 may operate in the same manner as the identical components described above in regard to FIGS. 1 and 4-8, unless otherwise noted.

FIG. 9 depicts an alternative melt tank configuration that does not utilize a disengagement vessel, an external heat exchanger, and an external stripper. Rather, in the configuration of FIG. 9, two melt tanks 312 are placed in series, wherein each melt tank 312 comprises an internal heating system 350 and an internal sparger 360 for introducing a stripping gas stream 153 into the molten waste plastic within the melt tank 312. The halogen-depleted molten plastic may be formed by sequential treatment in each of these melt tanks 312. While in each of the melt tanks 312, the molten waste plastic may be sparged with a stripping gas stream 153 from the internal sparger 360 located in the melt tank 312 in order to form a two-phase mixture. Subsequently, this two-phase mixture may be separated into a halogen-enriched gaseous byproduct stream 164 (and removed from the system) and a halogen-depleted molten liquid. After sufficient treatment in the second melt tank 312, the resulting halogen-depleted molten waste plastic may be sent downstream via conduit 161 for further processing in the pyrolysis reactor 60 and/or POX gasifier 50.

Although FIG. 9 depicts the liquification system as only comprising two melt tanks in series, it is feasible for the system to contain more melt tanks in series. For example, the liquification system may comprise at least 3, at least 4, at least 5, at least 6, at least 7, or at least 8 melt tank circulation loops either in parallel and/or series.

Figure 10:
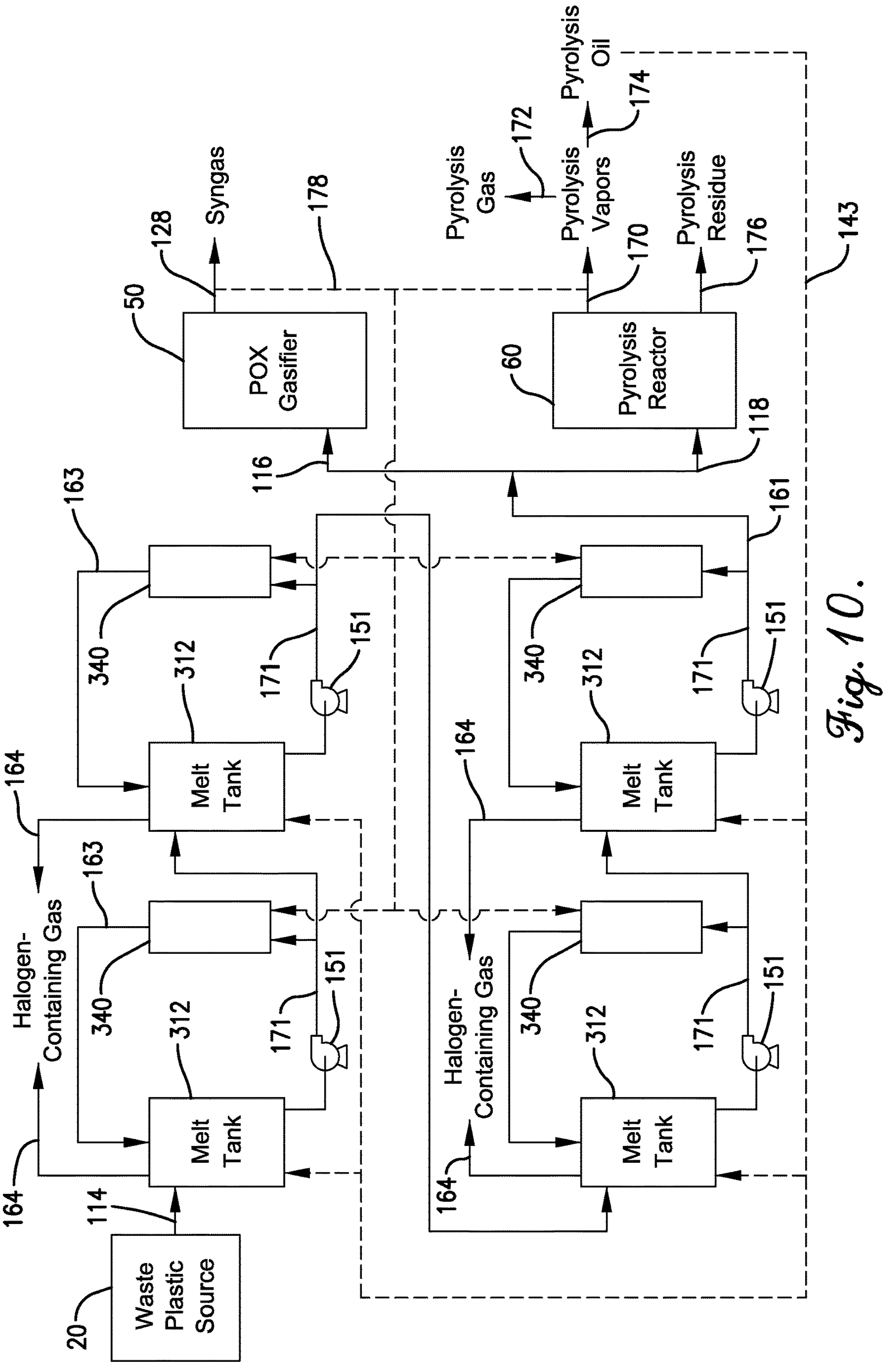
FIG. 10 depicts an exemplary melt tank liquification system according to one embodiment.

FIG. 10 depicts an alternative embodiment of the melt tank system and circulation loop. It should be understood that FIG. 10 depicts one exemplary embodiment of a liquification system 40 in the form of a melt tank system 310. Certain features depicted in FIG. 10 may be omitted and/or additional features described elsewhere herein may be added to the system depicted in FIG. 10. It should be noted that all of the components depicted in FIG. 10 may operate in the same manner as the identical components described above in regard to FIGS. 1 and 4-9, unless otherwise noted.

FIG. 10 depicts an alternative melt tank configuration that does not utilize a disengagement vessel, a stripper, and a sparger. Rather, in the configuration of FIG. 10, the melt tank configuration comprises four melt tank circulation loops placed in series, wherein each melt tank circulation loop comprises a melt tank 312 and an external heat exchanger 340. The halogen-depleted molten plastic may be formed by sequential treatment in each of these melt tank circulation loops. As shown in FIG. 10, the molten plastic from the melt tank 312 may be transferred via the circulation loop to the heat exchanger 340 to form a heated molten plastic, which may then be returned to the melt tank 312. In each melt tank circulation loop, a halogen-enriched gaseous byproduct stream 164 may be formed (and removed from the system) and separated from the molten plastic. The resulting halogen-depleted molten plastic may be either recirculated in the circulation loop and/or sent for additional processing in the next melt tank circulation loop. After sufficient treatment in the fourth melt tank circulation loop, the resulting halogen-depleted molten waste plastic may be sent downstream via conduit 161 for further processing in the pyrolysis reactor 60 and/or POX gasifier 50.

As discussed above, in an embodiment or in combination with any embodiment mentioned herein, at least a portion of the syngas stream 128 from the POX facility 50 and/or at least a portion of the pyrolysis vapors from the pyrolysis facility 60 may be routed via line 178 to any of the external heat exchangers 340 so as to recycle the heat from these streams back into the circulation loops of the liquification system 40.

Although FIG. 10 depicts the system as only comprising four melt tank circulation loops, it is feasible for the system to contain more melt tank circulation loops. For example, the liquification system may comprise at least 3, at least 4, at least 5, at least 6, at least 7, or at least 8 melt tank circulation loops either in parallel and/or series.

Figure 11:
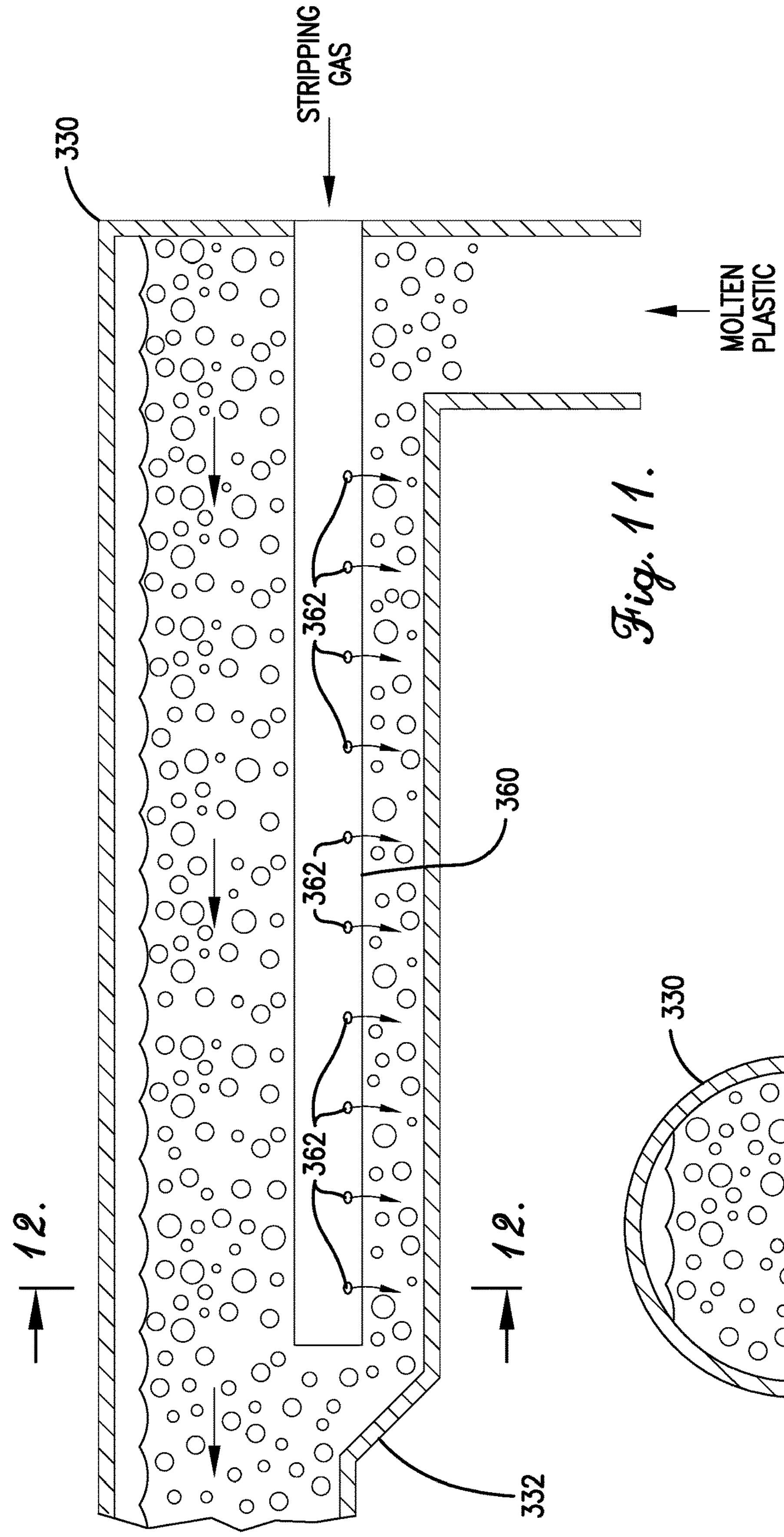
FIG. 11 depicts an exemplary external stripper for the liquification system.
Figure 12:
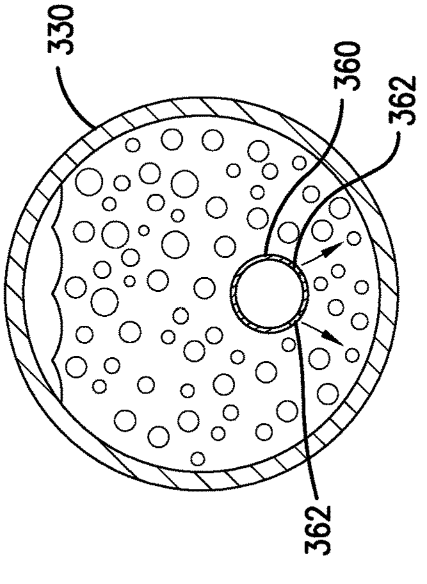
FIG. 12 depicts an exemplary external stripper for the liquification system.

FIGS. 11 and 12 depict an exemplary external stripper 330 that may be used in the liquification system 40, particularly the melt tank system 310 described herein. It should be understood that FIGS. 11 and 12 depict one exemplary embodiment of a stripper 330. Certain features depicted in FIGS. 11 and 12 may be omitted and/or additional features described elsewhere herein may be added to the stripper 330 depicted in FIGS. 11 and 12. It should also be noted that this external stripper 330 may operate in the same manner as the stripper 330 described above in regard to FIGS. 4-10, unless otherwise noted.

FIG. 11 depicts an exemplary stripper 330 that may be used in the liquification system 40, such as the melt tank system 310 described herein. FIG. 12 depicts a cross-sectional view of the stripper 330 depicted in FIG. 11. As shown in FIG. 11, the molten plastic may be introduced into the stripper 330 via a conduit in the circulation loop. While in the stripper 330, a stripping gas may be introduced into the molten plastic via a sparger tube 360 that comprises a plurality of gas distribution apertures 362. As shown in FIGS. 11 and 12, the level of the molten plastic is maintained above the sparger tube 360 so as to facilitate the distribution of the stripping gas into the molten plastic.

As depicted in FIGS. 11 and 12, the sparging of the stripping gas into the molten liquid results in the formation of a two-phase mixture comprising a gaseous phase and a liquid phase. Furthermore, the outlet of the stripper may comprise a constricted section 332 (as shown in FIG. 11) to thereby regulate the flow of the two-phase mixture from the stripper. Alternatively, and not depicted in FIG. 11, this constricted section 332 may be in the form of a weir.

As shown in FIG. 12, the positioning of the sparger apertures 362 may be positioned below the lateral axis of the sparger tube 360 at a defined angle relative to the lateral axis of the sparger tube. For example, the sparger apertures 362 may be positioned below the lateral axis of the sparger tube 360 at an angle of at least 10, at least 20, at least 30, or at least 40 and/or not more than 90, not more than 80, not more than 70, not more than 60, or not more than 50 degrees relative to the horizontal axis. Generally, in certain embodiments, the sparger apertures 362 may be positioned below the lateral axis of the sparger tube 360 at an angle of 10 to 90 degrees, 20 to 80 degrees, 30 to 70 degrees, or 40 to 60 degrees.

Figure 13:
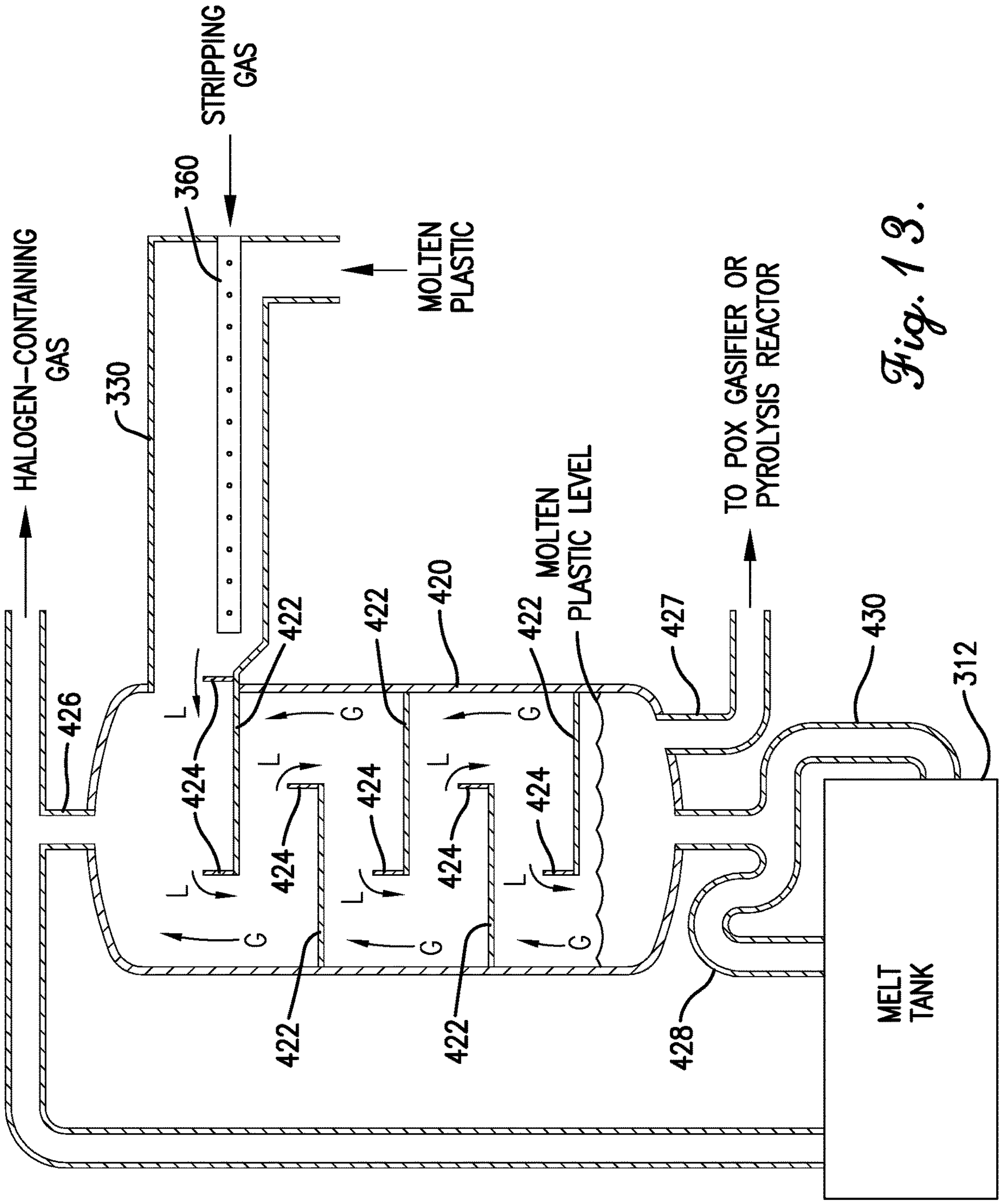
FIG. 13 depicts an exemplary disengagement vessel for the liquification system.

Turning to the disengagement vessel 320, FIG. 13 depicts an exemplary configuration containing a stripper 330 and a multistage disengagement vessel 420 that may be used in the liquification system 40, such as the melt tank system 310 described herein. It should be understood that FIG. 13 depicts one exemplary embodiment of a stripper 330 and disengagement vessel 420 configuration that may be used. Certain features depicted in FIG. 13 may be omitted and/or additional features described elsewhere herein may be added to the stripper 330 and disengagement vessel configuration 430 depicted in FIG. 13. It should also be noted that the disengagement vessel 420 and stripper 330 may operate in the same manner as the disengagement vessel 320 and stripper 330 described above in regard to FIGS. 4-12, unless otherwise noted.

As shown in FIG. 13, the two-phase mixture from the stripper may be introduced into a multistage disengagement vessel 420, which is depicted as a gravity-flow, multi-level, tray-containing vessel. The two-phase medium formed in the stripper 330 can be flowed (e.g., by gravity) through the multiple levels of the disengagement vessel 420, which are defined by separate trays 422, as shown in FIG. 13. While flowing between the multiple tray levels 422 in the disengagement vessel 420, the halogen-enriched gaseous phase (G) may be disengaged from the halogen-depleted molten plastic phase (L). The flow of the two-phase mixture may be controlled via the use of weirs 424 on each tray 422, as shown in FIG. 13.

As depicted in FIG. 13, the halogen-enriched gaseous phase (G) may exit the top of the disengagement vessel 420, while the halogen-depleted molten plastic phase (L) may be collected at the bottom of the vessel via alternative piping configurations. As shown in FIG. 13, the piping from the bottom of the disengagement vessel 420 can be configured so as to introduce at least a portion of the liquefied plastic into the top of the melt tank 312 via conduit 428 and/or at the bottom of the melt tank 312 via conduit 430. Thus, the halogen-depleted molten plastic phase may be reintroduced into the melt tank 312. Additionally, or alternatively, at least a portion of the halogen-depleted molten plastic phase may be sent to downstream processing at a pyrolysis reactor and/or POX gasifier via conduit 427.

Although FIG. 13 depicts the multistage disengagement vessel 420 as having five separate stages or trays 422, it is possible for the multistage disengagement vessel 420 to have a different number of stages or trays 422. For example, the multistage disengagement vessel 420 may comprise at least 2, at least 3, at least 4, at least 5, at least 6, at least 7, at least or 8 and/or not more than 30, not more than 25, not more than 20, not more than 15, or not more than 10 stages or trays 422. Generally, in certain embodiments, the multistage disengagement vessel 420 may comprise 2 to 30 trays, 4 to 25 trays, 5 to 20 trays, or 8 to 15 trays.

Figure 14:
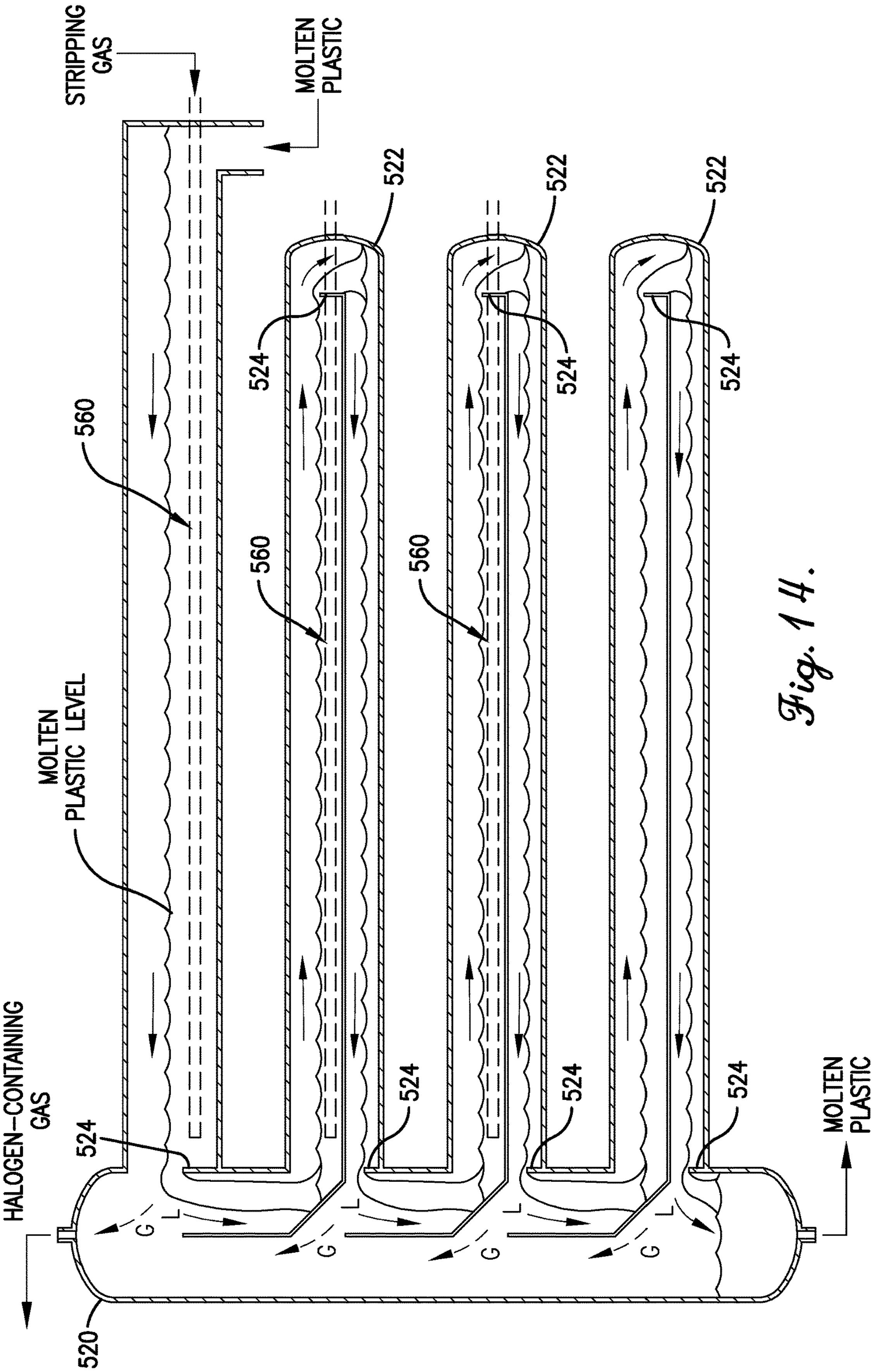
FIG. 14 depicts an exemplary disengagement vessel for the liquification system.

FIG. 14 depicts an alternative embodiment of the disengagement vessel 320 that may be used in the liquification system 40, such as the melt tank system 310 described herein. It should be understood that FIG. 14 depicts one exemplary embodiment of a disengagement vessel 520. Certain features depicted in FIG. 14 may be omitted and/or additional features described elsewhere herein may be added to the vessel 520 depicted in FIG. 14. It should also be noted that the disengagement vessel 520 may operate in the same manner as the disengagement vessel 320 described above in regard to FIGS. 4-12, unless otherwise noted.

As shown in FIG. 14, the disengagement vessel 520 can be in the form of a finger vessel, which is another gravity-flow, multi-level, tray-containing vessel. The finger vessel 520 of FIG. 14 may function in a similar manner to the disengagement vessel 420 depicted in FIG. 13. As depicted in FIG. 14, the molten plastic is introduced into the top level (or "finger") 522 of the vessel 520 and allowed to flow (e.g., by gravity) through the multiple levels (i.e., fingers) 522 of the vessel 520. While flowing between the multiple levels 522 in the vessel 520, the halogen-enriched gaseous phase (G) may be disengaged from the halogen-depleted molten plastic phase (L). The flow of the two-phase mixture may be controlled via the use of weirs 524 on each finger 522, as shown in FIG. 14.

As depicted in FIG. 14, the halogen-enriched gaseous phase (G) may exit the top of the finger vessel 520, while the halogen-depleted molten plastic phase (L) may be collected at the bottom of the vessel. Afterwards, the halogen-depleted molten plastic phase may be reintroduced into the melt tank and/or sent to downstream processing at a pyrolysis reactor and/or POX gasifier.

In an embodiment or in combination with any embodiment mentioned herein, and as depicted in FIG. 14, each of the fingers 522 in the vessel 520 may comprise an optional sparger 560 to distribute a stripping gas into the molten plastic, thereby increasing the formation of a two-phase mixture in the vessel. It is envisioned that only a single finger 522 may comprise a sparger 560, some of the fingers 522 may comprise a sparger 560, or all of the fingers 522 may comprise a sparger 560. The sparger 560 may operate in the same manner as the sparger 360 described in FIGS. 11 and 12, unless otherwise noted.

An exemplary finger vessel and system are described in U.S. Pat. No. 7,872,089, the entire disclosure of which is incorporated by reference to the extent not inconsistent with the present disclosure.

Although FIG. 14 depicts the finger vessel 520 as having four separate stages or fingers 522, it is possible for the finger vessel 520 to have a different number of stages or fingers 522. For example, the finger vessel 520 may comprise at least 2, at least 3, at least 4, at least 5, at least 6, at least 7, or at least 8 and/or not more than 30, not more than 25, not more than 20, not more than 15, or not more than 10 stages or fingers 522. Generally, in certain embodiments, the finger vessel 520 may comprise 2 to 30, 3 to 25, 4 to 20, 5 to 15, or 6 to 10 stages or fingers 522.

In an embodiment or in combination with any embodiment mentioned herein, the liquified molten plastic stream exiting the liquification system 40, such as the melt tank system 310, can have a viscosity of less than 3,000, less than 2,500, less than 2,000, less than 1,500, less than 1,000, less than 800, less than 750, less than 700, less than 650, less than 600, less than 550, less than 500, less than 450, less than 400, less than 350, less than 300, less than 250, less than 150, less than 100, less than 75, less than 50, less than 40, less than 30, less than 25, less than 20, less than 10, less than 5, less than 4, less than 3, less than 2, or less than 1 poise and/or at least 0.1, at least 0.2, or at least 0.5 poise, as measured using a Brookfield R/S rheometer with V80-40 vane spindle operating at a shear rate of 10 rad/s and a temperature of 350° C. For example, the liquified molten plastic stream exiting the liquification system 40, such as the melt tank system 310, can have a viscosity of 0.1 to 3,000 poise, 0.1 to 800 poise, 0.1 to 500 poise, 0.1 to 250 poise, 0.1 to 75 poise, 0.1 to 50 poise, 0.1 to 10 poise, 0.1 to 5 poise, or 0.1 to 1 poise, as measured using a Brookfield R/S rheometer with V80-40 vane spindle operating at a shear rate of 10 rad/s and a temperature of 350° C.

In an embodiment or in combination with any embodiment mentioned herein, the viscosity (measured at 350° C. and 10 rad/s and expressed in poise) of the liquified plastic stream exiting the liquification system 40, such as the melt tank system 310, is not more than 95, not more than 90, not more than 75, not more than 50, not more than 25, not more than 10, not more than 5, or not more than 1 percent of the viscosity of the waste plastic stream introduced into the liquification system 40.

In an embodiment or in combination with any embodiment mentioned herein, the halogen-depleted molten waste plastic exiting the liquification system 40, such as the melt tank system 310, can have a halogen content of less than 500, less than 400, less than 300, less than 200, less than 100, less than 50, less than 10, less than 5, less than 2, less than 1, less than 0.5, or less than 0.1 ppmw.

In an embodiment or in combination with any embodiment mentioned herein, the halogen content of the liquified plastic stream exiting the liquification system 40, such as the melt tank system 310, is not more than 95, not more than 90, not more than 75, not more than 50, not more than 25, not more than 10, or not more than 5 percent by weight of the halogen content of the waste plastic stream introduced into the liquification system 40.

In an embodiment or in combination with any embodiment mentioned herein, the feed stream to one or more of the downstream chemical recycling facilities from the liquification system 40, such as the melt tank system 310, can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of one or more solvolysis coproduct streams, based on the total weight of the feed stream introduced into the downstream processing facility or facilities. For example, the feed streams 116, 118, 120, and 122 to each of the POX facility 50, the pyrolysis facility 60, the cracking facility 70, the energy recovery facility 80, and/or any other facility 90 of the chemical recycling facility 10 may include PO-enriched waste plastic and an amount of one or more solvolysis coproducts described herein.

Additionally, or in the alternative, the feed stream to the pyrolysis facility 60, the POX facility 50, the cracking facility 70, the energy recovery facility 80, and/or any other facility 90 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of one or more solvolysis coproduct streams, based on the total weight of the feed stream introduced into the downstream processing facility or facilities.

Alternatively, or in addition, the liquified (or reduced viscosity) plastic stream withdrawn from the liquification system 40, such as the melt tank system 310, can include at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent and/or not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, not more than 20, not more than 15, not more than 10, not more than 5, not more than 2, or not more than 1 weight percent of polyolefins, based on the total weight of the stream, or the amount of polyolefins can be in the range of from 1 to 95 weight percent, 5 to 90 weight percent, or 10 to 85 weight percent, based on the total weight of the stream.

As shown in FIG. 1, at least a portion of a PO-enriched plastic stream from the preprocessing facility 20 and/or from liquification system 40 (alone or in combination with one or more solvolysis coproduct streams) may be introduced into one or more of the downstream processing facilities including, for example, the pyrolysis facility 60, the cracking facility 70, the POX gasification facility 50, the energy recovery facility 80, and any of the other optional facilities 90 as discussed in detail herein.

As shown in FIGS. 4-11, at least a portion of the halogen-depleted liquified waste plastic from the liquification system (e.g., melt tank system) may be introduced into a downstream POX gasifier at a POX gasification facility to produce a syngas composition and/or a downstream pyrolysis reactor at a pyrolysis facility to produce pyrolysis vapors (i.e., pyrolysis gas and pyrolysis oil) and pyrolysis residue. These processes are described below in greater detail.

Pyrolysis

In an embodiment or in combination with any embodiment mentioned herein, the chemical recycling facility 10 generally depicted in FIG. 1 may comprise a pyrolysis facility. As used herein the term "pyrolysis" refers to the thermal decomposition of one or more organic materials at elevated temperatures in an inert (i.e., substantially oxygen free) atmosphere. A "pyrolysis facility" is a facility that includes all equipment, lines, and controls necessary to carry out pyrolysis of waste plastic and feedstocks derived therefrom.

Figure 15:
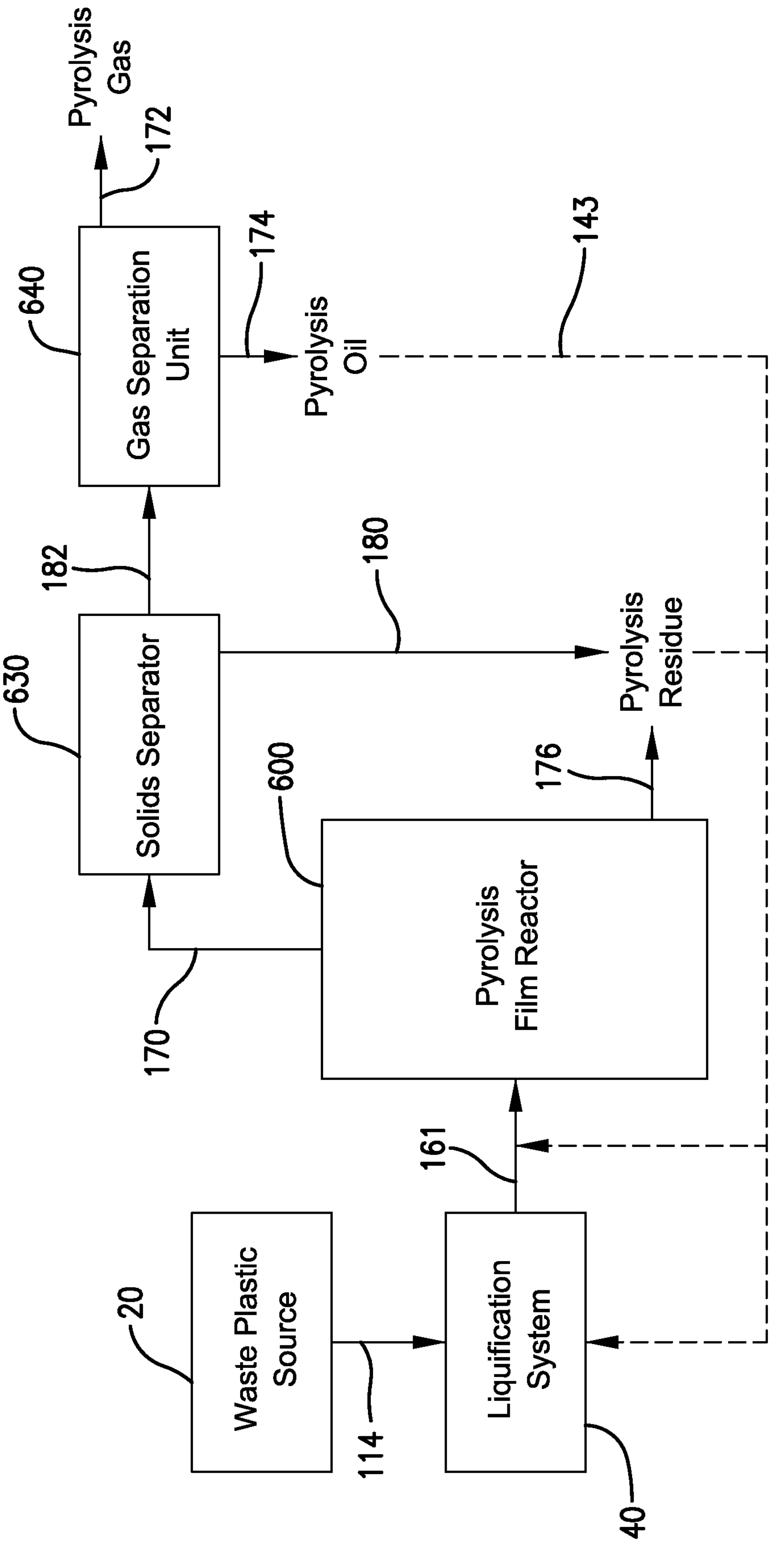
FIG. 15 depicts an exemplary pyrolysis facility with a liquification system and pyrolysis film reactor.

FIG. 15 depicts an exemplary pyrolysis facility for converting a waste plastic, such as the liquefied waste plastic from liquification zone 40, into a pyrolysis gas, a pyrolysis oil, and a pyrolysis residue. It should be understood that FIG. 15 depicts one exemplary embodiment of the present technology. Thus, certain features depicted in FIG. 15 may be omitted and/or additional features described elsewhere herein may be added to the system depicted in FIG. 15.

In general, and as depicted in FIG. 15, the pyrolysis facility includes a pyrolysis film reactor 600, along with a solids separator 630 (e.g., a filter system, a multistage separator, a condenser, and/or a quench tower) and a gas separation unit 640 (e.g., a filter system, a multistage separator, a condenser, and/or a quench tower) for separating the pyrolysis effluent stream 170 into a pyrolysis residue stream 180, a pyrolysis oil stream 174, and a pyrolysis gas stream 172. While in the pyrolysis reactor 600, at least a portion of the feed stream 161 from the liquification system 40 may be subjected to a pyrolysis reaction that produces a pyrolysis effluent stream 170 comprising the pyrolysis oil, the pyrolysis gas, and the pyrolysis residue.

As used herein, the term "pyrolysis gas" refers to a composition obtained from pyrolysis that is gaseous at 25° C. at 1 atm. As used herein, the term "pyrolysis oil" or "pyoil" refers to a composition obtained from pyrolysis that is liquid at 25° C. and 1 atm. As used herein, the term "pyrolysis residue" refers to a composition obtained from pyrolysis that is not pyrolysis gas or pyrolysis oil and that comprises predominantly pyrolysis char and pyrolysis heavy waxes. As used herein, the term "pyrolysis char" refers to a carbon-containing composition obtained from pyrolysis that is solid at 200° C. and 1 atm. As used herein, the term "pyrolysis heavy waxes," refers to C20+ hydrocarbons obtained from pyrolysis that are not pyrolysis char, pyrolysis gas, or pyrolysis oil.

In an embodiment or in combination with any embodiment mentioned herein, a feed stream 161 to the pyrolysis facility may comprise at least one of one or more solvolysis coproduct streams as described previously, a PO-enriched stream of waste plastic, and combinations thereof. Additionally, or alternatively, one or more of these streams may be introduced into the pyrolysis facility continuously or one or more of these streams may be introduced intermittently. When multiple types of feed streams are present, each may be introduced separately or all or a portion of the streams may be combined so that the combined stream may be introduced into the pyrolysis facility. The combining, when performed, may take place in a continuous or batch manner. The feed introduced into the pyrolysis facility can be in the form of liquified plastic (e.g., liquefied, plasticized, depolymerized, or combinations thereof), plastic pellets or particulates, or a slurry thereof.

In an embodiment or in combination with any embodiment mentioned herein, and as shown in FIG. 15, the feed stream 161 to the pyrolysis facility may be derived from the liquification system 40 described herein. For example, the feed stream 161 to the pyrolysis facility may comprise or consist of a liquefied plastic feed stream, such as a halogen-depleted molten waste plastic, that has been derived from the liquification system 40 described herein. Thus, any of the plastic feeds processed and described above in regard to the liquification system 40, including the melt tank system 310, may be fed and introduced into the pyrolysis facility.

Furthermore, as shown in FIG. 15, at least a portion of the pyrolysis oil stream 174 formed by the pyrolysis film reactor 600 may be introduced via line 143 into the liquification system 40 to serve as a dissolution solvent, as previously discussed. Additionally, or in the alternative, at least a portion of the pyrolysis residue streams 176 and 180 and/or the pyrolysis oil stream 174 may be introduced via conduit 143 into the feed stream 161 being fed into the pyrolysis film reactor 600, so that these streams my undergo additional conversion.

In an embodiment or in combination with any embodiment mentioned herein, the feed stream 161 to the pyrolysis facility comprises a halogen-depleted molten waste plastic having a halogen content of less than 500, less than 400, less than 300, less than 200, less than 100, less than 50, less than 10, less than 5, less than 2, less than 1, less than 0.5, or less than 0.1 ppmw.

In an embodiment or in combination with any embodiment mentioned herein, the liquefied plastic feed stream 161 to the pyrolysis facility comprises at least 10, at least 15, at least 25, at least 50, at least 75, or at least 90 and/or not more than 99, not more than 98, not more than 95, not more than 90, not more than 85, not more than 80, not more than 75, not more than 70, not more than 65, not more than 60, not more than 55, not more than 50, not more than 45, not more than 40, not more than 35, or not more than 30 weight percent of one or more polyolefins. Additionally, or in the alternative, the liquefied plastic feed stream to the pyrolysis facility comprises not more than 20, not more than 15, not more than 10, not more than 5, not more than 4, not more than 3, not more than 2, not more than 1, not more than 0.1, or not more than 0.01 weight percent of PET and/or PVC.

Pyrolysis is a process that involves the chemical and thermal decomposition of the introduced feed. Although all pyrolysis processes may be generally characterized by a reaction environment that is substantially free of oxygen, pyrolysis processes may be further defined, for example, by the pyrolysis reaction temperature within the reactor, the residence time in the pyrolysis reactor, the reactor type, the pressure within the pyrolysis reactor, and the presence or absence of pyrolysis catalysts.

In an embodiment or in combination with any embodiment mentioned herein, the pyrolysis reactor can be, for example, a film reactor, a screw extruder, a tubular reactor, a tank, a stirred tank reactor, a riser reactor, a fixed bed reactor, a fluidized bed reactor, a rotary kiln, a vacuum reactor, a microwave reactor, or an autoclave.

In an embodiment or in combination with any embodiment mentioned herein, and as shown in FIG. 15, the pyrolysis reactor comprises a film reactor 600, such as a falling film reactor, a wiped film reactor, a structured packing reactor, a screen reactor, a parallel wires reactor, a vacuum film reactor, a perforated plate reactor, and/or an upflow tubular reactor.

The film reactors 600 may be configured to receive the liquefied plastic feed stream 161 (e.g., a molten waste plastic) and allow the liquefied plastic feed to flow in a fixed direction (e.g., upwardly or downwardly) along stationary film-generating structures within the reactor 600 under certain temperature and pressure conditions to thereby pyrolyze the liquefied waste plastic and form a pyrolysis effluent stream 170 comprising a pyrolysis gas and a pyrolysis oil. During the pyrolysis reaction, the flowing liquefied plastic feed may at least partially coat the stationary film-generating structures and thereby form thin films, bubbles, and/or granules on these structures. The flow rate of the liquefied plastic feed per film-generating structure (e.g., a tube) can be at least 0.1, at least 0.5, at least 1, at least 2, at least 3, or at least 5 and/or not more than 500, not more than 400, not more than 300, not more than 200, not more than 100, or not more than 50 liters per hour, or 0.1 to 500, 0.5 to 400, or 5 to 200 liters per hour. Generally, the flow rate of the liquefied plastic feed may be maintained so as to facilitate film formation on the film-generating structures. Feed flow rates that are too high may negatively impact film formation on the stationary film-generating structures.

In an embodiment or in combination with any embodiment mentioned herein, the stationary film-generating structures comprise tubes, wires, plates (e.g., parallel plates), rings, saddles, sheets, grids, screens, and/or nets. Additionally, or in the alternative, in one or more embodiments, the stationary film-generating structures comprise plates and/or tubes with geometrically-shaped perturbances. It should be noted that the geometric shapes of these perturbances are not limited and may include, for example, triangular-shaped, squared shaped, and/or rectangular-shaped perturbances.

An advantage of a film reactor 600 is that moving, mechanical parts (e.g., agitators) are generally not required within the film reactor to generate formation of the films on the stationary film-generating structures. Instead, the film reactor is generally designed to promote passive surface-area generation of the film on the stationary film-generating structures to thereby facilitate the pyrolysis reaction.

The pyrolysis film reactor 600 may comprise only a single falling film reactor or, alternatively, may comprise two or more pyrolysis film reactors in series or parallel.

Exemplary falling film reactors that may be used for the pyrolysis reactors are described in Chinese Patent No. CN203582812U, U.S. Patent Application Publication No. 2009/0093600; U.S. Patent Application Publication No. 2006/0251547; and U.S. Pat. No. 7,453,393, the entire disclosures of which are incorporated herein by reference to the extent not inconsistent with the present disclosure.

Figure 16:
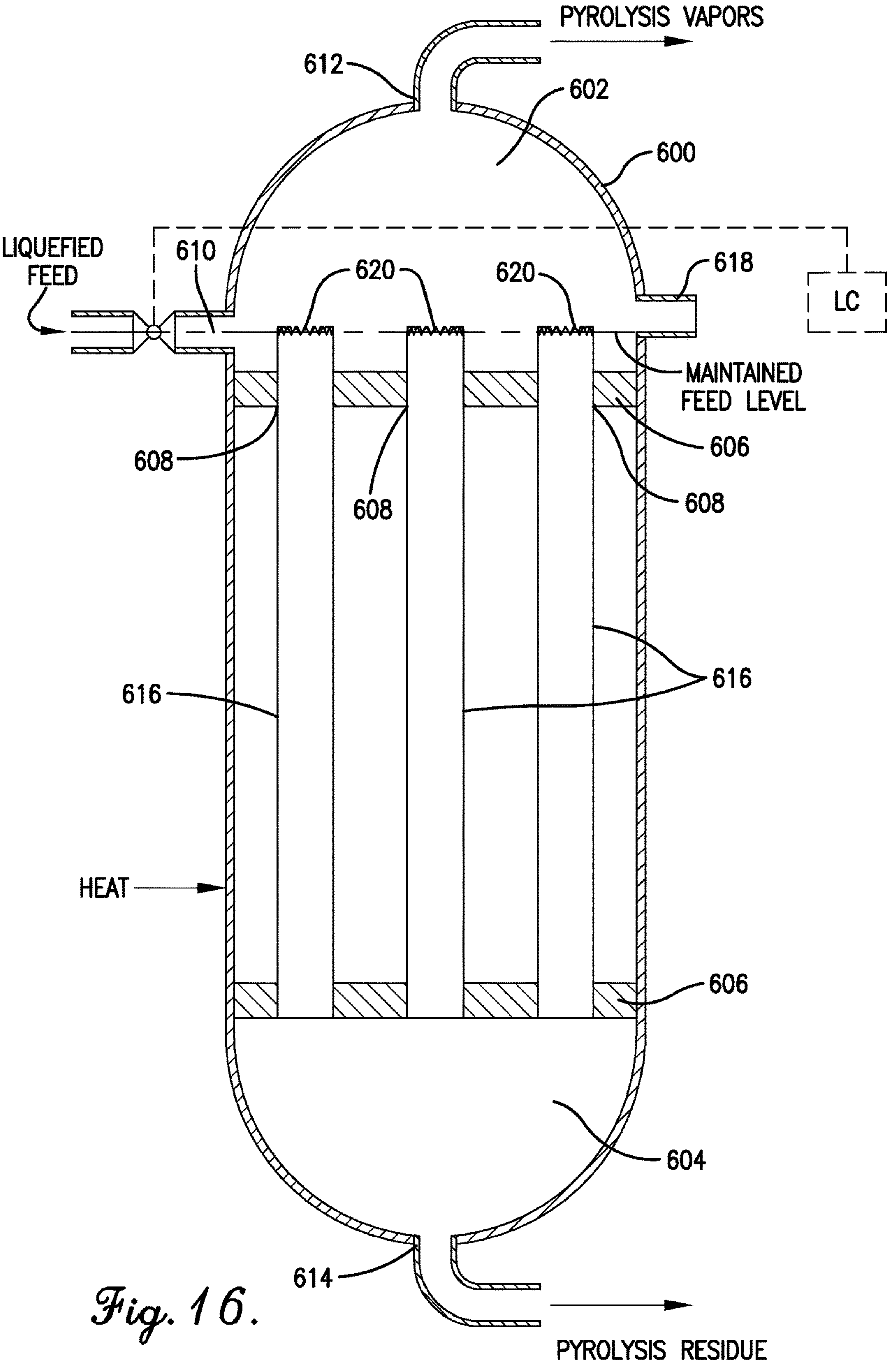
FIG. 16 depicts an exemplary falling film pyrolysis reactor.

FIG. 16 depicts an exemplary falling film pyrolysis reactor 600 that may be used as the pyrolysis film reactor. It should be understood that FIG. 16 depicts one exemplary embodiment of a falling film reactor. Certain features depicted in FIG. 16 may be omitted and/or additional features described elsewhere herein may be added to the reactor depicted in FIG. 16. It should also be noted that falling film reactor 600 may operate in the same manner as the falling film reactor described above in regard to FIG. 15, unless otherwise noted.

As shown in FIG. 16, the falling film reactor comprises a reaction section disposed between a top feeding section 602 and bottom pooling section 604. The top feeding section 602 and the bottom pooling section 604 may be divided from the reaction section via foraminous plates 606. The foraminous plates 606 may comprise a plurality of apertures 608. The geometric morphology of the apertures 608 is not particularly limiting and the apertures 608 may have any geometrical shape (e.g., a circle, a rectangle, an ellipse, etc.). The feeding section 602 also comprises an inlet 610 for the liquefied plastic feed and an outlet 612 for the pyrolysis vapors, which includes the pyrolysis gas and the vaporized pyrolysis oil. Likewise, the bottom pooling section 604 comprises an outlet 614 for the pyrolysis residue.

The reaction section can comprise one or more film-generating structures 616, which are depicted as a plurality of tubes 616 in FIG. 16, that may be positioned at and between the apertures 608 within the foraminous plates 606. As noted above, the foraminous plates 606 may comprise a plurality of apertures 608 and each of these apertures 608 may be associated with a film-generating structure 616. Although tubes 616 are depicted in FIG. 16, it is envisioned that other film-generating structures 616 may be used instead.

Furthermore, in an embodiment or in combination with any embodiment mentioned herein, the falling film reactor 60 may comprise more than three tubes 616, such as depicted in FIG. 16. For example, the falling film reactor 600 may comprise at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 and/or not more than 500, not more than 400, not more than 300, not more than 200, or not more than 100 film-generating structures 616, or 2 to 500, 3 to 400, 5 to 200, or 10 to 100 film-generating structures 616.

The size and length of the tubes 616 are not particularly limited and any size and length may be used as necessary. For example, the tubes 616 could have a vertical length in the range of 0.5 to 50 m, 1 to 40 m, or 2 to 30 m.

As depicted in FIG. 16, a liquefied plastic (e.g., a molten waste plastic) may be introduced into the top feeding section 602 of the reactor 600 and allowed to flow (via gravity or pressurized flow via a pump) in a downward direction down the tube 616 interiors. When falling down the tubes 616, the liquefied plastic feed may free-fall and form films, bubbles, or granules along the interior walls of the tubes 616. Due to the temperature and pressure conditions within the reactor 600, these formed thin films, bubbles, and/or granules may be effectively pyrolyzed. As the liquefied waste plastic pyrolyzes, the resulting pyrolysis vapors (which are predominantly formed from the non-condensable pyrolysis gas and the vaporized pyrolysis oil) exit at the top of the falling film reactor, while the pyrolysis residue flows down the tubes to the bottom pooling section, where it may be removed.

The heat provided to the falling film reactor may be provided by external or internal sources, such as interior or exterior heating coils, a heating jacket, and/or the injection of a heat-providing medium (e.g., steam) into the reactor. An exemplary external source could involve placing the falling film reactor 600 within a furnace vessel.

The rate that the liquefied plastic feed is introduced into the reactor 600 may be regulated by an overflow outlet 618, as shown in FIG. 16, the bottom of which may be aligned with the desired height at which one is trying to maintain the plastic feed level in the unit. The excess plastic feed may exit the reactor 600 via the overflow outlet 618 and be sent into an external feed tank (not shown), where it can be recycled back to the feed inlet of the reactor.

Additionally, or in the alternative, the reactor may comprise an optional Level Control (LC) device. Generally, the flow rate of the liquefied plastic feed into the falling film reactor 600 is regulated so as to maintain a constant mass flow rate and promote effective surface-area generation (i.e., film formation) in a way that avoids overflowing the film-generating structures 616 (e.g., the tubes). It is important to maintain the feed rate into the pyrolysis reactor 600 at a specific and designated rate since introducing too much feed into the feed section 602 at once may negatively affect the formation of films within the tubes 616. The flow rate may be largely influenced by the number and shape of the stationary film-generating structures 616, the size of the apertures 608 in the foraminous plate 606, the size of the reactor 600, and the viscosity of the liquefied plastic feed. The flow rate of the liquefied plastic feed per film-generating structure 616 (e.g., tube) can be at least 0.1, at least 0.5, at least 1, at least 2, at least 3, or at least 5 and/or not more than 500, not more than 400, not more than 300, not more than 200, not more than 100, or not more than 50 liters per hour, or 0.1 to 500, 0.5 to 400, 1 to 300, or 3 to 100 liters per hour.

Figure 17:
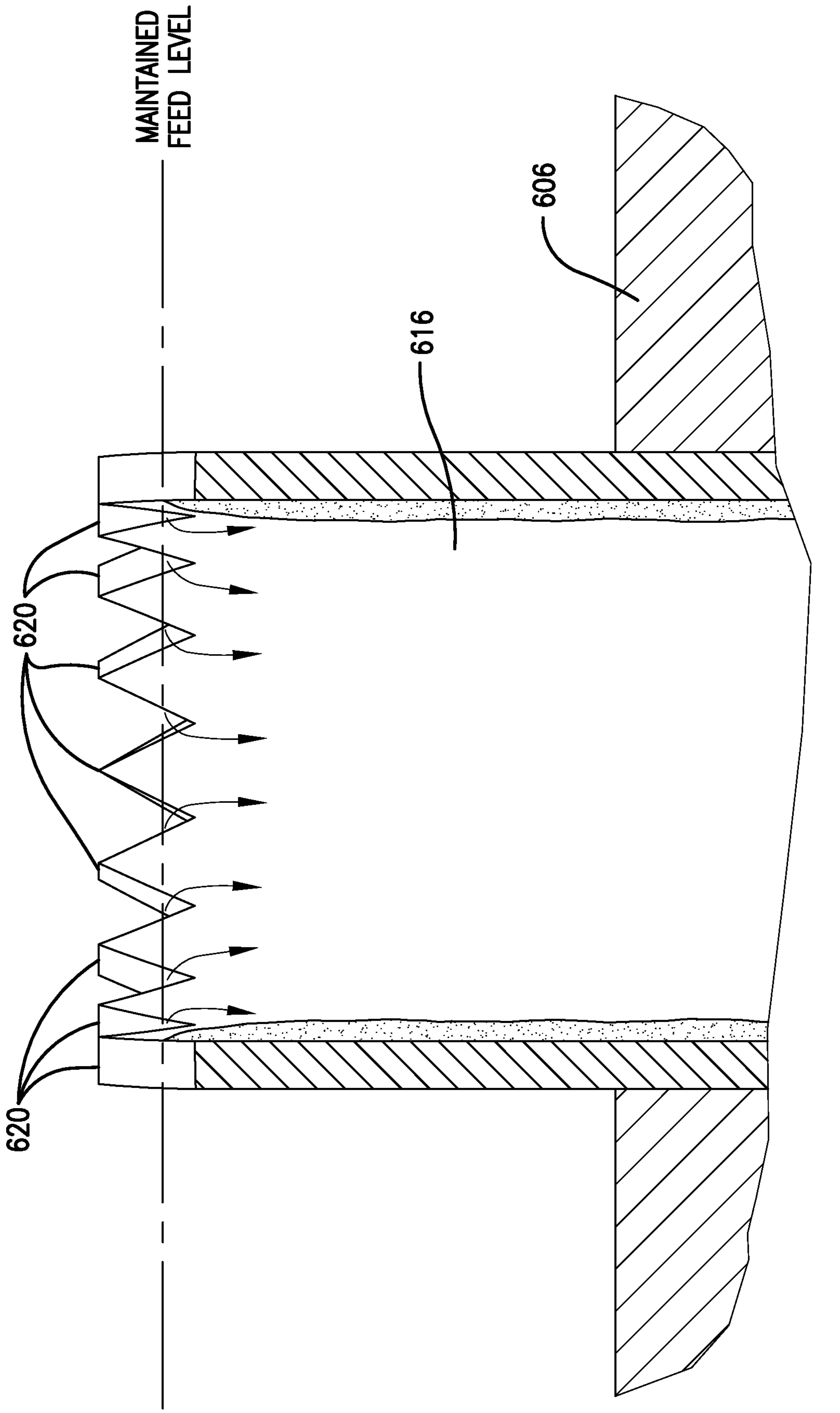
FIG. 17 depicts exemplary tube perturbances for a falling film pyrolysis reactor.
Figure 18:
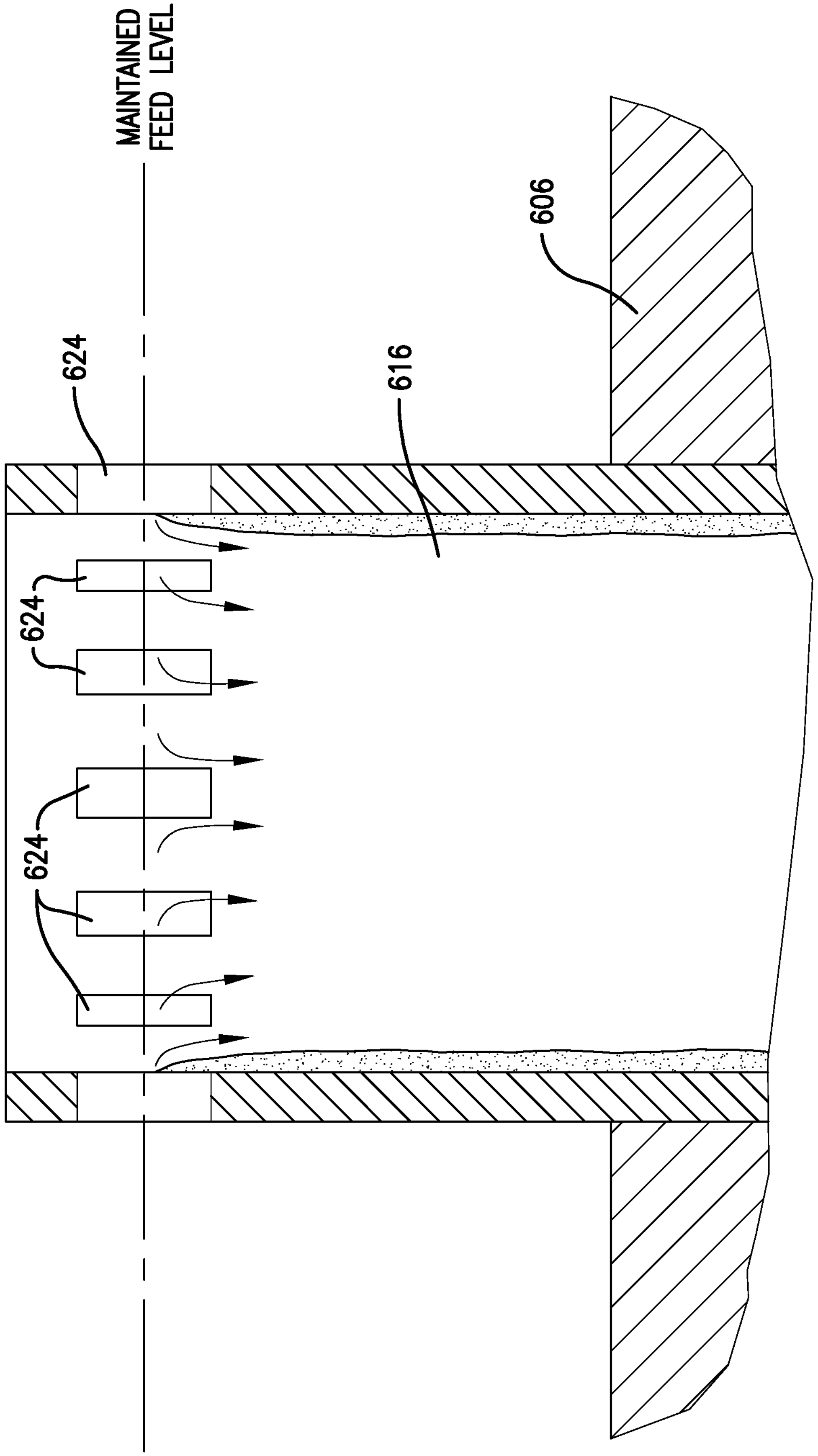
FIG. 18 depicts exemplary tube perturbances for a falling film pyrolysis reactor.

The flow rate of the liquefied plastic feed may also be at least partially controlled by the perturbances 620 located on the top of the tubes 616. FIGS. 17 and 18 depict different types of perturbance 620 configurations that may be used for the film-generating structures 616.

FIG. 17 depicts a closeup cross-sectional view of a tube 616 top from FIG. 16. As shown in FIG. 17, the tube 616 comprises a number of triangular-shaped perturbances 620 at its top, which may help regulate the flow of the liquefied plastic feed into the tube 616. Consequently, these triangular-shaped perturbances 620 may facilitate the formation of the films in the tubes 616 based on the controlled flow of the liquefied plastic feed.

FIG. 18 depicts an alternative embodiment for the perturbances 624. As shown in FIG. 18, the perturbances 624 are not located on the top of the tube 616; rather, the perturbances 624 are in the form of apertures formed within the walls of the tubes 616. These apertures 624 may have any geometric shape, although FIG. 18 depicts them as having rectangular shapes. As shown in FIG. 18, these perturbance apertures 624 may help regulate the flow of the liquefied plastic feed into the tube 616, so as to facilitate film formation.

Figure 19:
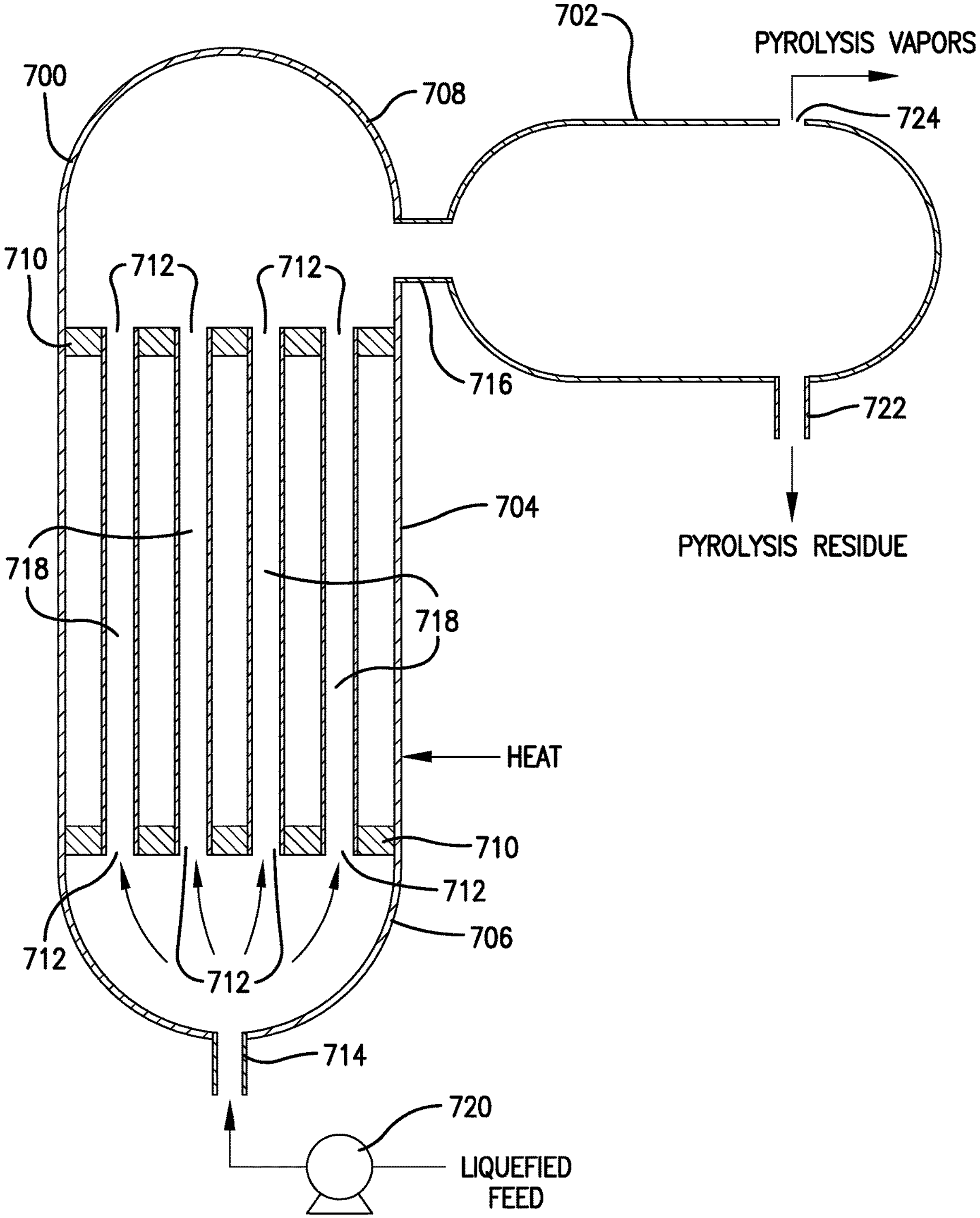
FIG. 19 depicts an exemplary upflow film pyrolysis reactor.

Alternatively, in an embodiment or in combination with any embodiment mentioned herein, the pyrolysis film reactor 600 may comprise an upflow film reactor 700. FIG. 19 depicts an exemplary upflow film pyrolysis reactor 700 that may be used as the pyrolysis film reactor 600. It should be understood that FIG. 19 depicts one exemplary embodiment of an upflow film reactor 700. Certain features depicted in FIG. 19 may be omitted and/or additional features described elsewhere herein may be added to the reactor 700 depicted in FIG. 19.

As shown in FIG. 19, the upflow film reactor 700 comprises a disengagement section 702 that allows the pyrolysis vapors (formed predominantly of the pyrolysis gas and vaporized pyrolysis oil) to be disengaged from the pyrolysis residue. As depicted in FIG. 19, the upflow film reactor 700 comprises a reaction section 704 disposed between a bottom feeding section 706 and a top section 708. The bottom feeding section 706 and the top section 708 may be divided from the reaction section 704 via foraminous plates 710, which may comprise a plurality of apertures 712. The geometric morphology of the apertures 712 is not particularly limiting and the apertures 712 may have any geometrical shape (e.g., a circle, a rectangle, an ellipse, etc.). The feeding section 706 also comprises an inlet 714 for the liquefied plastic feed and the top section 708 comprises an outlet 716 that leads into the disengagement vessel 702.

The reaction section 704 can comprise one or more film-generating structures 718, which are depicted as a plurality of tubes 718 in FIG. 19, that may be positioned at and between the apertures 712 within the foraminous plates 710. As noted above, the foraminous plates 710 may comprise a plurality of apertures 712 and each of these apertures 712 may be associated with a film-generating structure 718. Although tubes 718 are depicted in FIG. 19, it is envisioned that other film-generating structures 718 may be used instead.

Furthermore, in an embodiment or in combination with any embodiment mentioned herein, the upflow film reactor 700 may comprise more than four tubes 718, such as depicted in FIG. 19. For example, the upflow film reactor 700 may comprise at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 and/or not more than 500, not more than 400, not more than 300, not more than 200, or not more than 100 film-generating structures 718, or 2 to 500, 3 to 400, 4 to 300, or 10 to 100 film-generating structures 718.

The size and length of the tubes 718 are not particularly limited and any size and length may be used as necessary. For example, the tubes 718 could have a vertical length in the range of 0.5 to 50 m, 1 to 40 m, or 2 to 30 m.

As depicted in FIG. 19, a liquefied plastic (e.g., a molten waste plastic) may be introduced into the bottom feeding section 706 of the reactor 700 and allowed to flow via a pump 720 in an upward direction in the tube interiors. While flowing up the tubes 718, the liquefied plastic feed may be subjected to pyrolysis conditions, which causes the formation of gas bubbles. The gas bubble proceeds up the tube and forms a thin film on the interior wall of the tube 718 as it expands. Consequently, this provides a high heat transfer with the boiling action. The resulting pyrolysis effluent produced within the tubes 718 may then be introduced into a horizontal disengagement section 702 to disengage the pyrolysis residue from the pyrolysis vapors, which is predominantly made from the vaporized pyrolysis oil and the non-condensable pyrolysis gas. The pyrolysis residue can be recycled back from outlet 722 to the bottom of the pyrolysis reactor or removed from the system. The pyrolysis vapors are removed from the top of the horizontal disengagement section via outlet 724. Although not depicted in FIG. 16, this horizontal disengagement vessel may also be used on conjunction with the falling film reactor 600 in the same capacity that it is used with the upflow film reactor 700.

The heat provided to the upflow film reactor 700 may be provided by external or internal sources, such as interior or exterior heating coils, a heating jacket, and/or the injection of a heat-providing medium (e.g., steam) into the reactor. An exemplary external source could involve placing the upflow film reactor 700 within a furnace vessel.

An exemplary upflow vessel and system are described in U.S. Pat. No. 7,531,618, the entire disclosure of which is incorporated by reference to the extent not inconsistent with the present disclosure.

In an embodiment or in combination with any embodiment mentioned herein, the pyrolysis reaction can involve heating and converting the feedstock in an atmosphere that is substantially free of oxygen or in an atmosphere that contains less oxygen relative to ambient air. For example, the atmosphere within the pyrolysis reactor may comprise not more than 5, not more than 4, not more than 3, not more than 2, not more than 1, or not more than 0.5 percent of oxygen gas based on the interior volume of the reactor.

In an embodiment or in combination with any embodiment mentioned herein, a lift gas and/or a feed gas may be used to introduce the feedstock into the pyrolysis reactor and/or facilitate various reactions within the pyrolysis reactor. For instance, the lift gas and/or the feed gas may comprise, consist essentially of, or consist of nitrogen, carbon dioxide, and/or steam. The lift gas and/or feed gas may be added with the waste plastic prior to introduction into the pyrolysis reactor and/or may be added directly to the pyrolysis reactor. The lift gas and/or feed gas can include steam and/or a reducing gas such as hydrogen, carbon monoxide, and combinations thereof.

Furthermore, the temperature in the pyrolysis reactor can be adjusted so as to facilitate the production of certain end products. In an embodiment or in combination with any embodiment mentioned herein, the pyrolysis temperature in the pyrolysis reactor, including the pyrolysis film reactors, can be at least 325° C., at least 350° C., at least 375° C., at least 400° C., at least 425° C., at least 450° C., at least 475° C., at least 500° C., at least 525° C., at least 550° C., at least 575° C., at least 600° C., at least 625° C., at least 650° C., at least 675° C., at least 700° C., at least 725° C., at least 750° C., at least 775° C., or at least 800° C.

Additionally or alternatively, the pyrolysis temperature in the pyrolysis reactor, including the pyrolysis film reactors, can be not more than 1,100° C., not more than 1,050° C., not more than 1,000° C., not more than 950° C., not more than 900° C., not more than 850° C., not more than 800° C., not more than 750° C., not more than 700° C., not more than 650° C., not more than 600° C., not more than 550° C., not more than 525° C., not more than 500° C., not more than 475° C., not more than 450° C., not more than 425° C., or not more than 400° C. More particularly, the pyrolysis temperature in the pyrolysis reactor can range from 325 to 1,100° C., 350 to 900° C., 350 to 700° C., 350 to 550° C., 350 to 475° C., 425 to 1,100° C., 425 to 800° C., 500 to 1,100° C., 500 to 800° C., 600 to 1,100° C., 600 to 800° C., 650 to 1,000° C., or 650 to 800° C.

In an embodiment or in combination with any embodiment mentioned herein, the residence times of the feedstocks within the pyrolysis reactor, including the pyrolysis film reactors, can be at least 0.1, at least 0.2, at least 0.3, at least 0.5, at least 1, at least 1.2, at least 1.3, at least 2, at least 3, or at least 4 seconds. Alternatively, the residence times of the feedstocks within the pyrolysis reactor can be at least 1, at least 2, at least 3, at least 4, at least 5, at least 6, at least 7, at least 8, at least 9, at least 10, at least 20, at least 30, at least 45, at least 60, at least 75, or at least 90 minutes. Additionally, or alternatively, the residence times of the feedstocks within the pyrolysis reactor can be less than 6, less than 5, less than 4, less than 3, less than 2, less than 1, or less than 0.5 hours. Furthermore, the residence times of the feedstocks within the pyrolysis reactor can be less than 100, less than 90, less than 80, less than 70, less than 60, less than 50, less than 40, less than 30, less than 20, less than 10, less than 9, less than 8, less than 7, less than 6, less than 5, less than 4, less than 3, less than 2, or less than 1 seconds. More particularly, the residence times of the feedstocks within the pyrolysis reactor can range from 0.1 to 10 seconds, 0.5 to 10 seconds, 30 minutes to 4 hours, or 30 minutes to 3 hours, or 1 hour to 3 hours, or 1 hour to 2 hours.

In an embodiment or in combination with any embodiment mentioned herein, the residence times of the feedstocks within the pyrolysis film reactor can be at least 2, at least 3, at least 4, at least 5, at least 6, at least 7, at least 8, at least 9, or at least 10 seconds. Additionally, or in the alternative, in one or more embodiments, the residence times of the feedstocks within the pyrolysis film reactor can be not more than 300, not more than 250, not more than 200, not more than 150, not more than 100, not more than 90, not more than 80, not more than 70, not more than 60, not more than 50, not more than 40, not more than 30, not more than 20, or not more than 15 seconds. More particularly, in one or more embodiments, the residence times of the feedstocks within the pyrolysis film reactor can be in the range of 2 to 300 seconds, 3 to 250 seconds, or 4 to 40 seconds.

In an embodiment or in combination with any embodiment mentioned herein, the pressure within the pyrolysis reactor can be maintained at a pressure of at least 0.1, at least 0.2, or at least 0.3 bar and/or not more than 60, not more than 50, not more than 40, not more than 30, not more than 20, not more than 10, not more than 8, not more than 5, not more than 2, not more than 1.5, or not more than 1.1 bar. The pressure within the pyrolysis reactor can be maintained at atmospheric pressure or within the range of 0.1 to 100 bar, or 0.1 to 60 bar, or 0.1 to 30 bar, or 0.1 to 10 bar, or 1.5 bar, 0.2 to 1.5 bar, or 0.3 to 1.1 bar. The pressure within the pyrolysis reactor can be at least 10, at least 20, at least 30, at least 40, at least 50, at least 60, or at least 70 bar and/or not more than 100, not more than 95, not more than 90, not more than 85, not more than 80, not more than 75, not more than 70, not more than 65, or not more than 60 bar. As used herein, the term "bar" refers to gauge pressure, unless otherwise noted.

In an embodiment or in combination with any embodiment mentioned herein, the pressure within the pyrolysis film reactor can be maintained at a pressure of less than 70, less than 60, less than 50, less than 40, less than 30, or less than 20 torr. As used herein, this "torr" pressure refers to gauge pressure, unless otherwise noted.

In an embodiment or in combination with any embodiment mentioned herein, a pyrolysis catalyst may be introduced into the feed stream 116 prior to introduction into the pyrolysis reactor 500 and/or introduced directly into the pyrolysis reactor 500. The catalyst can be homogenous or heterogeneous and may include, for example, certain types of zeolites and other mesostructured catalysts. In some embodiments, the pyrolysis reaction may not be catalyzed (e.g., carried out in the absence of a pyrolysis catalyst), but may include a non-catalytic, heat-retaining inert additive, such as sand, in the reactor 510 in order to facilitate the heat transfer. Such catalyst-free pyrolysis processes may be referred to as "thermal pyrolysis."

In an embodiment or in combination with any embodiment mentioned herein, the pyrolysis reaction in the pyrolysis reactor may occur in the substantial absence of a pyrolysis catalyst, at a temperature in the range of 350 to 600° C., at a pressure ranging from 0.1 to 100 bar, and at a residence time of 0.2 seconds to 4 hours, or 0.5 hours to 3 hours.

In an embodiment or in combination with any embodiment mentioned herein, the pyrolysis effluent or pyrolysis vapors may comprise at least 1, at least 5, at least 10, at least 15, at least 20, at least 25, at least 30, at least 35, at least 40, at least 45, at least 50, at least 55, at least 60, at least 65, at least 70, or at least 75 weight percent of the pyrolysis oil, which may be in the form of vapors in the pyrolysis effluent upon exiting the heated reactor; however, these vapors may be subsequently condensed into the resulting pyrolysis oil. Additionally, or alternatively, the pyrolysis effluent or pyrolysis vapors may comprise not more than 99, not more than 95, not more than 90, not more than 85, not more than 80, not more than 75, not more than 70, not more than 65, not more than 60, not more than 55, not more than 50, not more than 45, not more than 40, not more than 35, not more than 30, or not more than 25 weight percent of the pyrolysis oil, which may be in the form of vapors in the pyrolysis effluent upon exiting the heated reactor. The pyrolysis effluent or pyrolysis vapors may comprise in the range of 20 to 99 weight percent, 25 to 80 weight percent, 30 to 85 weight percent, 30 to 80 weight percent, 30 to 75 weight percent, 30 to 70 weight percent, or 30 to 65 weight percent of the pyrolysis oil, based on the total weight of the pyrolysis effluent or pyrolysis vapors.

In an embodiment or in combination with any embodiment mentioned herein, the pyrolysis effluent or pyrolysis vapors may comprise at least 1, at least 5, at least 10, at least 15, at least 20, at least 25, at least 30, at least 35, at least 40, at least 45, at least 50, at least 55, at least 60, at least 65, at least 70, at least 75, or at least 80 weight percent of the pyrolysis gas. Additionally, or alternatively, the pyrolysis effluent or pyrolysis vapors may comprise not more than 99, not more than 95, not more than 90, not more than 85, not more than 80, not more than 75, not more than 70, not more than 65, not more than 60, not more than 55, not more than 50, or not more than 45 weight percent of the pyrolysis gas. The pyrolysis effluent or pyrolysis vapors may comprise 1 to 90 weight percent, 10 to 85 weight percent, 15 to 85 weight percent, 20 to 80 weight percent, 25 to 80 weight percent, 30 to 75 weight percent, or 35 to 75 weight percent of the pyrolysis gas, based on the total weight of the stream.

In an embodiment or in combination with any embodiment mentioned herein, the pyrolysis effluent or pyrolysis vapors may comprise at least 0.5, at least 1, at least 2, at least 3, at least 4, at least 5, at least 6, at least 7, at least 8, at least 9, or at least 10 weight percent of the pyrolysis residue. Additionally, or alternatively, the pyrolysis effluent may comprise not more than 60, not more than 50, not more than 40, not more than 30, not more than 25, not more than 20, not more than 15, not more than 10, not more than 9, not more than 8, not more than 7, not more than 6, or not more than 5 weight percent of the pyrolysis residue. The pyrolysis effluent may comprise in the range of 0.1 to 25 weight percent, 1 to 15 weight percent, 1 to 8 weight percent, or 1 to 5 weight percent of the pyrolysis residue, based on the total weight of the stream.

In an embodiment or in combination with any embodiment mentioned herein, the pyrolysis effluent or pyrolysis vapors may comprise not more than 15, not more than 14, not more than 13, not more than 12, not more than 11, not more than 10, not more than 9, not more than 8, not more than 7, not more than 6, not more than 5, not more than 4, not more than 3, not more than 2, not more than 1, or not more than 0.5 weight percent of free water. As used herein, "free water" refers to water previously added (as liquid or steam) to the pyrolysis unit and water generated in the pyrolysis unit.

The pyrolysis system described herein may produce a pyrolysis effluent that can be separated into a pyrolysis oil stream 174, a pyrolysis gas stream 172, and a pyrolysis residue stream 176, each of which may be directly used in various downstream applications based on their formulations. The various characteristics and properties of the pyrolysis oil, pyrolysis gas, and pyrolysis residue are described below. It should be noted that, while all of the following characteristics and properties may be listed separately, it is envisioned that each of the following characteristics and/or properties of the pyrolysis gas, pyrolysis oil, and/or pyrolysis residue are not mutually exclusive and may be combined and present in any combination.

In an embodiment or in combination with any embodiment mentioned herein, the pyrolysis oil may predominantly comprise hydrocarbons having from 4 to 30 carbon atoms per molecule (e.g., C4 to C30 hydrocarbons). As used herein, the term "Cx" or "Cx hydrocarbon," refers to a hydrocarbon compound including "x" total carbons per molecule, and encompasses all olefins, paraffins, aromatics, heterocyclic, and isomers having that number of carbon atoms. For example, each of normal, iso, and tert-butane and butene and butadiene molecules would fall under the general description "C4." The pyrolysis oil may have a C4-C30 hydrocarbon content of at least 55, at least 60, at least 65, at least 70, at least 75, at least 80, at least 85, at least 90, or at least 95 weight percent based on the total weight of the pyrolysis oil stream 174.

In an embodiment or in combination with any embodiment mentioned herein, the pyrolysis oil can predominantly comprise C5 to C30 hydrocarbons, C5 to C25 hydrocarbons, C5 to C22 hydrocarbons, or C5 to C20 hydrocarbons. For example, the pyrolysis oil may comprise at least 55, at least 60, at least 65, at least 70, at least 75, at least 80, at least 85, at least 90, or at least 95 weight percent of C5 to C30 hydrocarbons, C5 to C25 hydrocarbons, C5 to C22 hydrocarbons, or C5 to C20 hydrocarbons, based on the total weight of the pyrolysis oil.

In an embodiment or in combination with any embodiment mentioned herein, the pyrolysis oil may have a C5-C12 hydrocarbon content of at least 5, at least 10, at least 15, at least 20, at least 25, at least 30, at least 35, at least 40, at least 45, at least 50, or at least 55 weight percent based on the total weight of the pyrolysis oil. Additionally, or alternatively, the pyrolysis oil may have a C5-C12 hydrocarbon content of not more than 95, not more than 90, not more than 85, not more than 80, not more than 75, not more than 70, not more than 65, not more than 60, not more than 55, or not more than 50 weight percent. The pyrolysis oil may have a C5-C12 hydrocarbon content in the range of 10 to 95 weight percent, 20 to 80 weight percent, or 35 to 80 weight percent, based on the total weight of the stream.

In an embodiment or in combination with any embodiment mentioned herein, the pyrolysis oil may also include various amounts of olefins and aromatics depending on reactor conditions and whether or not a catalyst is employed. The pyrolysis oil comprises at least 1, at least 5, at least 10, at least 15, at least 20, at least 25, at least 30, at least 35, or at least 40 weight percent of olefins and/or aromatics based on the total weight of the pyrolysis oil. Additionally, or alternatively, the pyrolysis oil may include not more than 90, not more than 80, not more than 70, not more than 60, not more than 50, not more than 45, not more than 40, not more than 35, not more than 30, not more than 25, not more than 20, not more than 15, not more than 10, not more than 5, or not more than 1 weight percent of olefins and/or aromatics. As used herein, the term "aromatics" refers to the total amount (in weight) of any compounds containing an aromatic moiety, such as benzene, toluene, xylene, and styrene.

In an embodiment or in combination with any embodiment mentioned herein, the pyrolysis oil may have a paraffin (e.g., linear or branch alkanes) content of at least 5, at least 10, at least 15, at least 20, at least 25, at least 30, at least 35, at least 40, at least 45, at least 50, at least 55, at least 60, or at least 65 weight percent based on the total weight of the pyrolysis oil. Additionally, or alternatively, the pyrolysis oil may have a paraffin content of not more than 99, not more than 97, not more than 95, not more than 93, not more than 90, not more than 85, not more than 80, not more than 75, not more than 70, not more than 65, not more than 60, not more than 55, not more than 50, not more than 45, not more than 40, not more than 35, or not more than 30 weight percent. The pyrolysis oil may have a paraffin content in the range of 25 to 90 weight percent, 35 to 90 weight percent, or 50 to 80 weight percent.

In an embodiment or in combination with any embodiment mentioned herein, the pyrolysis oil may have a mid-boiling point of at least 75° C., at least 80° C., at least 85° C., at least 90° C., at least 95° C., at least 100° C., at least 105° C., at least 110° C., or at least 115° C. and/or not more than 250° C., not more than 245° C., not more than 240° C., not more than 235° C., not more than 230° C., not more than 225° C., not more than 220° C., not more than 215° C., not more than 210° C., not more than 205° C., not more than 200° C., not more than 195° C., not more than 190° C., not more than 185° C., not more than 180° C., not more than 175° C., not more than 170° C., not more than 165° C., not more than 160° C., not more than 155° C., not more than 150° C., not more than 145° C., not more than 140° C., not more than 135° C., not more than 130° C., not more than 125° C., or not more than 120° C., as measured according to ASTM D-5399. The pyrolysis oil may have a mid-boiling point in the range of 75 to 250° C., 90 to 225° C., or 115 to 190° C. As used herein, "mid-boiling point" refers to the median boiling point temperature of the pyrolysis oil, where 50 percent by volume of the pyrolysis oil boils above the mid-boiling point and 50 percent by volume boils below the mid-boiling point.

In an embodiment or in combination with any embodiment mentioned herein, the boiling point range of the pyrolysis oil may be such that at least 90 percent of the pyrolysis oil boils off at a temperature of 250° C., of 280° C., of 290° C., of 300° C., or of 310° C., as measured according to ASTM D-5399.

Turning to the pyrolysis gas, the pyrolysis gas can have a methane content of at least 1, at least 2, at least 3, at least 4, at least 5, at least 6, at least 7, at least 8, at least 9, at least 10, at least 11, at least 12, at least 13, at least 14, or at least 15 and/or not more than 50, not more than 45, not more than 40, not more than 35, not more than 30, not more than 25, or not more than 20 weight percent based on the total weight of the pyrolysis gas. In an embodiment or in combination with any embodiment mentioned herein, the pyrolysis gas can have a methane content in the range of 1 to 50 weight percent, 5 to 50 weight percent, or 15 to 45 weight percent.

In an embodiment or in combination with any embodiment mentioned herein, the pyrolysis gas can have a C3 and/or C4 hydrocarbon content (including all hydrocarbons having 3 or 4 carbon atoms per molecule) of at least 5, at least 10, at least 15, at least 20, at least 25, at least 30, at least 35, at least 40, at least 45, at least 50, at least 55, or at least 60 and/or not more than 99, not more than 95, not more than 90, not more than 85, not more than 80, not more than 75, not more than 70, or not more than 65 weight percent based on the total weight of the pyrolysis gas. The pyrolysis gas can have a C3 hydrocarbon content, a C4 hydrocarbon content, or combined C3 and C4 hydrocarbon content in the range of 10 to 90 weight percent, 25 to 90 weight percent, or 25 to 80 weight percent.

In an embodiment or in combination with any embodiment mentioned herein, the pyrolysis gas can make up at least 10, at least 20, at least 30, at least 40, or at least 50 weight percent of the total effluent from the pyrolysis reactor and the pyrolysis gas can have a combined ethylene and propylene content of at least 25, at least 40, at least 50, at least 60, at least 70, or at least 75 percent by total weight of the pyrolysis gas.

Turning to the pyrolysis residue, in an embodiment or in combination with any embodiment mentioned herein, the pyrolysis residue comprises at least 20, at least 25, at least 30, at least 35, at least 40, at least 45, at least 50, at least 55, at least 60, at least 65, at least 70, at least 75, at least 80, or at least 85 weight percent of C20+ hydrocarbons based on the total weight of the pyrolysis residue. As used herein, "C20+ hydrocarbon" refers to hydrocarbon compounds containing at least 20 total carbons per molecule, and encompasses all olefins, paraffins, and isomers having that number of carbon atoms.

In an embodiment or in combination with any embodiment mentioned herein, the pyrolysis residue comprises at least 1, at least 2, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent of carbon-containing solids based on the total weight of the pyrolysis residue. Additionally, or alternatively, the pyrolysis residue comprises not more than 99, not more than 90, not more than 80, not more than 70, not more than 60, not more than 50, not more than 40, not more than 30, not more than 20, not more than 10, not more than 9, not more than 8, not more than 7, not more than 6, not more than 5, or not more than 4 weight percent of carbon-containing solids. As used herein, "carbon-containing solids" refer to carbon-containing compositions that are derived from pyrolysis and are solid at 25° C. and 1 atm. The carbon-containing solids comprise at least 20, at least 30, at least 40, at least 50, at least 60, at least 70, at least 80, or at least 90 weight percent of carbon based on the total weight of the carbon-containing solids.

In an embodiment or in combination with any embodiment mentioned herein, at least a portion of the pyrolysis gas, pyrolysis oil, and pyrolysis residue may be routed to one or more of the other chemical processing facilities, including, for example, the energy recovery facility 80, the partial oxidation facility 50, one or more of the other facilities 90 discussed previously, and the cracking facility 70. In some embodiments, at least a portion of the pyrolysis gas stream 172 and/or at least a portion of the pyrolysis oil (pyrolysis oil) stream 174 can be introduced into the energy recovery facility 80, the cracking facility 70, the POX gasification facility 50, and combinations thereof, while the pyrolysis residue stream 176 may be introduced into the POX gasification facility 50 and/or the energy recovery facility 80. In some embodiments, at least a portion of the pyrolysis gas stream 172, pyrolysis oil stream 174, and/or pyrolysis residue stream 176 may be routed to one or more separation facilities (not shown in FIG. 1) to thereby form more purified streams of the pyrolysis gas, pyrolysis oil, and/or pyrolysis residue, which may then be routed to the energy recovery facility 80, the cracking facility 70, and/or the POX gasification facility 50. Additionally, or alternatively, all or a portion of the pyrolysis oil stream 176 can be combined with the PO-enriched waste plastic stream 114 to provide a liquified plastic stream fed to one or more of the downstream facilities as discussed herein.

Cracking

In an embodiment or in combination with any embodiment mentioned herein, at least a portion of one or more streams from the pyrolysis facility 60, or from one or more of the other facilities shown in FIG. 1, may be introduced into a cracking facility 70. As used herein, the term "cracking" refers to breaking down complex organic molecules into simpler molecules by the breaking of carbon-carbon bonds. A "cracking facility" is a facility that includes all equipment, lines, and controls necessary to carry out cracking of a feedstock derived from waste plastic. A cracking facility can include one or more cracker furnaces, as well as a downstream separation zone including equipment used to process the effluent of the cracker furnace(s). As used herein, the terms "cracker" and "cracking" are used interchangeably.

Figure 20:
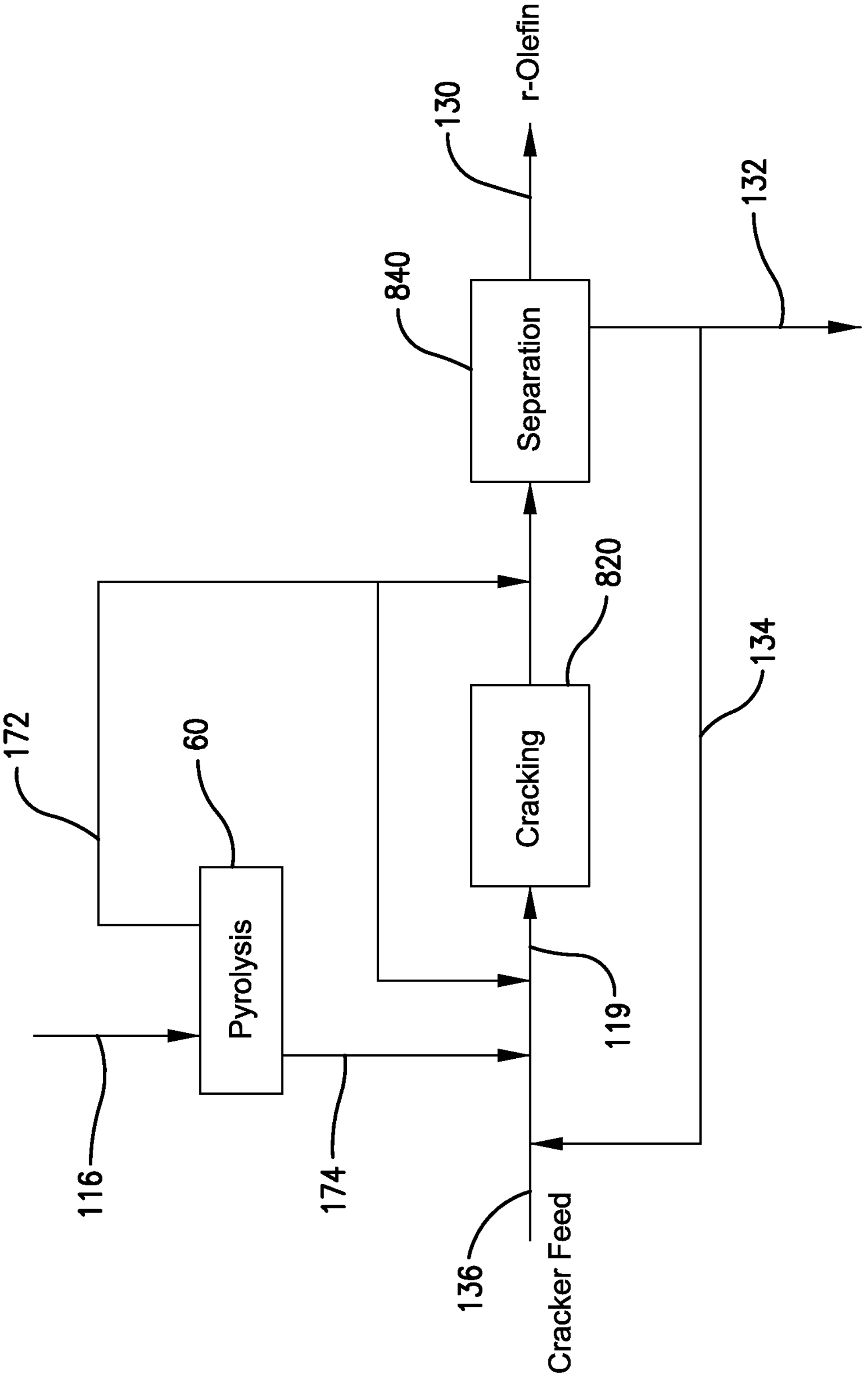
FIG. 20 depicts an exemplary cracking facility.

Turning now to FIG. 20, a cracking facility 70 configured according to one or more embodiments of the present technology is shown. In general, the cracker facility 70 includes a cracker furnace 820 and a separation zone 740 downstream of the cracker furnace 820 for separating the furnace effluent into various end products, such as a recycle content olefin (r-olefin) stream 130. As shown in FIG. 20, at least a portion of the pyrolysis gas stream 172 and/or pyrolysis oil stream 174 from a pyrolysis facility 60 can be sent to the cracking facility 70. The pyrolysis oil stream 174 may be introduced into the inlet of the cracker furnace 820, while the pyrolysis gas stream 172 can be introduced into a location upstream or downstream of the furnace 820. As also shown in FIG. 20, a stream of paraffin 132 (e.g., ethane and/or propane) may be withdrawn from the separation zone and may include recycle-content paraffin (r-paraffin). All or a portion of the paraffin may be recycled via stream 134 to the inlet of cracker furnace 820 as also shown in FIG. 20. When used, the pyrolysis oil stream, pyrolysis gas stream 172, and recycled paraffin stream 174 may optionally be combined with a stream of cracker feed 136 to form the feed stream 119 to the cracking facility 820.

In an embodiment or in combination with any embodiment mentioned herein, a feed stream 119 to the cracking facility 70 may comprise at least one of (i) one or more solvolysis coproduct streams 110 as described previously, (ii) a PO-enriched stream of waste plastic 114, and (iii) a pyrolysis stream (e.g., pyrolysis gas 172 and/or pyrolysis oil 174). One or more of these streams may be introduced into the cracking facility 70 continuously or one or more of these streams may be introduced intermittently. When multiple types of feed streams are present, each may be introduced separately or all, or a portion of, the streams may be combined so that the combined stream may be introduced into the cracking facility 70. The combining, when performed, may take place in a continuous or batch manner. The feed stream or streams introduced into the cracking facility 70 can be in the form of a predominantly gas stream, a predominantly liquid stream, or combinations thereof.

As shown in FIG. 20, a stream of pyrolysis gas 172 and/or pyrolysis oil 174 may be introduced into a cracker facility 70 along with or as the cracker feed stream 136. In some embodiments, the cracker feed stream 119 can comprise at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent of pyrolysis gas, pyrolysis oil, or pyrolysis gas and pyrolysis oil combined, based on the total weight of the stream 119. Alternatively, or in addition, the cracker feed stream 119 can comprise not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, or not more than 20 weight percent of pyrolysis gas, pyrolysis oil, or a combination of pyrolysis gas and pyrolysis oil, based on the total weight of the stream 119, or it can include these components in an amount in the range of from 1 to 95 weight percent, 5 to 90 weight percent, or 10 to 85 percent, based on the total weight of the stream 119.

In some embodiments, the cracker feed stream 119 can include at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent and/or not more than 95, not more than 90, not more than 85, not more than 80, not more than 75, not more than 70, not more than 65, not more than 60, not more than 55, not more than 50, not more than 45, not more than 40, not more than 35, not more than 30, not more than 25, or not more than 20 weight percent of a hydrocarbon feed other than pyrolysis gas and pyrolysis oil, based on the total weight of the cracker feed stream 119, or it can include a hydrocarbon feed other than pyrolysis gas and pyrolysis oil in an amount of from 5 to 95 weight percent, 10 to 90 weight percent, or 15 to 85 weight percent, based on the total weight of the cracker feed stream 119.

In an embodiment or in combination with any embodiment mentioned herein, the cracker feed stream 119 may comprise a predominantly C2 to C4 hydrocarbon containing composition. As used herein, the term "predominantly C2 to C4 hydrocarbon," refers to a stream or composition containing at least 50 weight percent of C2 to C4 hydrocarbon components. Examples of specific types of C2 to C4 hydrocarbon streams or compositions include propane, ethane, butane, and LPG. The cracker feed stream 119 may comprise at least 50, or at least 55, or at least 60, or at least 65, or at least 70, or at least 75, or at least 80, or at least 85, or at least 90, or at least 95, in each case wt. % based on the total weight of the feed, and/or not more than 100, or not more than 99, or not more than 95, or not more than 92, or not more than 90, or not more than 85, or not more than 80, or not more than 75, or not more than 70, or not more than 65, or not more than 60, in each case weight percent C2 to C4 hydrocarbons or linear alkanes, based on the total weight of the feed. The cracker feed stream 119 can comprise predominantly propane, predominantly ethane, predominantly butane, or a combination of two or more of these components.

In an embodiment or in combination with any embodiment mentioned herein, the cracker feed stream 119 may comprise a predominantly C5 to C22 hydrocarbon containing composition. As used herein, "predominantly C5 to C22 hydrocarbon" refers to a stream or composition comprising at least 50 weight percent of C5 to C22 hydrocarbon components. Examples include gasoline, naphtha, middle distillates, diesel, kerosene.

In an embodiment or in combination with any embodiment mentioned herein, the cracker feed stream 119 may comprise at least 20, or at least 25, or at least 30, or at least 35, or at least 40, or at least 45, or at least 50, or at least 55, or at least 60, or at least 65, or at least 70, or at least 75, or at least 80, or at least 85, or at least 90, or at least 95, in each case wt. % and/or not more than 100, or not more than 99, or not more than 95, or not more than 92, or not more than 90, or not more than 85, or not more than 80, or not more than 75, or not more than 70, or not more than 65, or not more than 60, in each case weight percent C5 to C22, or C5 to C20 hydrocarbons, based on the total weight of the stream, or it can include C5 to C22 in an amount in the range of from 20 to 100 weight percent, 25 to 95 weight percent, or 30 to 85 weight percent, based on the total weight of the stream.

In an embodiment or in combination with any embodiment mentioned herein, the cracker feed stream 119 may have a C15 and heavier (C15+) content of at least 0.5, or at least 1, or at least 2, or at least 5, in each case weight percent and/or not more than 40, or not more than 35, or not more than 30, or not more than 25, or not more than 20, or not more than 18, or not more than 15, or not more than 12, or not more than 10, or not more than 5, or not more than 3, in each case weight percent, based on the total weight of the feed, or it can be in the range of from 0.5 to 40 weight percent, 1 to 35 weight percent, or 2 to 30 weight percent, based on the total weight of the stream.

In an embodiment or in combination with any embodiment mentioned herein, the feed to the cracker furnace can comprise vacuum gas oil (VGO), hydrogenated vacuum gas oil (HVGO), or atmospheric gas oil (AGO). The cracker feed stream 119 can comprise at least 5, at least 10, at least 15, at least 20, at least 25, at least 30, at least 35, at least 40, at least 45, at least 50, at least 55, at least 60, at least 65, at least 70, at least 75, at least 80, at least 85, or at least 90 and/or not more than 99, not more than 95, not more than 90, not more than 85, not more than 80, not more than 75, not more than 70, not more than 65, not more than 60, not more than 55, or not more than 50 weight percent of at least one gas oil, based on the total weight of the stream, or it can be present in an amount in the range of from 5 to 99 weight percent, 10 to 90 weight percent, or 15 to 85 weight percent, or 5 to 50 weight percent, based on the total weight of the stream 119.

Figure 21:
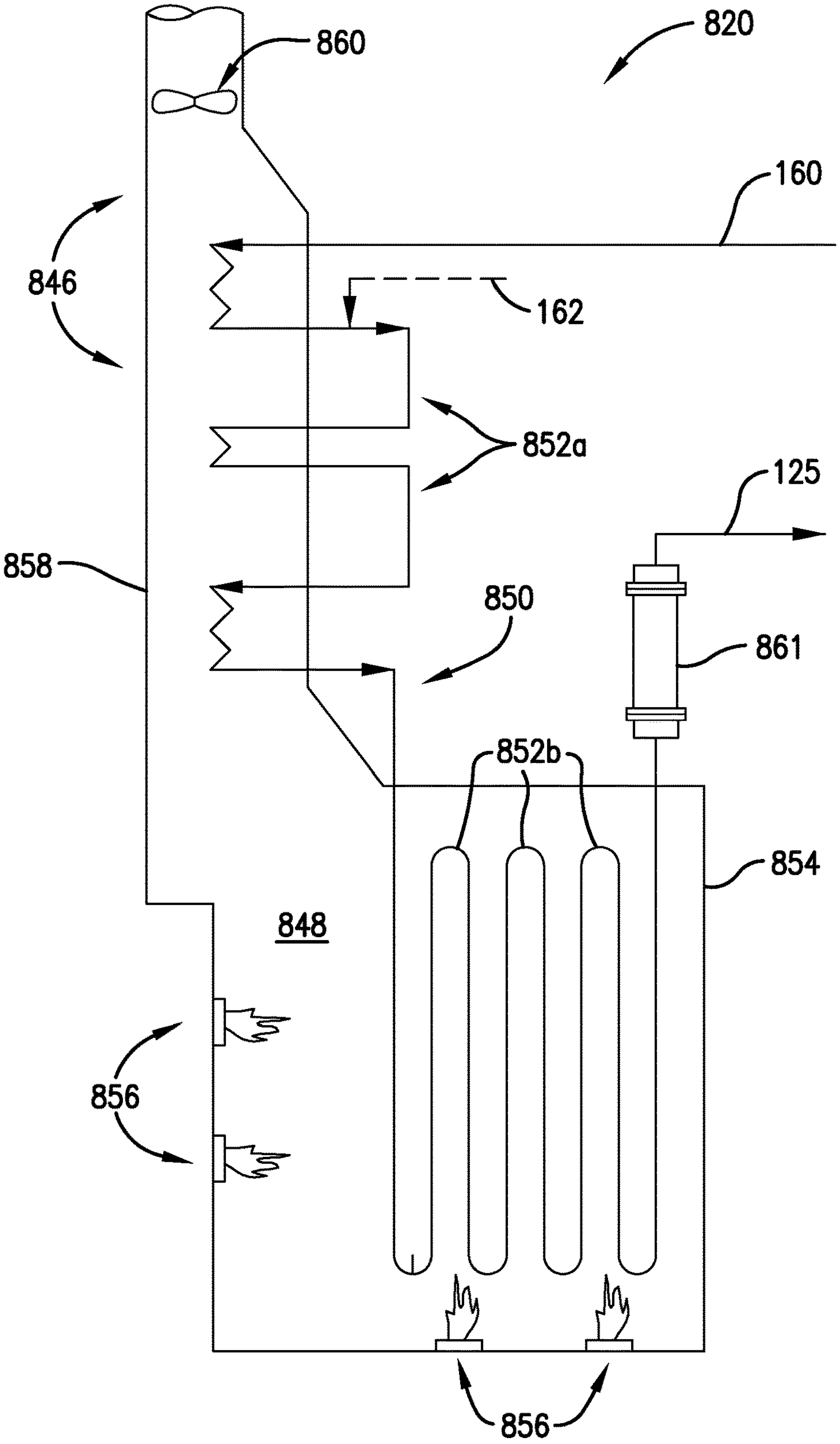
FIG. 21 provides a schematic diagram of a cracker furnace.

As shown in FIG. 20, the cracker feed stream 119 is introduced into a cracker furnace 820. Turning now to FIG. 21, a schematic diagram of a cracker furnace 820 suitable for use in a chemical recycling facility and/or cracker facility as described herein is shown. As shown in FIG. 21, the cracking furnace 820 can include a convection section 846, a radiant section 848, and a cross-over section 850 located between the convection 846 and radiant sections 848. The convection section 846 is the portion of the furnace that receives heat from hot flue gases and includes a bank of tubes or coils 852 through which a cracker stream passes. In the convection section 846, the cracker stream is heated by convection from the hot flue gasses passing therethrough. Although shown in FIG. 21 as including horizontally-oriented convection section tubes **852*a* and vertically-oriented radiant section tubes 852*b*, it should be understood that the tubes can be configured in any suitable configuration. For example, the convection section tubes 852*a* may be vertical. The radiant section tubes 852*b* may be horizontal. Additionally, although shown as a single tube, the cracker furnace 820** may comprise one or more tubes or coils that may include at least one split, bend, U, elbow, or combinations thereof. When multiple tubes or coils are present, such may be arranged in parallel and/or in series.

The radiant section 848 is the section of the furnace 820 into which heat is transferred into the heater tubes primarily by radiation from the high-temperature gas. The radiant section 848 also includes a plurality of burners 856 for introducing heat into the lower portion of the furnace 820. The furnace 820 includes a fire box 854 which surrounds and houses the tubes **852*b* within the radiant section 848 and into which the burners 856 are oriented. The cross-over section 850 includes piping for connecting the convection 846 and radiant 848 sections and may transfer the heated cracker stream from one section to the other within or external to the interior of the furnace 820**.

As hot combustion gases ascend upwardly through the furnace stack, the gases may pass through the convection section 846, wherein at least a portion of the waste heat may be recovered and used to heat the cracker stream passing through the convection section 846. The cracking furnace 820 may have a single convection (preheat) section and a single radiant section, while, in other embodiments, the furnace may include two or more radiant sections sharing a common convection section. At least one induced draft (I.D.) fan 860 near the stack may control the flow of hot flue gas and heating profile through the furnace 820, and one or more heat exchangers 861 may be used to cool the furnace effluent. A liquid quench (not shown) may be used in addition to, or alternatively with, the exchanger 861 (e.g., transfer line heat exchanger or TLE) on the outlet of the furnace shown in FIG. 21 for cooling the cracked olefin-containing effluent 125.

In an embodiment or in combination with any embodiment mentioned herein, the cracker facility 70 may comprise a single cracking furnace, or it can have at least 2, or at least 3, or at least 4, or at least 5, or at least 6, or at least 7, or at least 8 or more cracking furnaces operated in parallel. Any one or each furnace(s) may be gas cracker, or a liquid cracker, or a split furnace. The furnace can be a gas cracker receiving a cracker feed stream containing at least 50 wt. %, or at least 75 wt. %, or at least 85 wt. % or at least 90 wt. % ethane, propane, LPG, or a combination thereof through the furnace, or through at least one coil in a furnace, or through at least one tube in the furnace, based on the weight of all cracker feed to the furnace.

In an embodiment or in combination with any embodiment mentioned herein, the cracking furnace 820 can be a liquid or naphtha cracker receiving a cracker feed stream containing at least 50 wt. %, or at least 75 wt. %, or at least 85 wt. % liquid (when measured at 25° C. and 1 atm) hydrocarbons having a carbon number from C5-C22.

In an embodiment or in combination with any embodiment mentioned herein, the cracker feed stream 119 can be cracked in a gas furnace. A gas furnace is a furnace having at least one coil which receives (or operated to receive or configured to receive), at the inlet of the coil at the entrance to the convection zone, a predominately vapor-phase feed (more than 50% of the weight of the feed is vapor) ("gas coil"). The gas coil can receive a predominately C2-C4 feedstock, or a predominately a C2-C3 feedstock, to the inlet of the coil in the convection section, or alternatively, having at least one coil receiving more than 50 wt. % ethane and/or more than 50% propane and/or more than 50% LPG, or in any one of these cases at least 60 wt. %, or at least 70 wt. %, or at least 80 wt. %, based on the weight of the cracker feed to the coil, or alternatively based on the weight of the cracker feed to the convection zone.

The gas furnace may have more than one gas coil. In an embodiment or in combination with any embodiment mentioned herein, at least 25% of the coils, or at least 50% of the coils, or at least 60% of the coils, or all the coils in the convection zone or within a convection box of the furnace are gas coils. The gas coil receives, at the inlet of the coil at the entrance to the convection zone, a vapor-phase feed in which at least 60 wt. %, or at least 70 wt. %, or at least 80 wt. %, or at least 90 wt. %, or at least 95 wt. %, or at least 97 wt. %, or at least 98 wt. %, or at least 99 wt. %, or at least 99.5 wt. %, or at least 99.9 wt. % of feed is vapor.

In an embodiment or in combination with any embodiment mentioned herein, the feed stream can be cracked in a split furnace. A split furnace is a type of gas furnace. A split furnace contains at least one gas coil and at least one liquid coil within the same furnace, or within the same convection zone, or within the same convection box. A liquid coil is a coil which receives, at the inlet of coil at the entrance to the convection zone, a predominately liquid phase feed (more than 50% of the weight of the feed is liquid) ("liquid coil").

In an embodiment or in combination with any embodiment mentioned herein, the cracker feed stream 119 can be cracked in a thermal gas cracker.

In an embodiment or in combination with any embodiment mentioned herein, the cracker feed stream 119 can be cracked in a thermal steam gas cracker in the presence of steam. Steam cracking refers to the high-temperature cracking (decomposition) of hydrocarbons in the presence of steam. When present, steam may be introduced via line 862 shown in FIG. 21.

In an embodiment or in combination with any embodiment mentioned herein, when two or more streams from the chemical recycling facility 10 shown in FIG. 1 are combined with another of the streams from the facility 10 to form the cracker feed stream 119, such a combination may occur upstream of, or within, the cracking furnace 820. Alternatively, the different feed streams may be introduced separately into the furnace 820, and may pass through a portion, or all, of the furnace 820 simultaneously while being isolated from one another by feeding into separate tubes within the same furnace 820 (e.g., a split furnace). Alternatively, at least a portion of the stream or streams from the chemical recycling facility may be introduced into the cracker facility at a location downstream of the cracker furnace, but upstream of one or more pieces of equipment in the separation facility.

The heated cracker stream 119 then passes through the cracking furnace 820, wherein the hydrocarbon components therein are thermally cracked to form lighter hydrocarbons, including olefins such as ethylene, propylene, and/or butadiene. The residence time of the cracker stream the furnace 820 can be at least 0.15, or at least 0.2, or at least 0.25, or at least 0.3, or at least 0.35, or at least 0.4, or at least 0.45, in each case seconds and/or not more than 2, or not more than 1.75, or not more than 1.5, or not more than 1.25, or not more than 1, or not more than 0.9, or not more than 0.8, or not more than 0.75, or not more than 0.7, or not more than 0.65, or not more than 0.6, or not more than 0.5, in each case seconds, or it can be in the range of from 0.15 to 2 seconds, 0.20 to 1.75 seconds, or 0.25 to 1.5 seconds.

The temperature of the cracked olefin-containing effluent 125 withdrawn from the furnace outlet can be at least 640, or at least 650, or at least 660, or at least 670, or at least 680, or at least 690, or at least 700, or at least 720, or at least 730, or at least 740, or at least 750, or at least 760, or at least 770, or at least 780, or at least 790, or at least 800, or at least 810, or at least 820, in each case ° C. and/or not more than 1000, or not more than 990, or not more than 980, or not more than 970, or not more than 960, or not more than 950, or not more than 940, or not more than 930, or not more than 920, or not more than 910, or not more than 900, or not more than 890, or not more than 880, or not more than 875, or not more than 870, or not more than 860, or not more than 850, or not more than 840, or not more than 830, in each case ° C., in the range of from 730 to 900° C., 750 to 875° C., or 750 to 850° C.

In an embodiment or in combination with any embodiment mentioned herein, the yield of olefin—ethylene, propylene, butadiene, or combinations thereof—can be at least 15, or at least 20, or at least 25, or at least 30, or at least 35, or at least 40, or at least 45, or at least 50, or at least 55, or at least 60, or at least 65, or at least 70, or at least 75, or at least 80, in each case percent. As used herein, the term "yield" refers to the mass of product produced from the mass of feedstock/mass of feedstock×100%. The olefin-containing effluent stream comprises at least 30, or at least 40, or at least 50, or at least 60, or at least 70, or at least 75, or at least 80, or at least 85, or at least 90, or at least 95, or at least 97, or at least 99, in each case weight percent of ethylene, propylene, or ethylene and propylene, based on the total weight of the effluent stream.

In an embodiment or in combination with any embodiment mentioned herein, the olefin-containing effluent stream 125 can comprise at least 10, at least 15, at least 20, at least 25, at least 30, at least 35, at least 40, at least 45, at least 50, at least 55, at least 60, at least 65, at least 70, at least 75, at least 80, at least 85, or at least 90 weight percent of C2 to C4 olefins. The stream 125 may comprise predominantly ethylene, predominantly propylene, or predominantly ethylene and propylene, based on the total weight of the olefin-containing effluent stream 125. The weight ratio of ethylene-to-propylene in the olefin-containing effluent stream 125 can be at least 0.2:1, at least 0.3:1, at least 0.4:1, at least 0.5:1, at least 0.6:1, at least 0.7:1, at least 0.8:1, at least 0.9:1, at least 1:1, at least 1.1:1, at least 1.2:1, at least 1.3:1, at least 1.4:1, at least 1.5:1, at least 1.6:1, at least 1.7:1, at least 1.8:1, at least 1.9:1, or at least 2:1 and/or not more than 3:1, not more than 2.9:1, not more than 2.8:1, not more than 2.7:1, not more than 2.5:1, not more than 2.3:1, not more than 2.2:1, not more than 2.1:1, not more than 2:1, not more than 1.7:1, not more than 1.5:1, or not more than 1.25:1.

Turning again to FIG. 20, in an embodiment or in combination with any embodiment mentioned herein, when introduced into the cracker facility 70, the pyrolysis gas 172 may be introduced into the inlet of the cracker furnace 820, or all or a portion of the pyrolysis gas may be introduced downstream of the furnace outlet, at a location upstream of or within the separation zone 840 of the cracker facility 70. When introduced into or upstream of the separation zone 840, the pyrolysis gas can be introduced upstream of the last stage of compression, or prior to the inlet of at least one fractionation column in the fractionation section of the separation zone 840.

Prior to entering the cracker facility 70, in an embodiment or in combination with any embodiment mentioned herein, a stream of raw pyrolysis gas from a pyrolysis facility may undergo one or more separation steps to remove one or more components from the stream. Examples of such components can include, but are not limited to, halogens, aldehydes, oxygenated compounds, nitrogen-containing compounds, sulfur-containing compounds, carbon dioxide, water, vaporized metals, and combinations thereof. The pyrolysis gas stream 172 introduced into the cracker facility 70 comprises at least 0.1, at least 0.5, at least 1, at least 1.5, at least 2, at least 2.5, at least 3, at least 3.5, at least 4, at least 4.5, or at least 5 and/or not more than 30, not more than 25, not more than 20, not more than 15, not more than 10, not more than 5, not more than 3, not more than 2, or not more than 1 weight percent of one or more aldehyde components, based on the total weight of the pyrolysis gas stream 172.

In an embodiment or in combination with any embodiment mentioned herein, the total ethylene content of the pyrolysis gas stream 172 can be at least 1, at least 2, at least 5, at least 7, at least 10, at least 15, at least 20, at least 25, or at least 30 weight percent and/or not more than 60, not more than 55, not more than 50, not more than 45, not more than 40, or not more than 35 weight percent, based on the total weight of the stream 172. Alternatively, or in addition, the total propylene content of the pyrolysis gas stream 172 can be at least 1, at least 2, at least 5, at least 7, at least 10, at least 15, at least 20, at least 25, or at least 30 weight percent and/or not more than 60, not more than 55, not more than 50, not more than 45, not more than 40, or not more than 35 weight percent, based on the total weight of the stream 172. The combined amount of ethylene and propylene in the pyrolysis gas stream 172 can be at least 2, at least 5, at least 10, at least 15, at least 20, at least 25, at least 30, at least 35, at least 40, or at least 45 weight percent and/or not more than 85, not more than 80, not more than 75, not more than 70, not more than 65, not more than 60, not more than 55, not more than 50, or not more than 45 weight percent, based on the total weight of the stream.

Upon exiting the cracker furnace outlet, the olefin-containing effluent stream 125 may be cooled rapidly (e.g., quenched) in order to prevent production of large amounts of undesirable by-products and to minimize fouling in downstream equipment. In an embodiment or in combination with any embodiment mentioned herein, the temperature of the olefin-containing effluent from the furnace can be reduced by 35 to 485° C., 35 to 375° C., or 90 to 550° C. to a temperature of 500 to 760° C. during the quench or cooling step.

The resulting cooled effluent stream can be then separated in a vapor-liquid separator, and the vapor can be compressed in a gas compressor having, for example, between 1 and 5 compression stages with optional inter-stage cooling and liquid removal. The pressure of the gas stream at the outlet of the first set of compression stages is in the range of from 7 to 20 bar gauge (barg), 8.5 to 18 barg, or 9.5 to 14 barg. The resulting compressed stream is then treated for removal of acid gases, including halogens, CO, $CO_2$, and $H_2S$ by contact with an acid gas removal agent. Examples of acid gas removal agents can include, but are not limited to, caustic and various types of amines. In an embodiment or in combination with any embodiment mentioned herein, a single contactor may be used, while, in other embodiments, a dual column absorber-stripper configuration may be employed.

The treated compressed olefin-containing stream may then be further compressed in another compressor, optionally with inter-stage cooling and liquid separation. The resulting compressed stream, which has a pressure in the range of 20 to 50 barg, 25 to 45 barg, or 30 to 40 barg. Any suitable moisture removal method can be used including, for example, molecular sieves or other similar process. The resulting stream may then be passed to the fractionation section, wherein the olefins and other components may be separated in to various high-purity product or intermediate streams. In some embodiments, all or a portion of the pyrolysis gas may be introduced prior to and/or after one or more stages of the second compressor. Similarly, the pressure of the pyrolysis gas is within 20, within 50, within 100, or within 150 psi of the pressure of the stream with which it is being combined.

In an embodiment or in combination with any embodiment mentioned herein, a feed stream from the quench section may be introduced into at least one column within a fractionation section of the separation zone. As used herein, the term "fractionation" refers to the general process of separating two or more materials having different boiling points. Examples of equipment and processes that utilize fractionation include, but are not limited to, distillation, rectification, stripping, and vapor-liquid separation (single stage).

In an embodiment or in combination with any embodiment mentioned herein, the fractionation section of the cracker facility may include one or more of a demethanizer, a deethanizer, a depropanizer, an ethylene splitter, a propylene splitter, a debutanizer, and combinations thereof. As used herein, the term "demethanizer," refers to a column whose light key component is methane. Similarly, "deethanizer," and "depropanizer," refer to columns with ethane and propane as the light key component, respectively.

Any suitable arrangement of columns may be used so that the fractionation section provides at least one olefin product stream and at least one paraffin stream. In an embodiment or in combination with any embodiment mentioned herein, the fractionation section can provide at least two olefin streams, such as ethylene and propylene, and at least two paraffin streams, such as ethane and propane, as well as additional streams including, for example, methane and lighter components and butane and heavier components.

In an embodiment or in combination with any embodiment mentioned herein, the olefin stream withdrawn from the fractionation section can comprise at least 50, at least 55, at least 60, at least 65, at least 70, at least 75, at least 80, at least 85, at least 90, or at least 95 weight percent and/or not more than 100, 99, 97, 95, 90, 85, or 80 weight percent of olefins, based on the total weight of the olefin stream. The olefins can be predominantly ethylene or predominantly propylene. The olefin stream can comprise at least 50, at least 55, at least 60, at least 65, at least 70, at least 75, at least 80, at least 85, at least 90, or at least 95 weight percent and/or not more than 99, not more than 97, not more than 95, not more than 90, not more than 85, not more than 80, not more than 75, not more than 70, or not more than 65 weight percent of ethylene, based on the total weight of olefins in the olefin stream. The olefin stream may comprise at least 20, at least 25, at least 30, at least 35, at least 40, at least 45, at least 50, at least 55, or at least 60 weight percent and/or not more than 80, not more than 75, not more than 70, not more than 65, not more than 60, not more than 55, not more than 50, or not more than 45 weight percent of ethylene, based on the total weight of the olefin stream, or it can be present in an amount in the range of from 20 to 80 weight percent, 25 to 75 weight percent, or 30 to 70 weight percent, based on the total weight of the olefin stream.

Alternatively, or in addition, the olefin stream can comprise at least 50, at least 55, at least 60, at least 65, at least 70, at least 75, at least 80, at least 85, at least 90, or at least 95 weight percent and/or not more than 99, not more than 97, not more than 95, not more than 90, not more than 85, not more than 80, not more than 75, not more than 70, or not more than 65 weight percent of propylene, based on the total weight of olefins in the olefin stream. In an embodiment or in combination with any embodiment mentioned herein, the olefin stream may comprise at least 20, at least 25, at least 30, at least 35, at least 40, at least 45, at least 50, at least 55, or at least 60 weight percent and/or not more than 80, not more than 75, not more than 70, not more than 65, not more than 60, not more than 55, not more than 50, or not more than 45 weight percent of propylene, based on the total weight of the olefin stream, or it can be present in an amount in the range of from 20 to 80 weight percent, 25 to 75 weight percent, or 30 to 70 weight percent, based on the total weight of the olefin stream.

As the compressed stream passes through the fractionation section, it passed through a demethanizer column, wherein the methane and lighter (CO, $CO_2$, $H_2$) components are separated from the ethane and heavier components. The demethanizer can be operated at a temperature of at least −145, or at least −142, or at least −140, or at least −135, in each case ° C. and/or not more than −120, not more than −125, not more than −130, not more than −135° C. The bottoms stream from the demethanizer column includes at least 50, or at least 55, or at least 60, or at least 65, or at least 70, or at least 75, or at least 80, or at least 85, or at least 90, or at least 95 or at least 99, in each case percent of the total amount of ethane and heavier components.

In an embodiment or in combination with any embodiment mentioned herein, all or a portion of the stream introduced into the fractionation section can be introduced into a deethanizer column, wherein the C2 and lighter components are separated from the C3 and heavier components by fractional distillation. The deethanizer can be operated with an overhead temperature of at least −35, or at least −30, or at least −25, or at least −20, in each case ° C. and/or not more than −5, not more than −10, not more than −15, not more than −20° C., and an overhead pressure of at least 3, or at least 5, or at least 7, or at least 8, or at least 10, in each case barg and/or not more than 20, or not more than 18, or not more than 17, or not more than 15, or not more than 14, or not more than 13, in each case barg. The deethanizer column recovers at least 60, or at least 65, or at least 70, or at least 75, or at least 80, or at least 85, or at least 90, or at least 95, or at least 97, or at least 99, in each case percent of the total amount of C2 and lighter components introduced into the column in the overhead stream. The overhead stream removed from the deethanizer column comprises at least 50, or at least 55, or at least 60, or at least 65, or at least 70, or at least 75, or at least 80, or at least 85, or at least 90, or at least 95, in each case weight percent of ethane and ethylene, based on the total weight of the overhead stream.

In an embodiment or in combination with any embodiment mentioned herein, the C2 and lighter overhead stream from a deethanizer can be further separated in an ethane-ethylene fractionator column (ethylene fractionator or ethylene splitter). In the ethane-ethylene fractionator column, an ethylene and lighter component stream can be withdrawn from the overhead of the column or as a side stream from the top half of the column, while the ethane and any residual heavier components are removed in the bottoms stream. The ethylene fractionator may be operated at an overhead temperature of at least −45, or at least −40, or at least −35, or at least −30, or at least −25, or at least −20, in each case ° C. and/or not more than −15, or not more than −20, or not more than −25, in each case ° C., and an overhead pressure of at least 10, or at least 12, or at least 15, in each case barg and/or not more than 25, not more than 22, not more than 20 barg. The overhead stream, which may be enriched in ethylene, can include at least 70, or at least 75, or at least 80, or at least 85, or at least 90, or at least 95, or at least 97, or at least 98, or at least 99, in each case weight percent ethylene, based on the total weight of the stream and may be sent to downstream processing unit for further processing, storage, or sale.

The bottoms stream from the ethane-ethylene fractionator may include at least 40, or at least 45, or at least 50, or at least 55, or at least 60, or at least 65, or at least 70, or at least 75, or at least 80, or at least 85, or at least 90, or at least 95, or at least 98, in each case weight percent ethane, based on the total weight of the bottoms stream. All or a portion of the recovered ethane may be recycled to the inlet of the cracker furnace as additional feedstock, alone or in combination with the pyrolysis oil and/or pyrolysis gas, as discussed previously.

In some embodiments, at least a portion of the compressed stream may be separated in a depropanizer, wherein C3 and lighter components are removed as an overhead vapor stream, while C4 and heavier components exit the column in the liquid bottoms. The depropanizer can be operated with an overhead temperature of at least 20, or at least 35, or at least 40, in each case ° C. and/or not more than 70, 65, 60, 55° C., and an overhead pressure of at least 10, or at least 12, or at least 15, in each case barg and/or not more than 20, or not more than 17, or not more than 15, in each case barg. The depropanizer column recovers at least 60, or at least 65, or at least 70, or at least 75, or at least 80, or at least 85, or at least 90, or at least 95, or at least 97, or at least 99, in each case percent of the total amount of C3 and lighter components introduced into the column in the overhead stream. In an embodiment or in combination with any embodiment mentioned herein, the overhead stream removed from the depropanizer column comprises at least or at least 50, or at least 55, or at least 60, or at least 65, or at least 70, or at least 75, or at least 80, or at least 85, or at least 90, or at least 95, or at least 98, in each case weight percent of propane and propylene, based on the total weight of the overhead stream.

In an embodiment or in combination with any embodiment mentioned herein, the overhead stream from the depropanizer may be introduced into a propane-propylene fractionator (propylene fractionator or propylene splitter), wherein the propylene and any lighter components are removed in the overhead stream and the propane and any heavier components exit the column in the bottoms stream. The propylene fractionator may be operated at an overhead temperature of at least 20, or at least 25, or at least 30, or at least 35, in each case ° C. and/or not more than 55, not more than 50, not more than 45, not more than 40° C., and an overhead pressure of at least 12, or at least 15, or at least 17, or at least 20, in each case barg and/or not more than 20, or not more than 17, or not more than 15, or not more than 12, in each case barg. The overhead stream, which is enriched in propylene, can include at least 70, or at least 75, or at least 80, or at least 85, or at least 90, or at least 95, or at least 97, or at least 98, or at least 99, in each case weight percent propylene, based on the total weight of the stream and may be sent to downstream processing unit for further processing, storage, or sale.

The bottoms stream from the propane-propylene fractionator may include at least 40, or at least 45, or at least 50, or at least 55, or at least 60, or at least 65, or at least 70, or at least 75, or at least 80, or at least 85, or at least 90, or at least 95, or at least 98, in each case weight percent propane, based on the total weight of the bottoms stream. All or a portion of the recovered propane may be recycled to the cracker furnace as additional feedstock, alone or in combination with pyrolysis oil and/or pyrolysis gas, as discussed previously.

In an embodiment or in combination with any embodiment mentioned herein, at least a portion of the compressed stream may be sent to a debutanizer column for separating C4 and lighter components, including butenes, butanes and butadienes, from C5 and heavier (C5+) components. The debutanizer can be operated with an overhead temperature of at least 20, or at least 25, or at least 30, or at least 35, or at least 40, in each case ° C. and/or not more than 60, or not more than 65, or not more than 60, or not more than 55, or not more than 50, in each case ° C. and an overhead pressure of at least 2, or at least 3, or at least 4, or at least 5, in each case barg and/or not more than 8, or not more than 6, or not more than 4, or not more than 2, in each case barg. The debutanizer column recovers at least 60, or at least 65, or at least 70, or at least 75, or at least 80, or at least 85, or at least 90, or at least 95, or at least 97, or at least 99, in each case percent of the total amount of C4 and lighter components introduced into the column in the overhead stream.

In an embodiment or in combination with any embodiment mentioned herein, the overhead stream removed from the debutanizer column comprises at least 30, or at least 35, or at least 40, or at least 45, or at least 50, or at least 55, or at least 60, or at least 65, or at least 70, or at least 75, or at least 80, or at least 85, or at least 90, or at least 95, in each case weight percent of butadiene, based on the total weight of the overhead stream. The bottoms stream from the debutanizer includes mainly C5 and heavier components, in an amount of at least 50, or at least 60, or at least 70, or at least 80, or at least 90, or at least 95 weight percent, based on the total weight of the stream. The debutanizer bottoms stream may be sent for further separation, processing, storage, sale or use. In an embodiment or in combination with any embodiment mentioned herein, the overhead stream from the debutanizer, or the C4s, can be subjected to any conventional separation methods such as extraction or distillation processes to recover a more concentrated stream of butadiene.

In an embodiment or in combination with any embodiment mentioned herein, at least a portion of one or more of the above streams may be introduced into one or more of the facilities shown in FIG. 1, while, in other embodiments, all or a portion of the streams withdrawn from the separation zone of the cracking facility may be routed to further separation and/or storage, transportation, sale, and/or use.

Partial Oxidation (POX) Gasification

In an embodiment or in combination with any embodiment mentioned herein, the chemical recycling facility may also comprise a partial oxidation (POX) gasification facility. As used herein, the term "partial oxidation" refers to high temperature conversion of a carbon-containing feed into syngas (carbon monoxide, hydrogen, and carbon dioxide), where the conversion is carried out with an amount of oxygen that is less than the stoichiometric amount of oxygen needed for complete oxidation of carbon to CO2. The reactions occurring within a partial oxidation (POX) gasifier include conversion of a carbon-containing feed into syngas, and specific examples include, but are not limited to partial oxidation, water gas shift, water gas—primary reactions, Boudouard, oxidation, methanation, hydrogen reforming, steam reforming, and carbon dioxide reforming. The feed to POX gasification can include solids, liquids, and/or gases. A "partial oxidation facility" or "POX gasification facility" is a facility that includes all equipment, lines, and controls necessary to carry out POX gasification of waste plastic and feedstocks derived therefrom.

In the POX gasification facility, the feed stream may be converted to syngas in the presence of a sub-stoichiometric amount of oxygen. In an embodiment or in combination with any embodiment mentioned herein, the feed stream to the POX gasification facility may comprise one or more of a PO-enriched waste plastic, at least one solvolysis coproduct stream, a pyrolysis stream (including pyrolysis gas, pyrolysis oil, and/or pyrolysis residue), and at least one stream from the cracking facility. One or more of these streams may be introduced into the POX gasification facility continuously or one or more of these streams may be introduced intermittently. When multiple types of feed streams are present, each may be introduced separately, or all or a portion of the streams may be combined so that the combined stream may be introduced into the POX gasification facility. The combining, when present, may take place in a continuous or batch manner. The feed stream can be in the form of a gas, a liquid or liquified plastic, solids (usually comminuted), or a slurry.

Figure 22:
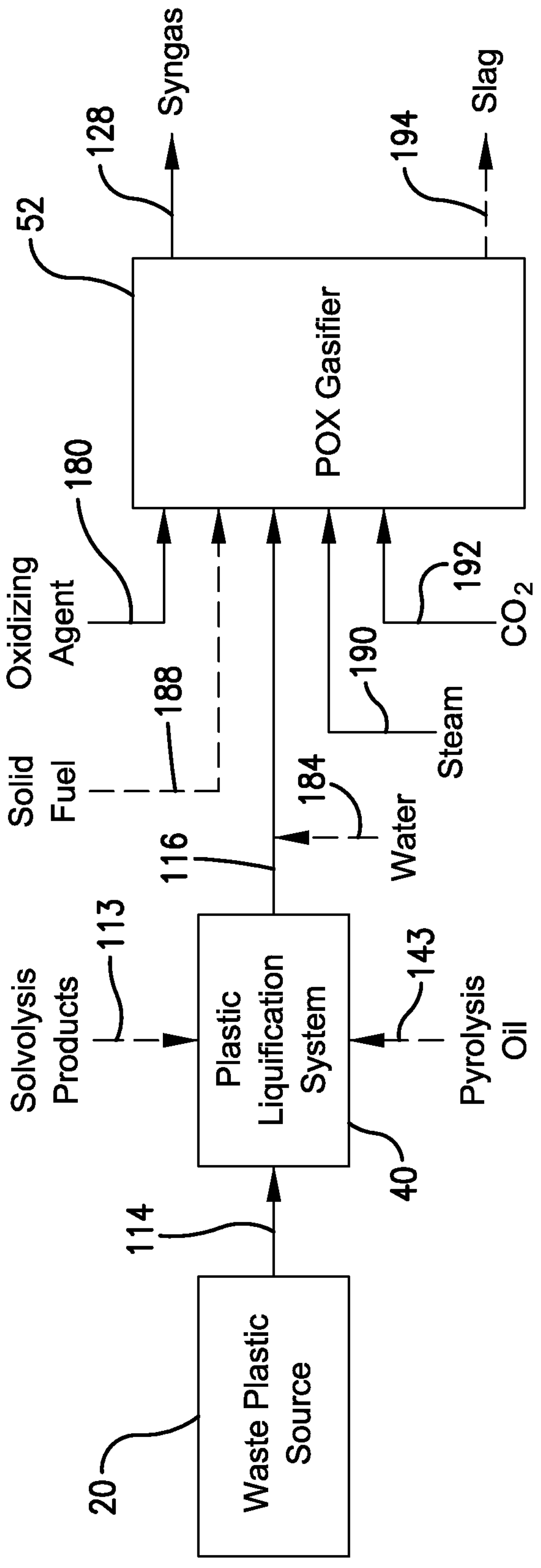
FIG. 22 depicts an exemplary partial oxidation gasification facility for converting waste plastic.

FIG. 22 depicts an exemplary POX gasification facility 50 for converting a waste plastic, such as the liquefied waste plastic from liquification zone 40, into a syngas stream 128 and a slag stream 194. It should be understood that FIG. 22 depicts one exemplary embodiment of the present technology. Thus, certain features depicted in FIG. 22 may be omitted and/or additional features described elsewhere herein may be added to the system depicted in FIG. 22.

In an embodiment or in combination with any embodiment mentioned herein, and as shown in FIG. 22, the feed stream 116 to the POX gasification facility may be derived from the liquification system 40 described herein. For example, the feed stream 116 to the POX gasification facility may comprise a liquefied plastic feed stream, such as a halogen-depleted molten waste plastic, that has been derived from the liquification system 40 described herein. Thus, any of the plastic feeds processed and described above in regard to the liquification system 40 may be fed and introduced into the POX gasification facility.

Furthermore, as shown in FIG. 22, an additional water stream 184 may be added to the feed stream 116 to the POX gasification facility prior to introduction into the POX gasifier 52. In addition, as shown in FIG. 22 and discussed below, an oxidizing agent stream 180, a solid fuel stream 188, a steam stream 190, and a $CO_2$ stream 192 may also be separately fed into the POX gasifier 50, along with the feed stream 116.

In an embodiment or in combination with any embodiment mentioned herein, the feed stream 116 to the POX gasification facility may comprise at least 50, at least 55, at least 60, at least 65, at least 70, at least 75, at least 80, at least 85, at least 90, at least 95, at least 99, or at least 99.5 weight percent of a liquefied waste plastic from the liquification system, based on the total weight of the fuel in the gasifier feed stream or based on the total weight of the gasifier feedstock stream. Furthermore, in one or more embodiments, the liquefied waste plastic may be introduced into the POX gasification facility at a rate of at least 1,000, at least 5,000, at least 10,000, at least 20,000, at least 40,000, at least 80,000, or at least 120,000 lbs/hour.

Figure 23:
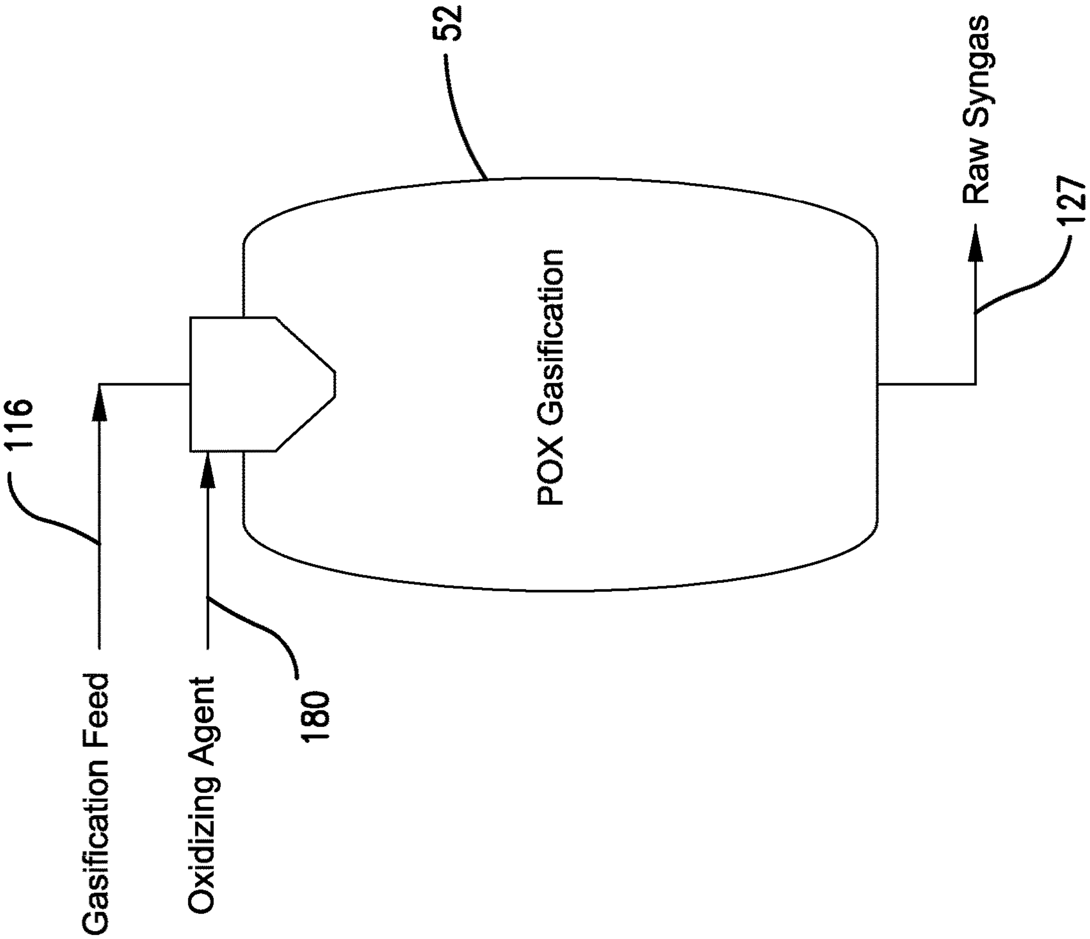
FIG. 23 depicts an exemplary partial oxidation gasification reactor.

The POX gasification facility includes at least one POX gasification reactor. An exemplary POX gasification reactor 52 is shown in FIG. 23. The POX gasification unit may comprise a gas-fed, a liquid-fed, or a solid-fed reactor (or gasifier). In an embodiment or in combination with any embodiment mentioned herein, the POX gasification facility may perform liquid-fed POX gasification. As used herein, "liquid-fed POX gasification" refers to a POX gasification process where the feed to the process comprises predominately (by weight) components that are liquid at 25° C. and 1 atm. Additionally, or alternatively, POX gasification unit may perform gas-fed POX gasification. As used herein, "gas-fed POX gasification" refers to a POX gasification process where the feed to the process comprises predominately (by weight) components that are gaseous at 25° C. and 1 atm.

Additionally, or alternatively, POX gasification unit may conduct solid-fed POX gasification. As used herein, "solid-fed POX gasification" refers to a POX gasification process where the feed to the process comprises predominately (by weight) components that are solid at 25° C. and 1 atm.

Gas-fed, liquid-fed, and solid-fed POX gasification processes can be co-fed with lesser amounts of other components having a different phase at 25° C. and 1 atm. Thus, gas-fed POX gasifiers can be co-fed with liquids and/or solids, but only in amounts that are less (by weight) than the amount of gasses fed to the gas-phase POX gasifier; liquid-fed POX gasifiers can be co-fed with gasses and/or solids, but only in amounts (by weight) less than the amount of liquids fed to the liquid-fed POX gasifier; and solid-fed POX gasifiers can be co-fed with gasses and/or liquids, but only in amounts (by weight) less than the amount of solids fed to the solid-fed POX gasifier.

In an embodiment or in combination with any embodiment mentioned herein, the total feed to a gas-fed POX gasifier can comprise at least 60, at least 70, at least 80, at least 90, or at least 95 weight percent of components that are gaseous at 25° C. and 1 atm; the total feed to a liquid-fed POX gasifier can comprise at least 60, at least 70, at least 80, at least 90, or at least 95 weight percent of components that are liquid at 25° C. and 1 atm; and the total feed to a solid-fed POX gasifier can comprise at least 60, at least 70, at least 80, at least 90, or at least 95 weight percent of components that are solids at 25° C. and 1 atm.

As generally shown in FIGS. 22 and 23, the gasification feed stream 116 may be introduced into a gasification reactor 52 along with an oxidizing agent stream 180. The feedstock stream 116 and the oxidizing agent stream 180 may be sprayed through an injector assembly into a pressurized gasification zone having, for example, a pressure, typically at least 500, at least 600, at least 800, or at least 1,000 psig, (or at least 35, at least 40, at least 55, or at least 70 barg).

In an embodiment or in combination with any embodiment mentioned herein, the oxidizing agent in stream 180 comprises an oxidizing gas that can include air, oxygen-enriched air, or molecular oxygen (02). The oxidizing agent can comprise at least 25, at least 35, at least 40, at least 50, at least 60, at least 70, at least 80, at least 90, at least 95, at least 97, at least 99, or at least 99.5 mole percent of molecular oxygen based on the total moles of all components in the oxidizing agent stream 180 injected into the reaction (combustion) zone of the gasification reactor 52. The particular amount of oxygen as supplied to the reaction zone can be sufficient to obtain near or maximum yields of carbon monoxide and hydrogen obtained from the gasification reaction relative to the components in the feed stream 116, considering the amount relative to the feed stream, and the amount of feed charged, the process conditions, and the reactor design.

The oxidizing agent can include other oxidizing gases or liquids, in addition to or in place of air, oxygen-enriched air, and molecular oxygen. Examples of such oxidizing liquids suitable for use as oxidizing agents include water (which can be added as a liquid or as steam) and ammonia. Examples of such oxidizing gases suitable for use as oxidizing agents include carbon monoxide, carbon dioxide, and sulfur dioxide.

In addition to the liquefied waste plastic, the gasification feedstock stream may also comprise at least 1, at least 5, at least 10, at least 15, at least 20, at least 25, at least 30, at least 35, at least 40, at least 45, or at least 50 weight percent of water, based on the total weight of the gasification feedstock stream. Additionally, or in the alternative, the gasification feedstock stream may also comprise not more than 20, not more than 15, not more than 10, not more than 9, not more than 8, not more than 7, not more than 6, not more than 5, not more than 4, not more than 3, not more than 2, or not more than 1 weight percent of water, based on the total weight of the gasification feedstock stream.

Exemplary fuels that may be introduced into the POX gasifier 52 and/or initially combined with the feed stream 116 may include, for example, a solid (e.g., coal, petrocoke, waste plastics, etc.), liquid (e.g., liquid hydrocarbons, liquefied plastics, etc.), and/or a gas (e.g., natural gas, organic hydrocarbons, etc.). As used herein, a "gasification feedstock" or "gasifier feed" refers to all components fed into the gasifier except oxygen.

In addition to the liquefied waste plastic, in an embodiment or in combination with any embodiment mentioned herein, the gasification feedstock stream may also comprise at least 1, at least 5, at least 10, at least 15, at least 20, at least 25, at least 30, at least 35, at least 40, at least 45, or at least 50 weight percent of one or more optional solid fuels, based on the total weight of the gasification feedstock stream. Additionally, or in the alternative, the gasification feedstock stream may also comprise not more than 99, not more than 90, not more than 80, not more than 70, not more than 60, not more than 50, not more than 40, not more than 30, not more than 20, not more than 10, not more than 5, not more than 4, not more than 3, not more than 2, or not more than 1 weight percent of one or more optional solid fuels, based on the total weight of the gasification feedstock stream. Exemplary solid fuels can include coal.

In an embodiment or in combination with any embodiment mentioned herein, the gasification feedstock stream may comprise an oxygen/carbon molar ratio in the range of 0.5 to 1.5, 0.6 to 1.3, or 0.7 to 1.1.

Figure 24:
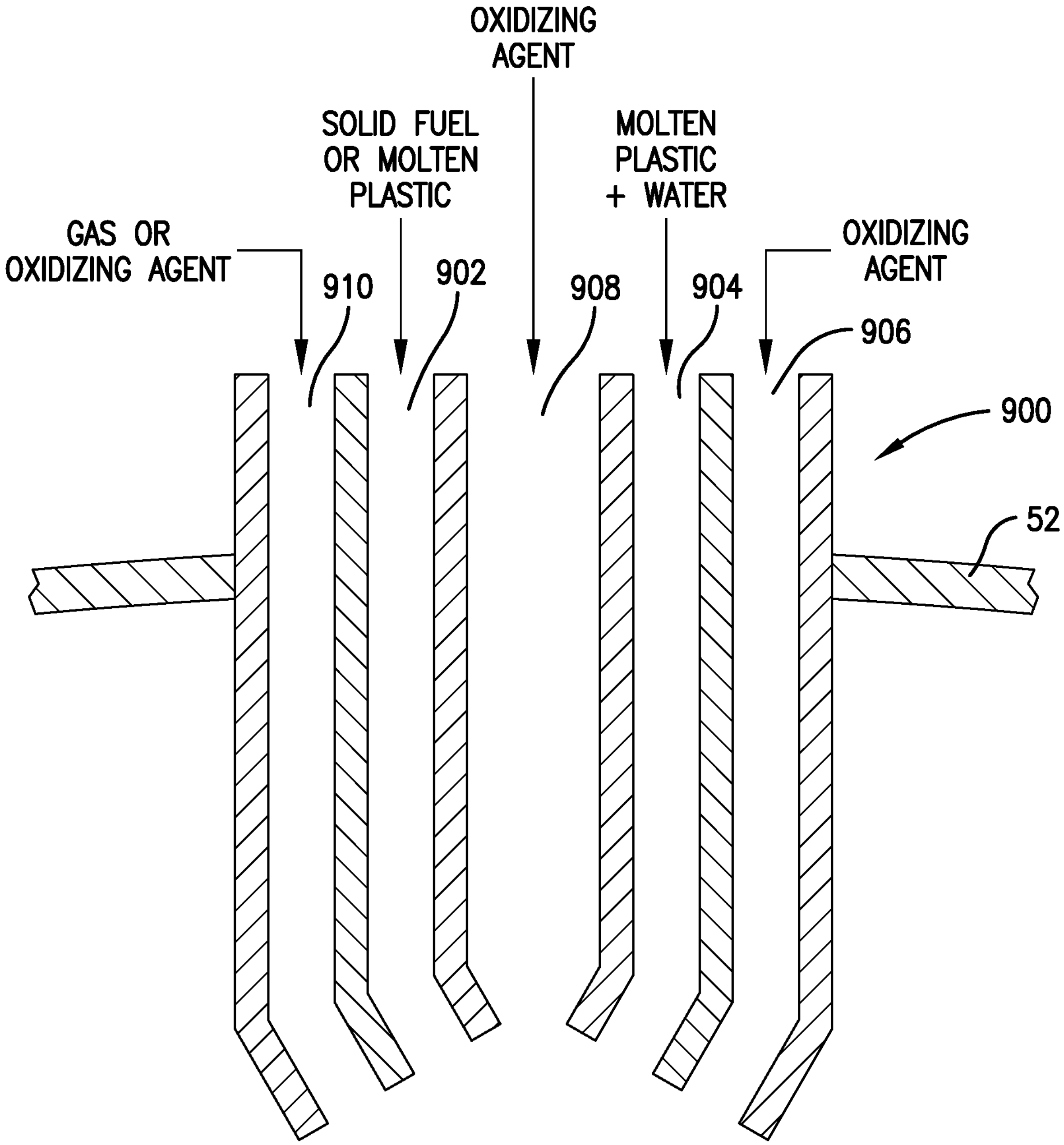
FIG. 24 depicts an exemplary injector for a partial oxidation gasification reactor.

As noted above, the feedstock stream and the oxidizing agent may be sprayed through an injector assembly into the pressurized gasification zone. FIG. 24 depicts an exemplary embodiment on how the separate components of the feedstock stream may be injected into separate passageways of an injector assembly 900.

As shown in FIG. 24, the liquefied plastic stream (e.g., molten waste plastic) may be injected in a separate passageway 904 of the injector 900 in the optional presence of water. Additionally, another passageway 902 can be used to inject an optional solid fuel (e.g., coal) or another stream of liquefied plastic into the POX gasifier. Furthermore, as depicted in FIG. 24, other gases (e.g., steam) and the oxidizing agent may be injected in separate passageways 906, 908, and 910 from the liquefied plastic.

In an embodiment or in combination with any embodiment mentioned herein, the liquefied plastic stream (e.g., molten waste plastic) has a viscosity of less than 3,000, less than 2,800, less than 2,600, less than 2,400, less than 2,200, less than 2,000, less than 1,800, less than 1,500, less than 1,000, less than 500, less than 250, less than 50 poise, less than 10, less than 5, less than 4, less than 3, less than 2, or less than 1 poise and/or at least 0.1, at least 0.2, or at least 0.5 poise at 350° C. and 10 radians/s immediately prior to being introduced into the injector assembly of the POX gasifier 52, as measured using a Brookfield R/S rheometer with V80-40 vane spindle. For example, the liquefied plastic stream (e.g., molten waste plastic) can have a viscosity of 0.1 to 3,000 poise, 0.1 to 2,600 poise, 0.1 to 1,000 poise, 0.1 to 250 poise, 0.1 to 50 poise, 0.1 to 10 poise, 0.1 to 5 poise, or 0.1 to 1 poise, as measured using a Brookfield R/S rheometer with V80-40 vane spindle operating at a shear rate of 10 rad/s and a temperature of 350° C.

In an embodiment or in combination with any embodiment mentioned herein, an atomization enhancing fluid is fed to the gasification zone along with the feedstock and oxidizing agent. As used herein, the term "atomization enhancing fluid" refers to a liquid or gas operable to reduce viscosity to decrease dispersion energy, or increase energy available to assist dispersion. The atomization enhancing fluid may be mixed with the plastic-containing feedstock before the feedstock is fed into the gasification zone or separately added to the gasification zone, for example to an injection assembly coupled with the gasification reactor. In an embodiment or in combination with any embodiment mentioned herein, the atomization enhancing fluid is water and/or steam. However, in an embodiment or in combination with any embodiment mentioned herein, steam and/or water is not supplied to the gasification zone.

In an embodiment or in combination with any embodiment mentioned herein, a gas stream enriched in carbon dioxide or nitrogen (e.g., greater than the molar quantity found in air, or at least 2, at least 5, at least 10, or at least 40 mole percent) is charged into the gasifier. These gases may serve as carrier gases to propel a feedstock to a gasification zone. Due to the pressure within the gasification zone, these carrier gases may be compressed to provide the motive force for introduction into the gasification zone. This gas stream may be compositionally the same as or different than the atomization enhancing fluid. In one or more embodiments, this gas stream also functions as the atomization enhancing fluid.

In an embodiment or in combination with any embodiment mentioned herein, a gas stream enriched in hydrogen (H2) (e.g., at least 1, at least 2, at least 5, at least 10, at least 20, at least 30, at least 40, at least 50, at least 60, at least 70, at least 80, or at least 90 mole percent is charged into the gasifier. Hydrogen may be added to affect the partial oxidation reactions so as to control the resulting syngas composition.

In an embodiment or in combination with any embodiment mentioned herein, no gas stream containing more than 0.01 or more than 0.02 mole percent of carbon dioxide is charged to the gasifier or gasification zone. Alternatively, no gas stream containing more than 77, more than 70, more than 50, more than 30, more than 10, more than 5, or more than 3 mole percent nitrogen is charged to the gasifier or gasification zone. Furthermore, a gaseous hydrogen stream more than 0.1, more than 0.5, more than 1, or more than 5 mole percent hydrogen is not charged to the gasifier or to the gasification zone. Moreover, a stream of methane gas containing more than 0.1, more than 0.5, more than 1, or more than 5 mole percent methane is not charged to the gasifier or to the gasification zone. In certain embodiments, the only gaseous stream introduced to the gasification zone is the oxidizing agent.

The gasification process can be a partial oxidation (POX) gasification reaction, as described previously. Generally, to enhance the production of hydrogen and carbon monoxide, the oxidation process involves partial, rather than complete, oxidization of the gasification feedstock and, therefore, may be operated in an oxygen-lean environment, relative to the amount needed to completely oxidize 100 percent of the carbon and hydrogen bonds. In an embodiment or in combination with any embodiment mentioned herein, the total oxygen requirements for the gasifier may be at least 5, at least 10, at least 15, or at least 20 percent in excess of the amount theoretically required to convert the carbon content of the gasification feedstock to carbon monoxide. In general, satisfactory operation may be obtained with a total oxygen supply of 10 to 80 percent in excess of the theoretical requirements. For example, examples of suitable amounts of oxygen per pound of carbon may be in the range of 0.4 to 3.0, 0.6 to 2.5, 0.9 to 2.5, or 1.2 to 2.5 pounds free oxygen per pound of carbon.

Mixing of the feedstock stream and the oxidizing agent may be accomplished entirely within the reaction zone by introducing the separate streams of feedstock and oxidizing agent so that they impinge upon each other within the reaction zone. In an embodiment or in combination with any embodiment mentioned herein, the oxidizing agent stream is introduced into the reaction zone of the gasifier as high velocity to both exceed the rate of flame propagation and to improve mixing with the feedstock stream. In an embodiment or in combination with any embodiment mentioned herein, the oxidant may be injected into the gasification zone in the range of 25 to 500, 50 to 400, or 100 to 400 feet per second. These values would be the velocity of the gaseous oxidizing agent stream at the injector-gasification zone interface, or the injector tip velocity. Mixing of the feedstock stream and the oxidizing agent may also be accomplished outside of the reaction zone. For example, in an embodiment or in combination with any embodiment mentioned herein, the feedstock, oxidizing agent, and/or atomization enhancing fluid can be combined in a conduit upstream of the gasification zone or in an injection assembly coupled with the gasification reactor.

In an embodiment or in combination with any embodiment mentioned herein, the gasification feedstock stream, the oxidizing agent, and/or the atomization enhancing fluid can optionally be preheated to a temperature of at least 200° C., at least 300° C., or at least 400° C. However, the gasification process employed does not require preheating the feedstock stream to efficiently gasify the feedstock and a pre-heat treatment step may result in lowering the energy efficiency of the process.

In an embodiment or in combination with any embodiment mentioned herein, the type of gasification technology employed may be a partial oxidation entrained flow gasifier that generates syngas. This technology is distinct from fixed bed (alternatively called moving bed) gasifiers and from fluidized bed gasifiers. An exemplary gasifier that may be used in depicted in U.S. Pat. No. 3,544,291, the entire disclosure of which is incorporated herein by reference to the extent not inconsistent with the present disclosure. However, in an embodiment or in combination with any embodiment mentioned herein, other types of gasification reactors may also be used within the scope of the present technology.

In an embodiment or in combination with any embodiment mentioned herein, the gasifier/gasification reactor can be non-catalytic, meaning that the gasifier/gasification reactor does not contain a catalyst bed and the gasification process is non-catalytic, meaning that a catalyst is not introduced into the gasification zone as a discrete unbound catalyst. Furthermore, in an embodiment or in combination with any embodiment mentioned herein, the gasification process may not be a slagging gasification process; that is, operated under slagging conditions (well above the fusion temperature of ash) such that a molten slag is formed in the gasification zone and runs along and down the refractory walls.

In an embodiment or in combination with any embodiment mentioned herein, the gasification zone, and optionally all reaction zones in the gasifier/gasification reactor, may be operated at a temperature of at least 1000° C., at least 1100° C., at least 1200° C., at least 1250° C., or at least 1300° C. and/or not more than 2500° C., not more than 2000° C., not more than 1800° C., or not more than 1600° C. The reaction temperature may be autogenous. Advantageously, the gasifier operating in steady state mode may be at an autogenous temperature and does not require application of external energy sources to heat the gasification zone.

In an embodiment or in combination with any embodiment mentioned herein, the gasification zone, and optionally all reaction zones in the gasifier/gasification reactor, may comprise a sidewall temperature of at least 1000° C., at least 1100° C., at least 1200° C., at least 1250° C., or at least 1300° C. and/or not more than 2500° C., not more than 2000° C., not more than 1800° C., not more than 1600° C., or not more than 1500° C.

In an embodiment or in combination with any embodiment mentioned herein, the gasifier may comprise a single burner or a plurality of burners to provide the necessary heat. Furthermore, in one or more embodiments, the gasifier may comprise an opposed burner configuration, such as an opposed multi-burner configuration. Additionally, or in the alternative, the gasifier may comprise a maximum flame temperature in the range of 1,800 to 3,000° C.

In an embodiment or in combination with any embodiment mentioned herein, the gasifier is a predominately gas fed gasifier.

In an embodiment or in combination with any embodiment mentioned herein, the gasifier is a non-slagging gasifier or operated under conditions not to form a slag.

In an embodiment or in combination with any embodiment mentioned herein, the gasifier may comprise a fixed bed gasifier.

In an embodiment or in combination with any embodiment mentioned herein, the gasifier may not be under negative pressure during operations, but rather can be under positive pressure during operation.

In an embodiment or in combination with any embodiment mentioned herein, the gasifier may be operated at a pressure within the gasification zone (or combustion chamber) of at least 200 psig (1.38 MPa), 300 psig (2.06 MPa), 350 psig (2.41 MPa), 400 psig (2.76 MPa), 420 psig (2.89 MPa), 450 psig (3.10 MPa), 475 psig (3.27 MPa), 500 psig (3.44 MPa), 550 psig (3.79 MPa), 600 psig (4.13 MPa), 650 psig (4.48 MPa), 700 psig (4.82 MPa), 750 psig (5.17 MPa), 800 psig (5.51 MPa), 900 psig (6.2 MPa), 1000 psig (6.89 MPa), 1100 psig (7.58 MPa), or 1200 psig (8.2 MPa). Additionally or alternatively, the gasifier may be operated at a pressure within the gasification zone (or combustion chamber) of not more than 1300 psig (8.96 MPa), 1250 psig (8.61 MPa), 1200 psig (8.27 MPa), 1150 psig (7.92 MPa), 1100 psig (7.58 MPa), 1050 psig (7.23 MPa), 1000 psig (6.89 MPa), 900 psig (6.2 MPa), 800 psig (5.51 MPa), or 750 psig (5.17 MPa).

Examples of suitable pressure ranges include 300 to 1000 psig (2.06 to 6.89 MPa), 300 to 750 psig (2.06 to 5.17 MPa), 350 to 1000 psig (2.41 to 6.89 MPa), 350 to 750 psig (2.06 to 5.17 MPa), 400 to 1000 psig (2.67 to 6.89 MPa), 420 to 900 psig (2.89 to 6.2 MPa), 450 to 900 psig (3.10 to 6.2 MPa), 475 to 900 psig (3.27 to 6.2 MPa), 500 to 900 psig (3.44 to 6.2 MPa), 550 to 900 psig (3.79 to 6.2 MPa), 600 to 900 psig (4.13 to 6.2 MPa), 650 to 900 psig (4.48 to 6.2 MPa), 400 to 800 psig (2.67 to 5.51 MPa), 420 to 800 psig (2.89 to 5.51 MPa), 450 to 800 psig (3.10 to 5.51 MPa), 475 to 800 psig (3.27 to 5.51 MPa), 500 to 800 psig (3.44 to 5.51 MPa), 550 to 800 psig (3.79 to 5.51 MPa), 600 to 800 psig (4.13 to 5.51 MPa), 650 to 800 psig (4.48 to 5.51 MPa), 400 to 750 psig (2.67 to 5.17 MPa), 420 to 750 psig (2.89 to 5.17 MPa), 450 to 750 psig (3.10 to 5.17 MPa), 475 to 750 psig (3.27 to 5.17 MPa), 500 to 750 psig (3.44 to 5.17 MPa), or 550 to 750 psig (3.79 to 5.17 MPa).

Generally, the average residence time of gases in the gasifier reactor can be very short to increase throughput. Since the gasifier may be operated at high temperature and pressure, substantially complete conversion of the feedstock to gases can occur in a very short time frame. In an embodiment or in combination with any embodiment mentioned herein, the average residence time of the gases in the gasifier can be not more than 30, not more than 25, not more than 20, not more than 15, not more than 10, or not more than 7 seconds.

To avoid fouling downstream equipment from the gasifier, and the piping in-between, the resulting raw syngas stream 127 may have a low or no tar content. In an embodiment or in combination with any embodiment mentioned herein, the syngas stream discharged from the gasifier may comprise not more than 4, not more than 3, not more than 2, not more than 1, not more than 0.5, not more than 0.2, not more than 0.1, or not more than 0.01 weight percent of tar based on the weight of all condensable solids in the syngas stream. For purposes of measurement, condensable solids are those compounds and elements that condense at a temperature of 15° C. and 1 atm. Examples of tar products include naphthalenes, cresols, xylenols, anthracenes, phenanthrenes, phenols, benzene, toluene, pyridine, catechols, biphenyls, benzofurans, benzaldehydes, acenaphthylenes, fluorenes, naphthofurans, benzanthracenes, pyrenes, acephenanthrylenes, benzopyrenes, and other high molecular weight aromatic polynuclear compounds. The tar content can be determined by GC-MSD.

Generally, the raw syngas stream discharged from the gasification vessel includes such gases as hydrogen, carbon monoxide, and carbon dioxide and can include other gases such as methane, hydrogen sulfide, and nitrogen depending on the fuel source and reaction conditions.

In an embodiment or in combination with any embodiment mentioned herein, the raw syngas stream (the stream discharged from the gasifier and before any further treatment by way of scrubbing, shift, or acid gas removal) can have the following composition in mole percent on a dry basis and based on the moles of all gases (elements or compounds in gaseous state at 25° C. and 1 atm) in the raw syngas stream:

- a hydrogen content in the range of 32 to 50 percent, or at least 33, at least 34, or at least 35 and/or not more than 50, not more than 45, not more than 41, not more than 40, or not more than 39 percent, or it can be in the range of 33 to 50 percent, 34 to 45 percent, or 35 to 41 percent, on a dry volume basis;
- a carbon monoxide content of at least 40, at least 41, at least 42, or at least 43 and/or not more than 55, not more than 54, not more than 53, or not more than 52 weight percent, based on the total weight of the stream, or in the range of from 40 to 55 weight percent, 41 to 54 weight percent, or 42 to 53 weight percent, based on the total weight of the stream on a dry basis;
- a carbon dioxide content of at least 1%, at least 1.5%, at least 2%, at least 3%, at least 4%, at least 5%, at least 6%, or at least 7% by volume and/or not more than 25%, not more than 20%, not more than 15%, not more than 12%, not more than 11%, not more than 10%, not more than 9%, not more than 8%, or not more than 7% by volume on a dry basis;
- a methane content of not more than 5000, not more than 2500, not more than 2000, or not more than 1000 ppm by volume methane on a dry basis;
- a sulfur content of not more than 1000, not more than 100, not more than 10, or not more than 1 ppm by weight (ppmw);

a soot content of at least 1000, or at least 5000 ppm and/or not more than 50,000, not more than 20,000, or not more than 15,000 ppmw;

a halides content of not more than 1000, not more than 500, not more than 200, not more than 100, or not more than 50 ppmw;

a mercury content of not more than 0.01, not more than 0.005, or not more than 0.001 ppmw;

an arsine content of not more than 0.1 ppm, not more than 0.05, or not more than 0.01 ppmw;

a nitrogen content of not more than 10,000, not more than 3000, not more than 1000, or not more than 100 ppmw nitrogen;

an antimony content of at least 10 ppmw, at least 20 ppmw, at least 30 ppmw, at least 40 ppmw, or at least 50 ppmw, and/or not more than 200 ppmw, not more than 180 ppmw, not more than 160 ppmw, not more than 150 ppmw, or not more than 130 ppmw; and/or a titanium content of at least 10 ppmw, at least 25 ppmw, at least 50 ppmw, at least 100 ppmw, at least 250 ppmw, at least 500 ppmw, or at least 1000 ppmw, and/or not more than 40,000 ppmw, not more than 30,000 ppmw, not more than 20,000 ppmw, not more than 15,000 ppmw, not more than 10,000 ppmw, not more than 7,500 ppmw, or not more than 5,000 ppmw.

In an embodiment or in combination with any embodiment mentioned herein, the syngas comprises a molar hydrogen/carbon monoxide ratio of 0.7 to 2, 0.7 to 1.5, 0.8 to 1.2, 0.85 to 1.1, or 0.9 to 1.05.

The gas components can be determined by Flame Ionization Detector Gas Chromatography (FID-GC) and Thermal Conductivity Detector Gas Chromatography (TCD-GC) or any other method recognized for analyzing the components of a gas stream.

In an embodiment or in combination with any embodiment mentioned herein, the recycle content syngas can have a recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, or at least 99 weight percent, based on the total weight of the syngas stream.

Energy Recovery

In an embodiment or in combination with any embodiment mentioned herein, the chemical recycling facility may also comprise an energy recovery facility. As used herein, an "energy recovery facility" is a facility that generates energy (i.e., thermal energy) from a feedstock via chemical conversion (e.g., combustion) of the feedstock. At least 5, at least 10, at least 15, at least 20, at least 25, at least 30, or at least 35 percent of the total energy generated from combustion can be recovered and used in one or more other processes and/or facilities.

In an embodiment or in combination with any embodiment mentioned herein, the feed stream introduced into the energy recovery facility 80 (FIG. 1) may comprise one or more of at least a portion of a PO-enriched waste plastic, at least one solvolysis coproduct stream, at least a portion of one or more of pyrolysis gas, pyrolysis oil, and pyrolysis residue, and/or one or more other streams from within the chemical recycling facility. In an embodiment or in combination with any embodiment mentioned herein, one or more of these streams may be introduced into the energy recovery facility continuously or one or more of these streams may be introduced intermittently. When multiple types of feed streams are present, each may be introduced separately, or all or a portion of the streams may be combined so that the combined stream may be introduced into the energy recovery facility. The combining, when present, may take place in a continuous or batch manner. The feed stream may include solids, a melt, a predominantly liquid stream, a slurry, a predominantly gas stream, or combinations thereof.

Any type of energy recovery facility may be used. In some embodiments, the energy recovery facility may comprise at least one furnace or incinerator. The incinerator may be gas-fed, liquid-fed, or solid-fed, or may be configured to accept a gas, liquid, or solid. The incinerator or furnace may be configured to thermally combust at least a portion of the hydrocarbon components in the feed stream with an oxidizing agent. In an embodiment or in combination with any embodiment mentioned herein, the oxidizing agent comprises at least 5, at least 10, at least 15, at least 20, or at least 25 and/or not more than 95, not more than 90, not more than 80, not more than 70, not more than 65, not more than 60, not more than 55, not more than 50, not more than 45, not more than 40, not more than 35, not more than 30, or not more than 25 mole percent oxygen, based on the total moles of oxidizing agent. Other components of the oxidizing agent can include, for example, nitrogen, or carbon dioxide. In other embodiments, the oxidizing agent comprises air.

In the energy recovery facility, at least 50, at least 60, at least 70, at least 80, at least 90, or at least 95 weight percent of the feed introduced therein can be combusted to form energy and combustion gases such as water, carbon monoxide, carbon dioxide, and combinations thereof. In some embodiments, at least a portion of the feed may be treated to remove compounds such as sulfur and/or nitrogen-containing compounds, to minimize the amount of nitrogen and sulfur oxides in the combustion gases.

In an embodiment or in combination with any embodiment mentioned herein, at least a portion of the energy generated may be used to directly or indirectly heat a process stream. For example, at least a portion of the energy may be used to heat water to form steam, or to heat steam and form superheated steam. At least a portion of the energy generated may be used to heat a stream of heat transfer medium (such as, for example, THERMINOL®), which itself, when warmed, may be used to transfer heat to one or more process streams. At least a portion of the energy may be used to directly heat a process stream.

In some embodiments, the process stream heated with at least a portion of the energy from the energy recovery facility may be a process stream from one or more of the facilities discussed herein, including, for example, at least one of a solvolysis facility, a pyrolysis facility, a cracker facility, a POX gasification facility, a solidification facility. The energy recovery facility 80 may be in a separate geographical area or in its own separate facility, while, in one or more other embodiments, at least a portion of the energy recovery facility 80 may be located in or near one of the other facilities. For example, an energy recovery facility 80 within a chemical recycling facility 10 as shown in FIG. 1 may include an energy recovery furnace in the solvolysis facility and another energy recovery furnace in a POX gasification facility.

Other Processing Facilities

In an embodiment or in combination with any embodiment mentioned herein, the chemical processing facility 10 generally shown in FIG. 1 may include at least one other type of downstream chemical recycling facility and/or one or more other systems or facilities for processing one or more of the chemical recycling product or coproduct streams. Examples of suitable types of other facilities can include, but are not limited to, a solidification facility and a product separation facility. Additionally, at least a portion of one or more streams may be transported or sold to an end user or customer, and/or at least a portion of one or more streams may be sent to a landfill or other industrial disposal site.

Solidification Facility

In an embodiment or in combination with any embodiment mentioned herein, the chemical recycling facility 10 may also comprise a solidification facility. As used herein, the term “solidification” refers to causing a non-solid material to become a solid material through a physical means (e.g., cooling) and/or chemical means (e.g., precipitation). A “solidification facility” is a facility that includes all equipment, lines, and controls necessary to carry out solidification of a feedstock derived from waste plastic.

A feed stream introduced into the solidification facility may originate from one or more locations within the chemical recycling facility 10. For example, the feed stream to the solidification facility may comprise at least one of one or more solvolysis coproduct streams, a stream from the pyrolysis facility including pyrolysis oil (pyrolysis oil) and/or pyrolysis residue, a predominantly liquid stream from one or more facilities, and combinations thereof. Definitions for pyrolysis oil and pyrolysis residue are provided herein. One or more of these streams may be introduced into the solidification facility continuously or one or more of these streams may be introduced intermittently. When multiple types of feed streams are present, each may be introduced separately, or all, or a portion, of the streams may be combined so that the combined stream may be introduced into the solidification facility. The combining, when performed, may take place in a continuous or batch manner.

The solidification facility may include a cooling zone for cooling and at least partially solidifying the feed stream, followed by an optional size reduction zone. Upon leaving the cooling zone, all or a portion of stream may be a solidified material. In some cases, the solidified material can be in the form of sheets, blocks, or chunks, or it may be in the form of flakes, tablets, pastilles, particles, pellets, micropellets, or a powder. When the feed stream is only partially solidified, the stream withdrawn from the cooling zone may comprise both a solid and a liquid phase. At least a portion of the solid phase may be removed and all or a portion of the liquid phase may be withdrawn from the solidification facility and introduced into another facility, optionally within the chemical recycling facility (such as, for example, the solvolysis facility).

In an embodiment or in combination with any embodiment mentioned herein, the solidification facility may also include a size reduction zone for reducing the size of the solid material and forming a plurality of particles. In an embodiment or in combination with any embodiment mentioned herein, the size reduction may include comminuting, smashing, breaking, or grinding/granulating larger pieces or chunks of solidified material to form the particles. In other embodiments, at least a portion of the feed stream to the solidification facility may be at least partially cooled before being pelletized via conventional pelletization devices. Regardless of how the particles are formed, the resulting solids can have an a D90 particle size of at least 50, at least 75, at least 100, at least 150, at least 250, at least 350, at least 450, at least 500, at least 750 microns, or at least 0.5, at least 1, at least 2, at least 5, or at least 10 mm and/or not more than 50, not more than 45, not more than 40, not more than 30, not more than 35, not more than 30, not more than 25, not more than 20, not more than 15, not more than 10, not more than 5, not more than 2, not more than 1 mm or not more than 750, not more than 500, not more than 250, or not more than 200 microns. The solids may comprise a powder. The solids may comprise pellets of any shape. The solids can have a recycle content of at least 1, at least 5, at least 10, at least 15, at least 20, at least 25, at least 30, at least 35, at least 40, at least 45, at least 50, at least 55, at least 60, at least 65, at least 70, at least 75, at least 80, at least 85, at least 90, or at least 95 weight percent, based on the total weight of the solids.

The solids withdrawn from the solidification facility may be routed to one or more (or two or more) of the pyrolysis facility, the energy recovery facility, and/or the POX gasification facility. The solids can be in the form of solids or may be melted or otherwise at least partially liquified prior to or during transport. In some embodiments, the solids may be combined with a liquid to form a slurry and the slurry may be introduced into one or more chemical recycling facilities as described herein. Examples of suitable liquids can include, but are not limited to, water, alcohols, and combinations thereof. In an embodiment or in combination with any embodiment mentioned herein, at least a portion of the solids can be heated to at least partially melt or liquefy the solids and the resulting melt can be introduced into one or more of facilities described above. Optionally, at least a portion of the solids may be sent to an industrial landfill (not shown).

Product Separation Facility

In an embodiment or in combination with any embodiment mentioned herein, at least a portion of one of the streams within the chemical recycling facility 10 shown in FIG. 1 may be separated in a product separation facility (represented by numeral 90 in FIG. 1) to form a product stream suitable for further sale and/or use. For example, at least a portion of one or more of the solvolysis coproduct streams may be further processed in a separation zone to form one or more purified or refined product streams. Examples of suitable processes used in the separation zone can include, but are not limited to, distillation, extraction, decanting, stripping, rectification, and combinations thereof. The refined streams form the product separation zone can include at least 50, at least 55, at least 60, at least 65, at least 70, at least 75, at least 80, at least 85, at least 90, or at least 95 weight percent of a desired component or components, based on the total weight of the refined product stream. Examples of desired components can include certain alcohols or glycols (e.g., ethylene glycol, methanol), alkanes (e.g., ethane, propane, and butane and heavier), and olefins (e.g., propylene, ethylene, and combinations).

Weight percentages expressed on the MPW are the weight of the MPW as fed to the first stage separation and prior to addition of any diluents/solutions such as salt or caustic solutions.

This invention can be further illustrated by the following examples of embodiments thereof, although it will be understood that these examples are included merely for the purposes of illustration and are not intended to limit the scope of the invention unless otherwise specifically indicated.

EXAMPLES

Examples 1-5

An experiment was carried out to analyze the effects of adding a pyrolysis oil to a melt tank setup so as to facilitate the dissolution and melting of the initial waste plastic feedstock.

TABLE 1 provides the compositional breakdown of the initial waste plastic feedstock generally received from municipal recycling facilities (MRFs) before and after a PET stream (and any PVC contamination) is removed for a separate methanolysis process (as described herein). The PET stream was removed using a sink/float separation method. The following percentages listed in TABLE 1 are based on weight percentages of the entire feedstock.

TABLE 1

| Feed Composition | Full Stream (Pre-PET Removal) | Full Stream (Post-PET Removal) |
|---|---|---|
| PET | 49.8% | 1.0% |
| HDPE | 42.2% | 83.7% |
| PP | 7.1% | 14.1% |
| LDPE | 0.2% | 0.4% |
| PS | 0.4% | 0.8% |
| PVC | 0.3% | 0.006% |
| Total | 100% | 100% |
| PVC ppm | 3,000 | 60 |
| CI ppm | 1,701 | 34 |

Examination of the Post-PET Removal waste plastic stream (i.e., the "polyolefin-rich stream") showed that it was dominated by polyolefins (~84% HDPE and ~14% PP). Thus, this experiment focused on melting this remaining polyolefin-rich stream and thereby forming a liquefied waste plastic that could be fed as a liquid to an existing coal slurry fed gasifier. It has been observed that polyethylene (especially HDPE) does not readily degrade at 340° C. to a low viscosity as rapidly as other plastics. Plastics like polypropylene and polystyrene generally degrade quickly and undergo significant viscosity reduction at 340° C. Thus, the focus of this experiment was developing a process to reduce the viscosity of HDPE (and the other waste plastics) at a maximum temperature of 340° C., including via dilution with a pyrolysis oil.

Initially, liquification of 50 grams of the polyolefin-rich stream was conducted at 340° C. for various time periods (15 minutes, one hour, two hours, and three hours) in a continuously-stirred glass round bottom tank. The viscosity and other properties of the liquefied plastic streams derived from these tests are outlined in TABLE 2, below.

TABLE 2

| Example | Mn (Da) | Mw (Da) | Mz (Da) | Mw/ Mn | Mass Loss % | Time | Viscosity (Poise) 1 rad/s | 10 rad/s | 100 rad/s |
|---|---|---|---|---|---|---|---|---|---|
| 1 | 22,722 | 131,085 | 778,462 | 5.77 | NA | 15 Min. | 2780 | 2062 | 1181 |
| 2 | 21,441 | 72,434 | 169,943 | 3.38 | 3.66 | 1 Hour | 1156 | 969 | 659 |
| 3 | 24,814 | 73,665 | 168,405 | 2.97 | NA | 1 Hour | 1204 | 993 | 671 |
| 4 | 18,833 | 57,933 | 142,446 | 3.08 | 0.50 | 2 Hours | 576 | 489 | 365 |
| 5 | 18,738 | 66,487 | 164,425 | 3.55 | 1.90 | 3 Hours | 319 | 284 | 239 |

As shown above in TABLE 2, the presence of PP and other minor plastics helped enhance the viscosity reduction of the blend either by dilution with their degraded fragments or by enhancing the radical reactions degradation of the polyethylene.

Example 6

For this experiment, the initial polyolefin-rich stream used in Examples 1-5 was separated into a "smaller portion" (20% by weight) and a "larger portion" (80% by weight). The smaller portion was initially subjected to pyrolysis at 400° C. in the vessel depicted in FIG. 25 to thereby form a pyrolysis oil. Subsequently, this pyrolysis oil was combined with the larger portion of the polyolefin-rich stream to thereby subject this larger solid portion to liquification in the presence of the pyrolysis oil at a temperature of 340° C. While not wishing to be bound by theory, it was thought that this small amount of added pyrolysis oil may act as an "initiation" source when it is was combined with the non-melted larger portion in the melt vessel and thereby enhance the rate of polyethylene molecular weight reduction. The additional initiation may overcome the crosslinking/branching reactions resulting in an overall accelerated reduction in overall molecular weight. This impact may be due to the increased initiation of radicals, which may influence chain scission or increase the termination rate, thereby resulting in less propagation by each radical on average and possibly reducing crosslinking and branching.

The process began by obtaining the polyolefin-rich stream from TABLE 1 in Examples 1-5 and dividing it into a "smaller portion" (containing ~20% by weight of the initial polyolefin-rich stream) and a "larger portion" (containing ~80% by weight of the initial polyolefin-rich stream). TABLE 3 provides the masses in grams of each plastic in the initial polyolefin-rich stream, the smaller portion, and the larger portion.

TABLE 3

| Plastic | Initial Feedstock | Small Portion (20%) | Larger Portion (80%) |
|---|---|---|---|
| PET | 0.485 | 0.01 | 0.392 |
| HDPE | 41.025 | 8.49 | 33.3 |
| PP | 6.905 | 1.36 | 5.6 |
| LDPE | 0.2 | 0.0575 | 0.316 |
| PS | 0.4 | 0.0963 | 0.156 |

Figure 25:
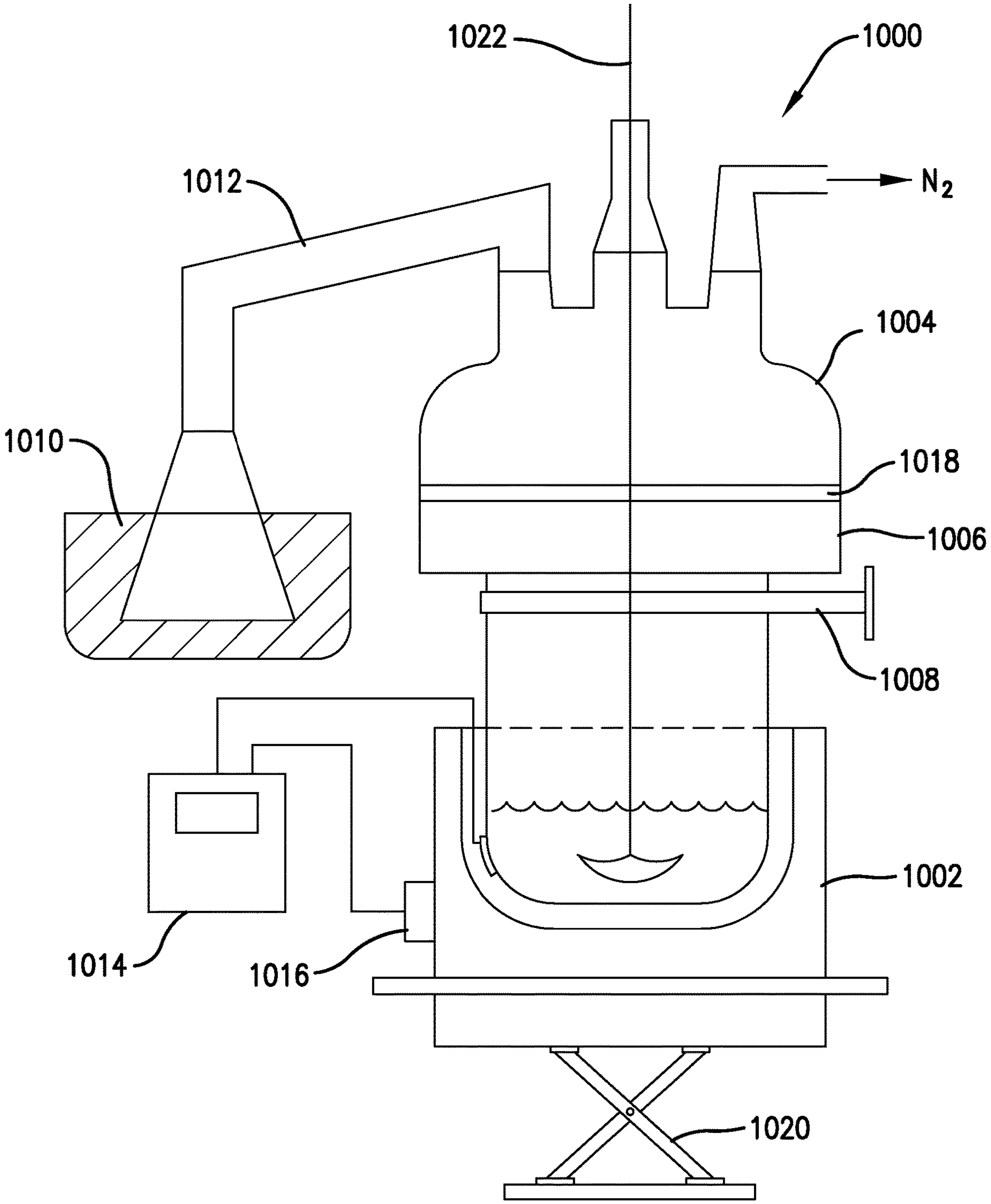
FIG. 25 depicts the reactor configuration used for Example 6.

The reactor setup as shown in FIG. 25 was used to carry out the experimental process.

As shown in FIG. 25, a metal reactor bottom 1006 was used along with a high temperature heating mantle 1002. The heating mantle 1002 was manufactured with internal components that could withstand high temperatures (up to 600° C.). As depicted in FIG. 25, the reactor 1000 contained a stainless-steel stir rod 1022 for agitation. In addition, a glass resin kettle top 1004 was attached to the metal reactor 1000 and held in place by a standard metal clamps 1008 and 1018. High temperature vacuum grease was used as the seal between the reactor flange and the kettle top. Furthermore, a polymer head takeoff 1012 was used and attached to a glass sidearm, which was then attached to an Erlenmeyer flask/trap 1010. The mantle/reactor setup was placed in a half mole polymerization rig, such that the mantle could be raised and lowered from the reactor bottom. A thermocouple 1016 was attached to the Eurotherm controller 1014 and then placed between the reactor bottom 1006 and the heating mantle 1002. As a result of this configuration, the measured temperature is that of the reactor external wall and not the internal plastic temperature. It was assumed that the heat transfer was such that the internal plastic reached the measured temperature in a relatively short period of time. Finally, the reactor was mounted on a jack 1020 so that the reactor could be raised and lowered as desired.

The process for producing and using the pyrolysis oil in the liquification process was as follows. First, the smaller portion of the feedstock was charged to the reactor and the reactor was purged with nitrogen. Subsequently, the plastic in the smaller portion was melted at 340° C. and held there to equilibrate with no agitation for 30 minutes. Afterwards, the temperature in the reactor was raised to 400° C. and the melted plastic was held at this temperature for one minute and subjected to agitation at 15 to 18 rpm to thereby produce a pyrolysis product comprising pyrolysis oil. After the one-minute hold, the mixture was cooled below 395° C. and the larger portion (in solid form) was added to the reactor. While not wishing to be bound by theory, it was believed that enhancement of the degradation of the remaining larger portion of the polyolefin-rich stream (i.e., the 80% portion) could be explained by the effects of increased radical activity from the pyrolysis products, particularly the pyrolysis oil, produced by the smaller portion. Melting the remaining larger portion (i.e., the 80% portion) of the polyolefin-rich stream cooled the contents within the reactor and the heating mantle was then set at 340° C. After melting the remaining mass of material and stabilizing the temperature at 340° C. The contents in the reactor were held at 340° C. for approximately 5 minutes, after which the contents were cooled.

This laboratory setup attempted to examine if the higher radical activity of the pyrolysis oil stream returning from the loop at 400° C. enhanced the resulting thermal degradation of the main plastic mass or only acted as a diluent in a similar fashion as motor oil. If the returning pyrolysis oil stream enhances degradation of the main mass of molten plastic via increased radical activity (initiation), then this would have implications on the size of the pyrolysis oil stream needed. From the crude lab simulation described above, and as shown in TABLE 4 below, the viscosity of the normal mix was reduced to 1.2 poise (350° C. and 10 rad/s).

TABLE 4

| Example | Mn (Da) | Mw (Da) | Mz (Da) | Mw/ Mn | Mass Loss % | Viscosity (Poise) 1 rad/s | 10 rad/s | 100 rad/s |
|---|---|---|---|---|---|---|---|---|
| 6 | 3,085 | 12,588 | 46,450 | 4.081 | 11.0 | 1.27 | 1.2 | 1.2 |

As shown above in TABLE 4, the viscosity of the larger portion of the polyolefin-rich stream was reduced to 1.2 poise (at 350° C. and 10 rad/s). Thus, this demonstrates that the presence of pyrolysis oil, derived from a smaller portion of the initial polyolefin-rich stream, may be used to enhance the liquification of the remaining polyolefin-rich stream not exposed to pyrolysis conditions.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the term "caustic" refers to any basic solution (e.g., strong bases, concentrated weak bases, etc.) that can be used in the technology as a cleaning agent, for killing pathogens, and/or reducing odors.

As used herein, the term "centrifugal density separation" refers to a density separation process where the separation of materials is primarily cause by centrifugal forces.

As used herein, the term "chemical recycling" refers to a waste plastic recycling process that includes a step of chemically converting waste plastic polymers into lower molecular weight polymers, oligomers, monomers, and/or non-polymeric molecules (e.g., hydrogen, carbon monoxide, methane, ethane, propane, ethylene, and propylene) that are useful by themselves and/or are useful as feedstocks to another chemical production process(es).

As used herein, the term "chemical recycling facility" refers to a facility for producing a recycle content product via chemical recycling of waste plastic. A chemical recycling facility can employ one or more of the following steps: (i) preprocessing, (ii) solvolysis, (iii) pyrolysis, (iv) cracking, and/or (v) POX gasification.

As used herein, the term "co-located" refers to the characteristic of at least two objects being situated on a common physical site, and/or within one mile of each other.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the term "conducting" refers to the transport of a material in a batchwise and/or continuous manner.

As used herein, the term "cracking" refers to breaking down complex organic molecules into simpler molecules by the breaking of carbon-carbon bonds.

As used herein, the term "D90" refers to a specified diameter where ninety percent of a distribution of particles has a smaller diameter than the specified diameter and ten percent has a larger diameter than the specified diameter. To ensure that a representative D90 value is obtained, the sample size of the particles should be at least one pound. To determine a D90 for particles in a continuous process, testing should be performed on at least 5 samples that are taken at equal time intervals over at least 24 hours. Testing for D90 is performed using high-speed photography and computer algorithms to generate a particle size distribution. One suitable particle size analyzer for determining D90 values is the Model CPA 4-1 Computerized Particle Analyzer from W. S Tyler of Mentor, Ohio.

As used herein, the term "diameter" means the maximum chord length of a particle (i.e., its largest dimension).

As used herein, the term "density separation process" refers to a process for separating materials based, at least in part, upon the respective densities of the materials. Moreover, the terms "low-density separation stage" and "high-density separation stage" refer to relative density separation processes, wherein the low-density separation has a target separation density less than the target separation density of the high-density separation stage.

As used herein, the term "depleted" refers to having a concentration (on a dry weight basis) of a specific component that is less than the concentration of that component in a reference material or stream.

As used herein, the term "directly derived" refers to having at least one physical component originating from waste plastic.

As used herein, the term "enriched" refers to having a concentration (on a dry weight basis) of a specific component that is greater than the concentration of that component in a reference material or stream.

As used herein, the term "halide" refers to a composition comprising a halogen atom bearing a negative charge (i.e., a halide ion).

As used herein, the term "halogen" or "halogens" refers to organic or inorganic compounds, ionic, or elemental species comprising at least one halogen atom.

As used herein, the terms "having," "has," and "have" have the same open-ended meaning as "comprising," "comprises," and "comprise" provided above.

As used herein, the term "heavy organic methanolysis coproduct" refers to a methanolysis coproduct with a boiling point greater than DMT.

As used herein, the term "heavy organic solvolysis coproduct" refers to a solvolysis coproduct with a boiling point greater than the principal terephthalyl product of the solvolysis facility.

As used herein, the terms "including," "include," and "included" have the same open-ended meaning as "comprising," "comprises," and "comprise" provided above.

As used herein, the term "indirectly derived" refers to having an assigned recycle content i) that is attributable to waste plastic, but ii) that is not based on having a physical component originating from waste plastic.

As used herein, the term "isolated" refers to the characteristic of an object or objects being by itself or themselves and separate from other materials, in motion or static.

As used herein, the term "light organic methanolysis coproduct" refers to a methanolysis coproduct with a boiling point less than DMT.

As used herein, the term "light organics solvolysis coproduct" refers to a solvolysis coproduct with a boiling point less than the principal terephthalyl product of the solvolysis facility.

As used herein, the term "methanolysis coproduct" refers to any compound withdrawn from a methanolysis facility that is not dimethyl terephthalate (DMT), ethylene glycol (EG), or methanol.

As used herein, the terms "mixed plastic waste" and "MPW" refer to a mixture of at least two types of waste plastics including, but not limited to the following plastic types: polyethylene terephthalate (PET), one or more polyolefins (PO), and polyvinylchloride (PVC).

As used herein, a "molten feed" refers to a substantially liquid feed that contains at least one component that is in substantially liquid form and has been heated above its melt temperature and/or glass transition temperature.

As used herein, a "molten waste plastic" refers to a waste plastic in substantially liquid form that has been heated above its melt temperature and/or glass transition temperature.

As used herein, the term "partial oxidation (POX) gasification" or "POX" refers to high temperature conversion of a carbon-containing feed into syngas, (carbon monoxide, hydrogen, and carbon dioxide), where the conversion is carried out in the presence of a less than stoichiometric amount of oxygen. The feed to POX gasification can include solids, liquids, and/or gases.

As used herein, the term "partial oxidation (POX) reaction" refers to all reactions occurring within a partial oxidation (POX) gasifier in the conversion of a carbon-containing feed into syngas, including but not limited to partial oxidation, water gas shift, water gas—primary reactions, Boudouard, oxidation, methanation, hydrogen reforming, steam reforming, and carbon dioxide reforming.

As used herein, the term "partial oxidation" refers to high temperature conversion of a carbon-containing feed into syngas (carbon monoxide, hydrogen, and carbon dioxide), where the conversion is carried out with an amount of oxygen that is less than stoichiometric amount of oxygen needed for complete oxidation of carbon to CO2.

As used herein, "PET" means a homopolymer of polyethylene terephthalate, or polyethylene terephthalate modified with modifiers or containing residues or moieties of other than ethylene glycol and terephthalic acid, such as isophthalic acid, 1,4-cyclohexanedicarboxylic acid, diethylene glycol, TMCD (2,2,4,4-tetramethyl-1,3-cyclobutanediol), CHDM (cyclohexanedimethanol), propylene glycol, isosorbide, 1,4-butanediol, 1,3-propane diol, and/or NPG (neopentylglycol), or polyesters having repeating terephthalate units (and whether or not they contain repeating ethylene glycol based units) and one or more residues or moieties of TMCD (2,2,4,4-tetramethyl-1,3-cyclobutanediol), CHDM (cyclohexanedimethanol), propylene glycol, or NPG (neopentylglycol), isosorbide, isophthalic acid, 1,4-cyclohexanedicarboxylic acid, 1,4-butanediol, 1,3-propane diol, and/or diethylene glycol, or combinations thereof.

As used herein, the term "overhead" refers to the physical location of a structure that is above a maximum elevation of quantity of particulate plastic solids within an enclosed structure.

As used herein, the term "partial oxidation (POX) gasification facility" or "POX Facility" refers to a facility that includes all equipment, lines, and controls necessary to carry out POX gasification of waste plastic.

As used herein, the term "partially processed waste plastic" means waste plastic that has been subjected to at least on automated or mechanized sorting, washing, or comminuted step or process. Partially processed waste plastics may originate from, for example, municipal recycling facilities (MRFs) or reclaimers. When partially processed waste plastic is provided to the chemical recycling facility, one or more preprocessing steps may me skipped.

As used herein, the term "PET solvolysis" refers to a reaction by which a polyester terephthalate-containing plastic feed is chemically decomposed in the presence of a solvent to form a principal terephthalyl product and/or a principal glycol product.

As used herein, the term "physical recycling" (also known as "mechanical recycling") refers to a waste plastic recycling process that includes a step of melting waste plastic and forming the molten plastic into a new intermediate product (e.g., pellets or sheets) and/or a new end product (e.g., bottles). Generally, physical recycling does not substantially change the chemical structure of the plastic, although some degradation is possible.

As used herein, the term "predominantly" means more than 50 percent by weight. For example, a predominantly propane stream, composition, feedstock, or product is a stream, composition, feedstock, or product that contains more than 50 weight percent propane.

As used herein, the term "preprocessing" refers to preparing waste plastic for chemical recycling using one or more of the following steps: (i) comminuting, (ii) particulating, (iii) washing, (iv) drying, and/or (v) separating.

As used herein, the term "pyrolysis" refers to thermal decomposition of one or more organic materials at elevated temperatures in an inert (i.e., substantially oxygen free) atmosphere.

As used herein, the term "pyrolysis char" refers to a carbon-containing composition obtained from pyrolysis that is solid at 200° C. and 1 atm.

As used herein, the term "pyrolysis gas" refers to a composition obtained from pyrolysis that is gaseous at 25° C.

As used herein, the term "pyrolysis heavy waxes" refers to C20+ hydrocarbons obtained from pyrolysis that are not pyrolysis char, pyrolysis gas, or pyrolysis oil.

As used herein, the term "pyrolysis oil" or "pyoil" refers to a composition obtained from pyrolysis that is liquid at 25° C. and 1 atm.

As used herein, the term "pyrolysis residue" refers to a composition obtained from pyrolysis that is not pyrolysis gas or pyrolysis oil and that comprises predominantly pyrolysis char and pyrolysis heavy waxes.

As used herein, the term "recycle content" and "r-content" refer to being or comprising a composition that is directly and/or indirectly derived from waste plastic.

As used herein, the term "resin ID code" refers to the set of symbols and associated number (1 through 7) appearing on plastic products that identify the plastic resin out of which the product is made, developed originally in 1988 in the United States but since 2008 has been administered by ASTM International.

As used herein, the term "resin ID code 1" refers to plastic products made from polyethylene terephthalate (PET). Such plastic products may include soft drink bottles, mineral water bottles, juice containers, and cooking oil containers.

As used herein, the term "resin ID code 2" refers to plastic products made from high-density polyethylene (HDPE). Such plastic products may include milk jugs, cleaning agent and laundry detergent containers, shampoo bottles, and soap containers.

As used herein, the term "resin ID code 3" refers to plastic products made from polyvinyl chloride (PVC). Such plastic products may include fruit and sweets trays, plastic packing (bubble foil), and food wrap.

As used herein, the term "resin ID code 4" refers to plastic products made from low-density polyethylene (LDPE). Such plastic products may include shopping bags, light weight bottles, and sacks.

As used herein, the term "resin ID code 5" refers to plastic products made from polypropylene (PP). Such plastic products may include furniture, auto parts, industrial fibers, luggage, and toys.

As used herein, the term "resin ID code 6" refers to plastic products made from polystyrene (PS). Such plastic products may include toys, hard packing, refrigerator trays, cosmetic bags, costume jewelry, CD cases, vending cups, and clamshell containers.

As used herein, the term "resin ID code 7" refers to plastic products made from plastics other than those defined as resin ID codes 1-6, including but not limited to, acrylic, polycarbonate, polyactic fibers, nylon, and fiberglass. Such plastic products may include bottles, headlight lenses, and safety glasses.

As used herein, the term "separation efficiency" refers to the degree of separation between at two or more phases or components as defined in FIG. 26.

As used herein, the term "sink-float density separation" refers to a density separation process where the separation of materials is primarily caused by floating or sinking in a selected liquid medium.

As used herein, the term "solvolysis" or "ester solvolysis" refers to a reaction by which an ester-containing feed is chemically decomposed in the presence of a solvent to form a principal carboxyl product and/or a principal glycol product. Examples of solvolysis include, hydrolysis, alcoholysis, and ammonolysis.

As used herein, the term "solvolysis coproduct" refers to any compound withdrawn from a solvolysis facility that is not the principal carboxyl (terephthalyl) product of the solvolysis facility, the principal glycol product of the solvolysis facility, or the principal solvent fed to the solvolysis facility.

As used herein, "sparging" refers to injecting a gaseous material into a predominantly liquid medium at multiple locations.

As used herein, the term "terephthalyl" refers to a molecule including the following group:

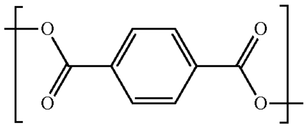

As used herein, the term "principal terephthalyl" refers to the main or key terephthalyl product being recovered from the solvolysis facility.

As used herein, the term "glycol" refers to a component comprising two or more —OH functional groups per molecule.

As used herein, the term "principal glycol" refers to the main glycol product being recovered from the solvolysis facility.

As used herein, the term "target separation density" refers to a density above which materials subjected to a density separation process are preferentially separated into the higher-density output and below which materials are separated in the lower-density output.

As used herein, the terms "waste plastic" and "plastic waste" refer to used, scrap, and/or discarded plastic materials. The waste plastic fed to the chemical recycling facility may be unprocessed or partially processed.

As used herein, the term "unprocessed waste plastic" means waste plastic that has not be subjected to any automated or mechanized sorting, washing, or comminuting. Examples of unprocessed waste plastic include waste plastic collected from household curbside plastic recycling bins or shared community plastic recycling containers.

As used herein, the phrase "at least a portion" includes at least a portion and up to and including the entire amount or time period.

As used herein, the term "waste plastic particulates" refers to waste plastic having a D90 of less than 1 inch.

As used herein, the term "predominantly" means at least 50 weight percent of something, based on its total weight. For example, a composition comprising "predominantly" component A includes at least 50 weight percent of component A, based on the total weight of the composition.

As used herein, "downstream" means a target unit operation, vessel, or equipment that:

is in fluid (liquid or gas) communication, or in piping communication, with an outlet stream from the radiant section of a cracker furnace, optionally through one or more intermediate unit operations, vessels, or equipment, or was in fluid (liquid or gas) communication, or in piping communication, with an outlet stream from the radiant section of a cracker furnace, optionally through one or more intermediate unit operations, vessels, or equipment, provided that the target unit operation, vessel, or equipment remains within the battery limits of the cracker facility (which includes the furnace and all associated downstream separation equipment).

Claims not Limited to Disclosed Embodiments

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A waste plastic dehalogenation process comprising:

(a) liquefying solid waste plastic in a melt tank to produce a liquefied waste plastic;

(b) circulating said liquified waste plastic through a circulation loop external to the melt tank, said circulation loop including a halogen stripper;

(c) sparging a stripping gas into said halogen stripper and through the liquefied waste plastic in the external halogen stripper to produce a multi-phase mixture, wherein sparging uses a sparger inside the halogen stripper, wherein the sparger comprises a sparger tube and sparger apertures, wherein the sparger apertures are positioned below a lateral axis of the sparger tube at an angle from 10 to 50 degrees relative to a horizontal axis; and (d) disengaging a gaseous phase from a liquid phase of said multi-phase mixture to thereby provide a halogen-enriched gaseous material and a halogen-depleted liquefied waste plastic.

2. The process according to claim 1, wherein said stripping gas comprises nitrogen, steam, methane, carbon monoxide, hydrogen, or a combination thereof.

3. The process according to claim 1, wherein said liquefying comprises liquefying at least a portion of said solid waste plastic in the melt tank, wherein the liquified waste plastic in said melt tank is maintained at a temperature of 200 to 500° C.

4. The process according to claim 3, comprising a melting system comprising a heat exchanger outside of said melt tank, wherein said liquefying comprises: (i) circulating said liquefied waste plastic through said melt tank and said heat exchanger in said circulation loop and (ii) heating said liquefied waste plastic in said heat exchanger while circulating in said circulation loop.

5. The process according to claim 4, wherein said sparging is carried out in said halogen stripper located downstream of said heat exchanger and upstream of said melt tank.

6. The process according to claim 4, wherein said disengaging is carried out in said circulation loop using a disengagement vessel located downstream of said halogen stripper and upstream of said melt tank.

7. The process of claim 5, wherein said halogen-depleted liquefied waste plastic has a halogen content of not more than 100 ppmw.

8. The process of claim 1, wherein said disengaging is carried out in said circulation loop using a disengagement vessel located downstream of said halogen stripper and upstream of said melt tank, and a portion of the halogen-depleted liquid phase is discharged from an outlet of the disengagement vessel and returned to the melt tank, and a halogen-enriched gaseous material stream is removed from an outlet of the disengagement vessel.

9. The process of claim 1, wherein said disengaging is carried out in said circulation loop using a disengagement vessel located downstream of said halogen stripper and upstream of said melt tank, and a portion of the halogen-depleted liquid phase is reintroduced into the melt tank and/or sent downstream for further processing, and a halogen-enriched gaseous material stream is removed from an outlet of the disengagement vessel.

10. The process according to claim 1, wherein said liquefying comprises liquefying at least a portion of said solid waste plastic in a melt tank in presence of at least one dissolution solvent, wherein said dissolution solvent comprises a pyrolysis oil, an overall feed stream introduced into liquification system comprises 1 to 50 weight percent of the at least one dissolution solvent, based on a total weight of the overall feed stream.

11. The process according to claim 10, wherein the circulation loop external to the melt tank comprises a heat exchanger outside the melt tank and (b) circulating said liquefied waste plastic through said melt tank and said heat exchanger in the circulation loop and (ii) heating said liquefied waste plastic in said heat exchanger while circulating in said circulation loop.

12. The process according to claim 11, wherein at least a portion of the halogen-depleted liquefied waste plastic is returned to the melt tank for further liquefying and at least a portion of the halogen-depleted liquefied waste plastic is removed for further processing in a downstream facility; wherein a ratio of the halogen-depleted liquefied waste plastic returned to the melt tank to the halogen-depleted liquefied waste plastic removed is in the range of 0.1:1 to 40:1.

* * * * *